（12）United States Patent
Ho et al.

(10) Patent No.: US 11,002,923 B2
(45) Date of Patent: May 11, 2021

(54) FIBER OPTIC CONNECTOR WITH CABLE BOOT RELEASE HAVING A TWO-PIECE CLIP ASSEMBLY

(71) Applicant: Senko Advanced Components, Inc., Marlborough, MA (US)

(72) Inventors: Man Ming Ho, Kowloon (HK); Kazuyoshi Takano, Tokyo (JP)

(73) Assignee: Senko Advanced Components, Inc., Marlborough, MA (US)

( * ) Notice: Subject to any disclaimer, the term of this patent is extended or adjusted under 35 U.S.C. 154(b) by 0 days.

(21) Appl. No.: 16/569,546

(22) Filed: Sep. 12, 2019

(65) Prior Publication Data

US 2020/0064564 A1   Feb. 27, 2020

Related U.S. Application Data

(63) Continuation-in-part of application No. 16/161,046, filed on Oct. 15, 2018, now Pat. No. 10,712,512, and
(Continued)

(51) Int. Cl.
*G02B 6/36* (2006.01)
*G02B 6/38* (2006.01)

(52) U.S. Cl.
CPC ......... *G02B 6/3893* (2013.01); *G02B 6/3825* (2013.01); *G02B 6/3847* (2013.01); *G02B 6/3887* (2013.01)

(58) Field of Classification Search
CPC .. G02B 6/3893; G02B 6/3825; G02B 6/3847; G02B 6/3887; G02B 6/387; G02B 6/3821; G02B 6/3879
See application file for complete search history.

(56) References Cited

U.S. PATENT DOCUMENTS 585,194 A   6/1897 Favor
678,283 A   7/1901 Schaefer
(Continued)

FOREIGN PATENT DOCUMENTS

CN   2836038 Y   11/2006
CN   201383588 Y   1/2010
(Continued)

OTHER PUBLICATIONS

Fiber Optic Connectors and Assemblies Catalog, 2009, Huber & Suhner Fiber Optics, Herisau, Switzerland.
(Continued)

*Primary Examiner* — Ellen E Kim
(74) *Attorney, Agent, or Firm* — Edward S. Jarmolowicz, Esq.

(57) ABSTRACT

Connector assemblies are described herein. For example, a connector assembly including: a housing configured to accept a first ferrule and a second ferrule. The connector assembly may also have a push/pull clip that is configure to depress a protrusion that rotates down a connector device to remove the connector assembly from an adapter. The push/pull clip is integrated with a cable boot assembly that allows a user to apply a distal force to remove or insert the connector assembly into the adapter housing. The push/pull clip is configured for use to release a MPO and LC connector type from an adapter.

8 Claims, 103 Drawing Sheets

Related U.S. Application Data a continuation-in-part of application No. 15/819,629, filed on Nov. 21, 2017, now Pat. No. 10,663,676.

(60) Provisional application No. 62/730,304, filed on Sep. 12, 2018.

(56) References Cited

U.S. PATENT DOCUMENTS

| | | | |
|---|---|---|---|
| 3,721,945 | A | 3/1973 | Hults |
| 4,150,790 | A | 4/1979 | Potter |
| 4,240,695 | A | 12/1980 | Evans |
| 4,327,964 | A | 5/1982 | Haesly |
| 4,478,473 | A | 10/1984 | Frear |
| 4,762,388 | A | 8/1988 | Tanaka |
| 4,764,129 | A | 8/1988 | Jones |
| 4,840,451 | A | 6/1989 | Sampson |
| 4,872,736 | A | 10/1989 | Myers |
| 4,979,792 | A | 12/1990 | Weber |
| 5,026,138 | A | 6/1991 | Boudreau |
| 5,031,981 | A | 7/1991 | Peterson |
| 5,041,025 | A | 8/1991 | Haitmanek |
| 5,073,045 | A | 12/1991 | Abendschein |
| D323,143 | S | 1/1992 | Ohkura |
| 5,101,463 | A | 3/1992 | Cubukciyan |
| 5,146,813 | A | 9/1992 | Stanfill, Jr. |
| 5,159,652 | A | 10/1992 | Grassin D'Alphonse |
| 5,265,181 | A | 11/1993 | Chang |
| 5,289,554 | A | 2/1994 | Cubukciyan |
| 5,315,679 | A | 5/1994 | Baldwin |
| 5,317,663 | A | 5/1994 | Beard |
| 5,321,784 | A | 6/1994 | Cubukciyan |
| 5,335,301 | A | 8/1994 | Newman |
| 5,348,487 | A | 9/1994 | Marazzi |
| 5,418,875 | A | 5/1995 | Nakano |
| 5,444,806 | A | 8/1995 | de Marchi |
| 5,481,634 | A | 1/1996 | Anderson |
| 5,506,922 | A | 4/1996 | Grois |
| 5,521,997 | A | 5/1996 | Rovenolt |
| 5,570,445 | A | 10/1996 | Chou |
| 5,588,079 | A | 12/1996 | Tanabe |
| 5,602,951 | A | 2/1997 | Shiota |
| 5,684,903 | A | 11/1997 | Kyomasu |
| 5,687,268 | A | 11/1997 | Stephenson |
| 5,781,681 | A | 7/1998 | Manning |
| 5,845,036 | A | 12/1998 | De Marchi |
| 5,862,282 | A | 1/1999 | Matsuura |
| 5,915,987 | A | 6/1999 | Reed |
| 5,930,426 | A | 7/1999 | Harting |
| 5,937,130 | A | 8/1999 | Amberg |
| 5,953,473 | A | 9/1999 | Shimotsu |
| 5,956,444 | A | 9/1999 | Duda |
| 5,971,626 | A | 10/1999 | Knodell |
| 6,017,153 | A | 1/2000 | Carlisle |
| 6,041,155 | A | 3/2000 | Anderson |
| 6,049,040 | A | 4/2000 | Biles |
| 6,095,862 | A | 8/2000 | Doye |
| 6,134,370 | A | 10/2000 | Childers |
| 6,174,190 | B1 | 1/2001 | Tharp |
| 6,178,283 | B1 | 1/2001 | Weigel |
| RE37,080 | E | 3/2001 | Stephenson |
| 6,206,577 | B1 | 3/2001 | Hall, III |
| 6,206,581 | B1 | 3/2001 | Driscoll |
| 6,227,717 | B1 | 5/2001 | Ott |
| 6,238,104 | B1 | 5/2001 | Yamakawa |
| 6,240,228 | B1 | 5/2001 | Chen |
| 6,247,849 | B1 | 6/2001 | Liu |
| 6,250,817 | B1 | 6/2001 | Lampert |
| 6,276,840 | B1 | 8/2001 | Weiss |
| 6,318,903 | B1 | 11/2001 | Andrews |
| 6,364,537 | B1 | 4/2002 | Maynard |
| 6,379,052 | B1 | 4/2002 | de Jong |
| 6,422,759 | B1 | 7/2002 | Kevern |
| 6,450,695 | B1 | 9/2002 | Matsumoto |
| 6,461,054 | B1 | 10/2002 | Iwase |
| 6,471,412 | B1 | 10/2002 | Belenkiy |
| 6,478,472 | B1 | 11/2002 | Anderson |
| 6,485,194 | B1 | 11/2002 | Shirakawa |
| 6,527,450 | B1 | 3/2003 | Miyachi |
| 6,530,696 | B1 | 3/2003 | Ueda |
| 6,551,117 | B2 | 4/2003 | Poplawski |
| 6,572,276 | B1 | 6/2003 | Theis |
| 6,579,014 | B2 | 6/2003 | Melton |
| 6,634,796 | B2 | 10/2003 | de Jong |
| 6,634,801 | B1 | 10/2003 | Waldron |
| 6,648,520 | B2 | 11/2003 | McDonald |
| 6,668,113 | B2 | 12/2003 | Togami |
| 6,682,228 | B2 | 1/2004 | Rathnam |
| 6,685,362 | B2 | 2/2004 | Burkholder |
| 6,695,486 | B1 | 2/2004 | Falkenberg |
| 6,783,280 | B2 | 8/2004 | Viklund |
| 6,817,272 | B2 | 11/2004 | Holland |
| 6,854,894 | B1 | 2/2005 | Yunker |
| 6,863,556 | B2 | 3/2005 | Viklund |
| 6,869,227 | B2 | 3/2005 | Del Grosso |
| 6,872,039 | B2 | 3/2005 | Baus |
| 6,935,789 | B2 | 8/2005 | Gross, III |
| 7,036,993 | B2 | 5/2006 | Luther |
| 7,052,186 | B1 | 5/2006 | Bates |
| 7,077,576 | B2 | 7/2006 | Luther |
| 7,091,421 | B2 | 8/2006 | Kukita |
| D533,504 | S | 12/2006 | Lee |
| D534,124 | S | 12/2006 | Taguchi |
| 7,150,567 | B1 | 12/2006 | Luther |
| 7,153,041 | B2 | 12/2006 | Mine |
| 7,198,409 | B2 | 4/2007 | Smith |
| D543,124 | S | 5/2007 | Raatikainen |
| D543,146 | S | 5/2007 | Chen |
| 7,258,493 | B2 | 8/2007 | Milette |
| 7,264,402 | B2 | 9/2007 | Theuerkorn |
| 7,281,859 | B2 | 10/2007 | Mudd |
| 7,297,013 | B2 | 11/2007 | Caveney |
| D558,675 | S | 1/2008 | Chien |
| 7,315,682 | B1 | 1/2008 | En Lin |
| 7,325,976 | B2 | 2/2008 | Gurreri |
| 7,325,980 | B2 | 2/2008 | Pepe |
| 7,329,137 | B2 | 2/2008 | Martin |
| 7,331,718 | B2 | 2/2008 | Yazaki |
| 7,354,291 | B2 | 4/2008 | Caveney |
| 7,371,082 | B2 | 5/2008 | Zimmel |
| 7,387,447 | B2 | 6/2008 | Mudd |
| 7,390,203 | B2 | 6/2008 | Murano |
| 7,431,604 | B2 | 10/2008 | Waters |
| 7,463,803 | B2 | 12/2008 | Cody |
| 7,465,180 | B2 | 12/2008 | Kusuda |
| 7,473,124 | B1 | 1/2009 | Briant |
| 7,510,335 | B1 | 3/2009 | Su |
| 7,513,695 | B1 | 4/2009 | Lin |
| 7,534,128 | B2 * | 5/2009 | Caveney ............ H01R 13/6272 29/764 |
| 7,540,666 | B2 | 6/2009 | Luther |
| 7,588,373 | B1 | 9/2009 | Sato |
| 7,591,595 | B2 | 9/2009 | Lu |
| 7,594,766 | B1 | 9/2009 | Sasser |
| 7,641,398 | B2 | 1/2010 | O'Riorden |
| 7,695,199 | B2 | 4/2010 | Teo |
| 7,712,970 | B1 * | 5/2010 | Lee ........................ G02B 6/387 385/58 |
| 7,717,625 | B2 | 5/2010 | Margolin |
| 7,824,113 | B2 | 11/2010 | Wong |
| 7,837,395 | B2 | 11/2010 | Lin |
| 7,959,455 | B1 | 6/2011 | Armstrong |
| D641,708 | S | 7/2011 | Yamauchi |
| 8,083,450 | B1 | 12/2011 | Smith |
| 8,152,385 | B2 | 4/2012 | de Jong |
| 8,186,890 | B2 | 5/2012 | Lu |
| 8,192,091 | B2 | 6/2012 | Hsu |
| 8,202,009 | B2 | 6/2012 | Lin |
| 8,221,007 | B2 | 7/2012 | Peterhans |
| 8,251,733 | B2 | 8/2012 | Wu |
| 8,267,595 | B2 | 9/2012 | Lin |
| 8,270,796 | B2 | 9/2012 | Nhep |
| 8,408,815 | B2 | 4/2013 | Lin |
| 8,414,196 | B2 | 4/2013 | Lu |
| 8,465,317 | B2 | 6/2013 | Gniadek |

(56) References Cited

U.S. PATENT DOCUMENTS

| | | |
|---|---|---|
| 8,534,928 B2 | 9/2013 | Cooke |
| 8,550,728 B2 | 10/2013 | Takahashi |
| 8,556,645 B2 | 10/2013 | Crain |
| 8,559,781 B2 | 10/2013 | Childers |
| 8,622,634 B2 | 1/2014 | Arnold |
| 8,651,749 B2 | 2/2014 | Dainese, Jr. |
| 8,676,022 B2 | 3/2014 | Jones |
| 8,678,670 B2 | 3/2014 | Takahashi |
| 8,727,638 B2 * | 5/2014 | Lee .............. G02B 6/3879 385/78 |
| 8,757,894 B2 * | 6/2014 | Katoh ............ G02B 6/3887 385/78 |
| 8,764,308 B2 * | 7/2014 | Irwin ............ G02B 6/3879 385/56 |
| 8,770,863 B2 | 7/2014 | Cooke |
| 8,864,390 B2 | 10/2014 | Chen |
| 8,869,661 B2 | 10/2014 | Opstad |
| 9,052,474 B2 | 6/2015 | Jiang |
| 9,063,296 B2 | 6/2015 | Dong |
| 9,250,402 B2 | 2/2016 | Ishii |
| 9,310,569 B2 | 4/2016 | Lee |
| 9,366,829 B2 | 6/2016 | Czosnowski |
| 9,411,110 B2 | 8/2016 | Barnette, Jr. |
| 9,448,370 B2 | 9/2016 | Xue |
| 9,465,172 B2 | 10/2016 | Shih |
| 9,494,744 B2 | 11/2016 | de Jong |
| 9,529,160 B2 * | 12/2016 | Kanno .............. G02B 6/3847 |
| 9,548,557 B2 | 1/2017 | Liu |
| 9,551,842 B2 | 1/2017 | Theuerkorn |
| 9,557,495 B2 | 1/2017 | Raven |
| 9,568,686 B2 | 2/2017 | Fewkes |
| 9,581,768 B1 | 2/2017 | Baca |
| 9,595,786 B1 | 3/2017 | Takano |
| 9,599,778 B2 | 3/2017 | Wong |
| 9,658,409 B2 | 5/2017 | Gniadek |
| 9,678,283 B1 | 6/2017 | Chang |
| 9,684,130 B2 | 6/2017 | Veatch |
| 9,684,313 B2 | 6/2017 | Chajec |
| 9,709,753 B1 | 7/2017 | Chang |
| 9,739,955 B2 | 8/2017 | Lee |
| 9,778,425 B2 | 10/2017 | Nguyen |
| 9,829,645 B2 | 11/2017 | Good |
| 9,829,653 B1 | 11/2017 | Nishiguchi |
| 9,869,825 B2 | 1/2018 | Bailey |
| 9,880,361 B2 | 1/2018 | Childers |
| 9,946,035 B2 | 4/2018 | Gustafson |
| 9,971,102 B2 | 5/2018 | Raven |
| 9,989,711 B2 | 6/2018 | Ott |
| 10,031,296 B2 | 7/2018 | Good |
| 10,042,129 B2 * | 8/2018 | Taira .............. G02B 6/3863 |
| 10,067,301 B2 | 9/2018 | Murray |
| 10,114,180 B2 * | 10/2018 | Suzic ............. G02B 6/3879 |
| 10,120,140 B2 | 11/2018 | Goldstein |
| 10,146,011 B2 | 12/2018 | Nhep |
| 10,295,758 B2 | 5/2019 | Chen |
| 2002/0168148 A1 | 11/2002 | Gilliland |
| 2002/0191919 A1 | 12/2002 | Nolan |
| 2003/0053787 A1 | 3/2003 | Lee |
| 2003/0063862 A1 | 4/2003 | Fillion |
| 2003/0157825 A1 | 8/2003 | Kane |
| 2004/0052473 A1 | 3/2004 | Seo |
| 2004/0109646 A1 | 6/2004 | Anderson |
| 2004/0136657 A1 | 7/2004 | Ngo |
| 2004/0141693 A1 | 7/2004 | Szilagyi |
| 2004/0161958 A1 | 8/2004 | Togami |
| 2004/0234209 A1 | 11/2004 | Cox |
| 2004/0247252 A1 | 12/2004 | Ehrenreich |
| 2005/0036744 A1 | 2/2005 | Caveney |
| 2005/0111796 A1 | 5/2005 | Matasek |
| 2005/0213891 A1 | 9/2005 | Hardcastle |
| 2006/0013539 A1 | 1/2006 | Thaler |
| 2006/0076061 A1 | 4/2006 | Bush |
| 2006/0089049 A1 | 4/2006 | Sedor |
| 2006/0127025 A1 | 6/2006 | Haberman |
| 2006/0153503 A1 | 7/2006 | Suzuki |
| 2006/0160429 A1 | 7/2006 | Dawiedczyk |
| 2006/0193562 A1 | 8/2006 | Theuerkorn |
| 2006/0274411 A1 | 12/2006 | Yamauchi |
| 2007/0025665 A1 | 2/2007 | Dean |
| 2007/0028409 A1 | 2/2007 | Yamada |
| 2007/0079854 A1 | 4/2007 | You |
| 2007/0098329 A1 | 5/2007 | Shimoji |
| 2007/0149028 A1 | 6/2007 | Yu |
| 2007/0149062 A1 | 6/2007 | Long |
| 2007/0230874 A1 | 10/2007 | Lin |
| 2007/0232115 A1 | 10/2007 | Burke |
| 2007/0243749 A1 | 10/2007 | Wu |
| 2008/0008430 A1 | 1/2008 | Kewitsch |
| 2008/0044137 A1 | 2/2008 | Luther |
| 2008/0056647 A1 | 3/2008 | Margolin |
| 2008/0064334 A1 | 3/2008 | Hamadi |
| 2008/0226237 A1 | 9/2008 | O'Riorden |
| 2009/0022457 A1 | 1/2009 | de Jong |
| 2009/0047818 A1 | 2/2009 | Irwin |
| 2009/0176401 A1 | 7/2009 | Gu |
| 2009/0196555 A1 | 8/2009 | Lin |
| 2009/0214162 A1 | 8/2009 | O'Riorden |
| 2009/0290938 A1 | 11/2009 | Asaoka |
| 2010/0054668 A1 | 3/2010 | Nelson |
| 2010/0061069 A1 | 3/2010 | Cole |
| 2010/0092136 A1 | 4/2010 | Nhep |
| 2010/0220961 A1 | 9/2010 | de Jong |
| 2010/0247041 A1 | 9/2010 | Szilagyi |
| 2010/0284656 A1 | 11/2010 | Morra |
| 2011/0044588 A1 | 2/2011 | Larson |
| 2011/0058773 A1 | 3/2011 | Peterhans |
| 2011/0131801 A1 | 6/2011 | Nelson |
| 2011/0155810 A1 | 6/2011 | Taniguchi |
| 2011/0177710 A1 | 7/2011 | Tobey |
| 2011/0239220 A1 | 9/2011 | Gibson |
| 2012/0155810 A1 | 6/2012 | Nakagawa |
| 2012/0189260 A1 | 7/2012 | Kowalczyk |
| 2012/0237177 A1 | 9/2012 | Minota |
| 2012/0269485 A1 | 10/2012 | Haley |
| 2012/0301080 A1 | 11/2012 | Gniadek |
| 2012/0328248 A1 | 12/2012 | Larson |
| 2013/0019423 A1 | 1/2013 | Srutkowski |
| 2013/0071067 A1 | 3/2013 | Lin |
| 2013/0094816 A1 | 4/2013 | Lin |
| 2013/0101258 A1 | 4/2013 | Hikosaka |
| 2013/0121653 A1 | 5/2013 | Shitama |
| 2013/0163934 A1 | 6/2013 | Lee |
| 2013/0170797 A1 | 7/2013 | Ott |
| 2013/0183012 A1 | 7/2013 | Cabanne Lopez |
| 2013/0216185 A1 | 8/2013 | Klavuhn |
| 2013/0308915 A1 | 11/2013 | Buff |
| 2014/0016901 A1 | 1/2014 | Lambourn |
| 2014/0050446 A1 | 2/2014 | Chang |
| 2014/0056562 A1 | 2/2014 | Limbert |
| 2014/0133808 A1 | 5/2014 | Hill |
| 2014/0169727 A1 | 6/2014 | Veatch |
| 2014/0219621 A1 | 8/2014 | Barnette, Jr. |
| 2014/0226946 A1 | 8/2014 | Cooke |
| 2014/0241644 A1 | 8/2014 | Kang |
| 2014/0241678 A1 | 8/2014 | Bringuier |
| 2014/0241688 A1 | 8/2014 | Isenhour |
| 2014/0334780 A1 | 11/2014 | Nguyen |
| 2014/0348477 A1 | 11/2014 | Chang |
| 2015/0003788 A1 | 1/2015 | Chen |
| 2015/0111417 A1 | 4/2015 | Vanderwoud |
| 2015/0147033 A1 * | 5/2015 | Coggi .............. G02B 6/3849 385/76 |
| 2015/0177463 A1 | 6/2015 | Lee |
| 2015/0198766 A1 | 7/2015 | Takahashi |
| 2015/0212282 A1 | 7/2015 | Lin |
| 2015/0241644 A1 | 8/2015 | Lee |
| 2015/0301294 A1 | 10/2015 | Chang |
| 2015/0331201 A1 | 11/2015 | Takano |
| 2015/0355417 A1 | 12/2015 | Takano |
| 2015/0370021 A1 | 12/2015 | Chan |
| 2016/0131849 A1 | 5/2016 | Takano |
| 2016/0139343 A1 | 5/2016 | Dean, Jr. |
| 2016/0161681 A1 | 6/2016 | Banal, Jr. |
| 2016/0169727 A1 | 6/2016 | Riedel |

(56) References Cited

U.S. PATENT DOCUMENTS

| | | |
|---|---|---|
| 2016/0172852 A1 | 6/2016 | Tamura |
| 2016/0216458 A1* | 7/2016 | Shih .................... G02B 6/3871 |
| 2016/0231512 A1 | 8/2016 | Seki |
| 2016/0259135 A1 | 9/2016 | Gniadek |
| 2016/0266326 A1 | 9/2016 | Gniadek |
| 2016/0320572 A1 | 11/2016 | Gniadek |
| 2016/0327756 A1 | 11/2016 | Raven |
| 2016/0327757 A1 | 11/2016 | Lee |
| 2016/0349458 A1 | 12/2016 | Murray |
| 2016/0370545 A1 | 12/2016 | Jiang |
| 2017/0003458 A1 | 1/2017 | Gniadek |
| 2017/0205587 A1 | 7/2017 | Chang |
| 2017/0205590 A1 | 7/2017 | Bailey |
| 2017/0205591 A1 | 7/2017 | Takano |
| 2017/0212313 A1 | 7/2017 | Elenabaas |
| 2017/0212316 A1 | 7/2017 | Takano |
| 2017/0254961 A1 | 9/2017 | Kamada |
| 2017/0276275 A1 | 9/2017 | Beemer |
| 2017/0276887 A1 | 9/2017 | Allen |
| 2018/0128988 A1 | 5/2018 | Chang |
| 2018/0156988 A1 | 6/2018 | Gniadek |
| 2018/0172923 A1 | 6/2018 | Bauco |
| 2018/0252872 A1 | 9/2018 | Chen |
| 2018/0341069 A1 | 11/2018 | Takano |
| 2019/0204513 A1 | 7/2019 | Davidson |

FOREIGN PATENT DOCUMENTS

| | | |
|---|---|---|
| CN | 102016670 A | 4/2011 |
| CN | 103529522 A | 1/2014 |
| DE | 19507669 C2 | 10/1998 |
| DE | 202006011910 U1 | 4/2007 |
| DE | 102006019335 A1 | 10/2007 |
| DE | 202009019167 U1 | 7/2017 |
| DE | 202009019167 U1 | 7/2017 |
| EP | 1211537 A2 | 6/2002 |
| EP | 1245980 B1 | 6/2006 |
| EP | 1566674 B1 | 5/2009 |
| EP | 2274644 B1 | 4/2015 |
| EP | 2664951 B1 | 6/2016 |
| EP | 3101456 A1 | 12/2016 |
| GB | 2111240 B | 9/1985 |
| JP | 2000089059 A | 3/2000 |
| JP | 03752331 B2 | 3/2006 |
| JP | 2009229545 A | 10/2009 |
| JP | 2009276493 A | 11/2009 |
| JP | 04377820 B2 | 12/2009 |
| KR | 200905382 U | 6/2009 |
| KR | 1371686 B1 | 3/2014 |
| TW | 200821653 A | 5/2008 |
| WO | WO2001019904 A1 | 3/2001 |
| WO | WO2004027485 A1 | 4/2004 |
| WO | WO2006007120 A1 | 1/2006 |
| WO | WO2009135787 A1 | 11/2009 |
| WO | WO2010024851 A2 | 3/2010 |
| WO | WO2012136702 A1 | 10/2012 |
| WO | WO2015103783 A1 | 7/2015 |
| WO | WO2016019993 A1 | 2/2016 |
| WO | WO2019126333 A1 | 6/2019 |

OTHER PUBLICATIONS

Fiber Optic Interconnect Solutions, Tactical Fiber Optic Connector Cables and Termini, 2006, Glenair, Inc., Glendale, California.

Fiber Optic Products Catalog, Nov. 2007, Tyco Electronics Corporation, Harrisburg, Pennsylvania.

Final Office Action, U.S. Appl. No. 16/035,691, dated Feb. 11, 2019, pp. 8.

Non-Final Office Action, U.S. Appl. No. 16/035,695, dated Sep. 28, 2018, pp. 7.

International Search Report and Written Opinion for Application No. PCT/US2018/62406 dated Mar. 18, 2019, 12, pages, United States.

International Search Report and Written Opinion for Application No. PCT/US2019/40700 dated Sep. 27, 2019, 12, pages, United States.

International Search Report and Written Opinion for Application No. PCT/US2019/50895 dated Jan. 6, 2020, 12, pages, United States.

International Search Report and Written Opinion for Application No. PCT/US2019/50909 dated Dec. 17, 2019, 11, pages, United States.

International Search Report and Written Opinion for Application No. PCT/US2019/56564 dated Jan. 14, 2020, 14, pages, United States.

International Search Report and Written Opinion, Application No. PCT/US2018/056133, dated Jan. 1, 2019, pp. 7.

International Search Report and Written Opinion, Application No. PCT/US/2018/042202, pp. 17, dated Dec. 7, 2018.

International Search Report and Written Opinion, Application No. PCT/US2018/62405, dated Apr. 3, 2019, pp. 17.

International Search Report and Written Opinion, Application No. PCT/US19/24718, dated Jun. 26, 2019, pp. 7.

International Search Report and Written opinion for Application No. PCT/US2019/013861, dated Apr. 8, 2019, 14 pages.

PCT Search Report dated Apr 3, 2019 PCT/US18/62405.

PCT Written Opinion dated Apr. 3, 2019 PCT/US19/62406.

PCT/US2018/034658 International Search Report dated Oct. 16, 2018.

PCY/US2018/034658 Written Opinion dated Oct. 16, 2018.

* cited by examiner

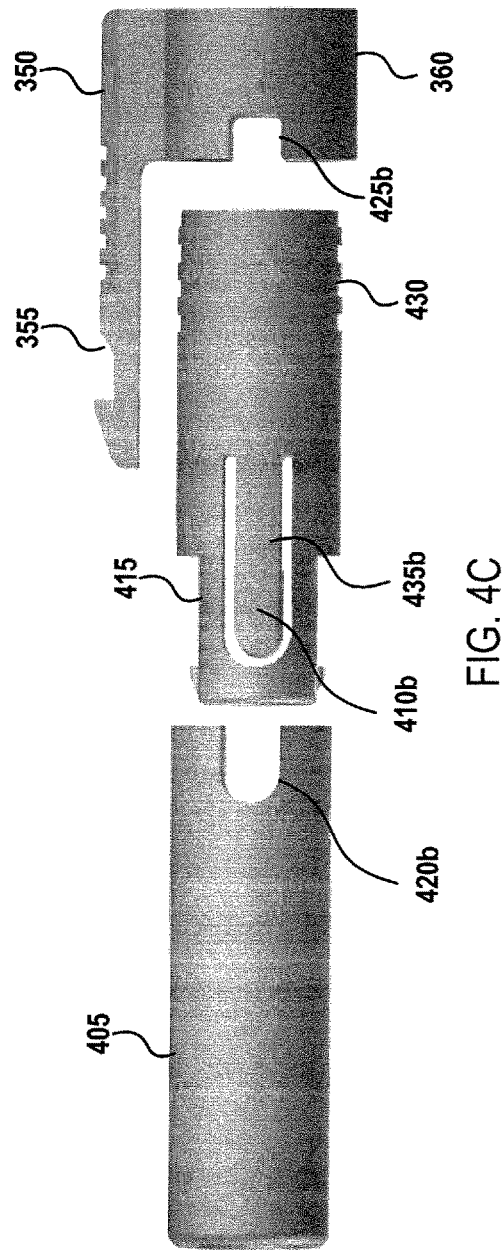
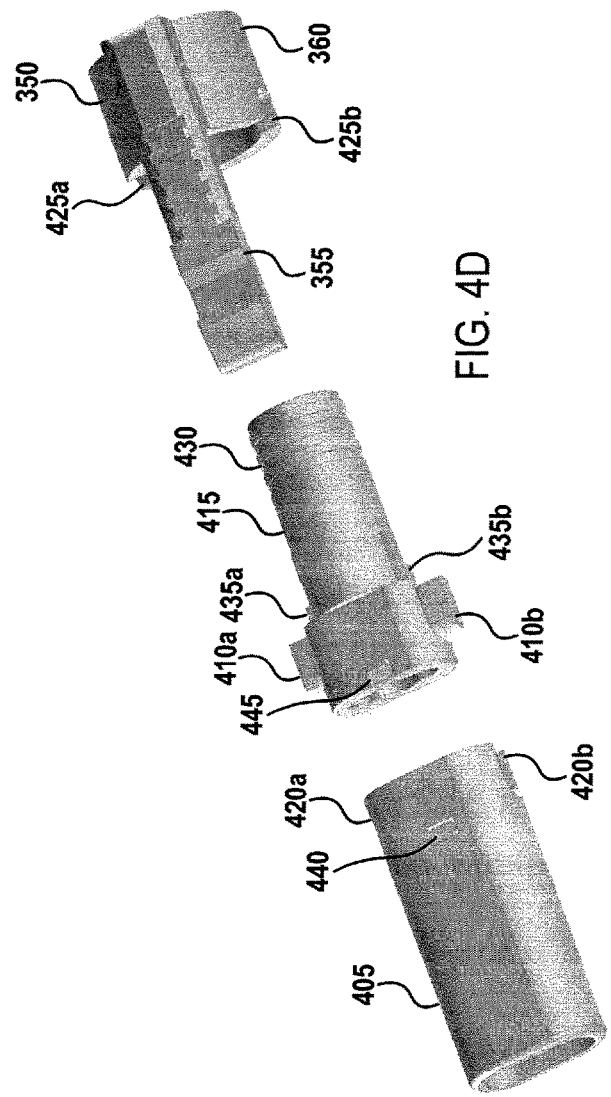
FIG. 4C
FIG. 4D

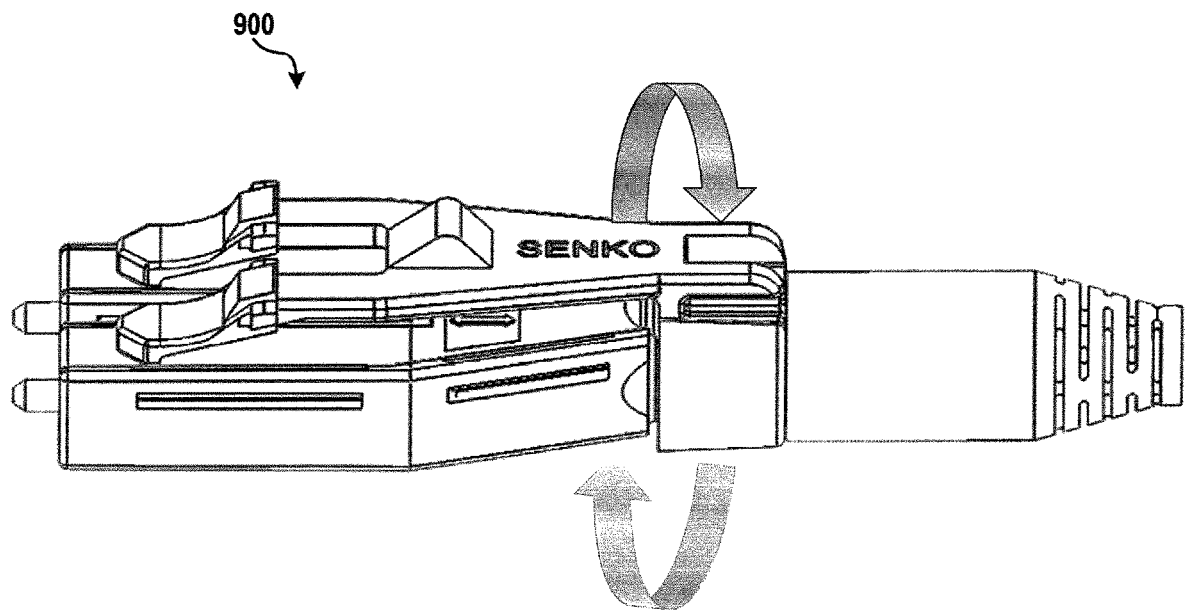
FIG. 9A
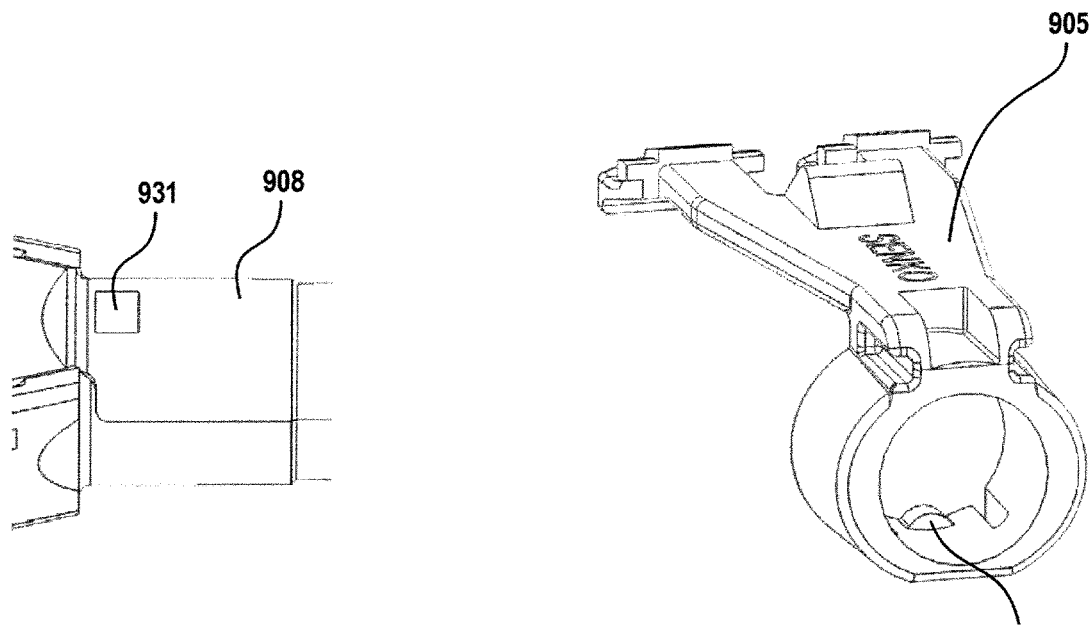
FIG. 9B
FIG. 9C

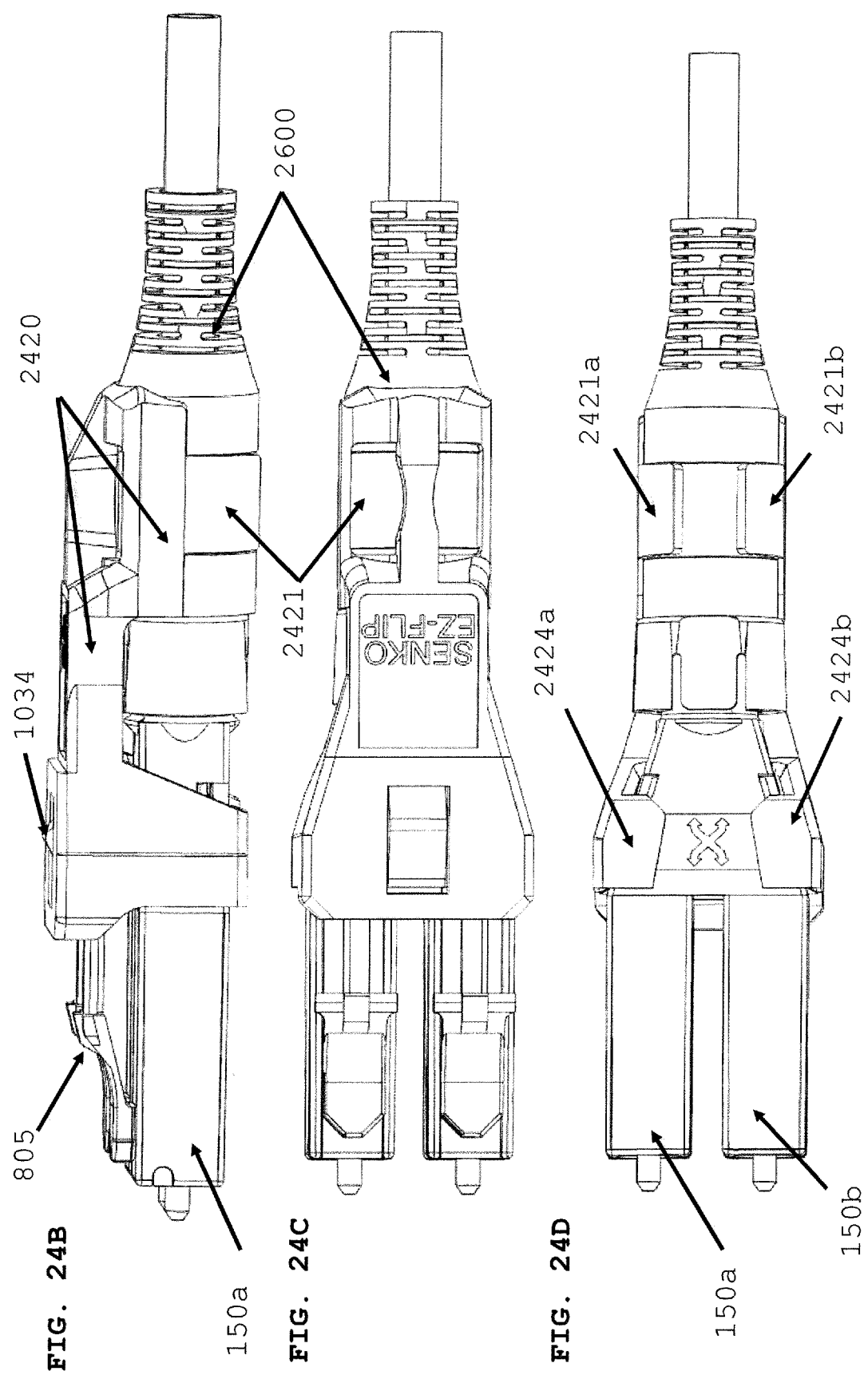

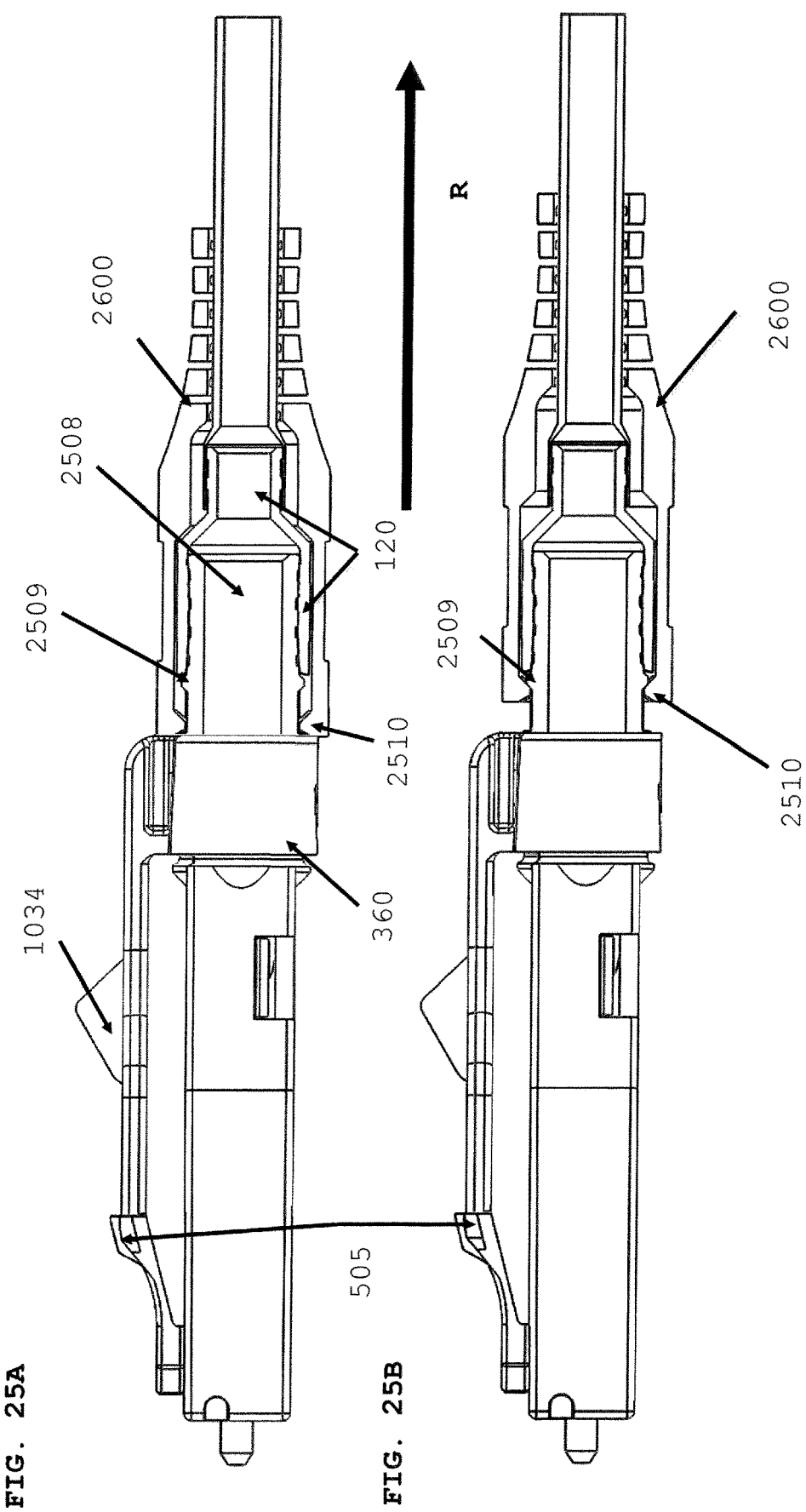

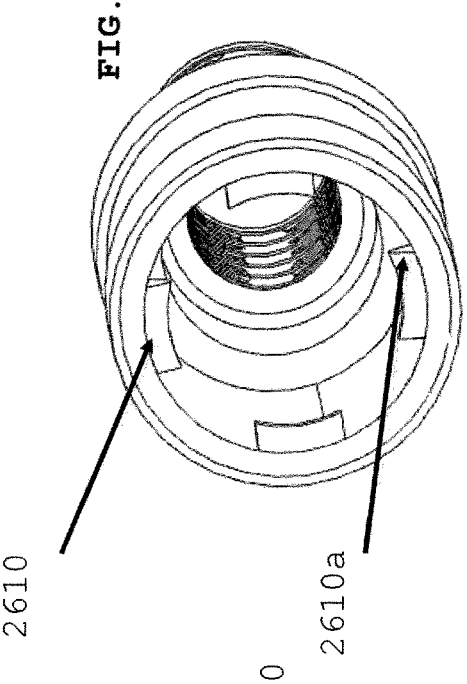
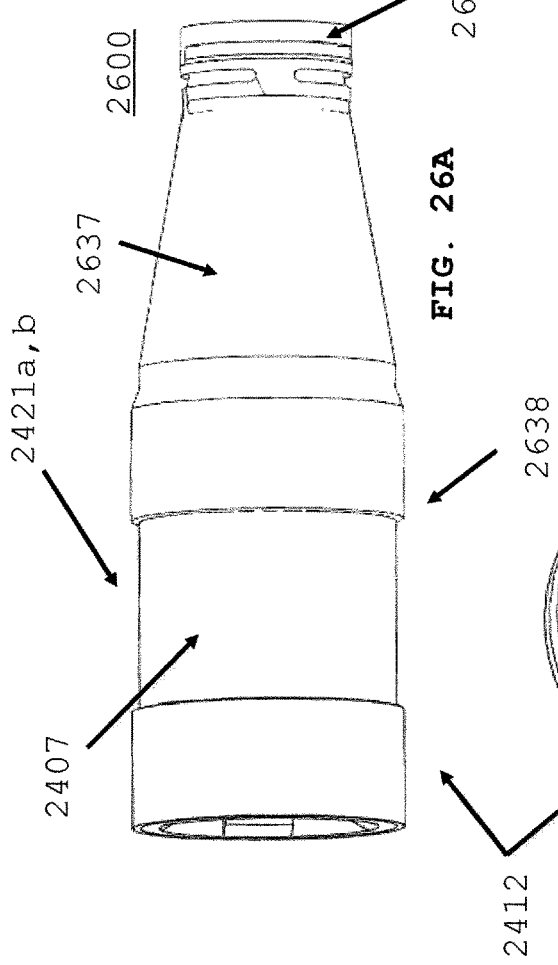
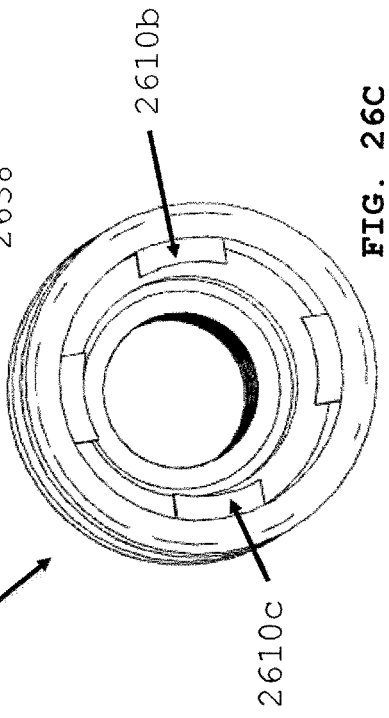

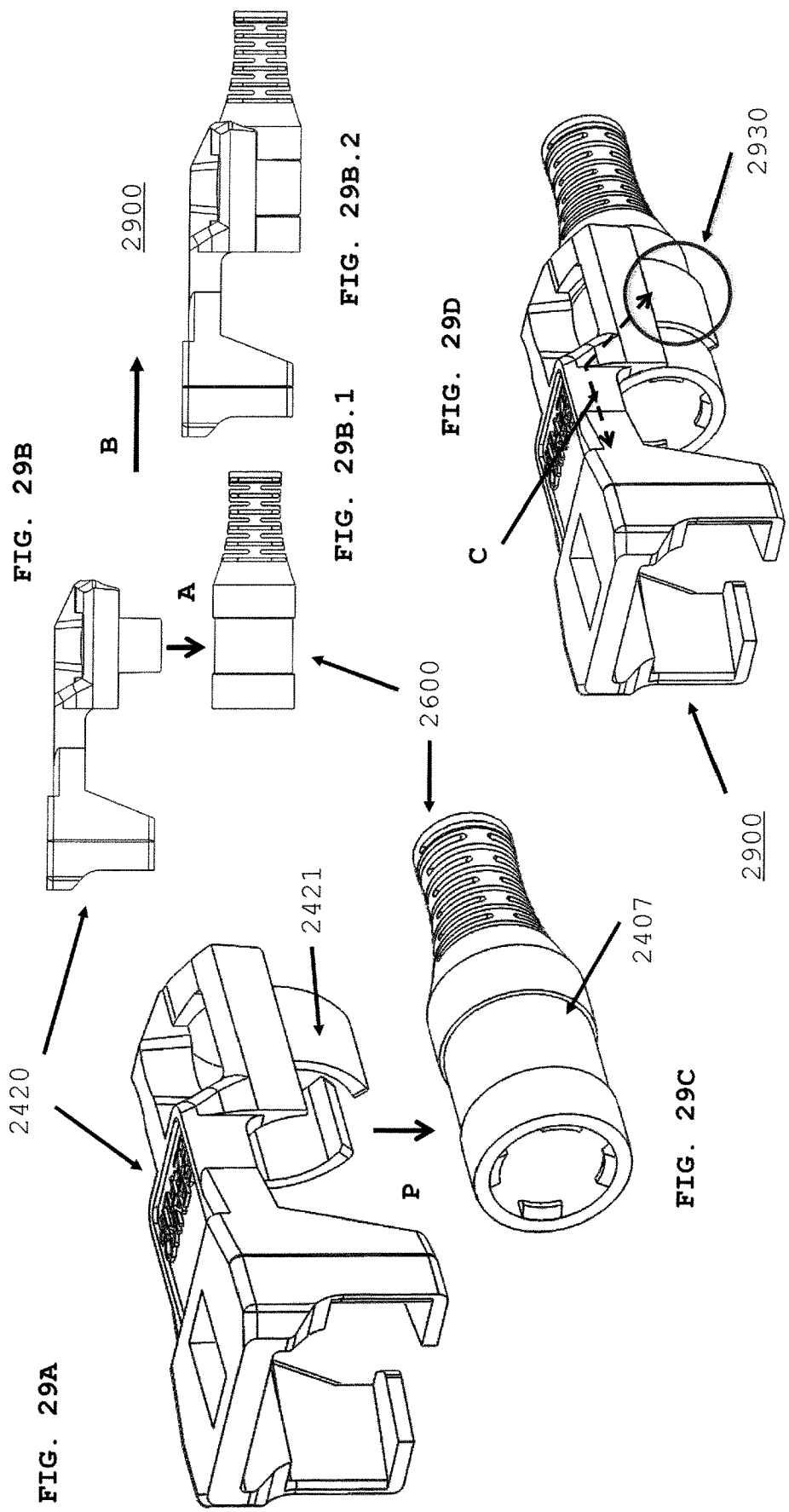

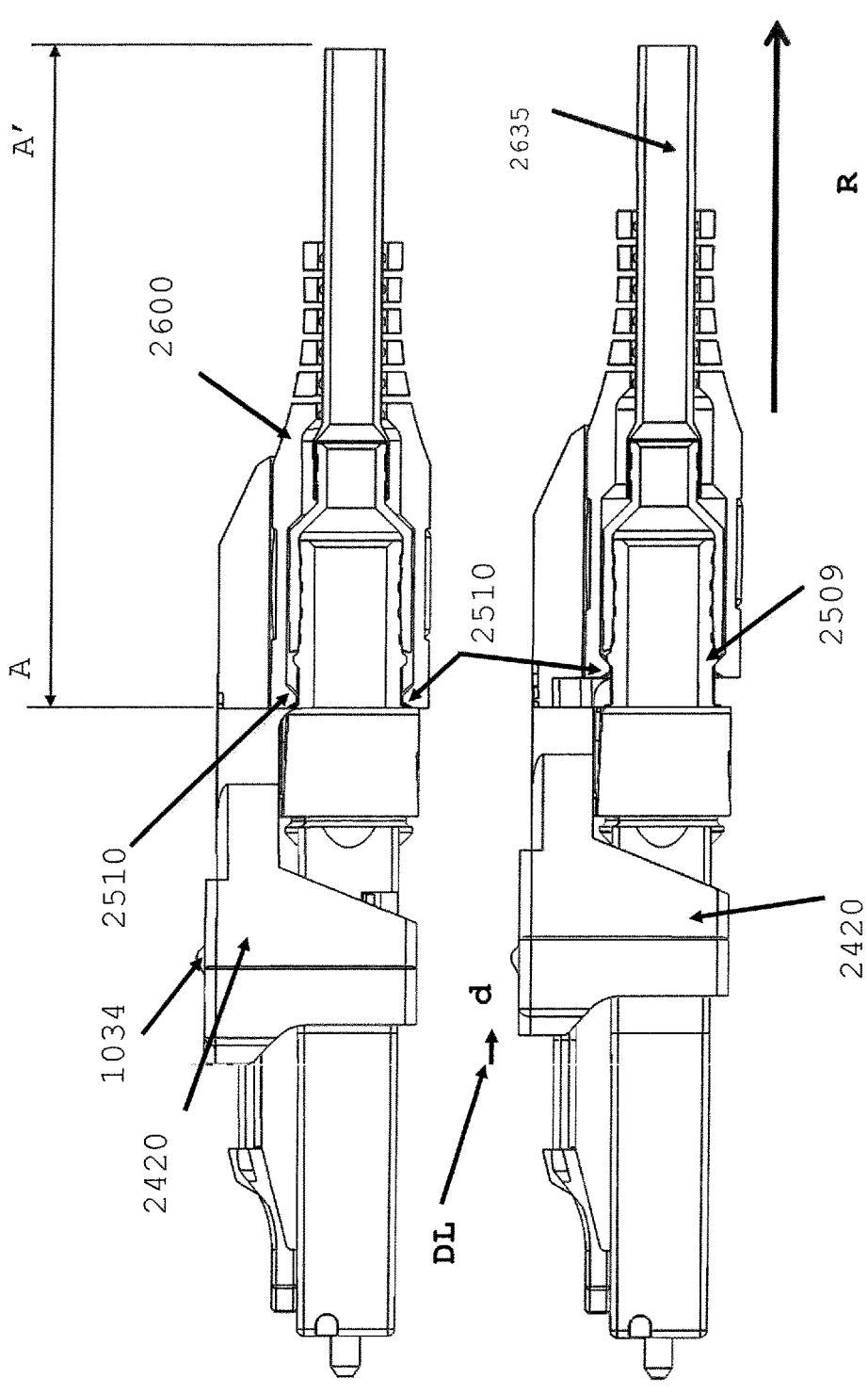

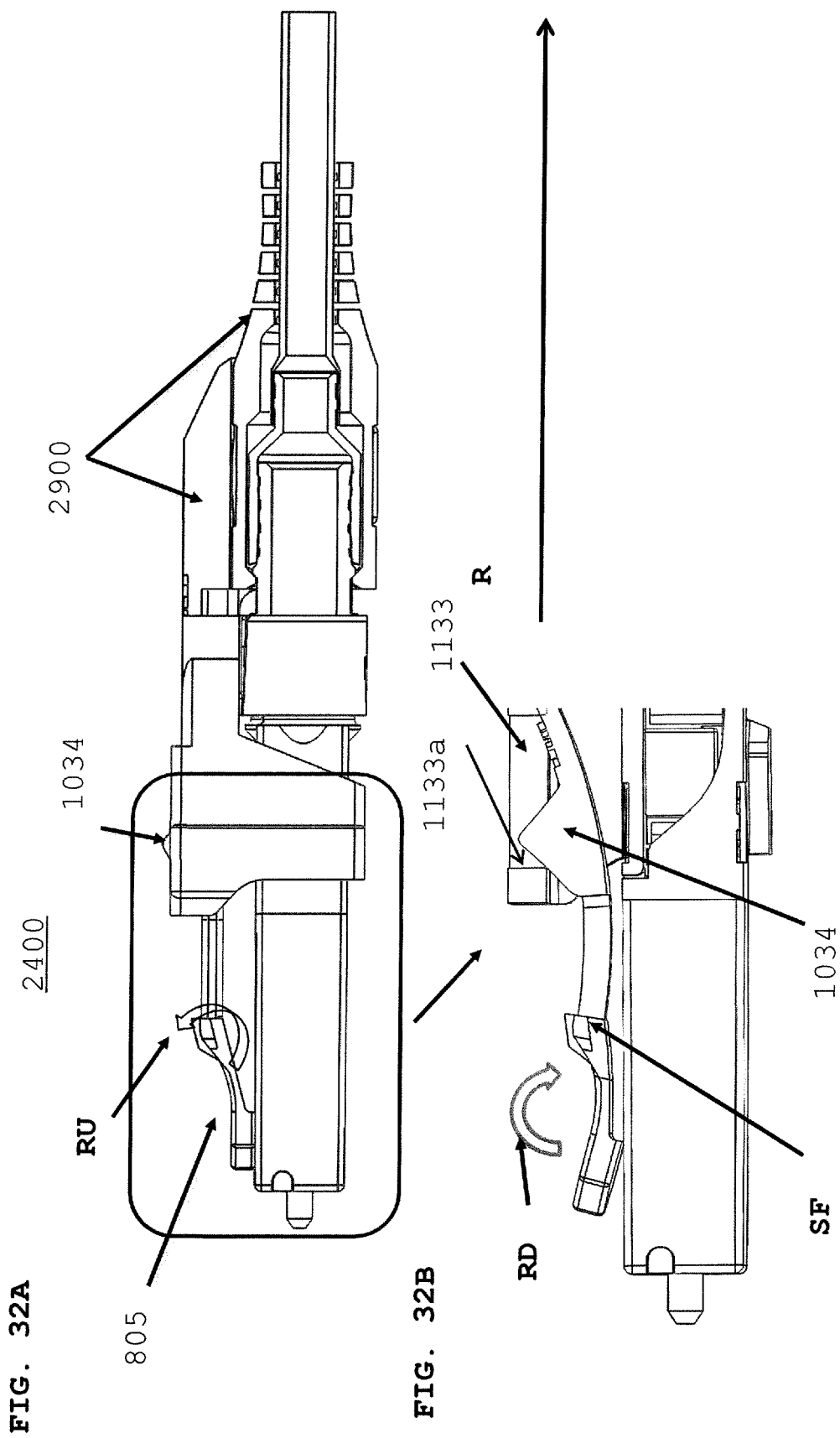

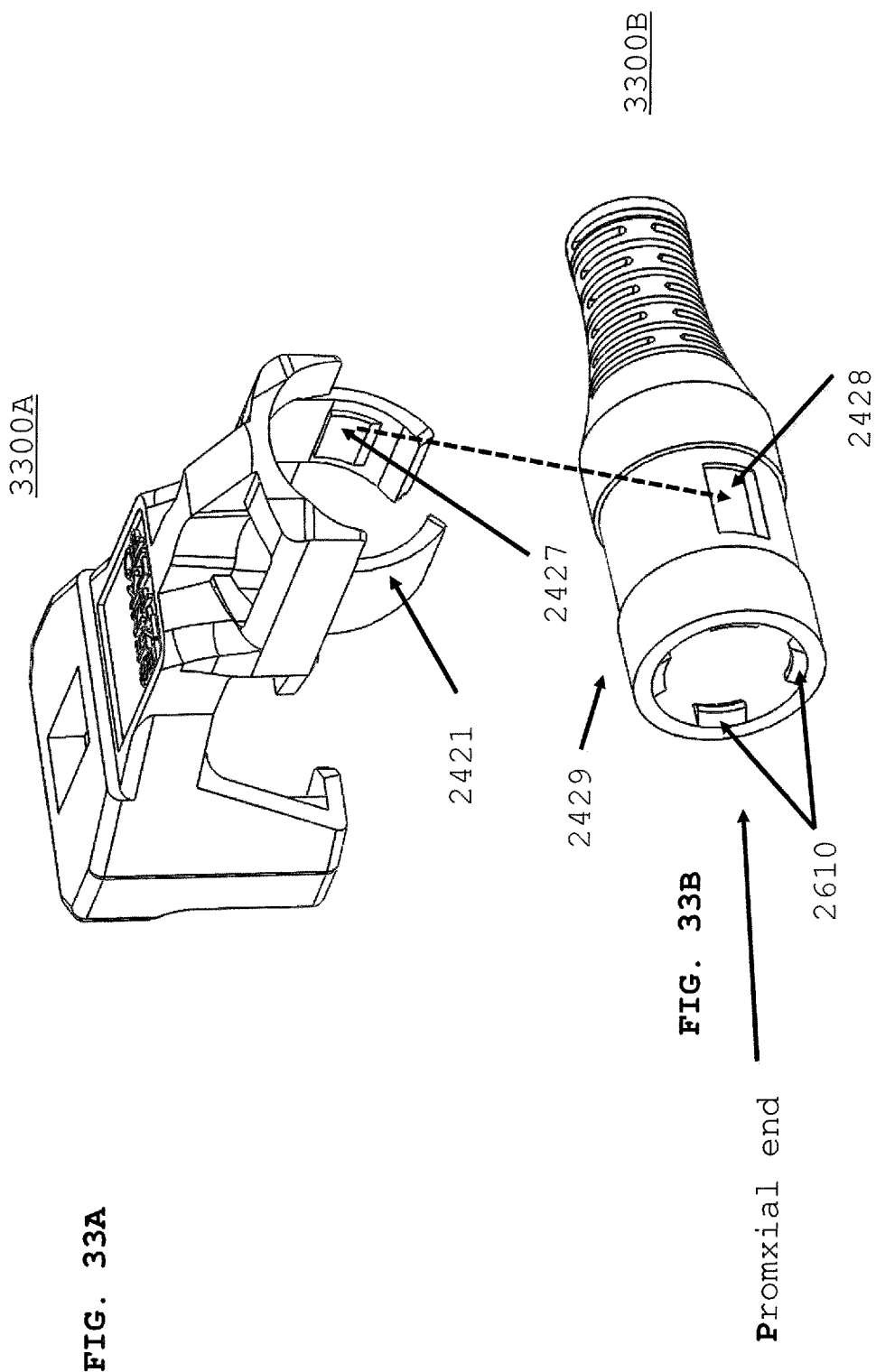

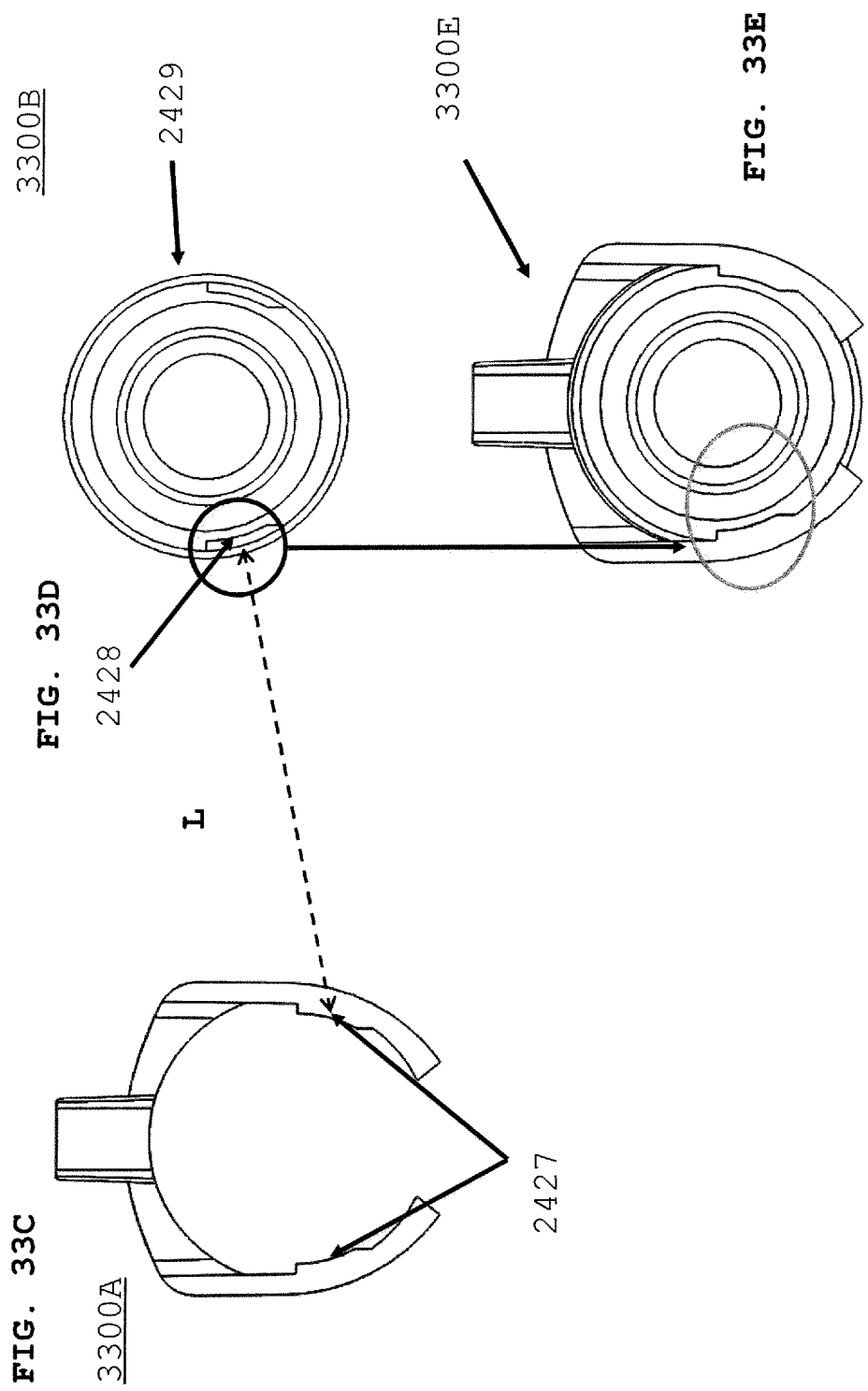

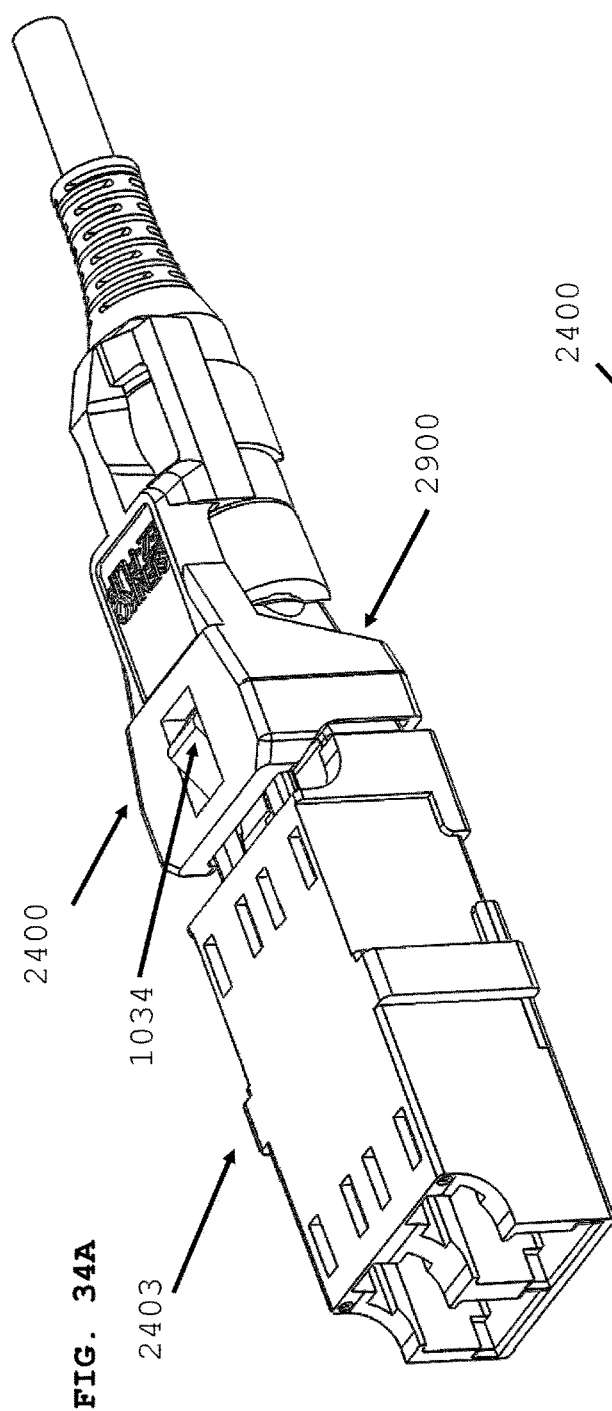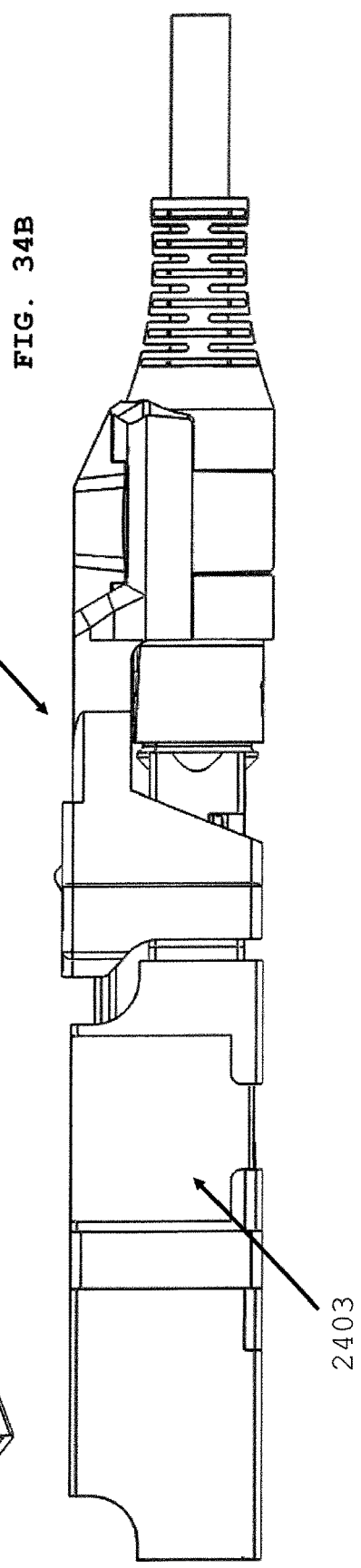

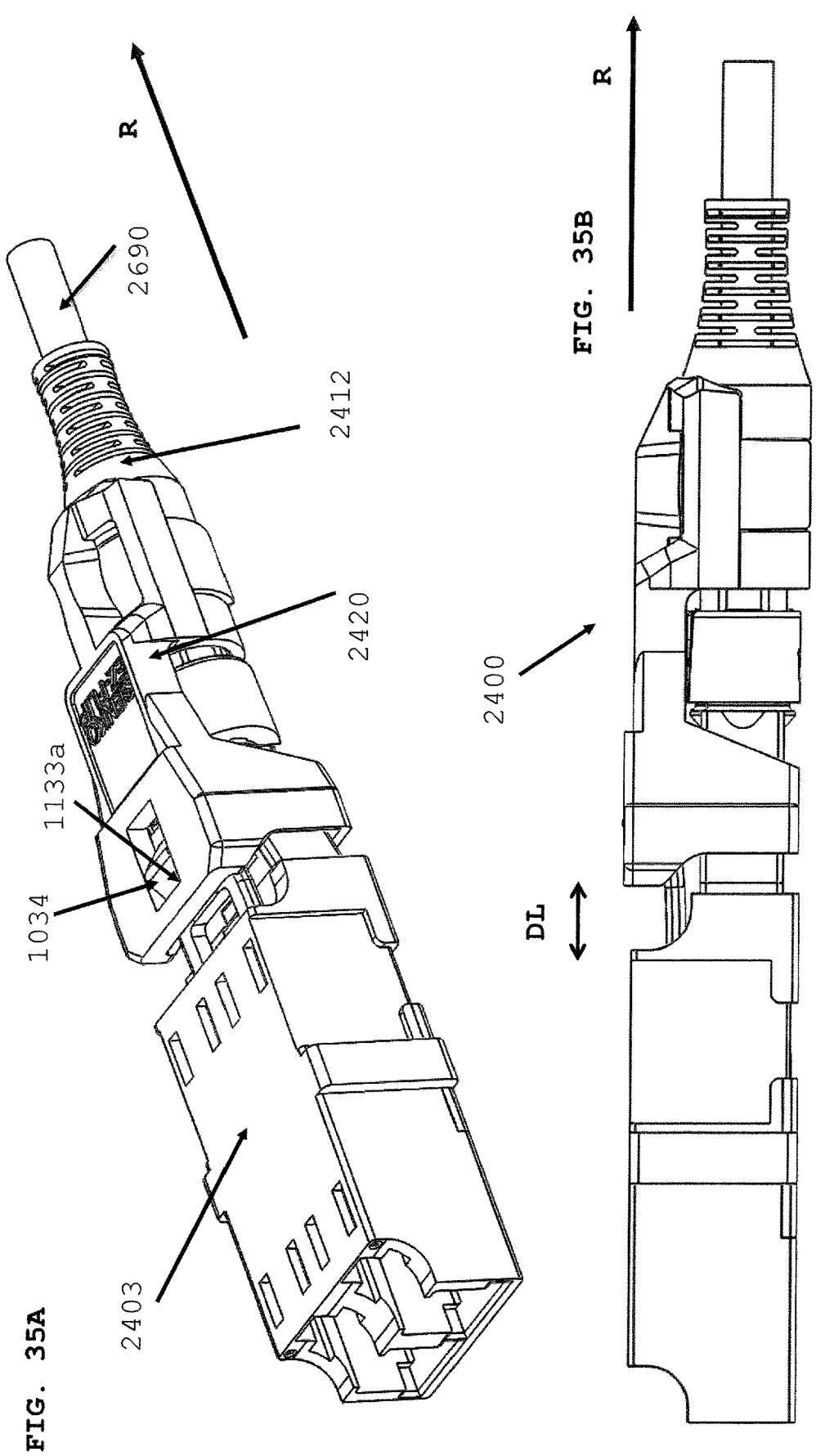

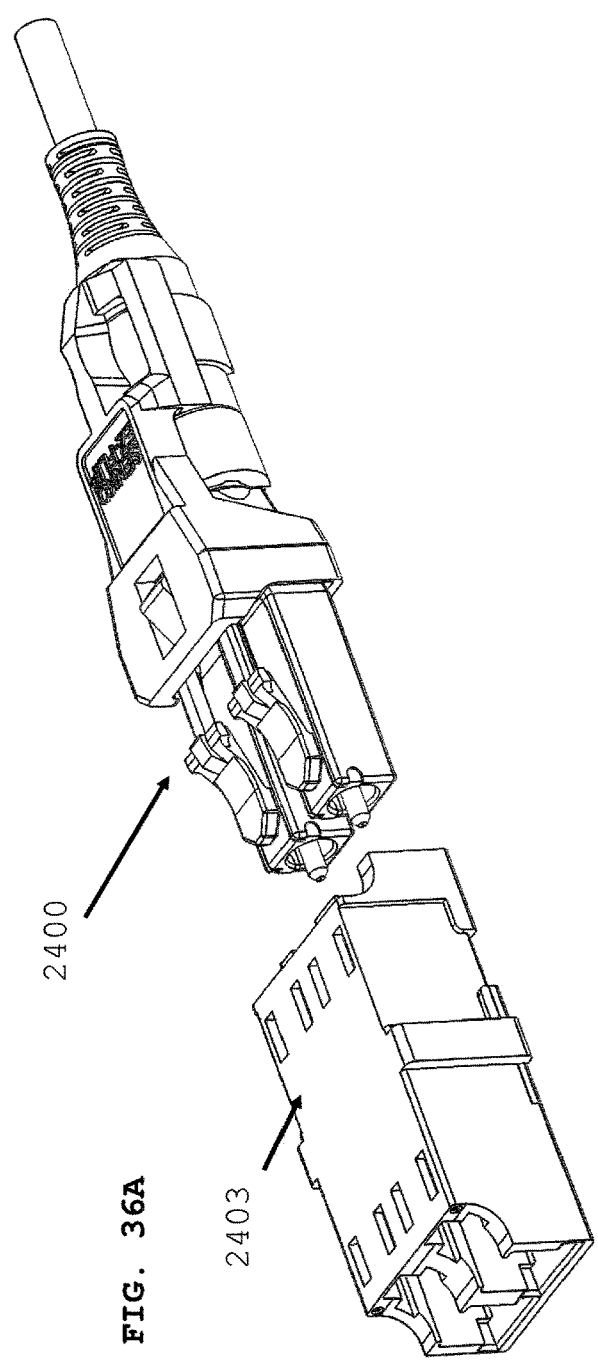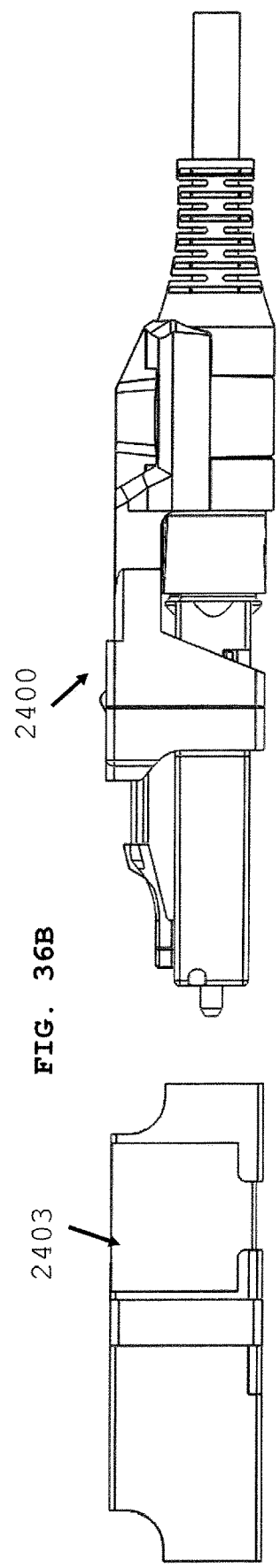
FIG. 36A
FIG. 36B

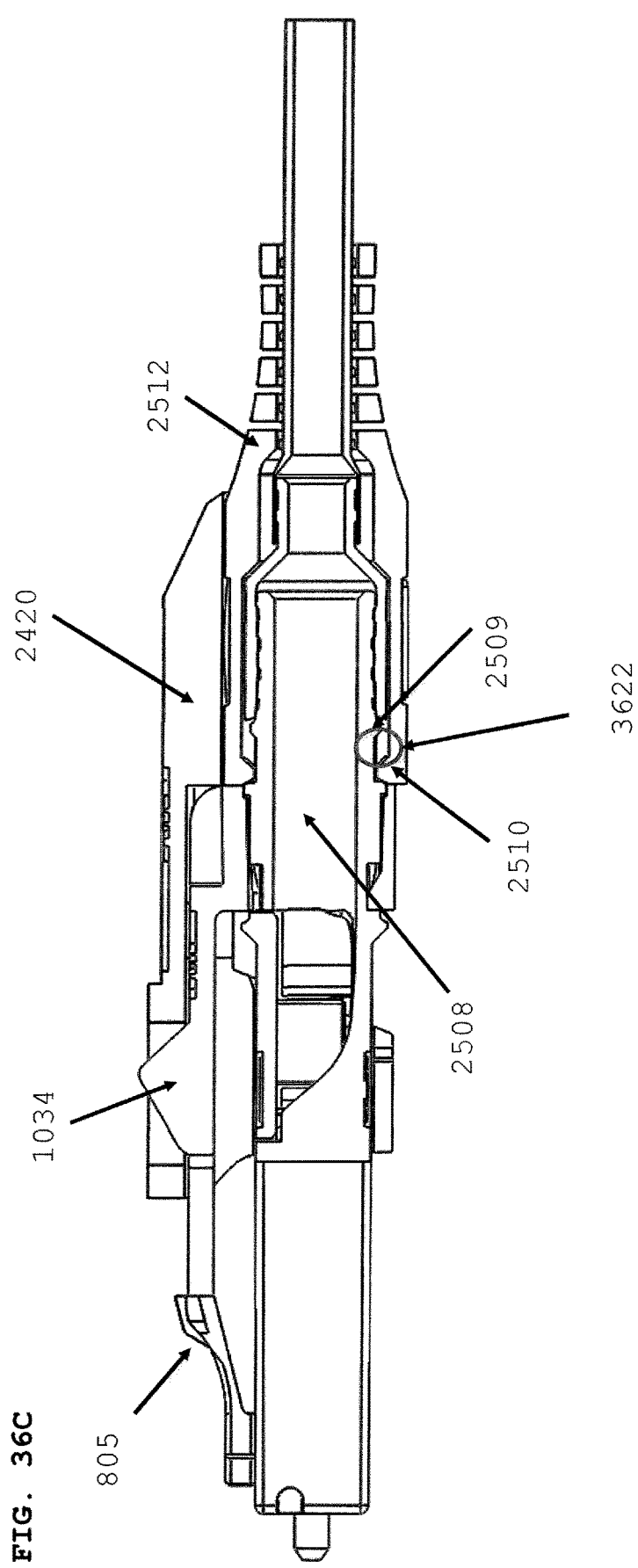

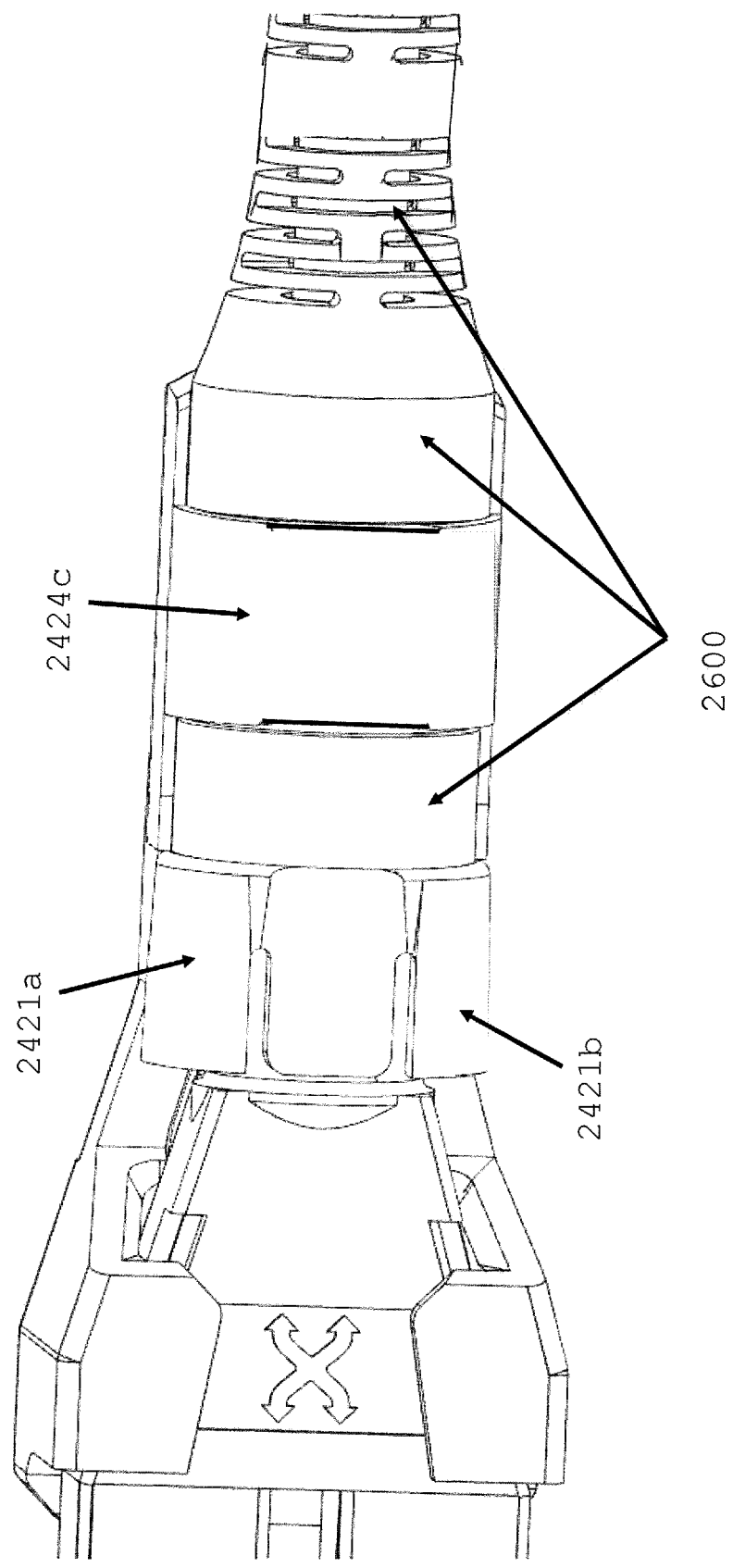

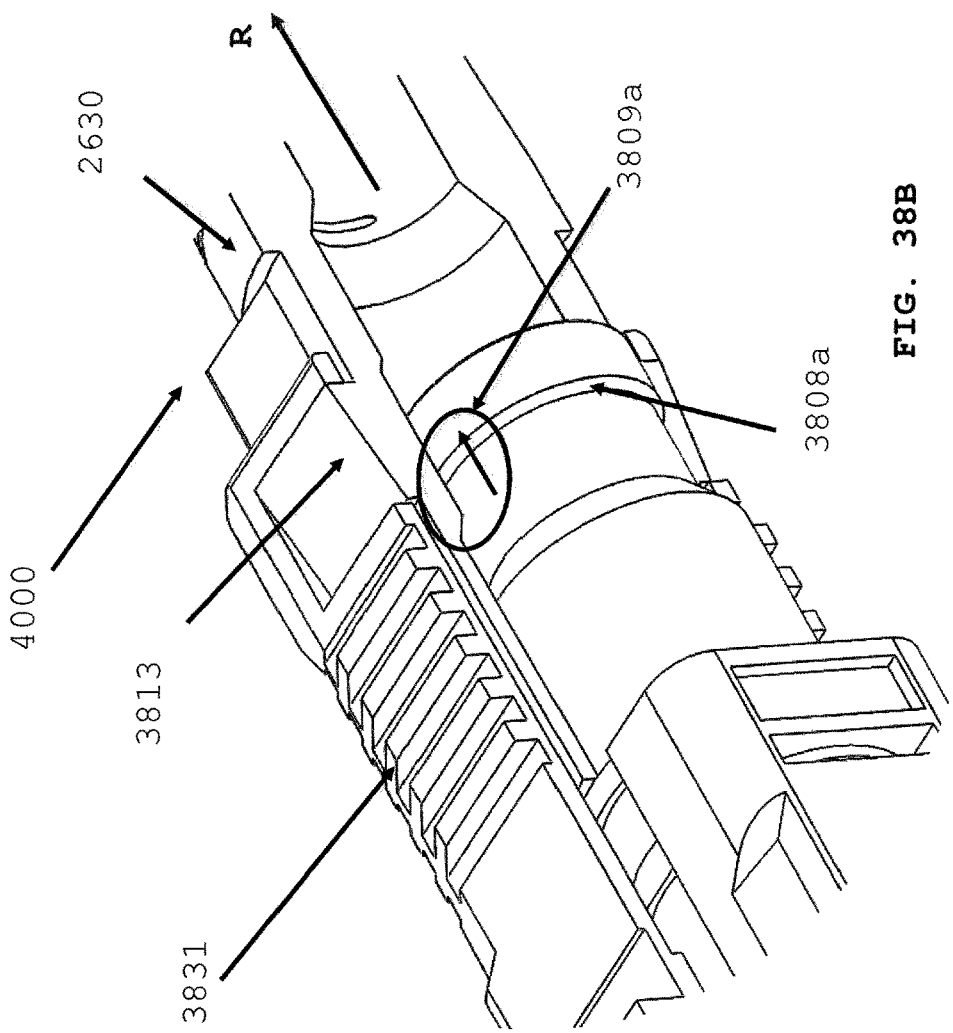
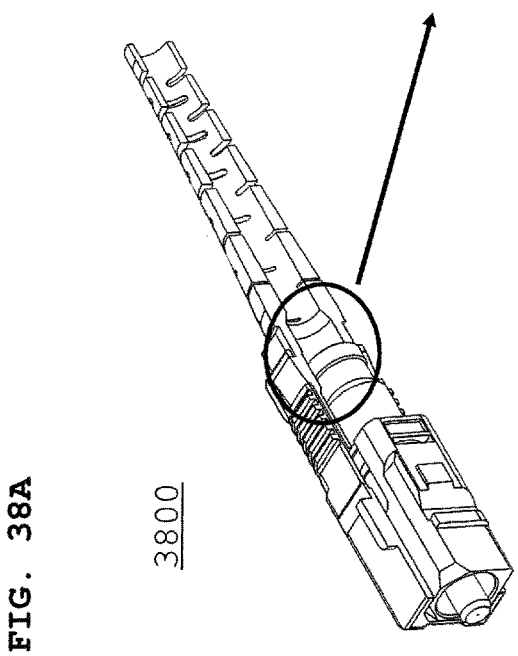
FIG. 38A
FIG. 38B

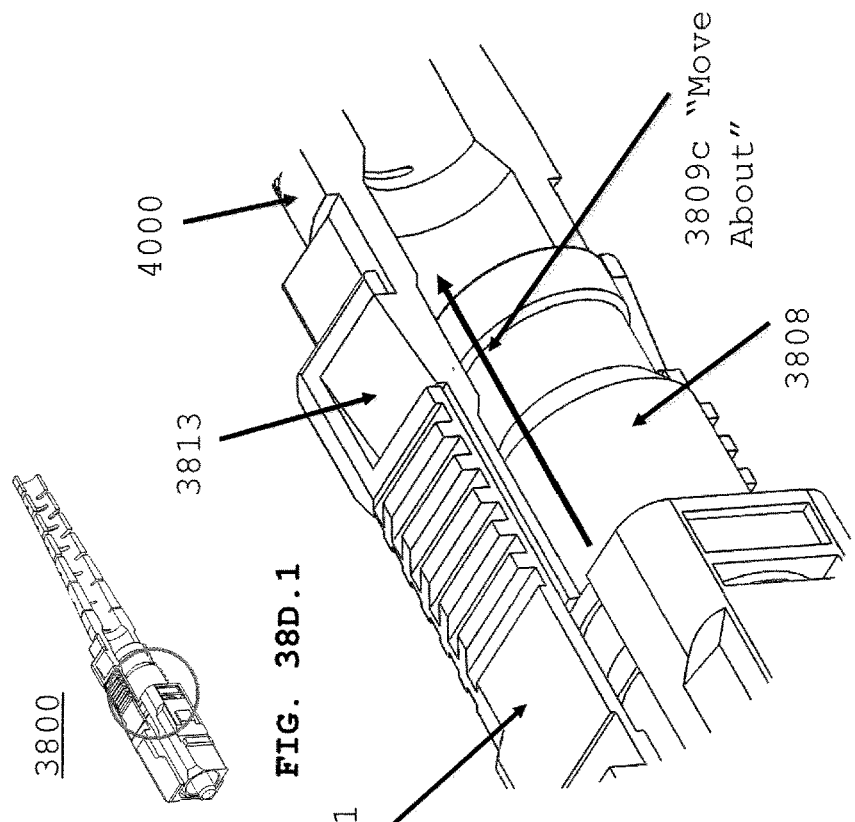
FIG. 38D.1
FIG. 38D.2
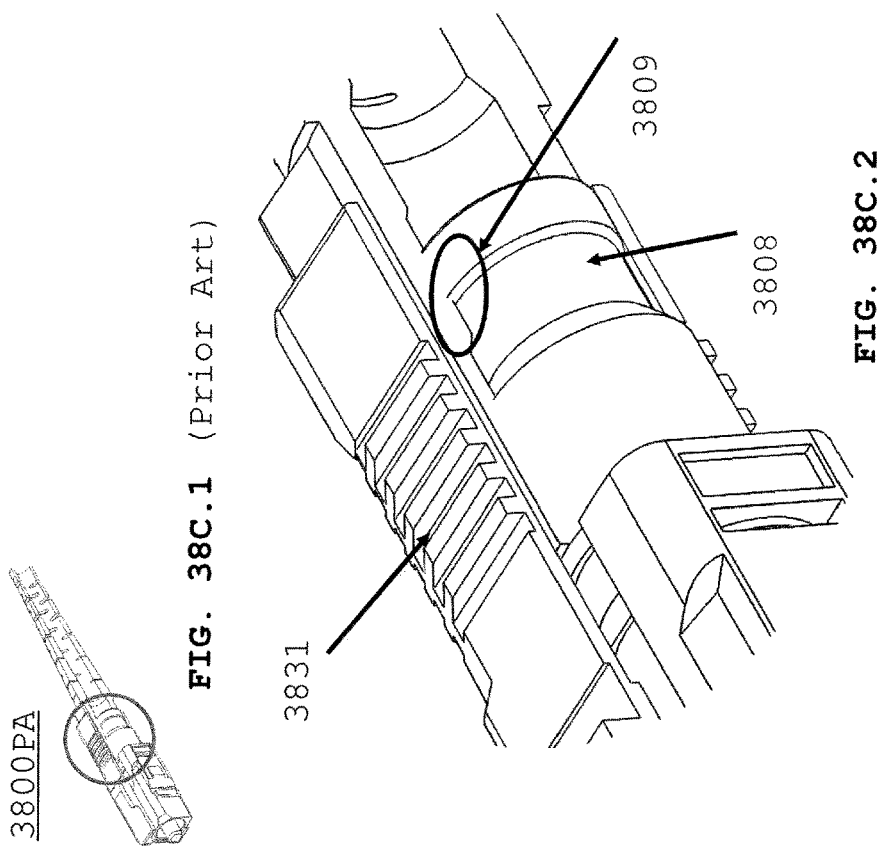
FIG. 38C.1 (Prior Art)
FIG. 38C.2

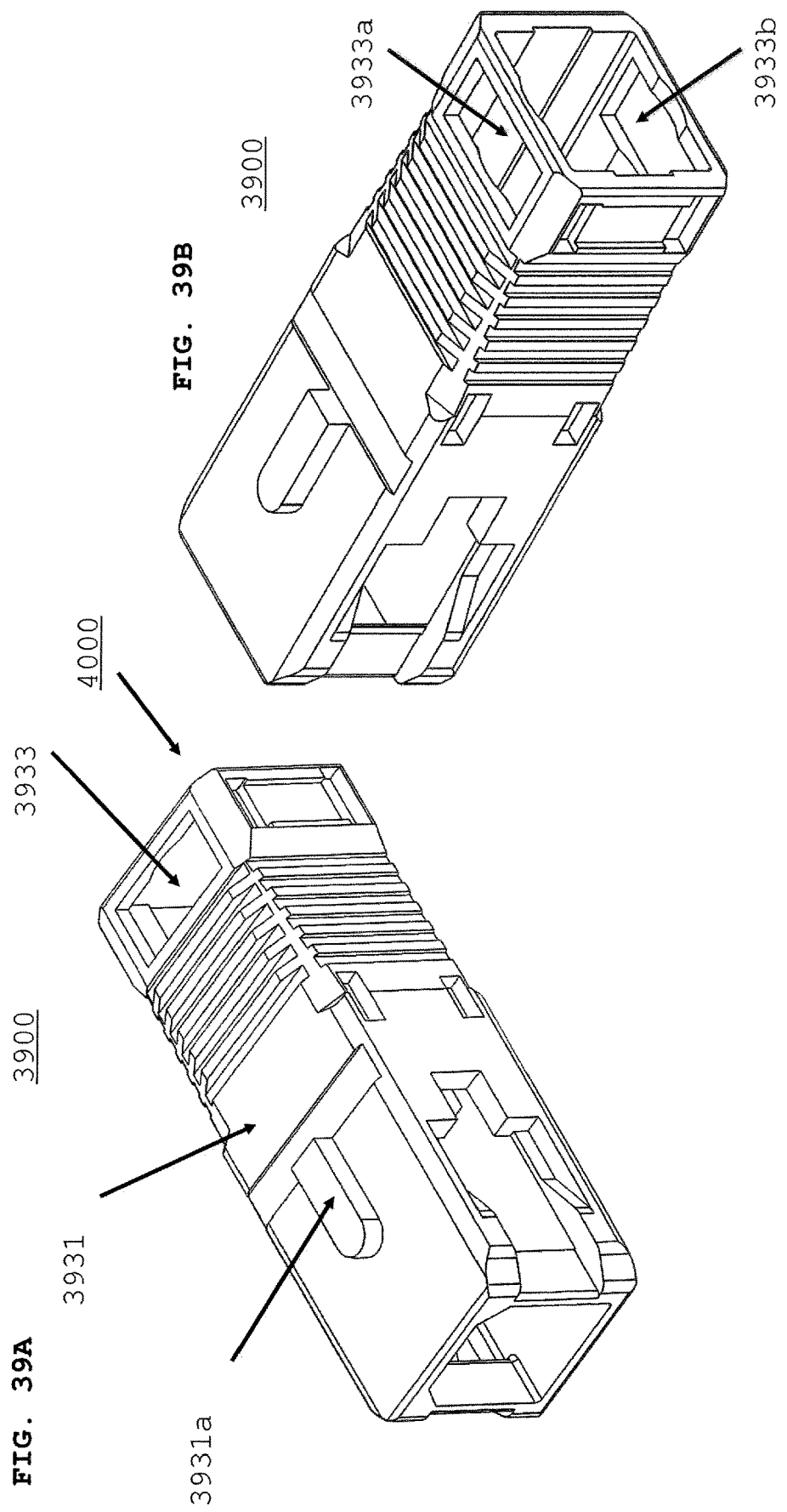

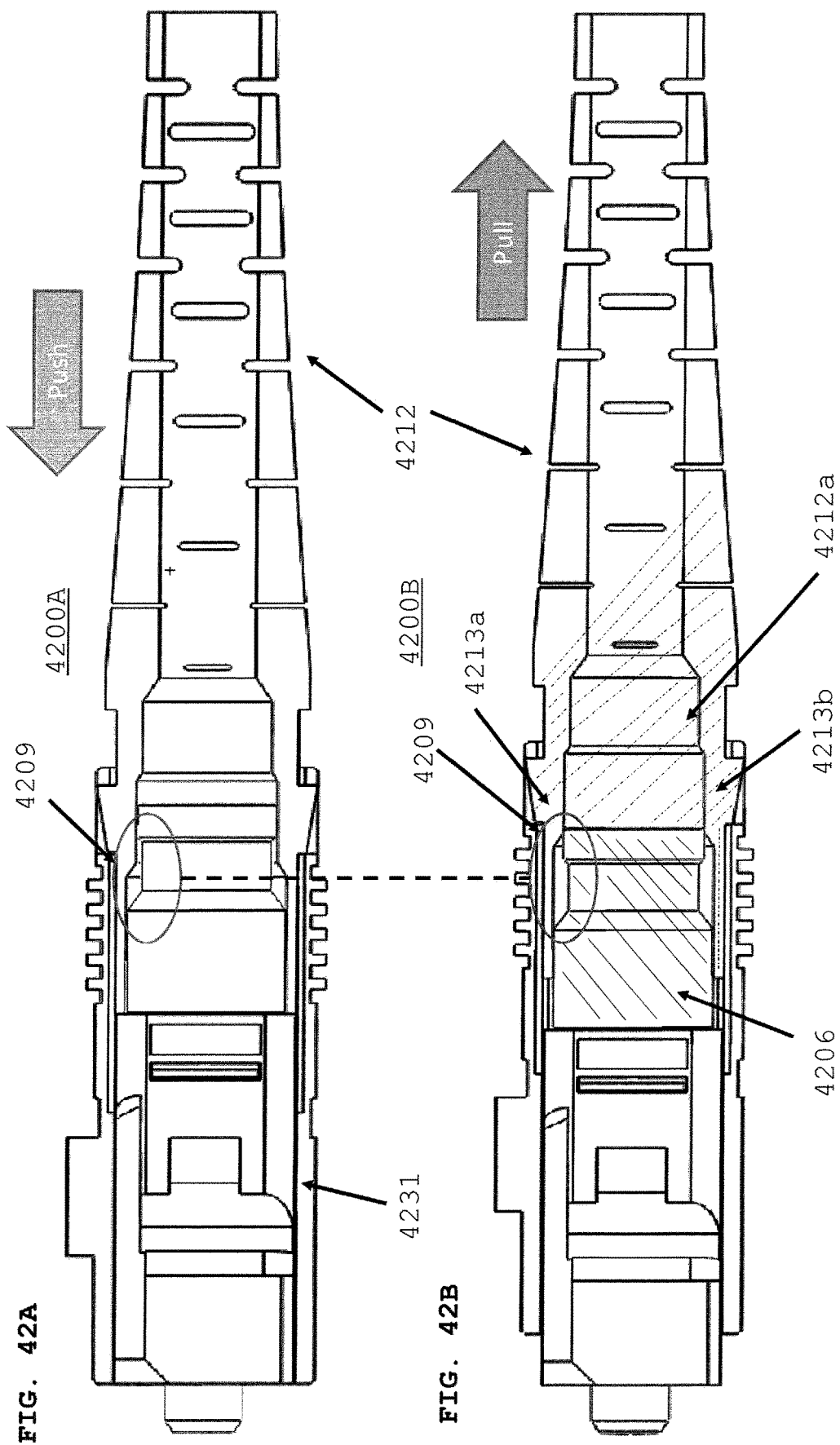

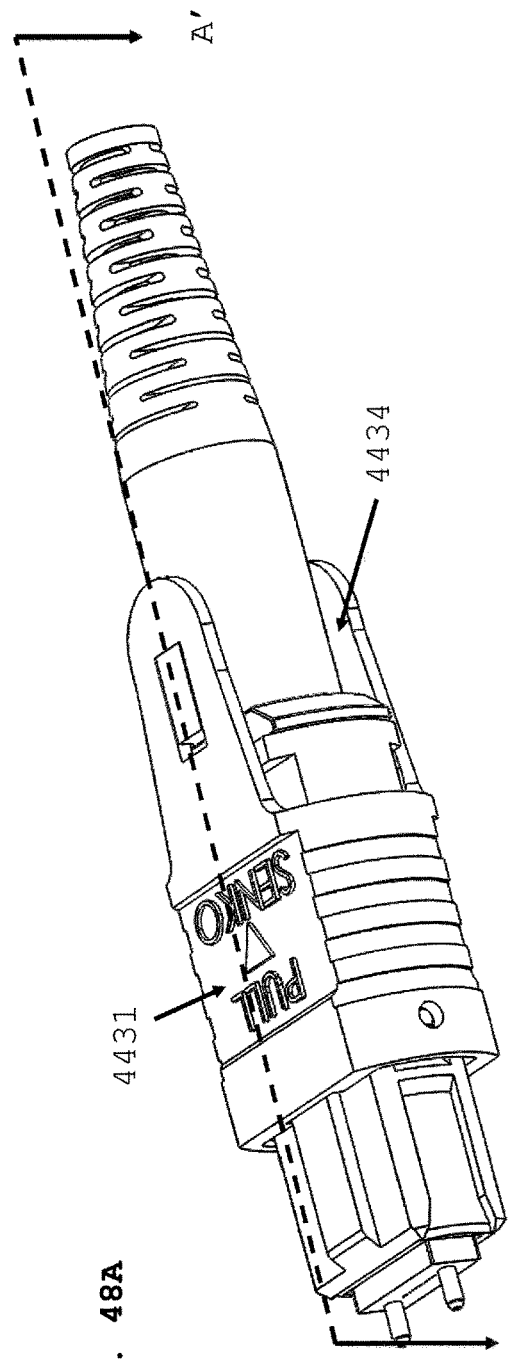
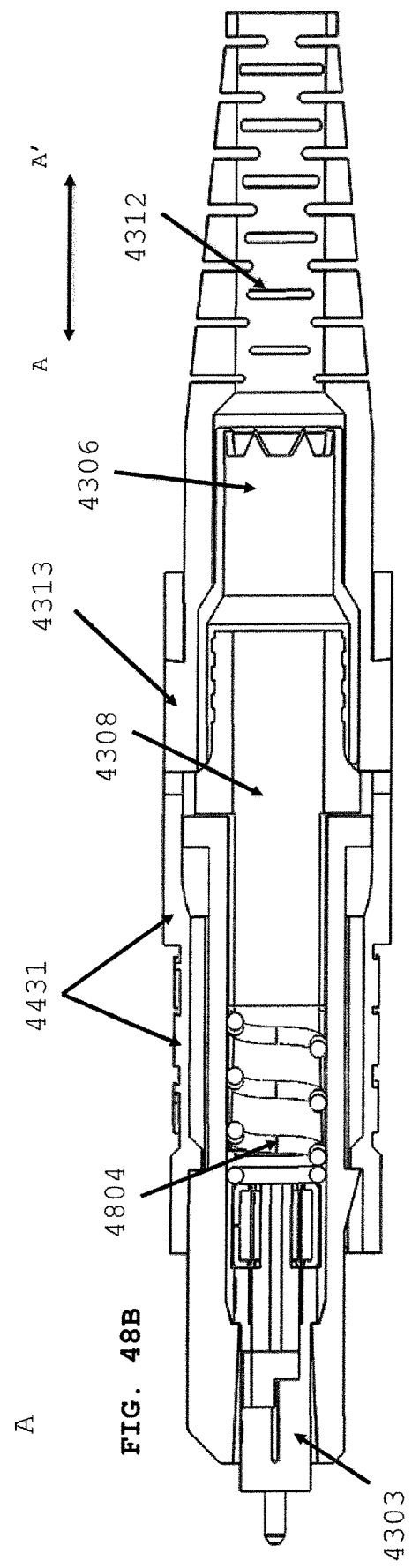
FIG. 48A
FIG. 48B

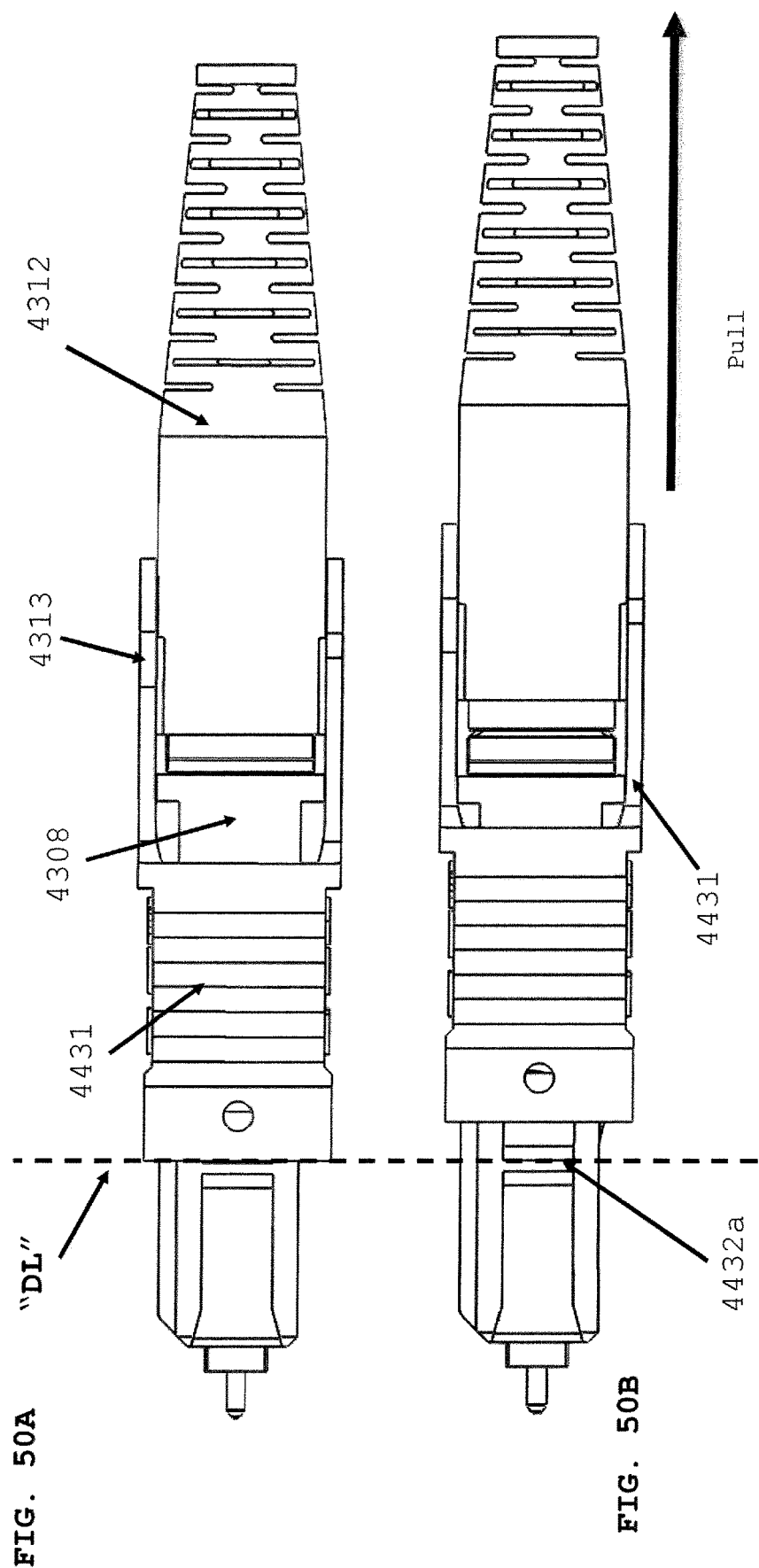

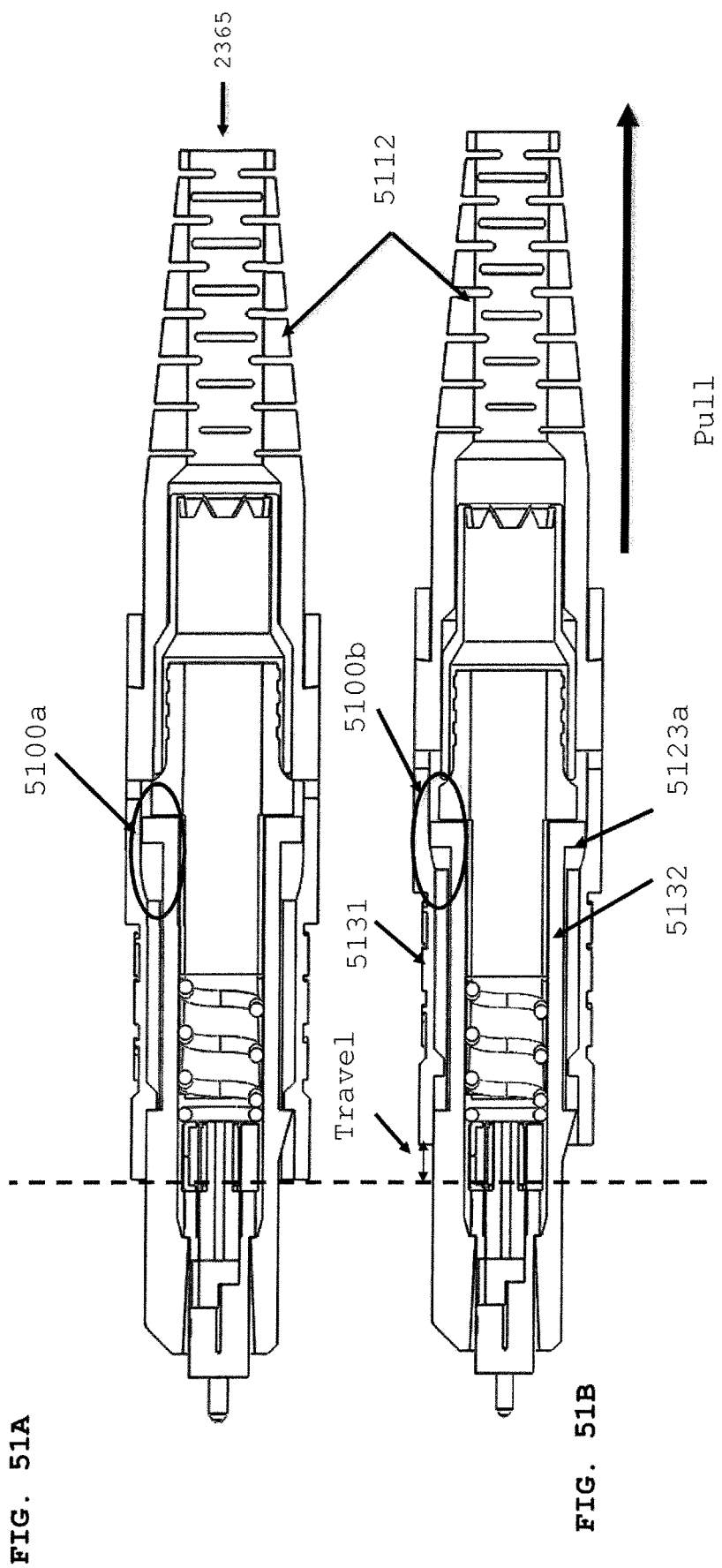

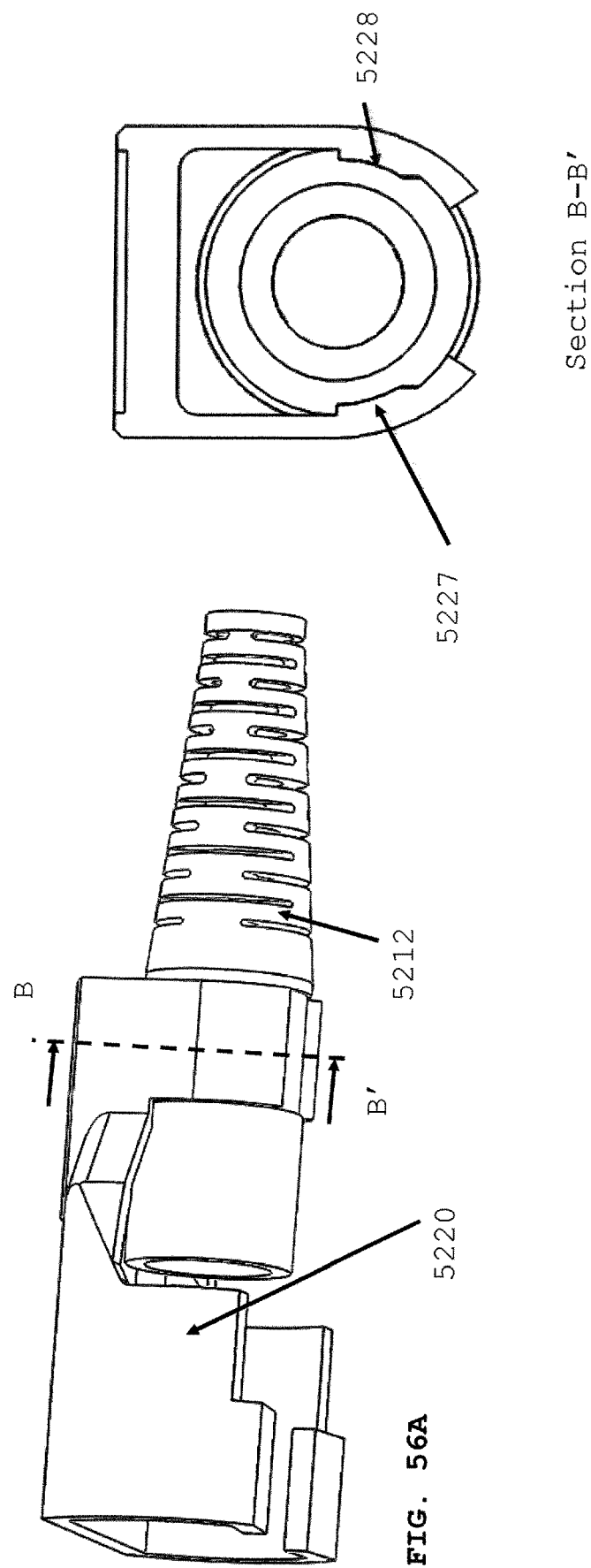

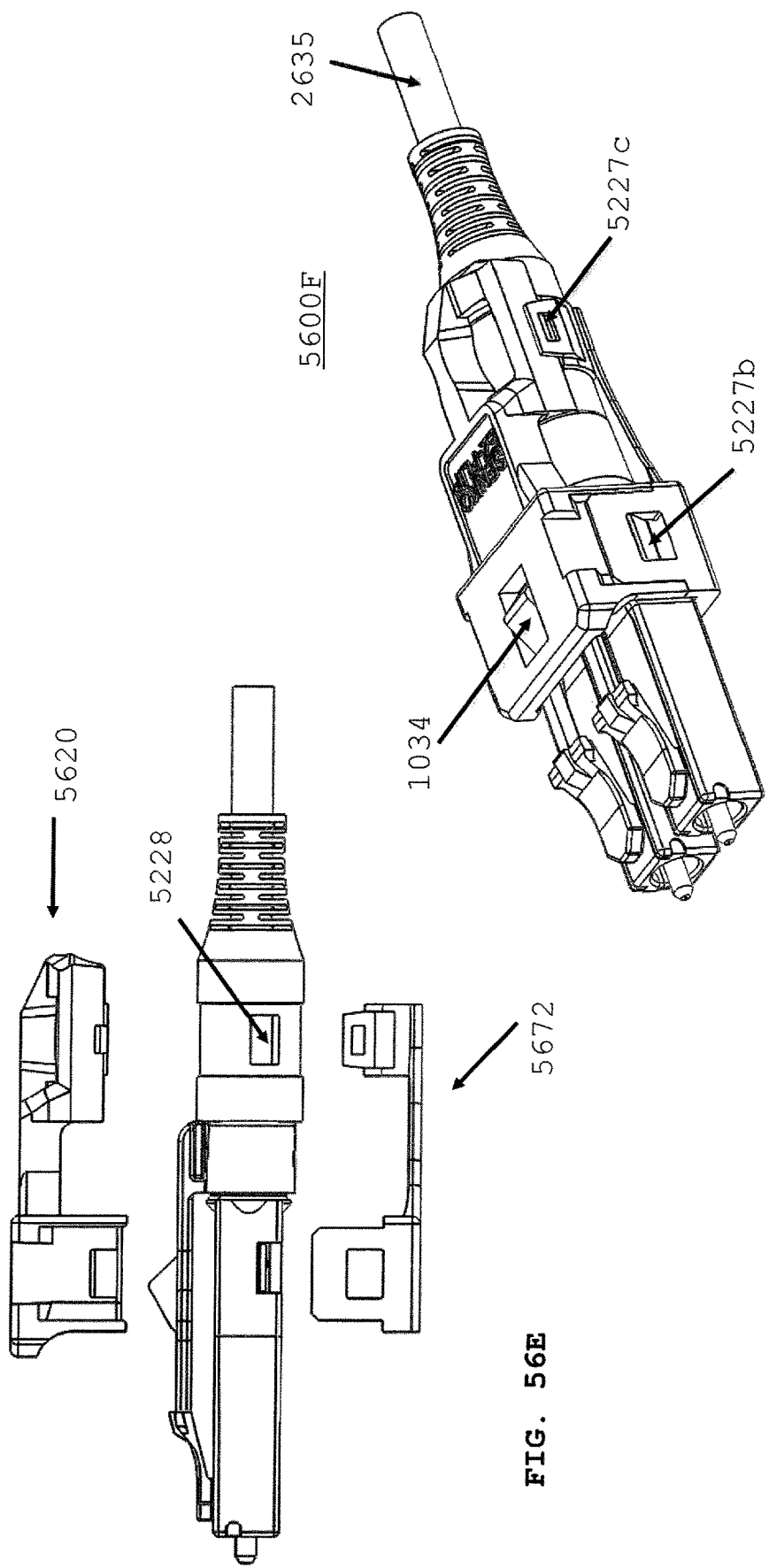

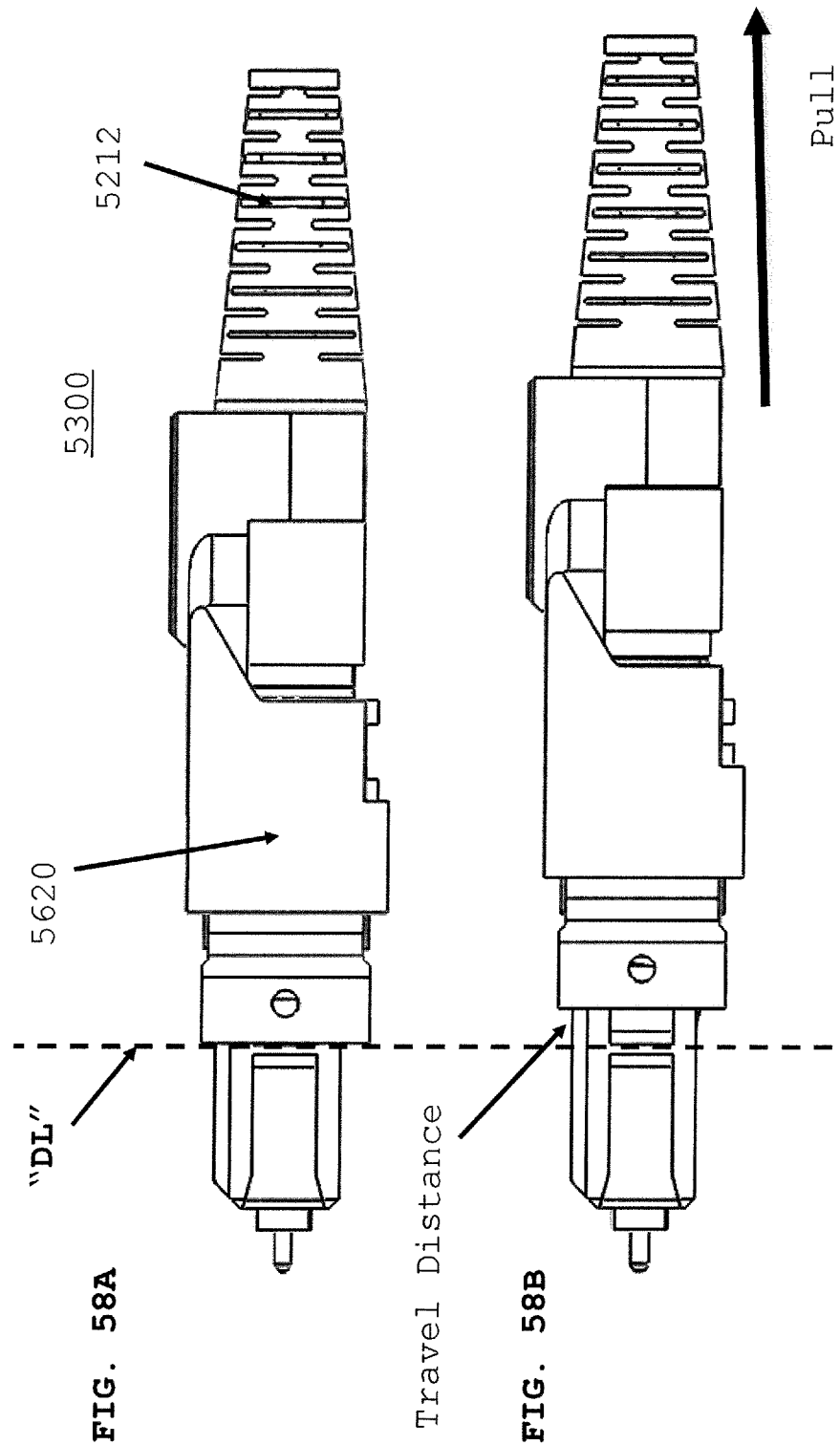

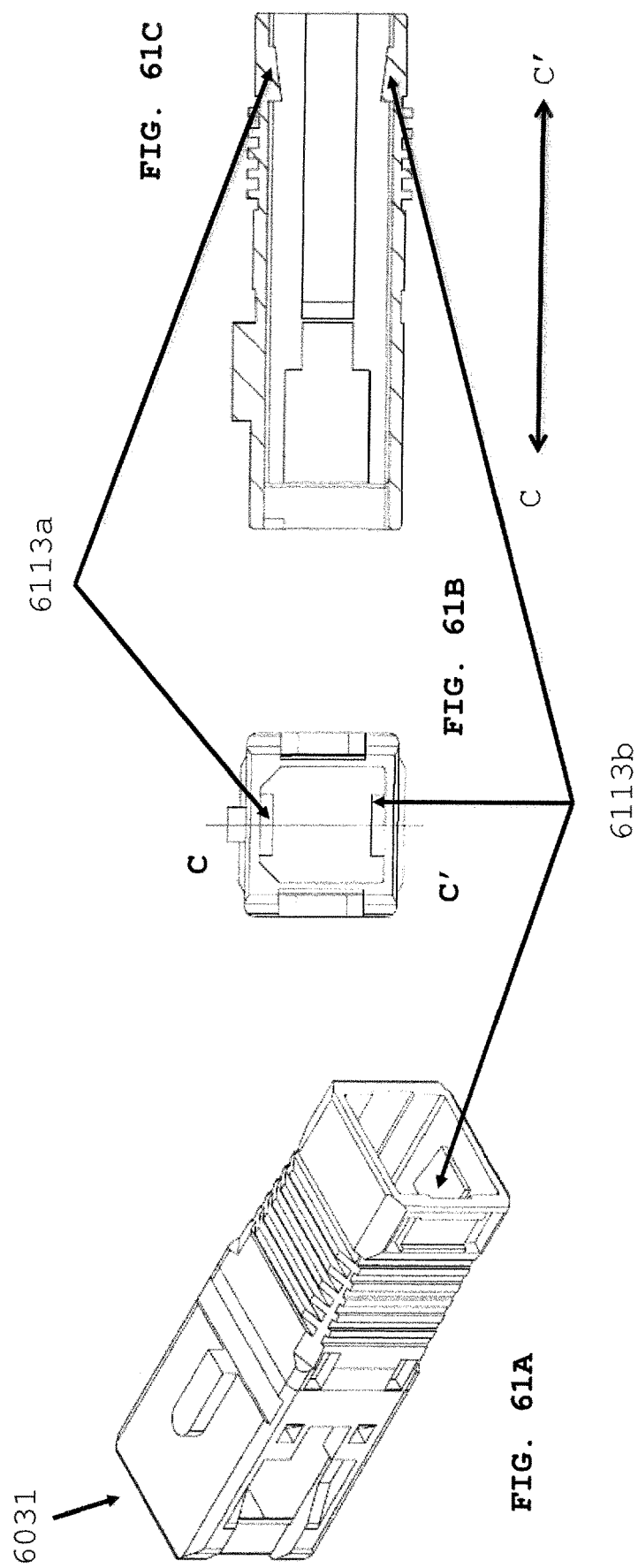

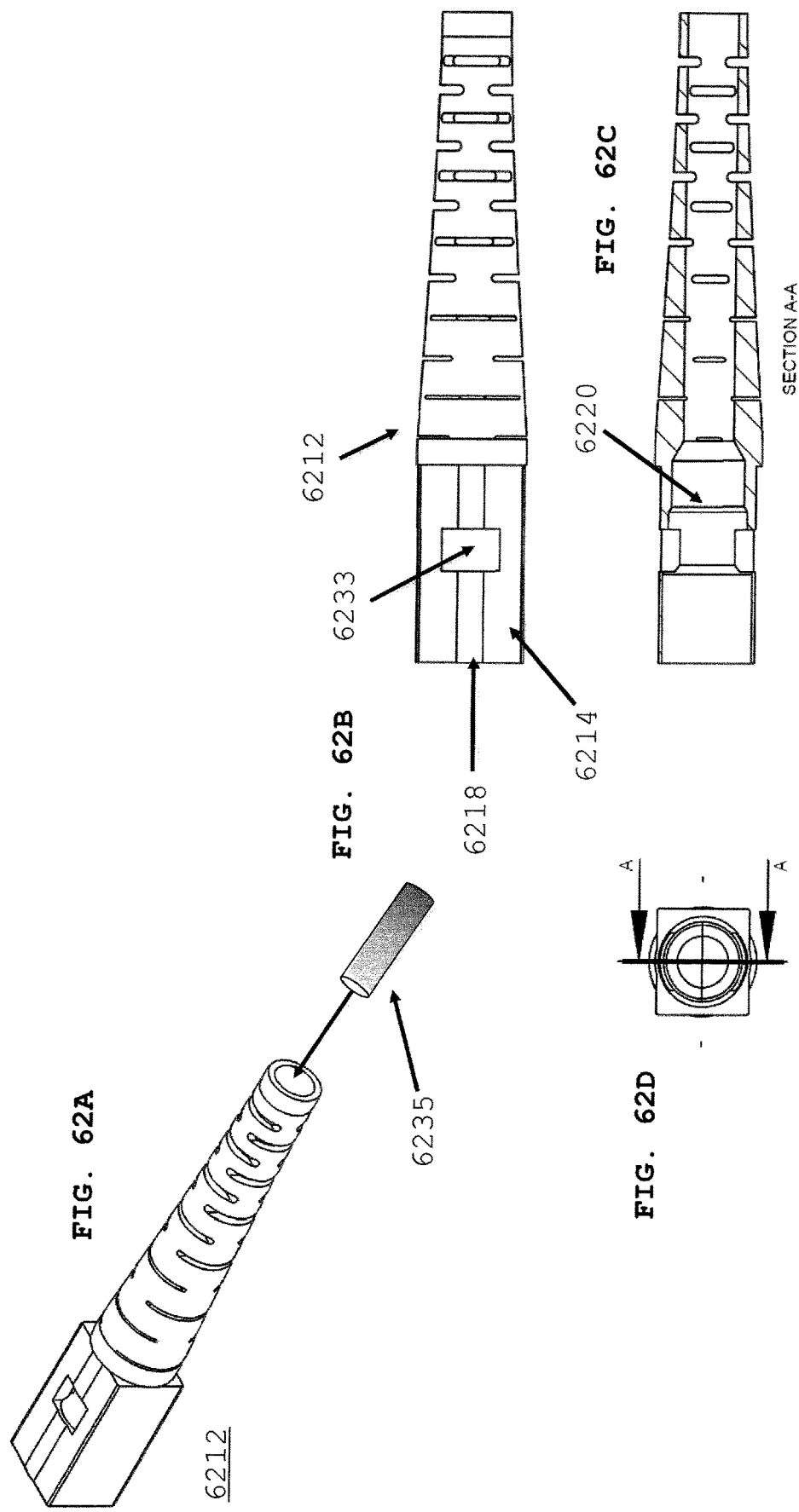

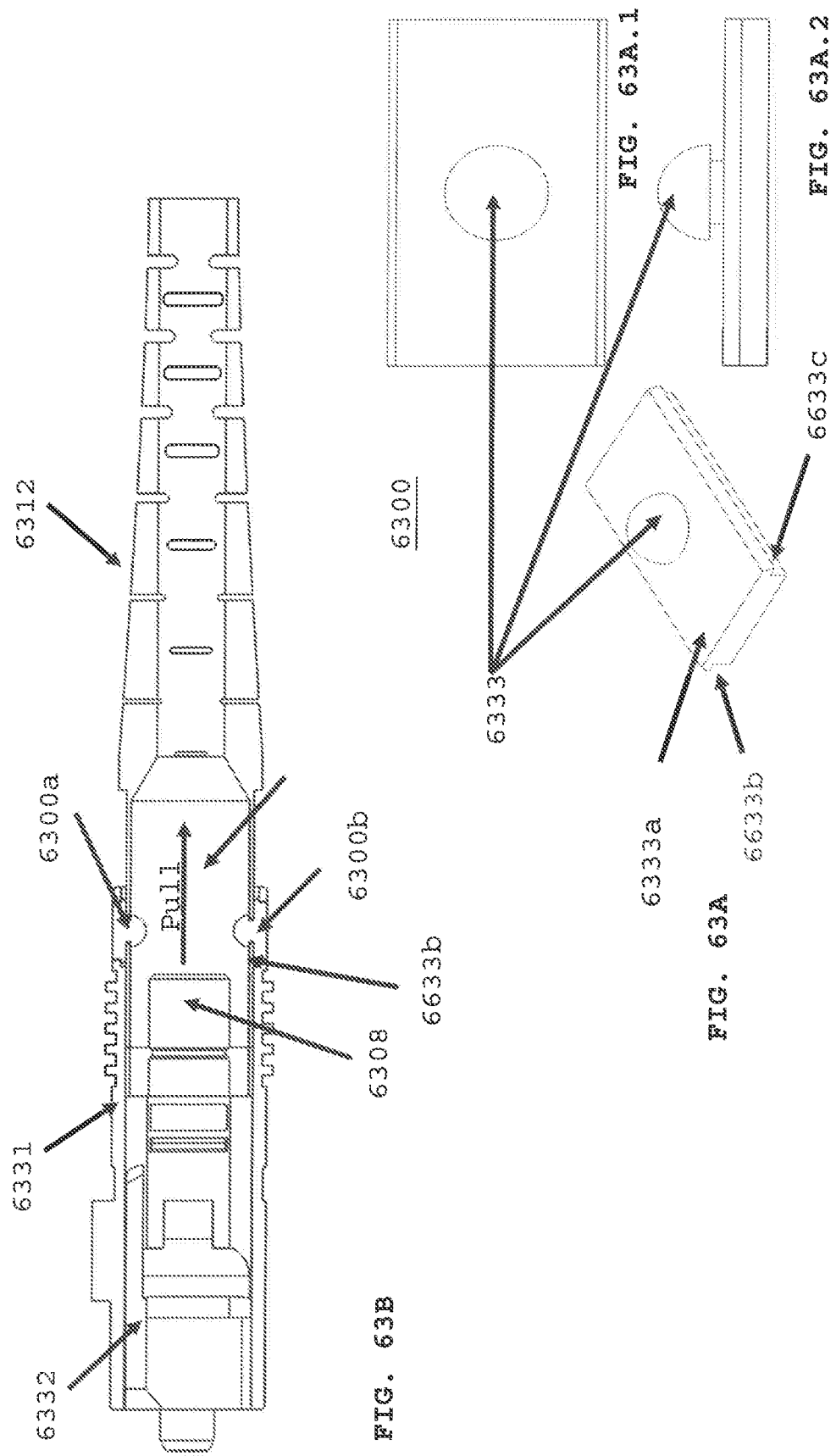

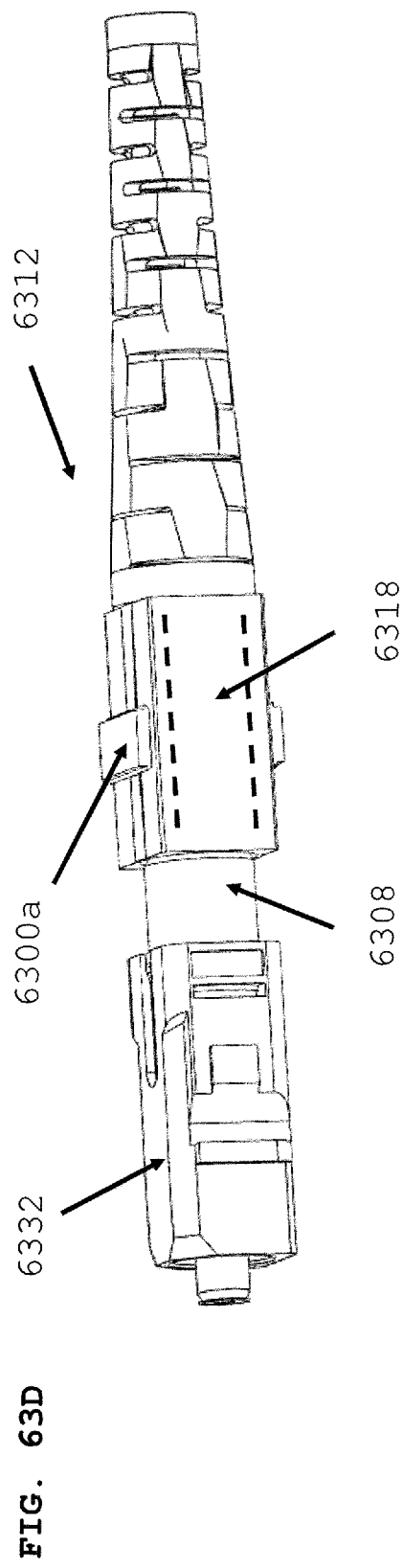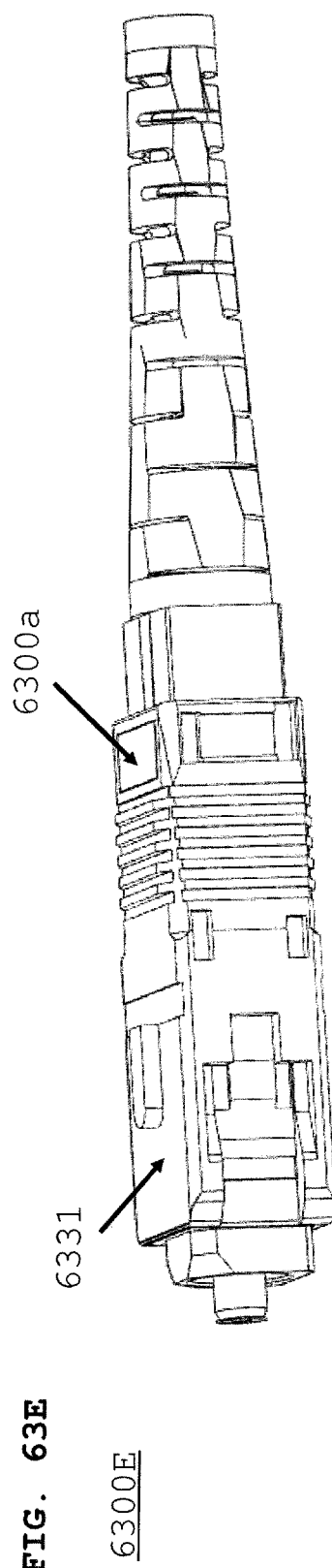
FIG. 63D
FIG. 63E
6300E

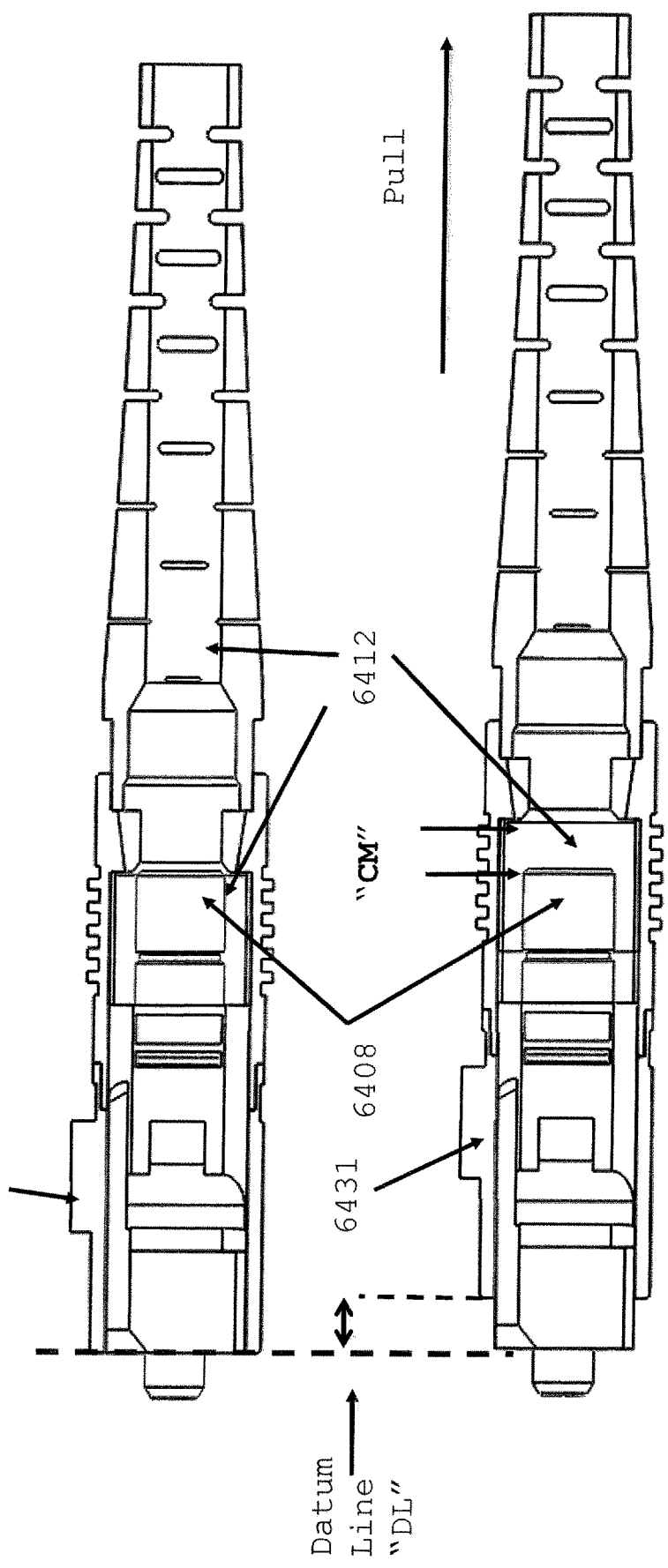

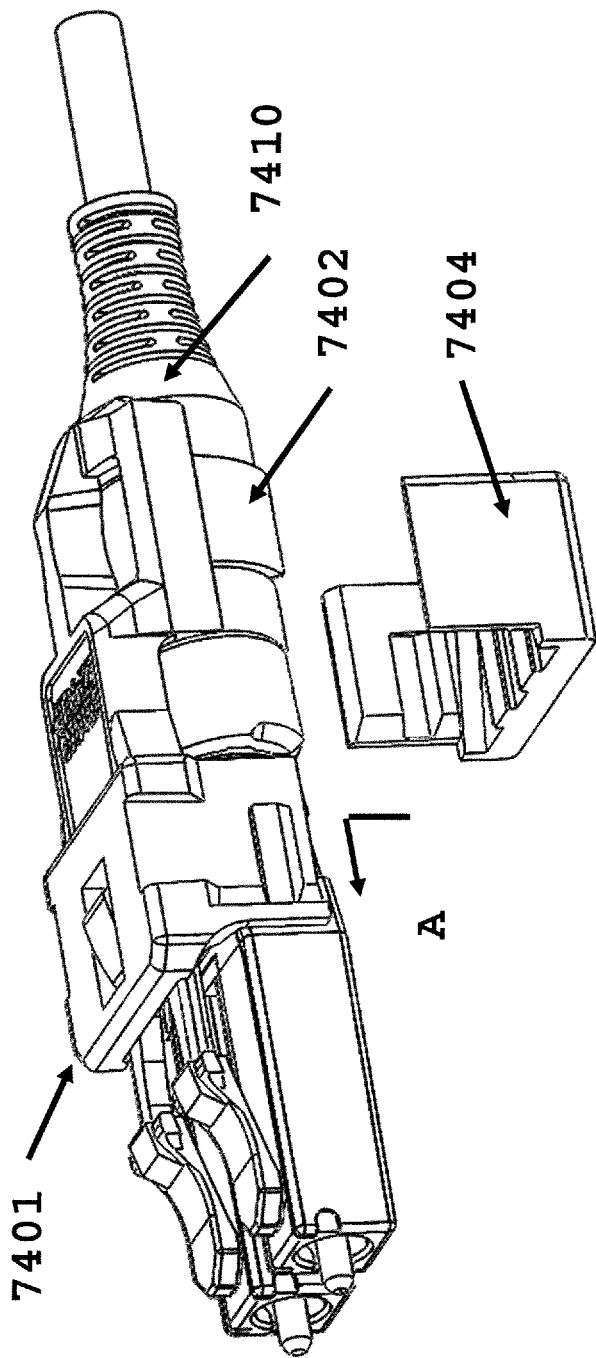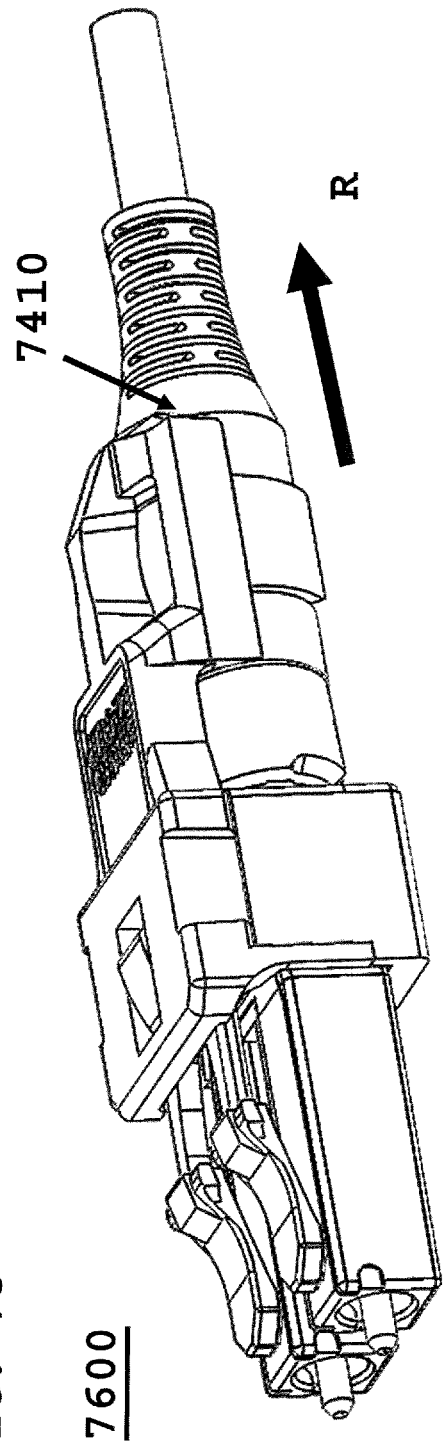
FIG. 75
FIG. 76

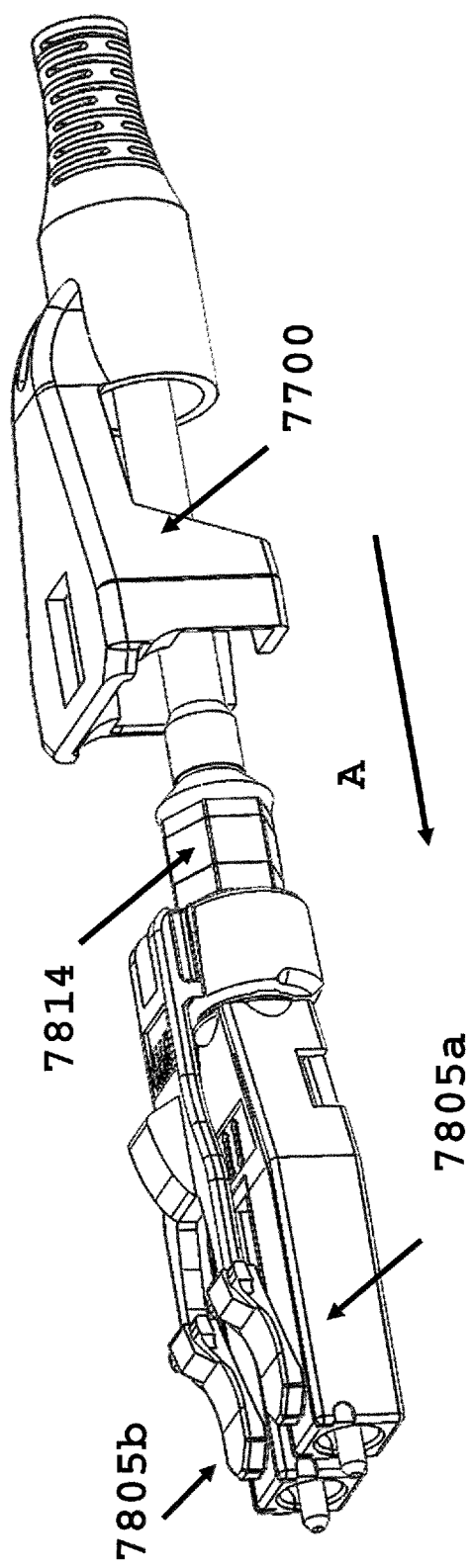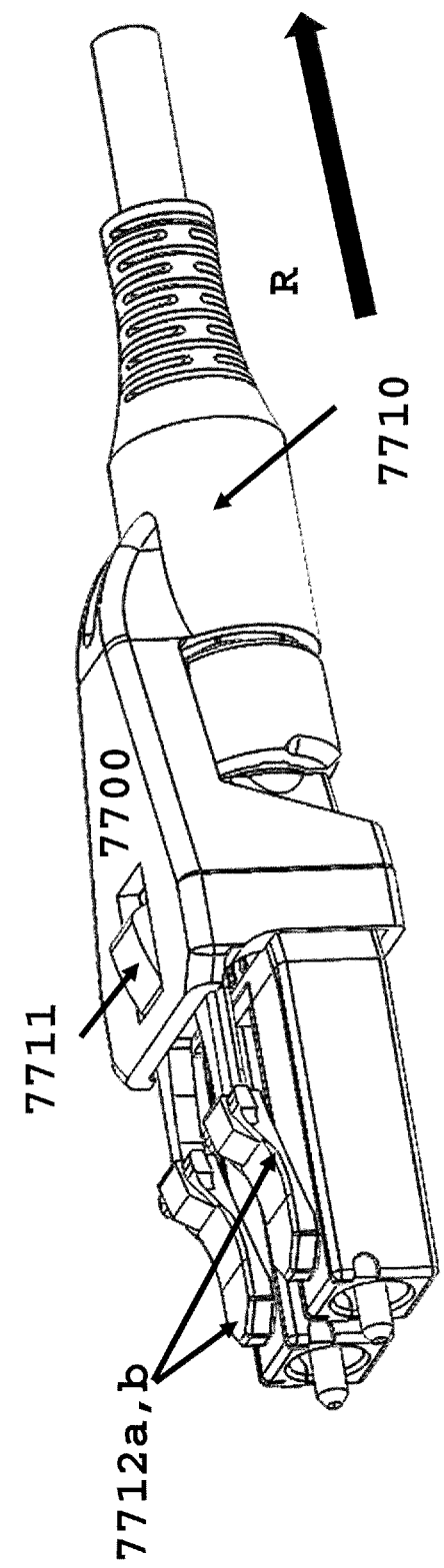
FIG. 78
FIG. 79

US 11,002,923 B2

FIBER OPTIC CONNECTOR WITH CABLE BOOT RELEASE HAVING A TWO-PIECE CLIP ASSEMBLY

CROSS-REFERENCED TO RELATED APPLICATIONS

The present application is continuation-in-part of U.S. patent application Ser. No. 16/161,046 filed on Oct. 15, 2018, which claims the benefit of priority under U.S. Provisional Patent Application having Ser. No. 62/730,304 filed Sep. 12, 2018, titled "Optical Connector Assemblies with Cable Boot Release having Adjustable Polarity" and U.S. patent application Ser. No. 16/161,046 is also a continuation-in-part of U.S. patent application Ser. No. 15/816,629 filed on Nov. 21, 2017, titled "Adjustable Polarity Fiber Optic Connector Assemblies with Push-Pull Tabs", all of which is incorporated herein by reference in their entirety.

BACKGROUND

The present disclosure relates generally to fiber optic connectors. The prevalence of the Internet has led to unprecedented growth in communication networks. Consumer demand for service and increased competition has caused network providers to continuously find ways to improve quality of service while reducing cost. Certain solutions have included deployment of high-density interconnect panels. High-density interconnect panels may be designed to consolidate the increasing volume of interconnections necessary to support the fast-growing networks into a compacted form factor, thereby increasing quality of service and decreasing costs such as floor space and support overhead.

In communication networks, such as data centers and switching networks, numerous interconnections between mating connectors may be compacted into high-density panels. Panel and connector producers may optimize for such high densities by shrinking the connector size and/or the spacing between adjacent connectors on the panel. While both approaches may be effective to increase the panel connector density, shrinking the connector size and/or spacing may also increase the support cost and diminish the quality of service.

In a high-density panel configuration, adjacent connectors and cable assemblies may obstruct access to the individual release mechanisms. Such physical obstructions may impede the ability of an operator to minimize the stresses applied to the cables and the connectors. For example, these stresses may be applied when the user reaches into a dense group of connectors and pushes aside surrounding optical fibers and connectors to access an individual connector release mechanism with his/her thumb and forefinger. Overstressing the cables and connectors may produce latent defects, compromise the integrity and/or reliability of the terminations, and potentially cause serious disruptions to network performance.

In the present invention, the push-pull tab 510 of FIG. 5 is replaced with a cable boot release assembly for releasing and inserting a fiber optic connector from an adapter receptacle. This reduces overall space requirements as the push/pull tab extends from the connector body over a cable, and the push/pull tab protrudes into valuable space between racks of connectors interconnecting the network. In one embodiment, the cable boot assembly moves over a back post or back body located with a connector housing. The back body is secured to a front housing using a latch and recess mechanism.

This cable boot assembly can be used with a LC or Lucent® connector, a SC or standard connector, a CS® or SN™ connector sold by the assignee of the present invention, or a MT ferrule or mechanical transfer ferrule connector used in MPO or multi-fiber push on connector. All these connector types have a ferrule with an optical fiber secured therein at a proximal end, and an incoming cable at a distal end.

Accordingly, there is a need for fiber optic connectors that will meet the needs of future developments allowing for smaller footprints, easier implementation, and easy field modification.

SUMMARY

This disclosure is not limited to the particular systems, devices and methods described, as these may vary. The terminology used in the description is for the purpose of describing the particular versions or embodiments only, and is not intended to limit the scope.

As used in this document, the singular forms "a," "an," and "the" include plural references unless the context clearly dictates otherwise. Unless defined otherwise, all technical and scientific terms used herein have the same meanings as commonly understood by one of ordinary skill in the art. Nothing in this disclosure is to be construed as an admission that the embodiments described in this disclosure are not entitled to antedate such disclosure by virtue of prior invention. As used in this document, the term "comprising" means "including, but not limited to."

In an embodiment, a connector assembly may have a housing configured to accept a first ferrule and a second ferrule. The connector assembly may also have a latch component that is removably connected to the housing, wherein the latch component is configured to rotate around the housing. The latch component may have a first locking element configured to engage a second locking element to prevent rotation of the latch component in at least one of a first polarity position to a second polarity position. The connector may further more include a push-pull tab removably connected to the housing and configured to move vertically along the housing when a biasing force is applied, to the push-pull tab, in at least one of a forward direction and a rearward direction. Accordingly, the push-pull tab can compress the latch component when moving longitudinally along the housing.

In an embodiment, a connector assembly having an adjustable polarity may include a first plug frame and a second plug frame that are independent from each other, a first ferrule disposed within the first plug frame and a second ferrule disposed within the second plug frame that are each coupled to a terminal end of an optical fiber cable; and a housing that may include a top housing component configured to be removably coupled to a bottom housing component. The top and bottom housing coupled together to form a configured to secure the first plug frame and the second plug frame within the connector assembly. In one aspect, removal of the top housing component from the bottom housing component may provide access to the first plug frame and the second plug frame to allow for changing a location of the first plug frame and the second plug frame within the housing to change polarity of the connector assembly.

In a further embodiment, a connector assembly may have an adjustable polarity comprising: a polymer uni-body base frame comprising a plug frame portion, a body portion, and a back post portion; a top cover; and an independent latch;

wherein the independent latching component is removable connected to the distal end (D) of the base frame; and wherein the independent latch component is configured to rotate substantially concentric about the base frame to change polarity of the connector assembly from a first polarity to a second polarity.

In the present invention, a cable boot assembly moves over the back body as a user pulls on the assembly, clip, cable or connector housing to release the connector from an adapter. Likewise the user can push to insert the connector into an adapter housing. The clip can be replaced with a two-piece clip, or just a cable boot assembly that is secured to an outer housing, while the assembly internal bore is configured to allow the assembly to move over the back body. The cable boot assembly is secured to the outer housing which actuates a release of the connector from within an adapter housing.

BRIEF DESCRIPTION OF THE DRAWINGS

The above and other objects of the present invention will become more readily apparent from the following detailed description taken in connection with the accompanying drawings.

FIG. 4C depicts a side view of a connector assembly according to an embodiment.

FIG. 4D depicts a perspective view of a connector assembly according to an embodiment.

FIG. 9A depicts a potential polarity change of the connector assembly according to an embodiment.

FIG. 9B depicts a recess on the housing of the connector assembly according to an embodiment.

FIG. 9C depicts a protrusion on the latching component according to an embodiment.

FIG. 24B is a side-view of the connector of FIG. 24A.

FIG. 24C is a top-view of the connector of FIG. 24A.

FIG. 24D is a bottom-view of the connector of FIG. 24A.

FIG. 25A is a cross-section view of the connector of FIG. 24B, which is prior to release "R".

FIG. 25B is a cross-section side-view of the connector of FIG. 24E.

FIG. 26A is a side-view of a cable boot according to an embodiment of the present invention used in in FIG. 24A.

FIG. 26B is a perspective offset-view of a proximal, "P", end of FIG. 26A.

FIG. 26C is an end view of a proximal end of FIG. 26A.

FIG. 29A is a front perspective view of FIG. 27 prior to insertion over the cable boot assembly of FIG. 26A.

FIG. 29B is a side vie of FIG. 27 prior to insertion over the cable boot assembly of FIG. 29B.1.

FIG. 29B.1 is a side view of the cable boot assembly of FIG. 26A.

FIG. 29B.2 depicts insertion of cable boot assembly (FIG. 29B.1), into a proximal end opening of push/pull clip of FIG. 28B.

FIG. 29C is a side-offset view of the cable boot of FIG. 26A prior to interconnection with FIG. 29A.

FIG. 29D depicts push/pull clip of FIG. 27 inserted onto cable boot assembly of FIG. 29C.

FIG. 30A depicts connector of FIG. 24A while connector is in a normal or first position.

FIG. 30B depicts connector of FIG. 24A after user pulls on cable boot in direction "R", where the push/pull clip moves distally a distance "d" from a datum line "DL".

FIG. 32A depicts a call-out area after a user pulls rearward in direction "R" to cause connector to release from an adapter opening (refer to FIG. 34B)

FIG. 32B depicts FIG. 32A call-out showing a window face depressing a protrusion to release connector from adapter (not shown).

FIG. 33A depicts push/pull clip of FIG. 27 illustrating an under-cut protrusion on inside surface of wing.

FIG. 33B depicts cable boot assembly of FIG. 26A with a recess as another embodiment.

FIG. 33C is an end-view of FIG. 33A.

FIG. 33D is an end-view of FIG. 33B with a call-out area.

FIG. 33E depicts the push/pull clip inserted onto and secured with cable boot of FIG. 33B.

FIG. 34A depicts the connector of FIG. 24A inserted into an adapter.

FIG. 34B is a side-view of FIG. 34A.

FIG. 35A depicts connector of FIG. 24A during release of connector (FIG. 24A) at distal end thereof by user pulling in direction "R".

FIG. 35B is a side view of FIG. 35A.

FIG. 36A illustrates the connector of FIG. 24A removed from the adapter.

FIG. 36B is a side-view of FIG. 36A.

FIG. 36C is the cross-section view of the connector of FIG. 36B after removed from adapter.

FIG. 37 is a perspective view of bottom of connector with push-pull clip permanently secured to or integrated with cable boot about back body.

FIG. 38A is a perspective view of a SC connector having a push-pull boot release.

FIG. 38B is a cross-section, cut-away view of the SC connector of FIG. 38A.

FIG. 38C.1 is a prior art SC connector.

FIG. 38C.2 is a zoomed view of FIG. 38C.1.

FIG. 38D.1 is showing a call-out area of FIG. 38A.

FIG. 38D.2 is a zoomed view of FIG. 38D.1.

FIG. 39A is a front, left side perspective view of a SC outer housing of FIG. 38A.

FIG. 39B is a front, right side perspective view of a SC outer housing of FIG. 38A.

FIG. 42A is a cross-section view of FIG. 38A pushing on boot portion to secure connector within an adapter opening (not shown).

FIG. 42B is a cross-section view of FIG. 38A pulling on a boot portion to release connector secured within an adapter opening (not shown).

FIG. 48A depicts assembled connector of FIG. 44 showing cross-section line for FIG. 48B.

FIG. 48B is a cross-section view of FIG. 44.

FIG. 49A is cross-section view connector of FIG. 44 after "pushing" on cable boot.

FIG. 49B is a side perspective view of connector of FIG. 44 after cable boot is "pushed" forward.

FIG. 50A is a side view of connector of FIG. 44.

FIG. 50B is a side view of connector of FIG. 50B after release of connector from an adapter not shown.

FIG. 51A is a cross-section view of FIG. 50A.

FIG. 51B is a cross-section view of FIG. 50B.

FIG. 52 is an exploded view of a MPO connector with a cable boot assembly and push-pull clip.

FIG. 53 is an assembled view of FIG. 52.

FIG. 54A is a perspective side proximal view of a push/pull clip for FIG. 53 connector.

FIG. 54B is a perspective side distal view of a push/pull clip for FIG. 53 connector.

FIG. 55 is a perspective view of a cable boot assembly.

FIG. 56A is a side view of a cable boot assembly secured with a push/pull clip.

FIG. 56B is a proximal end view of FIG. 56A.

Figure 56D:
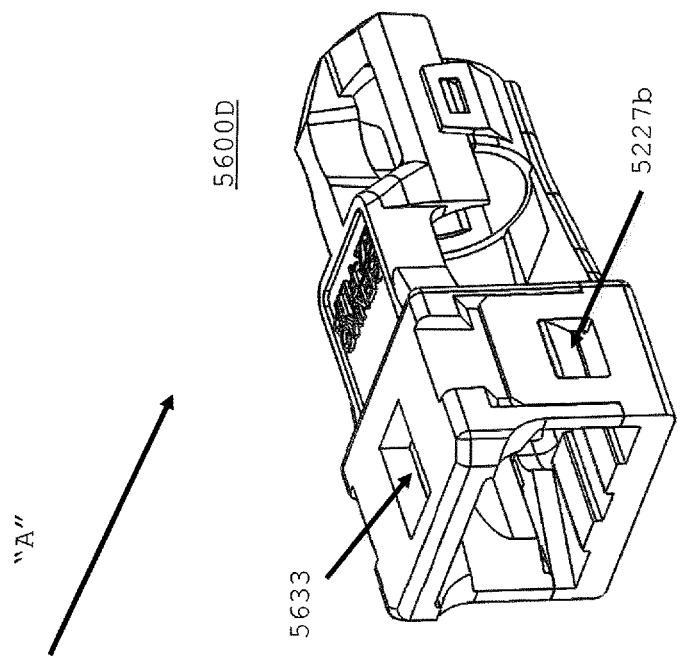
Figure 56C:
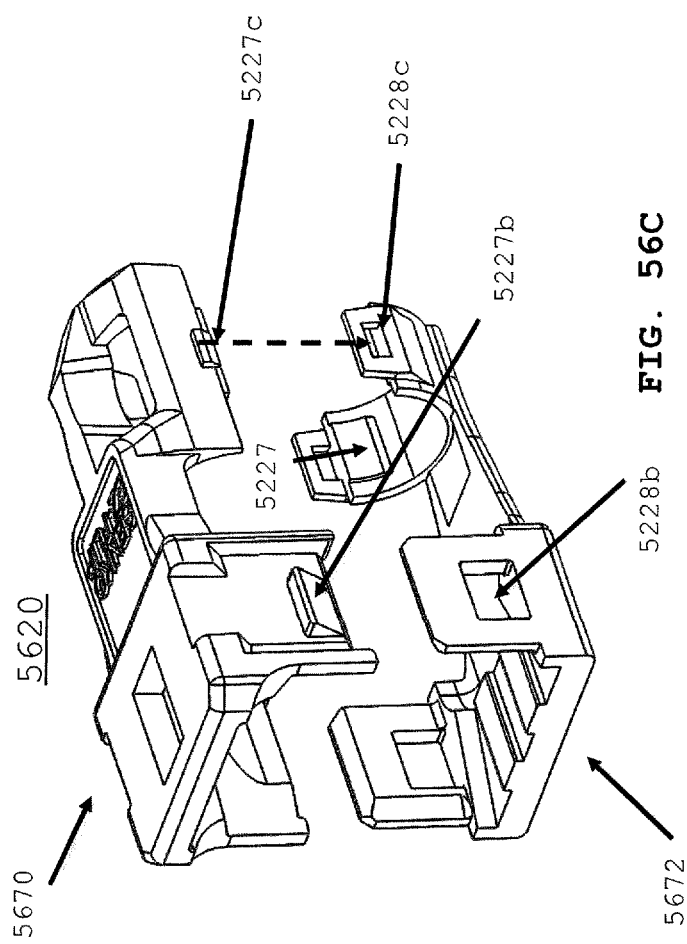

FIG. 56C is a perspective view of a two-piece push/pull clip.

FIG. 56D is an assembled view of FIG. 56C.

FIG. 56E is an exploded view of FIG. 56C prior to assembled with a LC connector.

FIG. 56F is an assembled view of FIG. 56E.

Figure 54B:
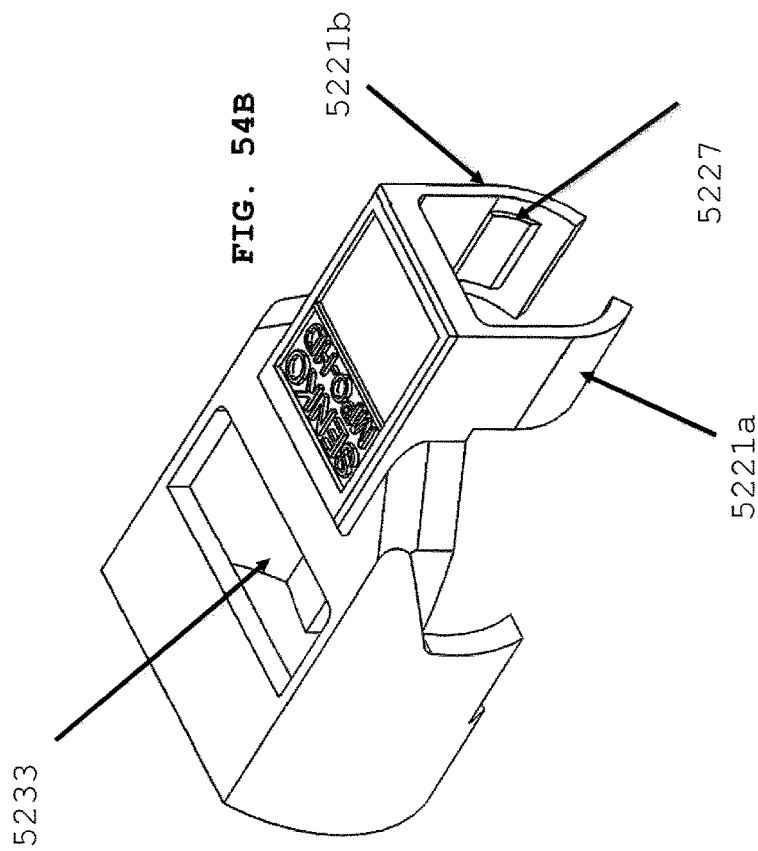
Figure 54A:
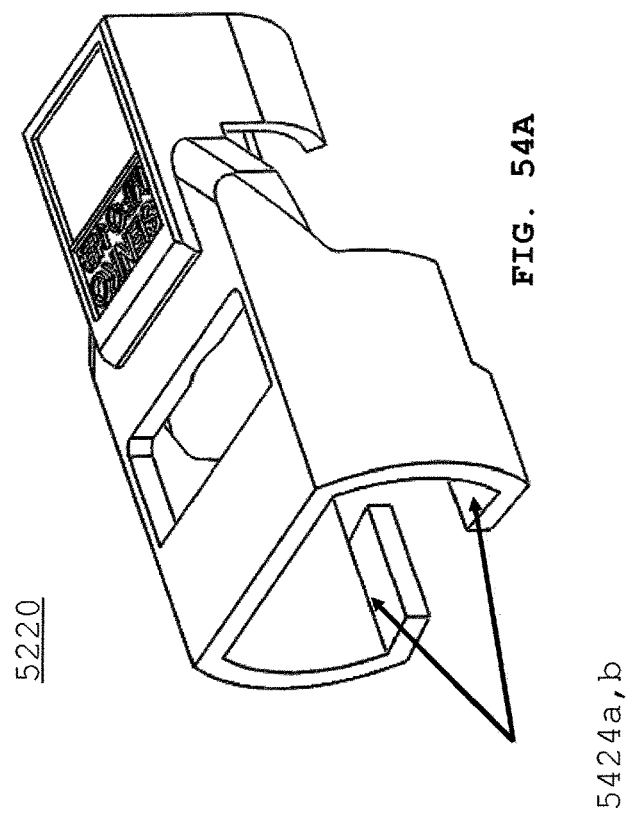
Figure 57A:
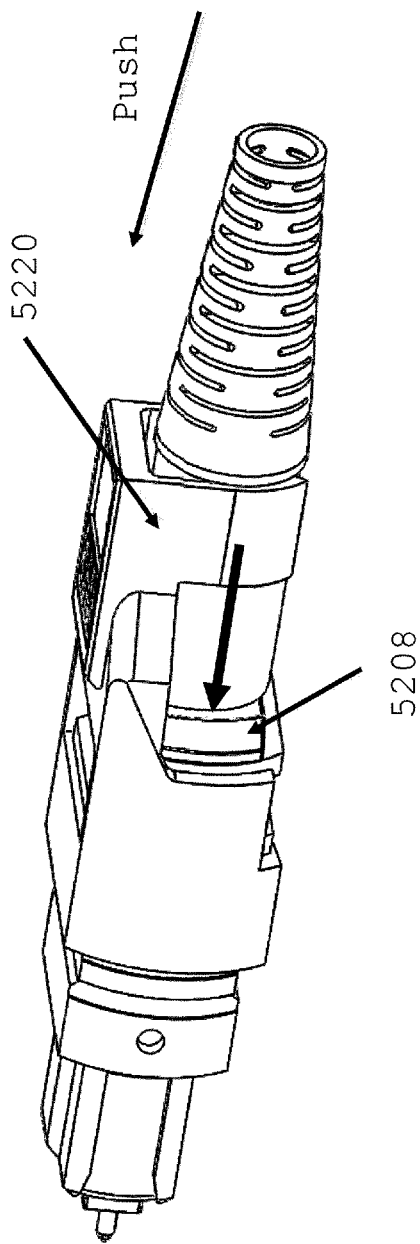

FIG. 57A is an assembled view of FIG. 54A push/pull clip on a MPO connector.

Figure 57B:
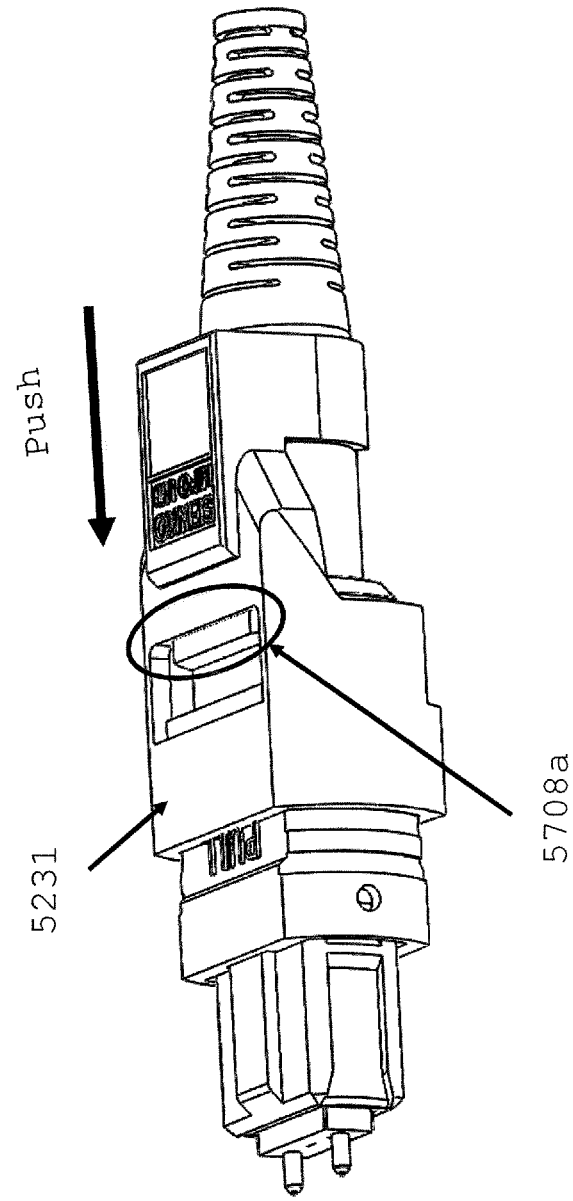

FIG. 57B is a top view of FIG. 57A.

FIG. 58A is a side view of FIG. 57A prior to pull release from an adapter housing (not shown).

FIG. 58B is view pulling a MPO connector with push/pull clip from an adapter housing (not shown).

Figures 59A, 59B:
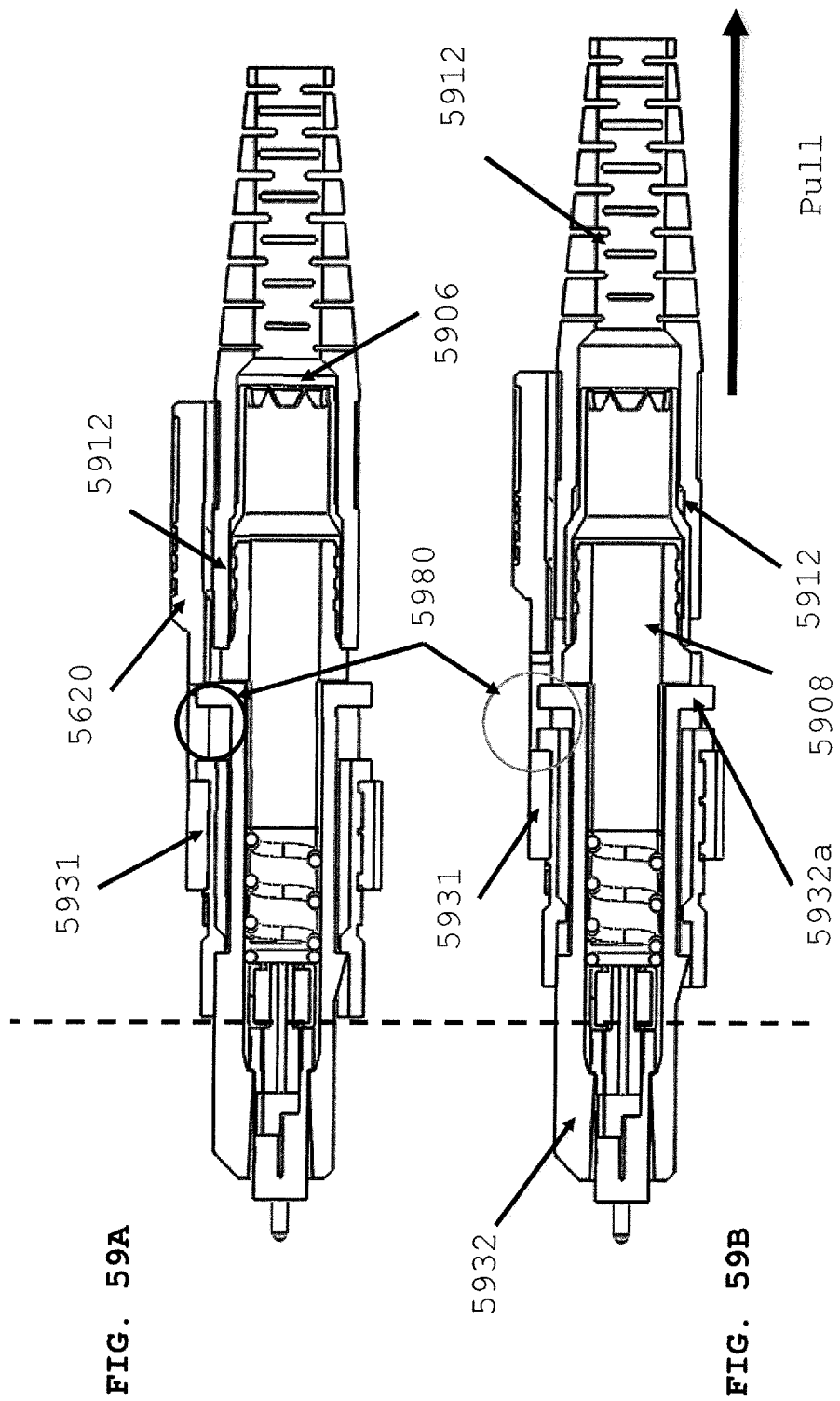

FIG. 59A is a cross-section view of FIG. 58A.

FIG. 59B is a cross-section view of FIG. 58B.

Figure 60:
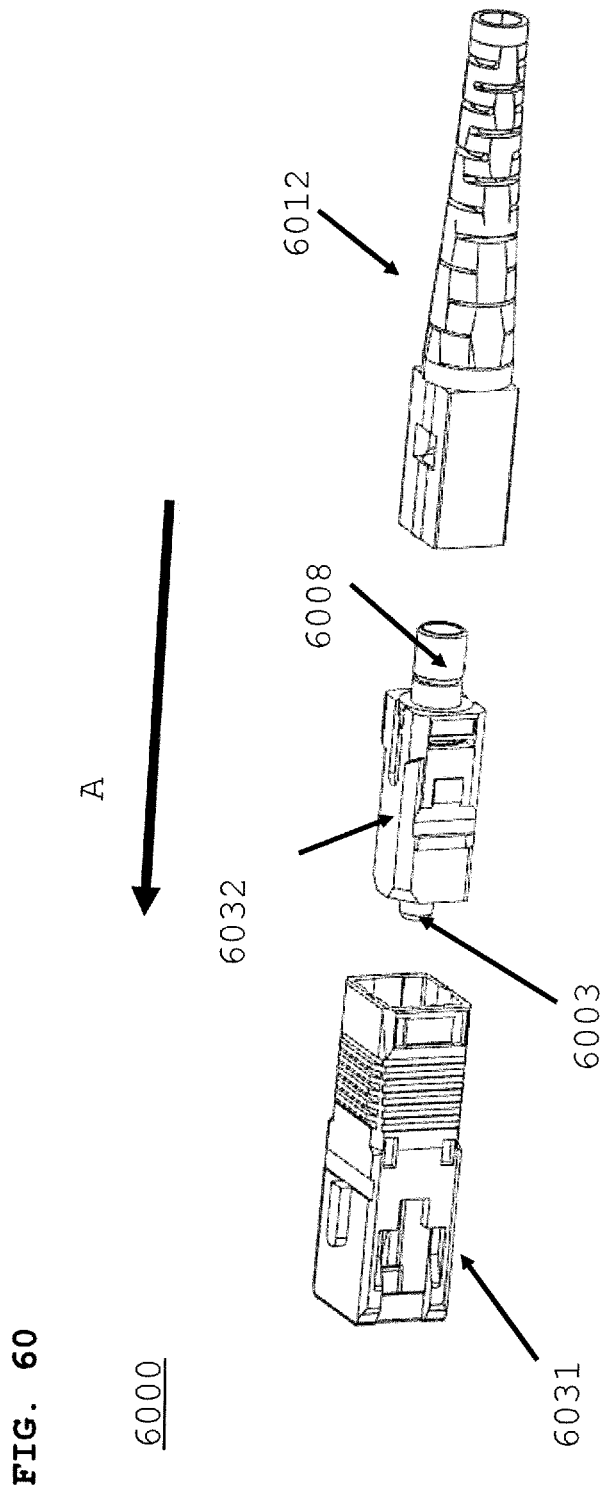

FIG. 60 is an exploded view of a second embodiment of a cable boot assembly with a SC connector.

FIG. 61A is a side perspective view of an outer connector housing according to an embodiment of the present invention.

FIG. 61B is a proximal end view of FIG. 61A.

FIG. 61C is a cross section view of FIG. 61A, along C-C' of FIG. 61B.

FIG. 62A is an exploded view of cable boot assembly and cable.

FIG. 62B is a top perspective view of a cable boot assembly.

FIG. 62C is a cross-section view of a cable boot assembly.

FIG. 62D is cross-section B-B' of FIG. 62C.

FIG. 63A is a perspective view of a securing plate.

FIG. 63A.1 is a top view of FIG. 63A.

FIG. 63A.2 is a side view of FIG. 63A.

FIG. 63B is a cross view of a SC connector assembled with securing plate.

Figure 63C:
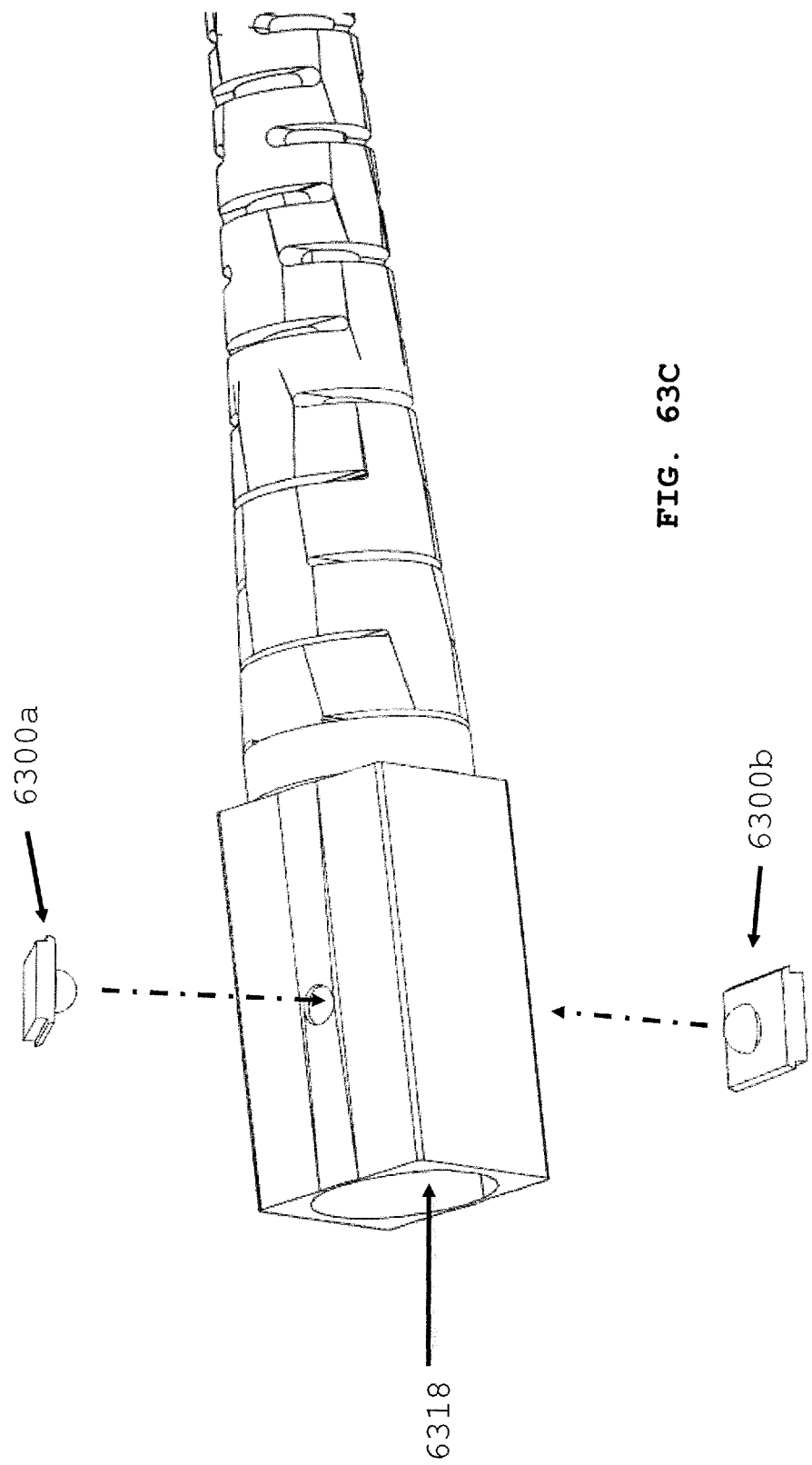

FIG. 63C is an exploded view of securing plates being assembled to a cable boot assembly.

FIG. 63D is a perspective view of a SC connector with an outer housing partially assembled with a cable boot assembly and securing plate.

FIG. 63E is a fully assembled view with outer housing included in in FIG. 63D.

FIG. 64A is a cross-section view of FIG. 63E connector prior to release from an adapter housing (not shown).

FIG. 64B is a cross-section view of FIG. 63E connector being pulled to actuate or release connector from adapter housing (not shown).

Figure 65:
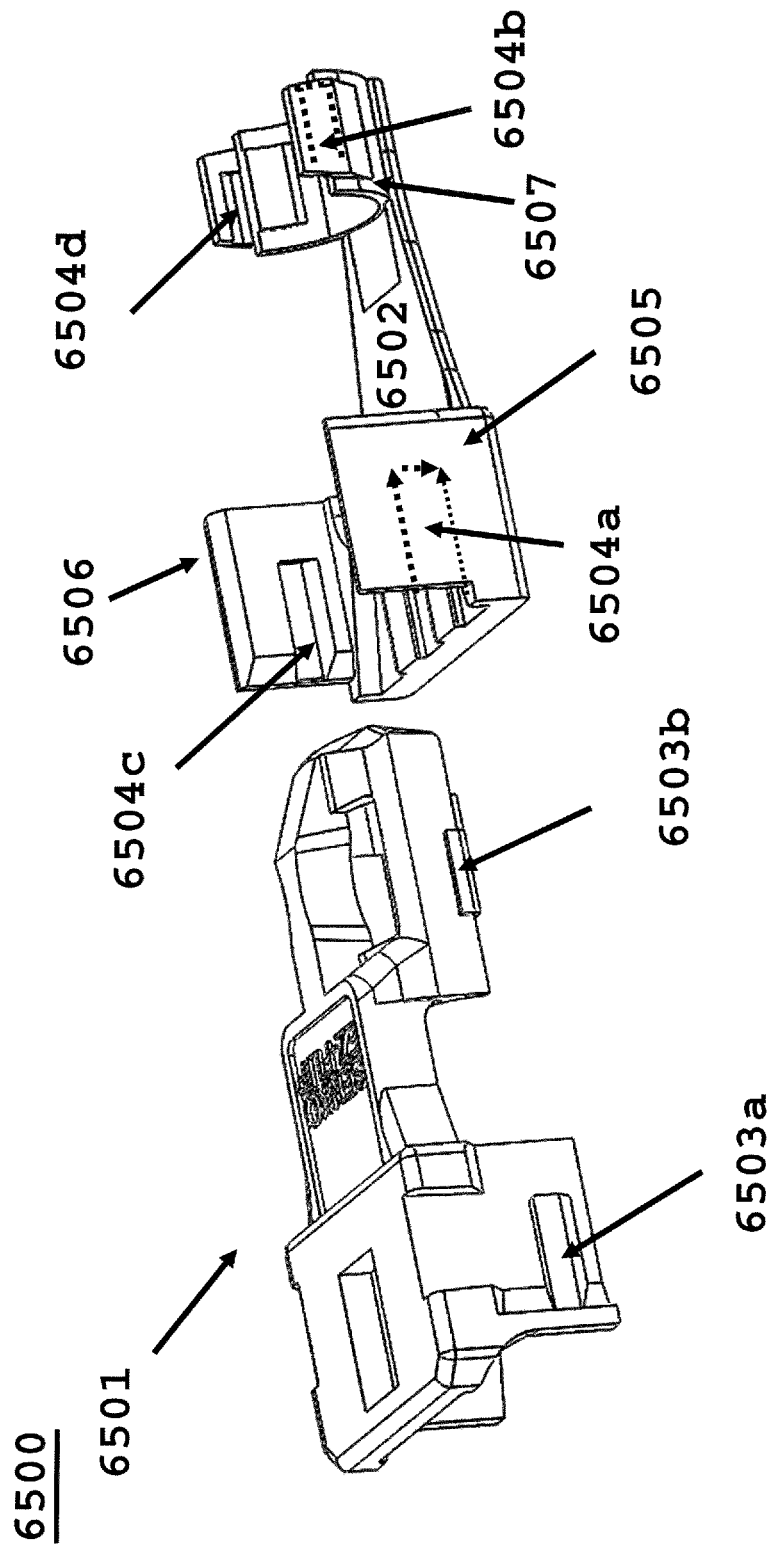

FIG. 65 is an exploded view of a two-piece push/pull clip.

Figure 66:
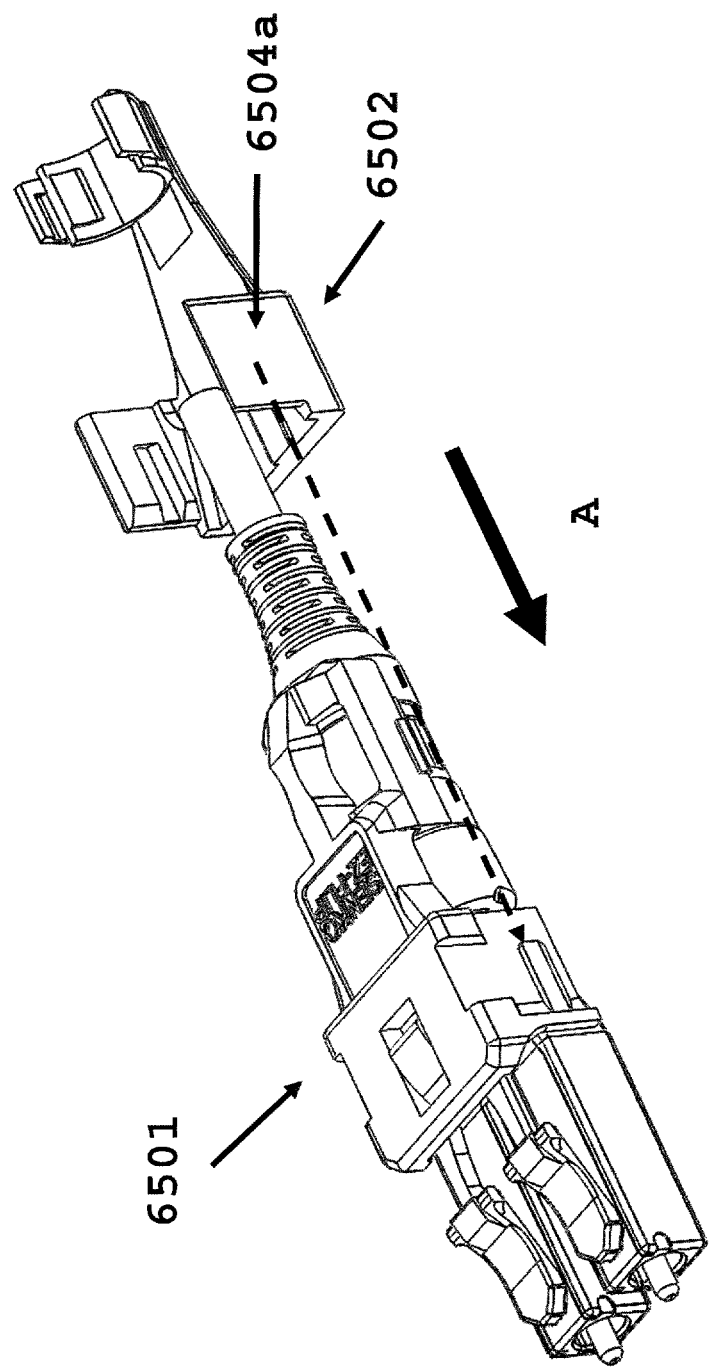

FIG. 66 is an exploded view of assembling the clip of FIG. 65 onto a fiber optic connector.

Figure 67:
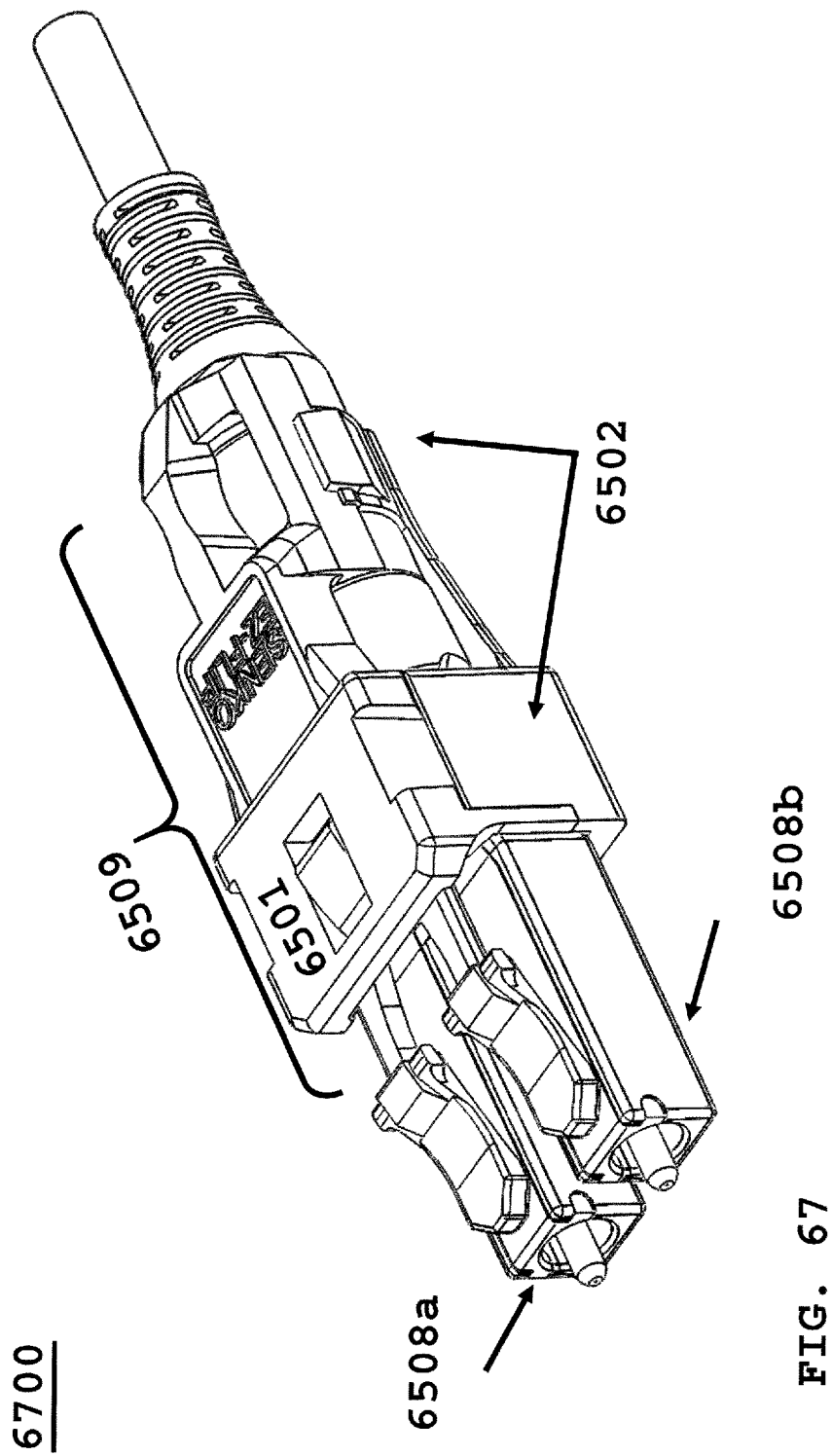

FIG. 67 is a perspective view of the clip of FIG. 65 assembled with a fiber optic connector.

Figure 68:
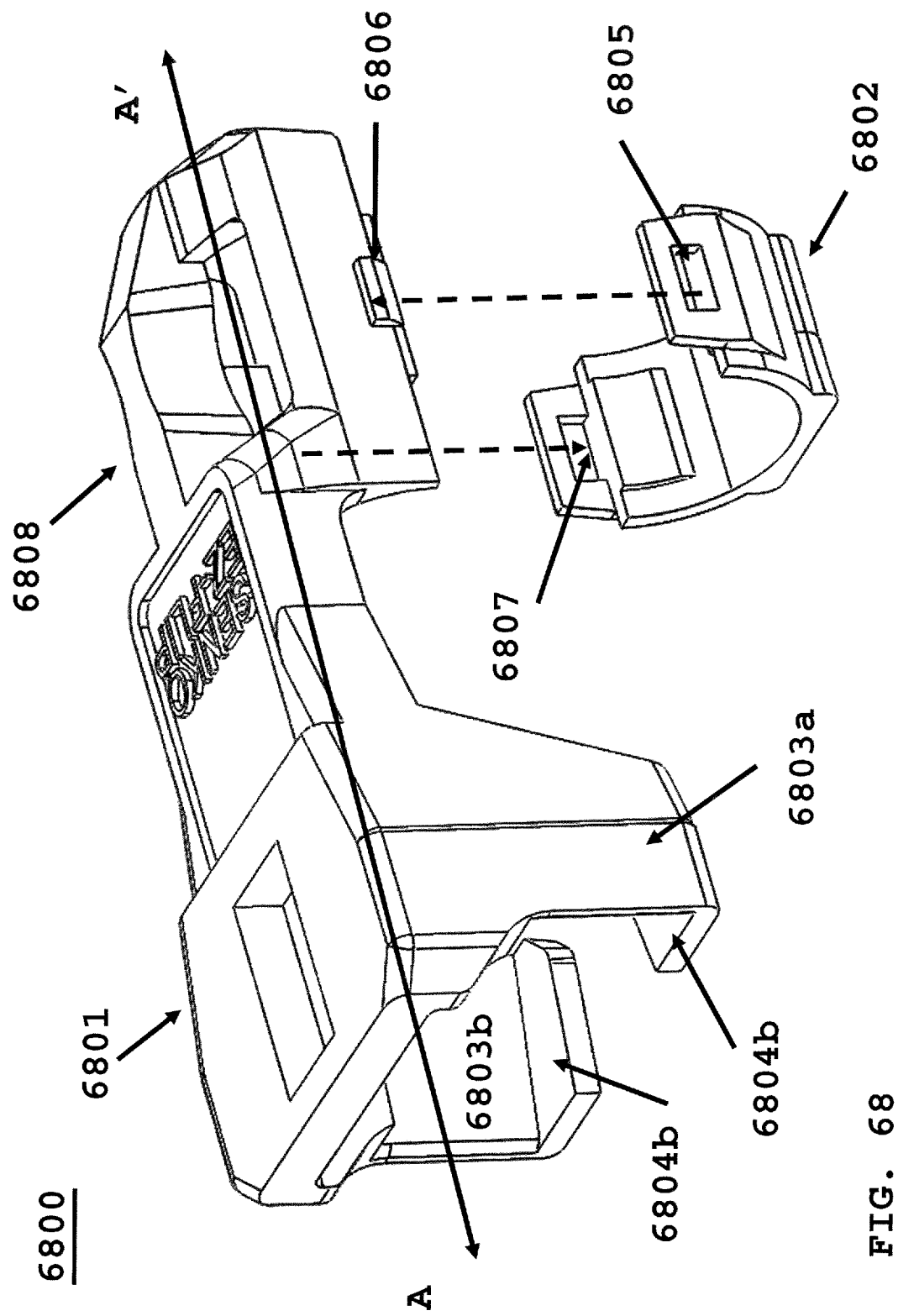

FIG. 68 is an exploded view of another two-piece push/pull clip.

Figure 69:
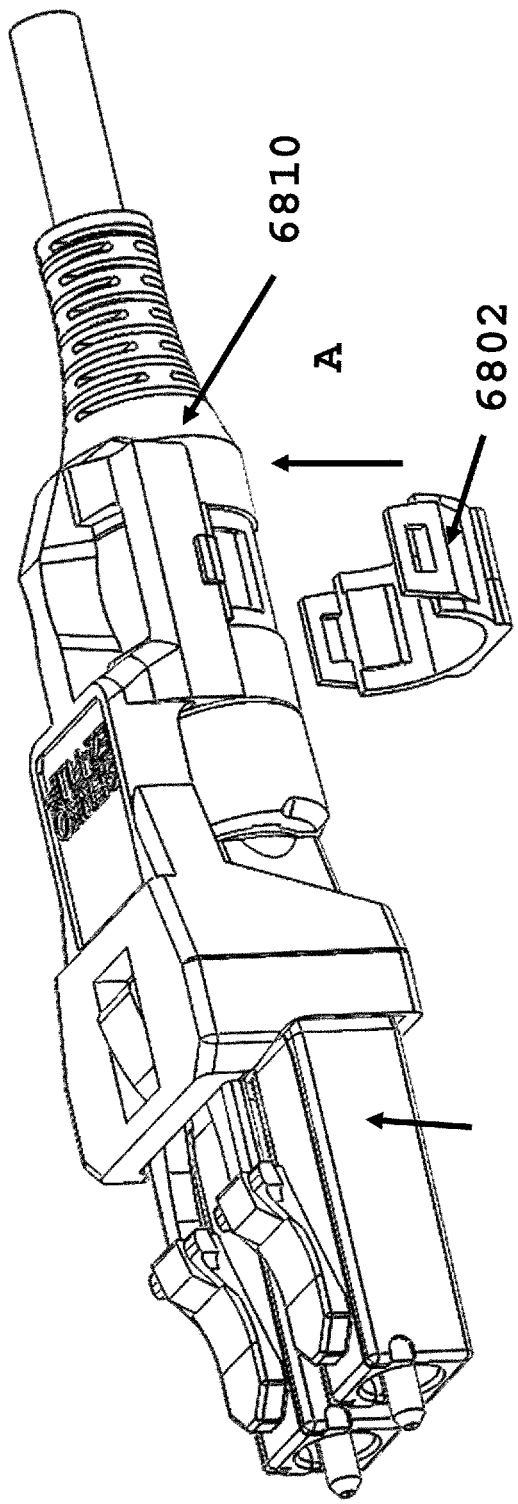

FIG. 69 is an exploded view of assembling the clip of FIG. 68.

Figure 70:
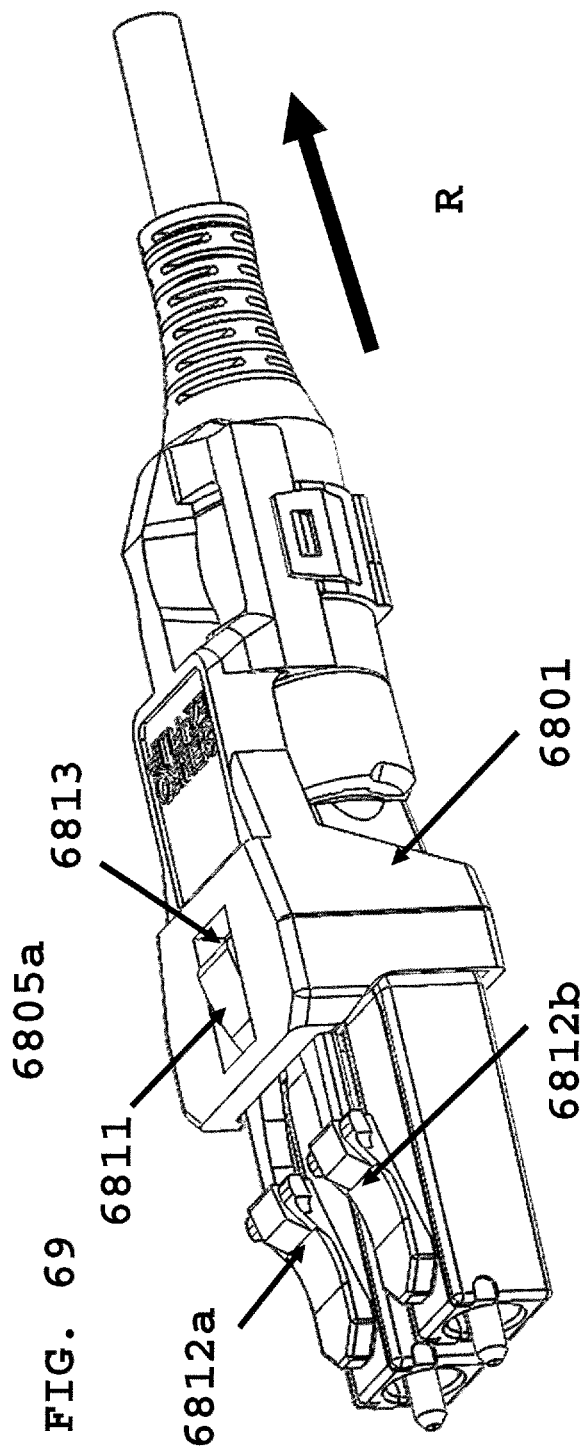

FIG. 70 is a perspective view of clip of FIG. 67 assembled with a fiber optic connector.

Figure 71:
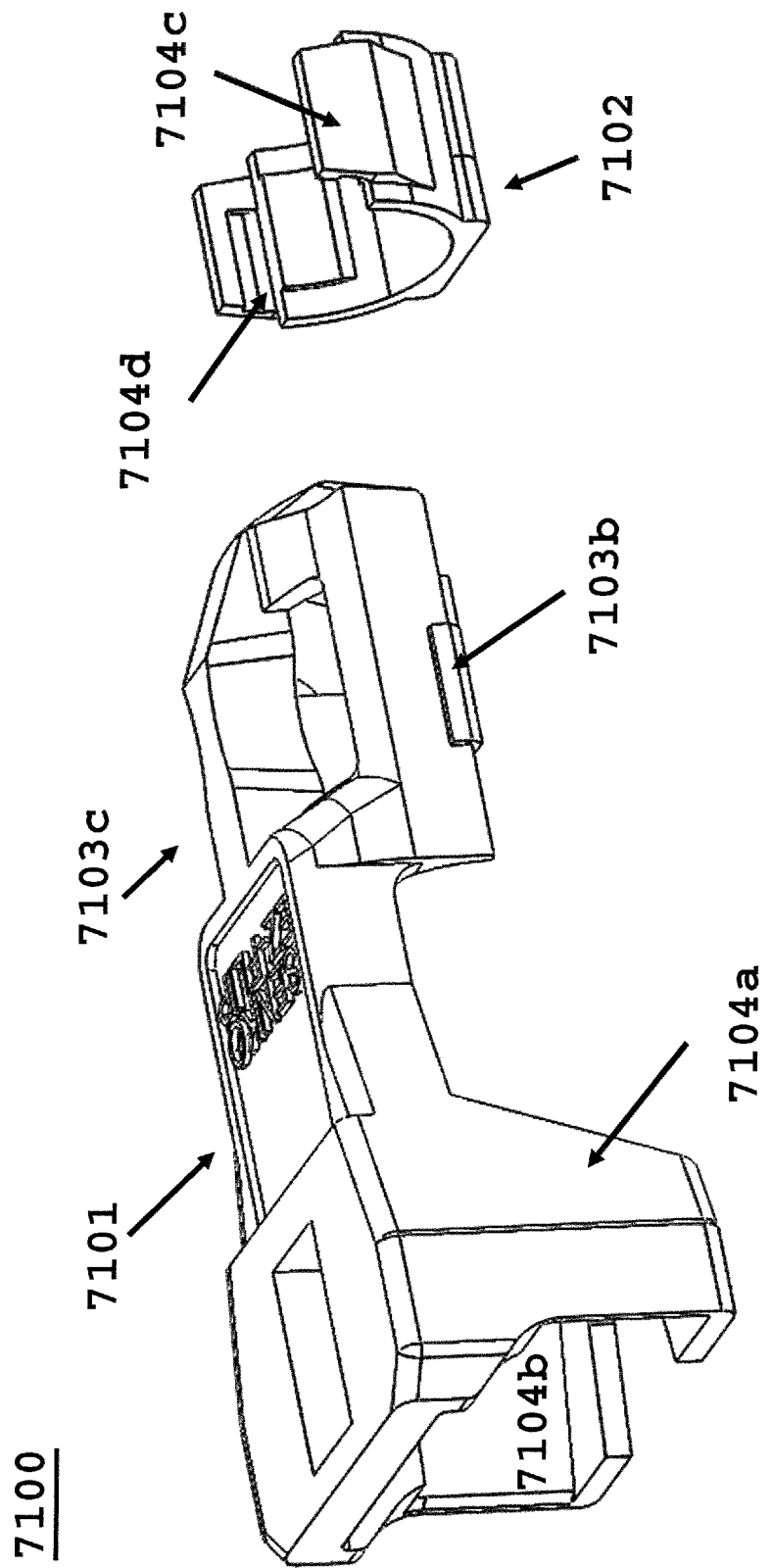

FIG. 71 is an exploded view of another two-piece push/pull clip.

Figure 72:
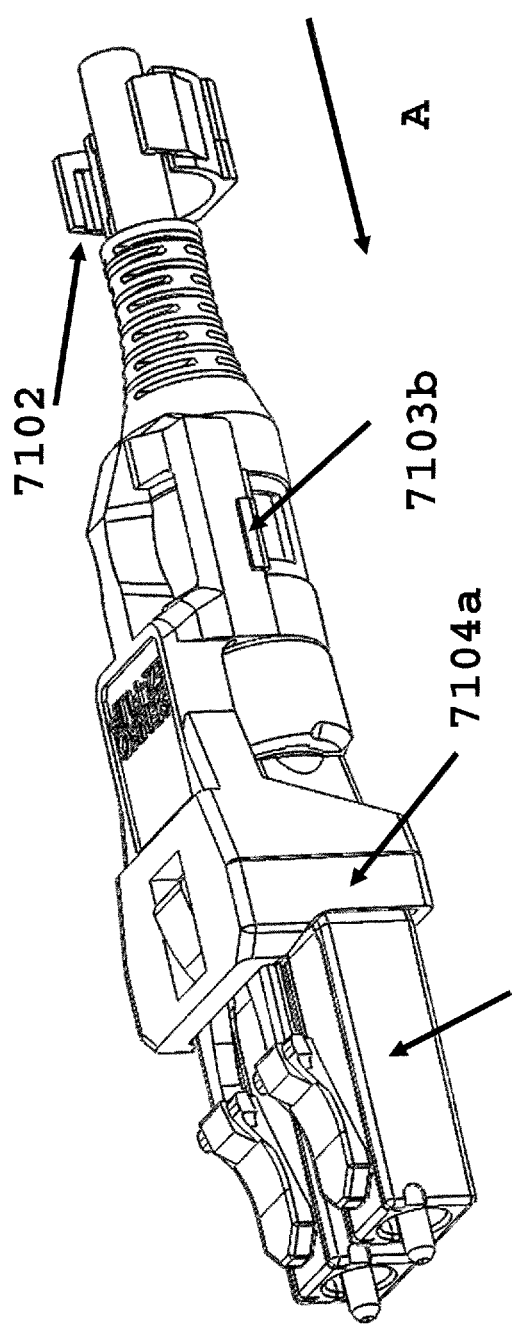

FIG. 72 is an exploded view of assembling the clip of FIG. 71.

Figure 73:
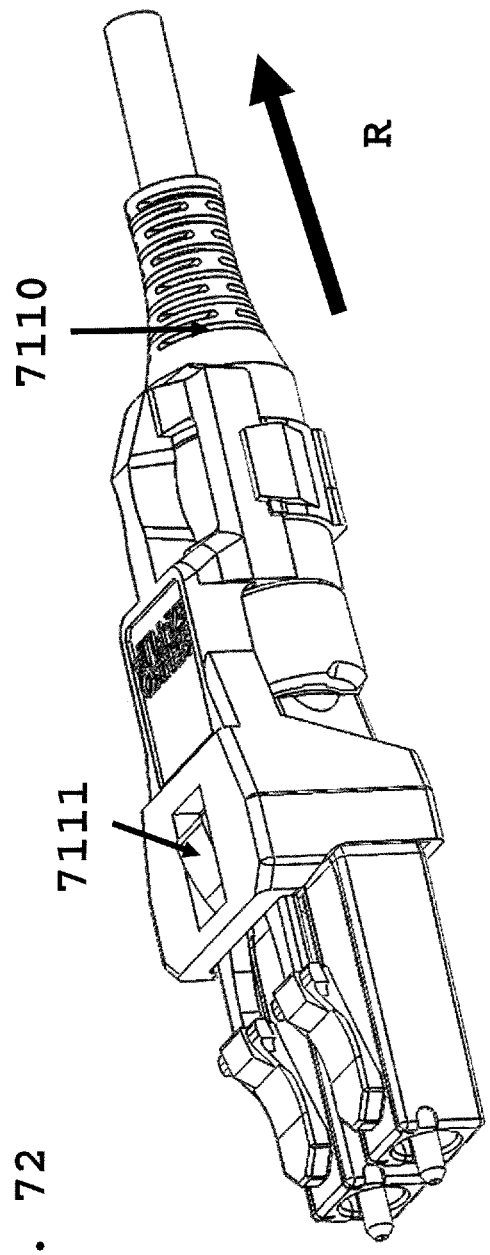

FIG. 73 is a perspective view of clip of FIG. 71 assembled with a fiber optic connector.

Figure 74:
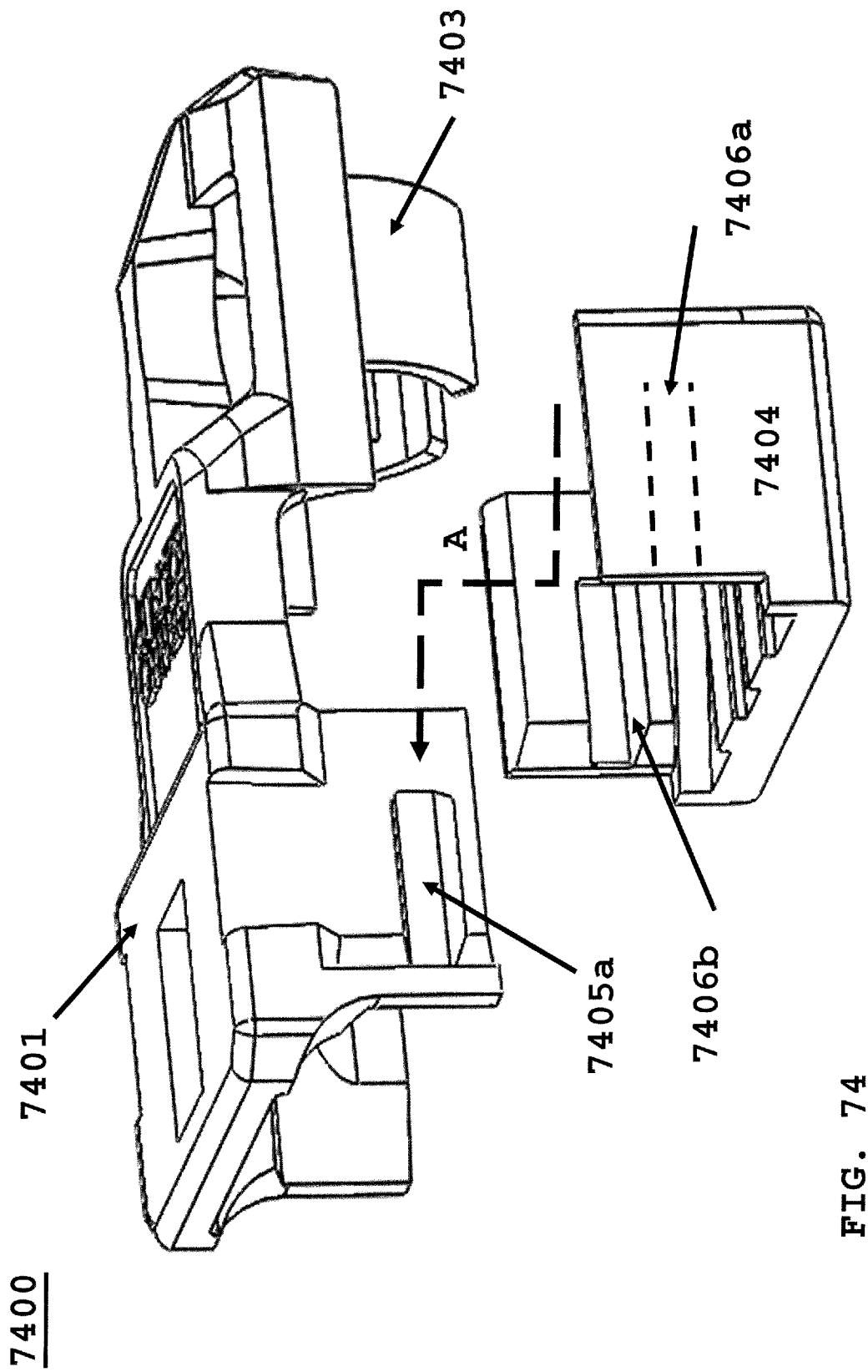

FIG. 74 is an exploded view of another two-piece push/pull clip.

FIG. 75 is an exploded view of assembling the clip of FIG. 74.

FIG. 76 is a perspective view of clip of FIG. 74 assembled with a fiber optic connector.

Figure 77:
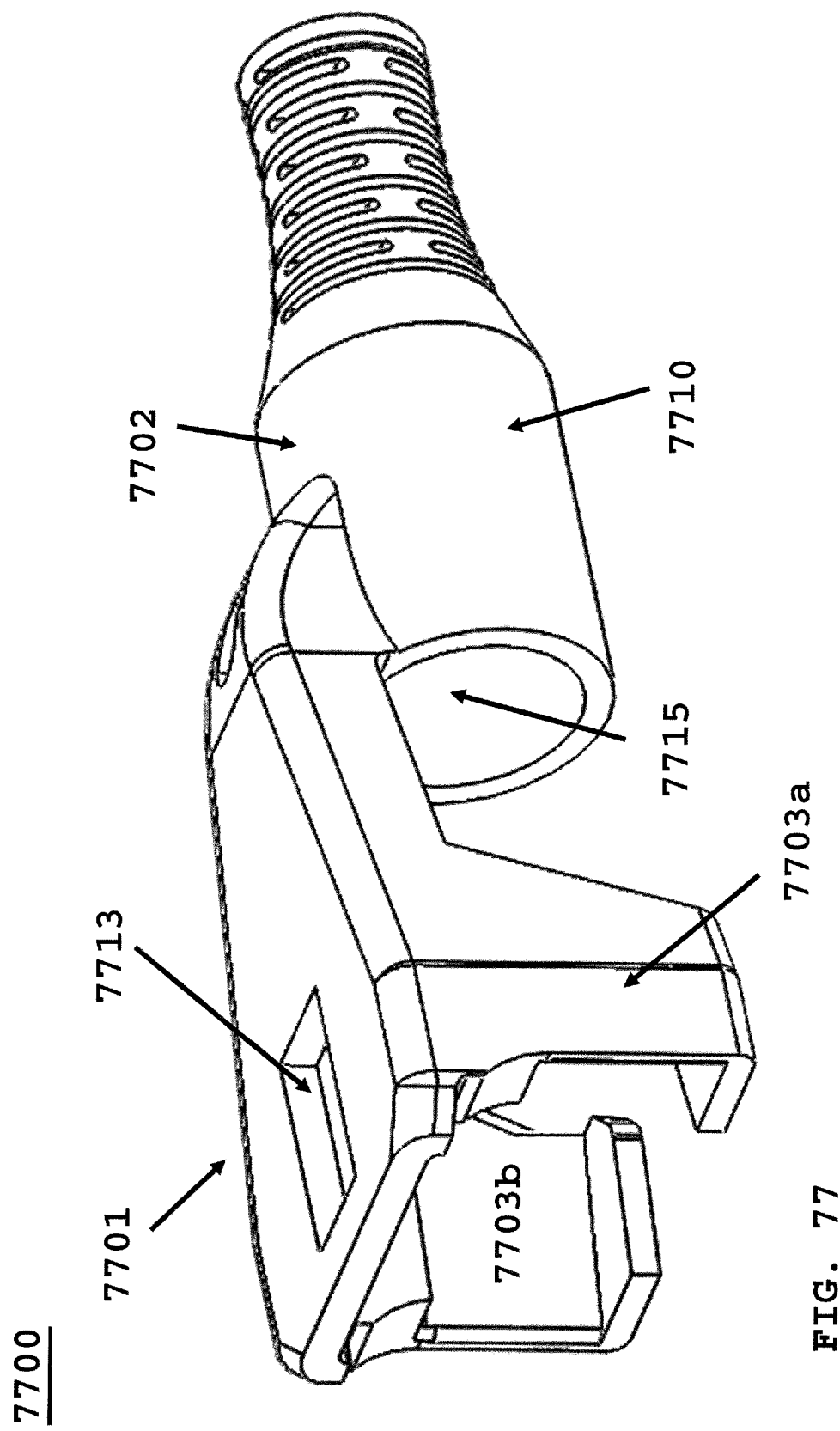

FIG. 77 is a perspective view of another push/pull clip.

FIG. 78 is an exploded view of assembling the clip of FIG. 77 on a fiber optic connector.

FIG. 79 is an assembled view of the clip of FIG. 77 on a fiber optic connector.

Figure 80:
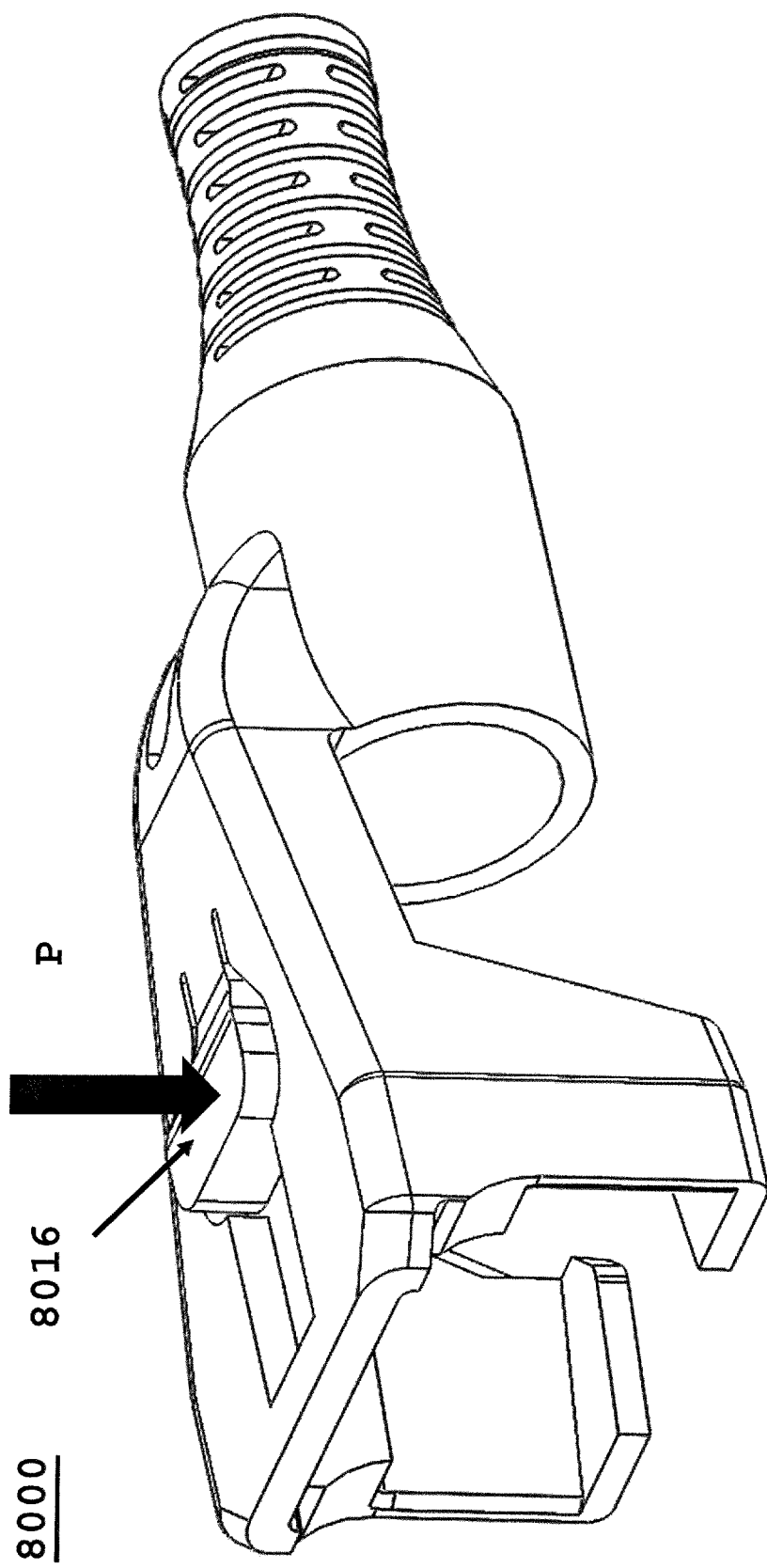

FIG. 80 is a perspective view of another push/pull clip.

Figure 81:
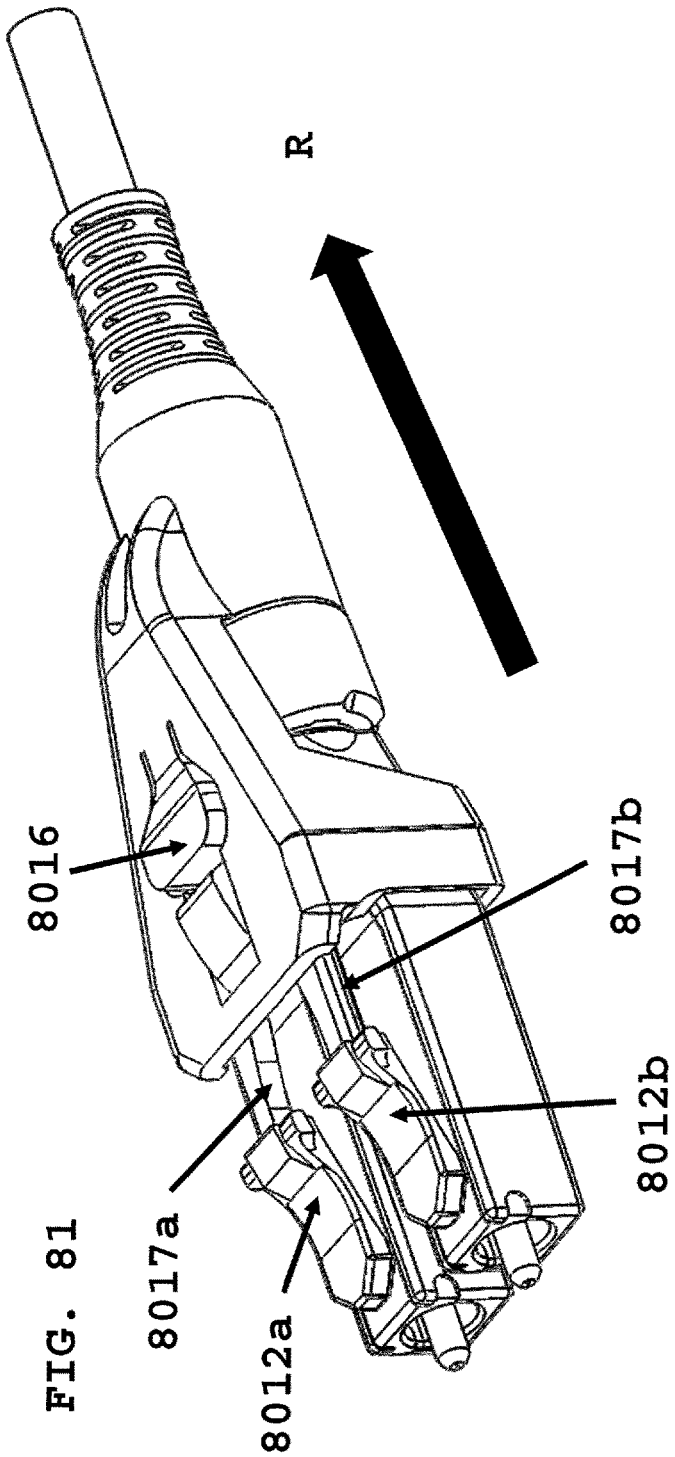

FIG. 81 is a perspective view of using the clip of FIG. 80.

Figure 82:
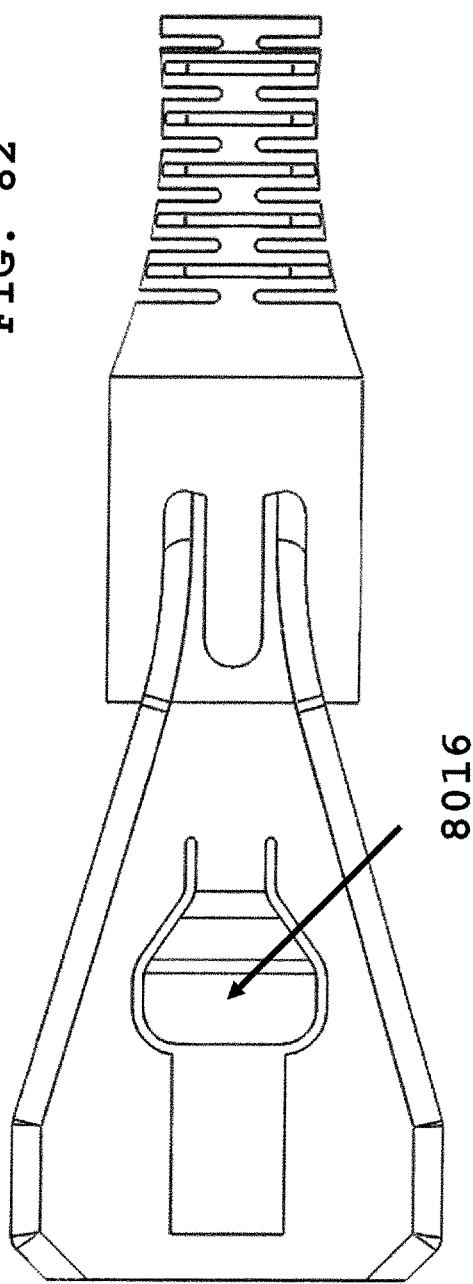

FIG. 82 is a bottom view of the clip of FIG. 80.

Figure 83:
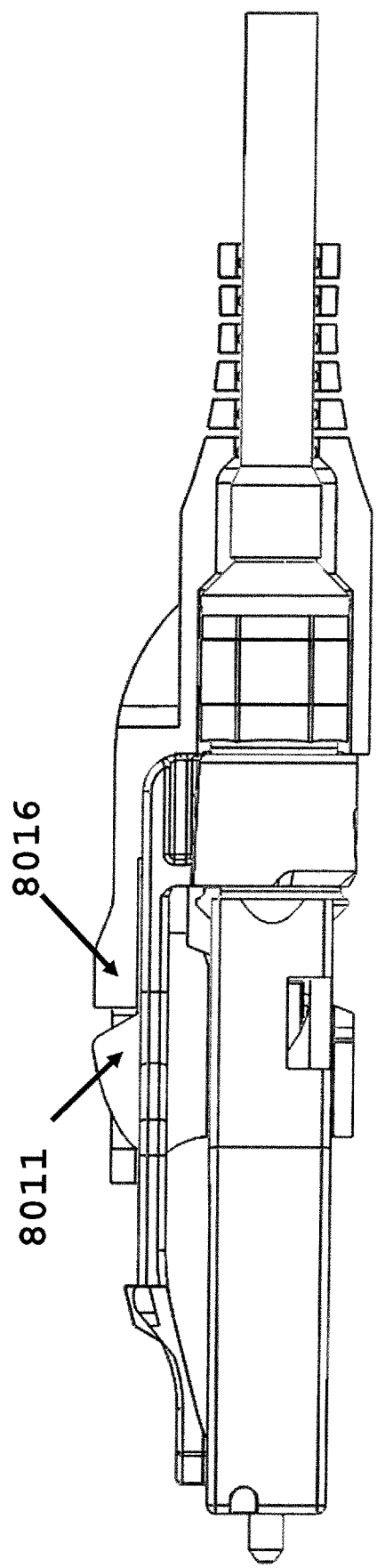

FIG. 83 is a perspective view prior to using the clip of FIG. 80 as part of a fiber optic connector.

Figure 84:
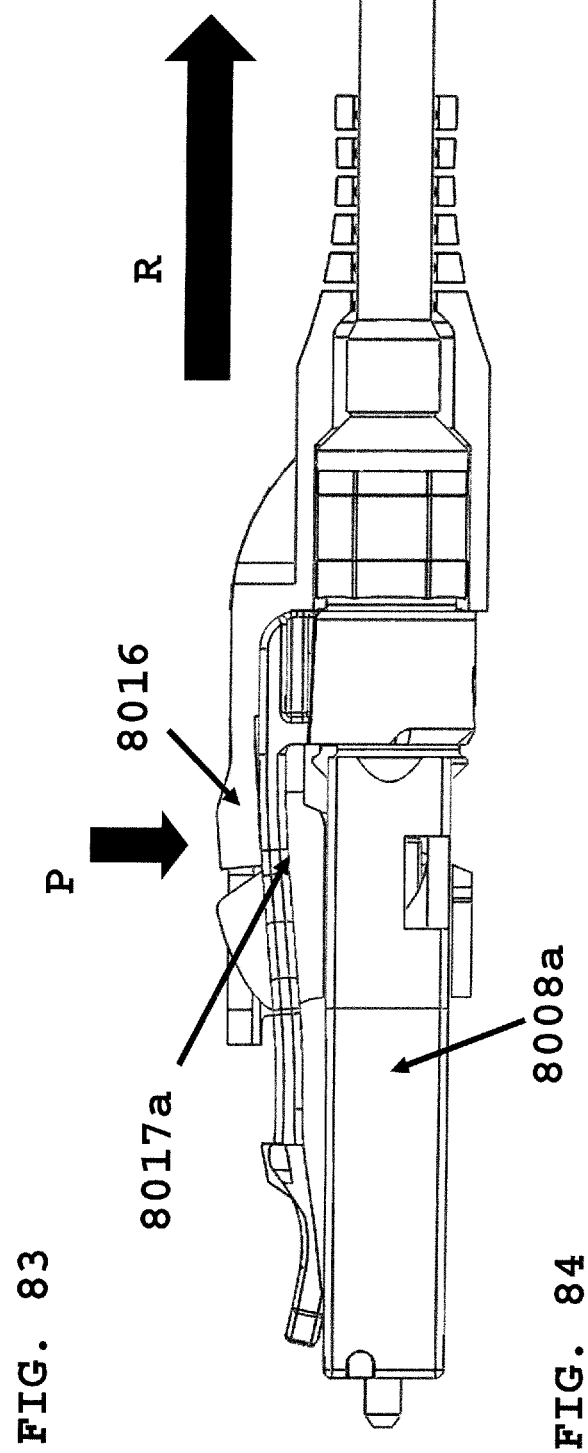

FIG. 84 is a perspective view of using the clip of FIG. 83.

DETAILED DESCRIPTION

The reliability of communication infrastructure depends on secure and accurate connections between components, such as cable segments, network equipment, and communication devices. Large-scale data communication systems use fiber optic cables for data transmission between components. The fiber optic cables may be terminated by connector assemblies. Duplex connector assemblies, such as an LC connector assembly, may include a receiving optical fiber (typically labeled as "A") and a transmitting optical fiber (typically labeled as "B"). Such duplex connector assemblies may connect with an adapter having corresponding receiving (or "A") and transmitting ("B") ports. A duplex connector assembly is generally configured such that the receiving optical fiber connects with the transmitting port of the adapter and the transmitting optical fiber connects with the receiving port of the adapter.

A duplex connector assembly has a polarity based on the relative orientation of the receiving optical fiber and the transmitting optical fiber. Similarly, a corresponding adapter may have a polarity based on the relative orientation of the receiving port and the transmitting port. If the polarity of the connector assembly corresponds to the polarity of the adapter, the connection between connector assembly and adapter may communicate data over fiber optic cables joined by these two components. However, particularly in large installations, the polarity of the connector often does not correspond with adapter polarity, leading failed data transmission. The connector assembly cannot simply be rotated to a correct polarity, as the connector assembly includes elements configured to secure the connector assembly to the adapter which prevents rotation.

Conventional techniques for changing an incorrect polarity of a connector assembly involve difficult and time consuming methods. For example, an installer may be required to remove the existing, incorrect connector assembly and prepare a new connector assembly on site. Other methods involve the use of special tools or high-cost connector components that may also require twisting or rotating the fiber, which may lead to damaged connections. Accordingly, telecommunication network providers would benefit from a connector assembly configured to allow for the efficient and effective changing of the polarity of the connector assembly on-site.

The described technology generally relates to connector assemblies (for example, a plug, male connector, connector, or the like) having an adjustable polarity. In general, the connector assemblies have a plurality of orientations, alignments, or other physical attributes that cause the connector assemblies to have a plurality of polarities. In some embodiments, the connector assembly may only fit into and/or correctly connect with an adapter (for instance, a receptacle, female connector, adapter, or the like) in one or more of the polarities. The polarity of the connector assembly may be based on the relative orientation of components of the connector assembly, such as ferrules, a housing, a latch, a frame, or the like. For example, a connector assembly configured according to some embodiments may include two ferrules, a transmission ferrule and a receiving ferrule that may be arranged in one of a first polarity and a second polarity in order to form a successful connection with a corresponding adapter.

The connector assemblies and other data transmission elements described according to some embodiments herein may be connected within a network, which may include any type of network capable of transmitting signals, electricity, or any other type of transmission medium. For instance, the network may include, without limitation, a communication network, a telecommunication network, an electrical network, a data network, a computer network, and any combination thereof. In some embodiments, the network may include a communication network using various signal transmission mediums, including, without limitation, fiber optic networks, Ethernet networks, cable and/or satellite television networks, and any other type of communication network now known or developed in the future. In some embodiments, the sealable connector assemblies may be configured to connect cable segments and/or devices within a fiber optic network using various standard connector types and/or adaptors, including, but not limited to, LC, ST, SC, FC, DIN, D4, SMA, E2000, Biconic, FullAXS, OCD, small form-factor pluggable (SFP), MPO and/or copper-type network connections, such as RJ-45 type connectors. In some embodiments, the connector assembly may include a duplex LC-type connector and the connector assembly adaptor may include an SFP adaptor. In some embodiments the connector assembly may include a LC-type uniboot connector. In some embodiments, the connector assembly may include a unibody connector, for instance, that includes a round fiber optic cable.

Figure 1:
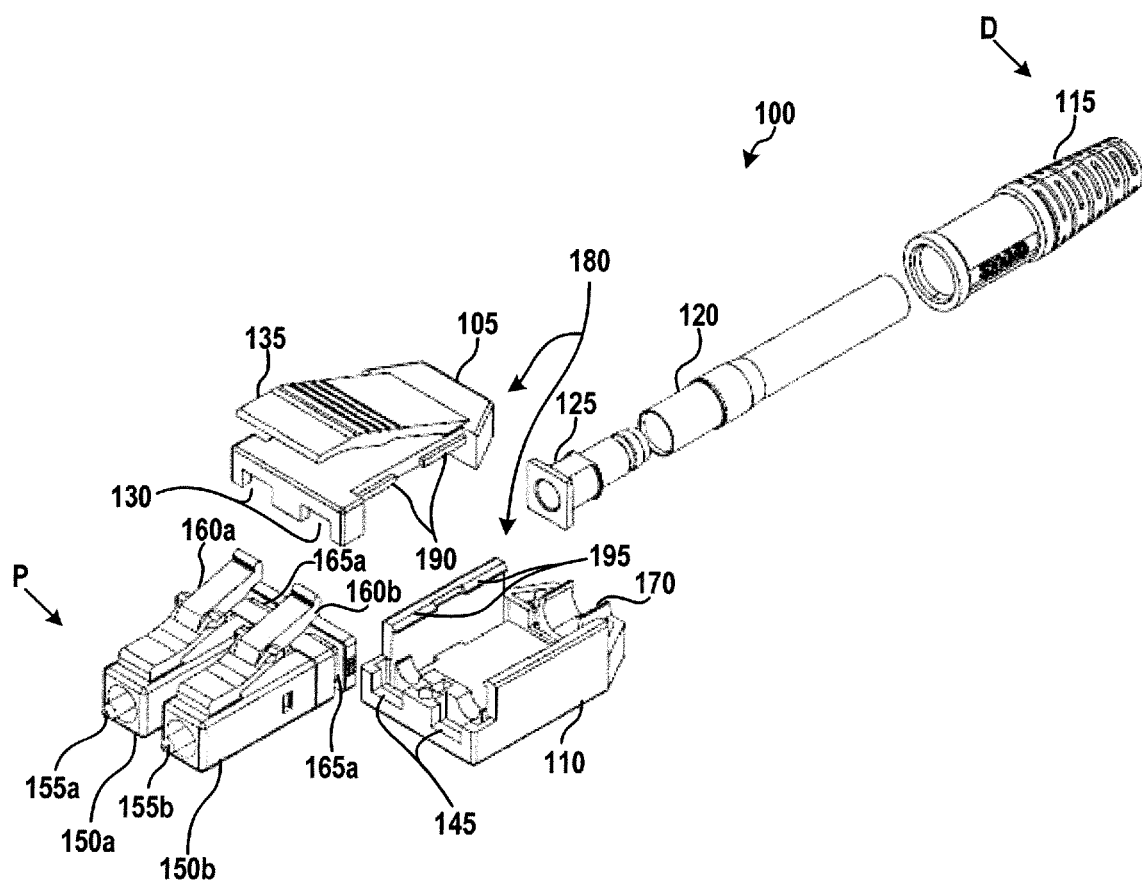
FIG. 1 depicts an exploded view of a connector assembly according to an embodiment.

FIG. 1 depicts an exploded view of an illustrative connector assembly according to a first embodiment. As shown in FIG. 1, a connector assembly 100 may include a housing 180 formed from a top housing component 105 and a bottom housing component 110. The housing 180 may include a "closed" configuration when the top housing component 105 is coupled to the bottom housing component 110 and an "open" configuration when the top housing component 105 is not coupled to the bottom housing component 110. The top housing component 105 and the bottom housing component 110 may be securely coupled to each other using various means, such as a snap-fit, a friction-fit, or the like.

In some embodiments, the top housing component 105 may include one or more top projections 190 configured to engage corresponding locking projections 195 on the bottom housing component 110. As the top housing component 105 is being pushed onto the bottom housing component 110, the top projections 190 engage the locking projections 195, which may include a slanted top surface such that the force of the projections against the locking projections causes the side walls of the bottom housing component to extend outward to facilitate the movement of the projections past the locking projections and into the interior of the housing 180. When the top projections 190 have passed the locking projections 195, the side walls of the bottom housing component 110 return to their original position and the locking projections are positioned over the top projections, preventing movement of the top housing component 105 in an upward direction. Accordingly, the top housing component 105 is securely coupled to the bottom housing component 110. The top housing component 105 may be removed from the bottom housing component 110 using various processes, including prying on a portion of bottom housing component. For example, an installer may manually spread locking projections 195 apart and lift the top housing component 105 to remove the top housing component from the bottom housing component 110.

A cable (not shown) may extend through a boot 115 into the connector assembly 100. The cable may include two optical fibers (for instance, a transmitting optical fiber and a receiving optical fiber) terminating at a first ferrule 155a and a second ferrule 155b. For example, the first ferrule 155a may be coupled to a terminal end of a transmitting optical fiber and the second ferrule 155b may be coupled to a terminal end of a receiving optical fiber, or vice versa. A crimp ring and/or crimp tube 120, which may include a material, such as a heat-shrink material, may encase a portion of the cable and a crimp ring 120 may be secured to the cable. A back post 125 may engage the crimp ring 120 at a distal (D) end thereof. In some embodiments, as the crimp ring 120 is secured to the cable, the crimp ring may prevent movement of the back post 125 and, therefore, the housing 180, toward the distal (D) end of the connector assembly 100. In some embodiments, the back post 125 may be molded or otherwise affixed to a portion of the top housing component 105 or the bottom housing component 110. The back post 125 may be arranged within a channel 170 formed in the housing 180. In some embodiments, the back post 125 may be affixed to the channel 170 within the bottom housing component 110, such as through a snap-fit, a friction-fit, adhesive, or the like.

The first ferrule 155a and the second ferrule 155b may be arranged within a first plug frame 150a and a second plug frame 150b, respectively. The first plug frame 150a and the second plug frame 150b may be independent from each other. The top housing component 105 and the bottom housing component 110 may include recesses 130, 145 at a proximal (P) end thereof that are configured to engage corresponding channels 165a, 165b famed in the distal (D) end of the first plug frame 150a and the second plug frame 150b. In this manner, the first plug frame 150a and the second plug frame 150b may be secured within the connector assembly 100 when the housing 180 is in the closed configuration. In some embodiments, the first plug frame 150a and the second plug frame 150b may be coupled to the top housing component 105 and/or the bottom housing component 110 within the recesses 130, 145, such as through a snap-fit, friction-fit, or the like.

The first plug frame 150a and the second plug frame 150b may include a locking latch 160a, 160b configured to releasably couple the connector assembly 100 to a complementary adapter (not shown). The locking latches 160a, 160b may be depressable and may have sufficient flexibility such that the connector assembly 100 may be released from the adapter when the latch is activated with a moderate pressing force. The top housing component 105 may include a thumb latch 135 configured to engage the locking latches 160a, 160b. The thumb latch 135 may be positioned on the housing 180 such that individual locking latches 160a, 160b may be triggered by a single thumb latch 135 on the housing. The thumb latch 135 may be configured to depress the locking latches 160a, 160b at substantially the same time.

Figure 2A:
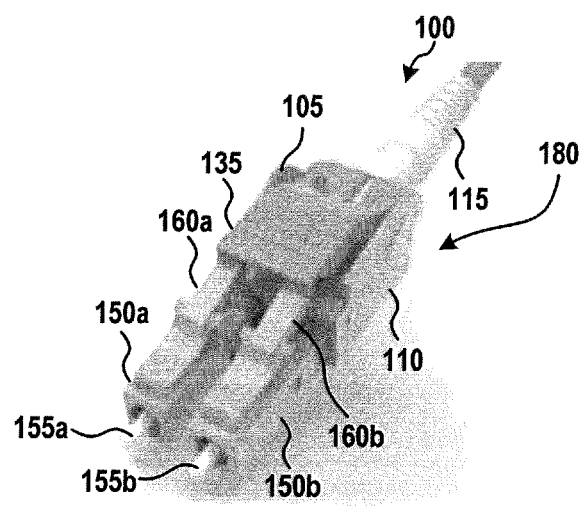
FIGS. 2A-2C depict an illustrative connector assembly according to an embodiment.
Figure 2B:
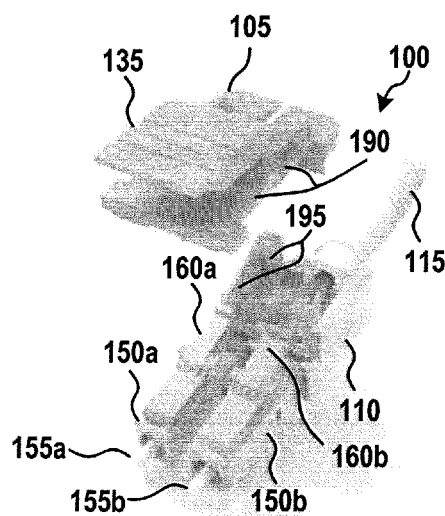
Figure 2C:
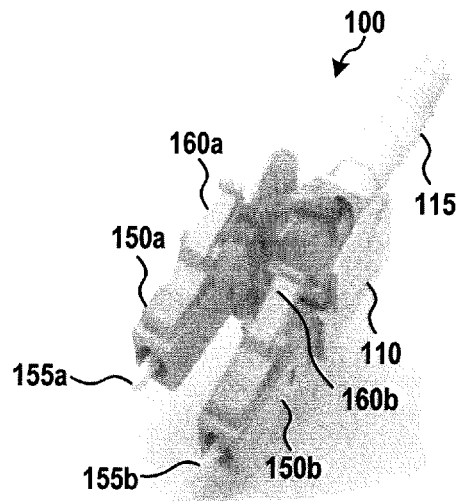

FIGS. 2A-2C depict an illustrative connector assembly according to the first embodiment. FIG. 2A depicts the connector assembly 100 with the housing 180 in the closed position and having a first polarity in which ferrule 155a is located on the left and ferrule 155b is located on the right. In FIG. 2B, the housing component 180 is in the open configuration in which the top housing component 105 has been disconnected from the bottom housing component 110 exposing the interior of the housing and allowing access to the first plug frame 150a and the second plug frame 150b. As shown in FIG. 2C, the first plug frame 150a and the second plug frame 150b may be independently moved from the bottom housing component 110 when the housing 180 is in the open configuration. Accordingly, the position of the first plug frame 150a and the second plug frame 150b and, therefore, the first ferrule 155a and the second ferrule 155b, may be switched within the connector assembly 180. In this manner, the connector assembly 100 may be adjusted to have a second polarity in which ferrule 155a is located on the right and ferrule 155b is located on the left. Once the polarity of the connector assembly 100 has been adjusted, the top housing component 105 may be coupled to the bottom housing component 110 and the connector assembly may be connected to a corresponding adapter.

Figure 3A:
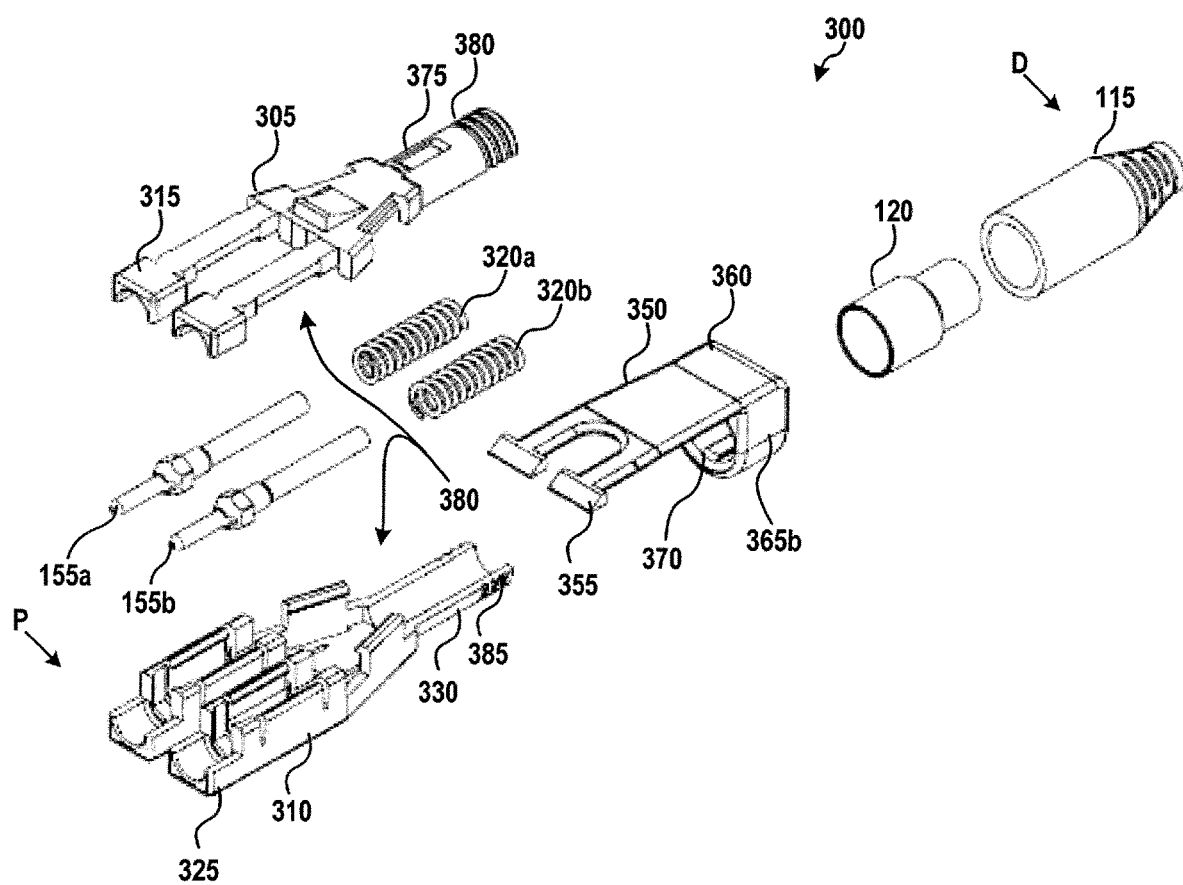
FIG. 3A depicts an exploded view of a connector assembly according to an embodiment.

FIGS. 3A-3F depict an illustrative connector assembly according to a second embodiment. In particular, FIG. 3A depicts an exploded view of an illustrative connector assembly according to the second embodiment. A connector assembly 300 may include a frame (or "housing") 380 configured to securely house a first ferrule 155a and a second ferrule 155b, springs 320a, 320b, and other internal components not shown in FIG. 3A. The frame 380 may include a top frame component 305 configured to be coupled to a bottom frame component 310, both of which may include a back post portion 381, 385 and a plug frame portion 315, 325. At least a portion of the plug frame portion 315, 325 may be configured to engage and/or be inserted into a corresponding port of an adapter. The top frame component 305 and the bottom frame component 310 may be securely coupled to each other using various means, such as a snap-fit, a friction-fit, an adhesive, or the like.

A cable (not shown) may extend through a boot 115 into the connector assembly 300. The cable may include two optical fibers (for instance, a transmitting optical fiber and a receiving optical fiber) terminating at the first ferrule 155a and the second ferrule 155b. For example, the first ferrule 155a may be coupled to a terminal end of a transmitting optical fiber and the second ferrule 155b may be coupled to a terminal end of a receiving optical fiber, or vice versa. A crimp ring 120 may be secured to the cable. The post portion 381, 385 may engage the crimp ring 120 at a distal (D) end thereof. As the crimp ring 120 is secured to the cable, the crimp ring may prevent movement of the post portion 381, 385 and, therefore, the frame 380, toward the distal (D) end of the connector assembly 300.

A latch component 350 may include a ring portion 360 arranged around a distal (D) end of the frame 380. The latch component may include a thumb latch 355 configured to releasably couple the connector assembly 300 to a complementary adapter (not shown). The thumb latch 355 may be depressable and may have sufficient flexibility such that the connector assembly 300 may be released from the adapter when the latch is activated with a moderate pressing force.

Figure 3B:
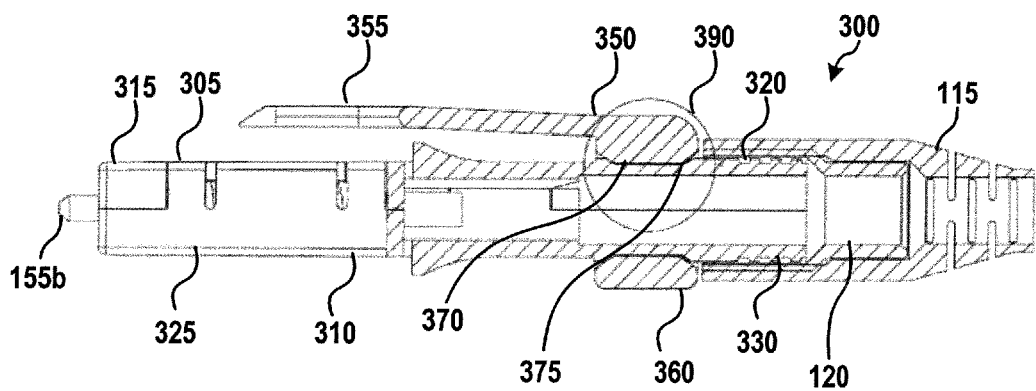
FIG. 3B depicts a cross-sectional view of a connector assembly according to an embodiment.
Figure 3C:
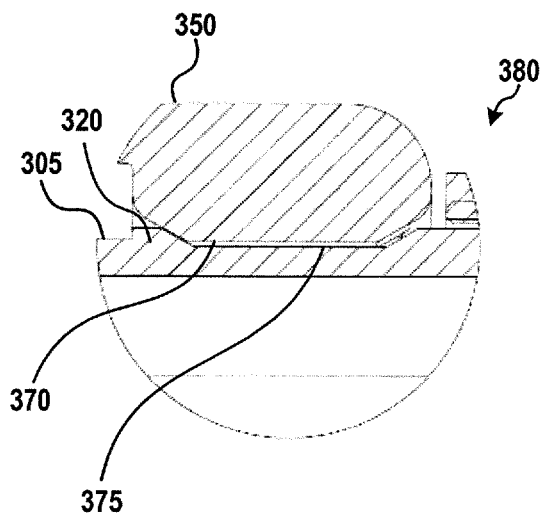
FIG. 3C depicts a detailed view of a latch component of a connector assembly according to an embodiment.

FIG. 3B depicts a cross-sectional view of the connector assembly 300 and FIG. 3C depicts detail 390 of FIG. 3B. As shown in FIGS. 3A-3C, an external surface of the frame 380 may include one or more locking recesses 375 configured to receive one or more corresponding locking projections 370 arranged on an inner surface of the ring portion 360. The latch component 350 may include one or more compression sections 365b (compression section 365a is not visible in FIG. 3A, see FIG. 3E). As shown in FIGS. 3A and 3C, the locking projections 370 may engage the locking recesses 375 to prevent the rotation of the latch component 350 with respect to the frame 380.

The compression of the compression sections 365a, 365b causes the shape of the ring portion 360 to become deformed. For example, the shape of the ring portion 360 may be integral to the latch component 350. Additionally, the ring portion 360 may have a generally circular-shape when the compression sections 365a, 365b are not compressed and a generally oval-shape when the compression sections are compressed. When the compression sections 365a, 365b are compressed, the locking projections 370 move out of the locking recesses 375 and the latch component 350 may rotate with respect to the frame 380. When the compression sections 365a, 365b are not compressed, the locking projections 370 may be inserted into the locking recesses 375 and the latch component 350 may be locked in place with respect to the frame 380. Accordingly, the latch component 350 may be rotated to the other side of the frame 380 and the connector assembly 300 may be rotated to connect with a corresponding adapter with a different polarity.

In some embodiments, sections 365a and 365b may become compressed when the user (e.g., via their fingers or a tool) twists the ring portion 360. Thus, in some embodiments, the ring portion 360 impacts sections 365a and 365b causing compression. In a further embodiment, when a user twists a ring portion 360 it becomes compressed against an integral surface (not shown) as it is rotated surface 370. If rotation continues surface 370 may engage a recess 375 thus allowing the connector to change polarity.

Figure 3D:
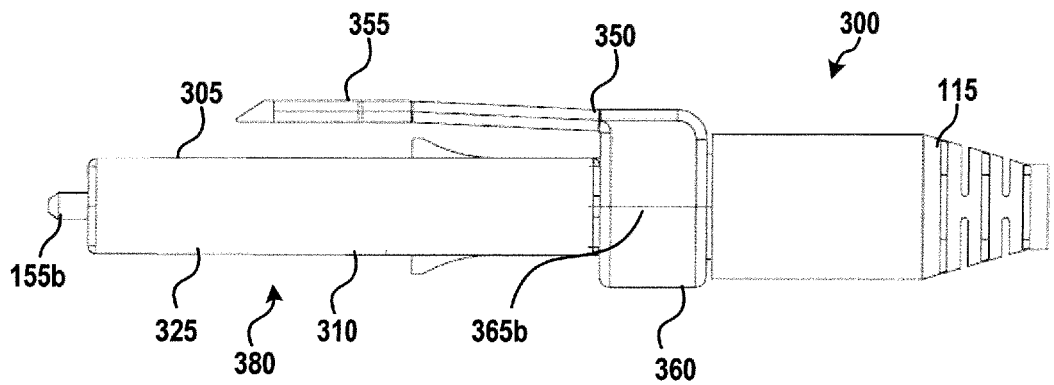
FIGS. 3D-3F depict a change in polarity of an illustrative connector assembly according to an embodiment.
Figure 3E:
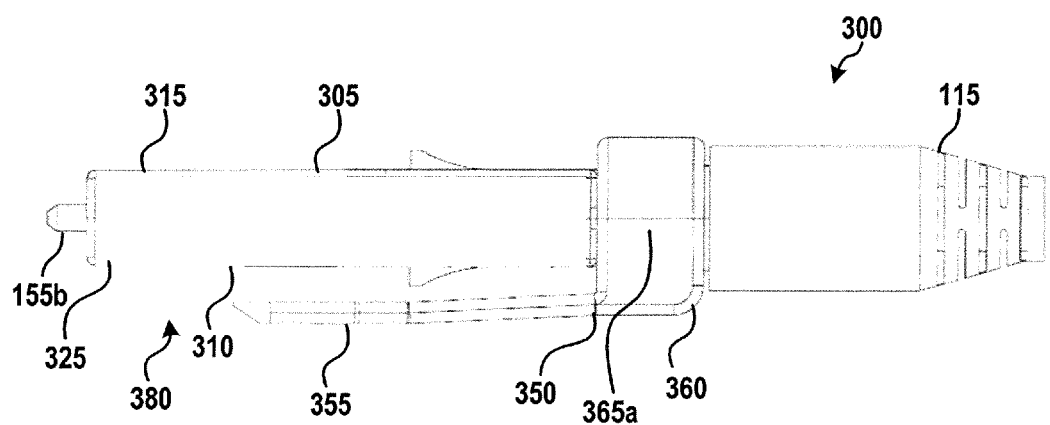
Figure 3F:
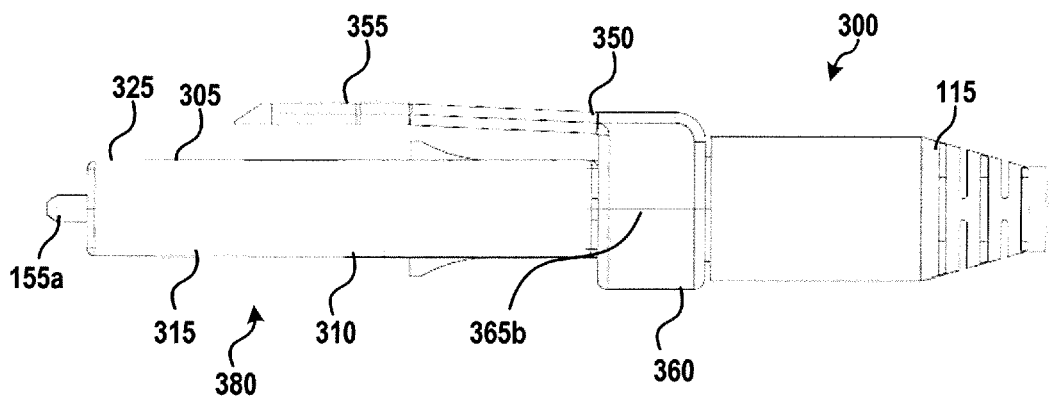

FIGS. 3D-3F depicts an illustrative polarity adjustment for connector assembly 300. In FIG. 3D, connector assembly 300 is arranged in a first polarity in which the connector assembly is configured to connect with an adapter with second ferrule 155b on the right side and first ferrule 155a on the left side of the connector assembly from a top-down perspective. Latch component 350 is arranged in a first polarity position on frame 380, with compression section 365b visible in FIG. 3D and thumb latch 355 over plug frame portion 315. In FIG. 3E, compression sections 365a, 365b have been compressed and latch component 350 has been rotated to a second polarity position, in which compression section 365a is visible in FIG. 3E and thumb latch 355 is under plug frame portion 325. In FIG. 3F, entire connection assembly 300 has been rotated such that the connection assembly may connect with an adapter in a second polarity with second ferrule 155b on the left side and first ferrule 155a on the right side of the connector assembly from a top-down perspective. Accordingly, the polarity of connector assembly 300 may be adjusted by rotating latch component 350 from a first polarity position to a second polarity position and rotating the connector assembly such that thumb latch 355 is orientated to engage a corresponding adapter.

Figure 4A:
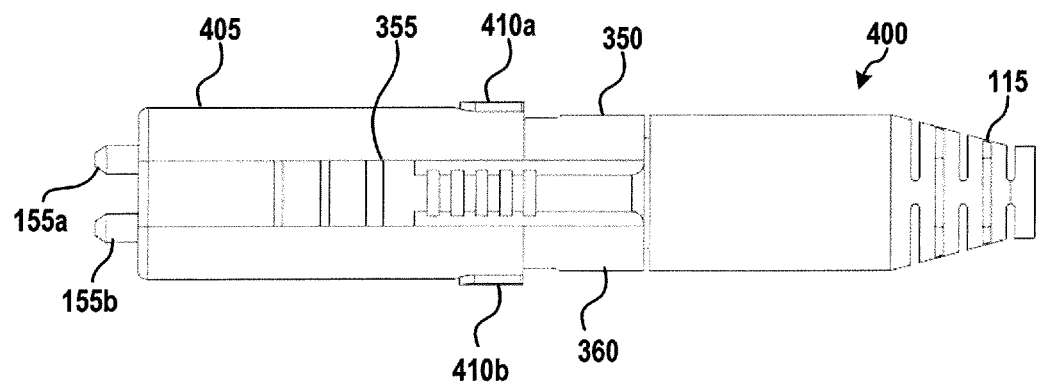
FIG. 4A depicts a top-down view of a connector assembly according to an embodiment.

FIGS. 4A-4I depicts an illustrative connector assembly according to a third embodiment. FIG. 4A depicts a top-down view of a connector assembly 400 having a housing and compression elements 410a, 410b. Latch component 350 may have a ring portion 360 disposed around a locking component 430 (not shown, see FIG. 43). In some embodiments, compression elements 410a, 410b may be resilient and biased outward. In some embodiments, compression of compression elements 410a, 410b may allow latch component 350 to rotate from a first polarity position to one or more other positions.

Figure 4B:
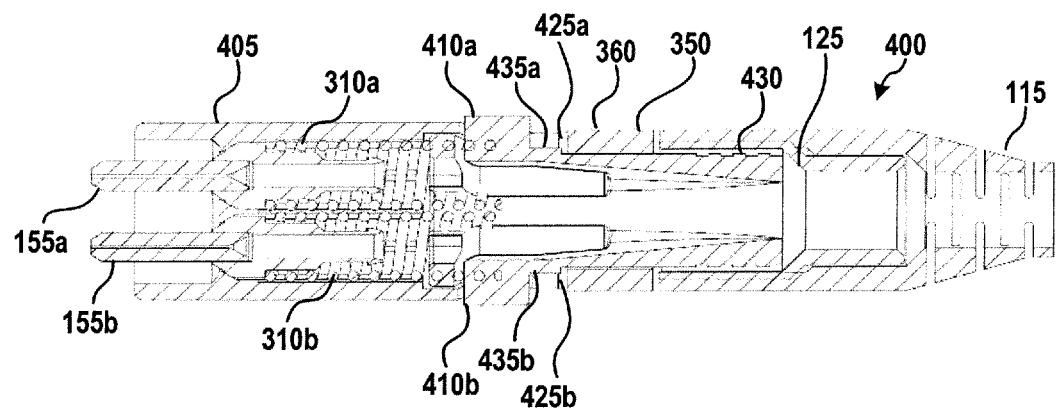
FIG. 4B depicts a cross-sectional view of a connector assembly according to an embodiment.

FIG. 4B depicts a cross-sectional view of the connector assembly 400 from a top-down perspective. As shown in FIG. 4B, compression elements 410a, 410b may be arranged on a locking component 430. One or more cables (not shown) may extend through connector assembly 400, for example, through the boot 115, crimp ring 125, locking component 430, and housing 405, and terminating at the ferrules 155a, 155b. When compression elements 410a, 410b are not compressed, locking elements 435a, 435b arranged on locking component 430 may engage latch component 350 to prevent rotation thereof. In some embodiments, locking elements 435a, 435b may engage a locking recess 425a, 425b formed in ring portion 360 of latch component 350. Compression of compression elements 410a, 410b may cause locking elements 435a, 435b to move inward such that they no longer engage latch component 350, thereby allowing latch component to rotate about locking component 430. As latch component 350 rotates around locking component 430, the outward bias of locking elements 435a, 435b may cause the locking components to press against the inner surface of ring portion 360. Accordingly, when a locking recess 425a, 425b is located over a locking element 435a, 435b without the compression elements 410a, 410b being compressed, the locking element may push outward and re-engage locking recess 425a, 425b.

Figure 4E:
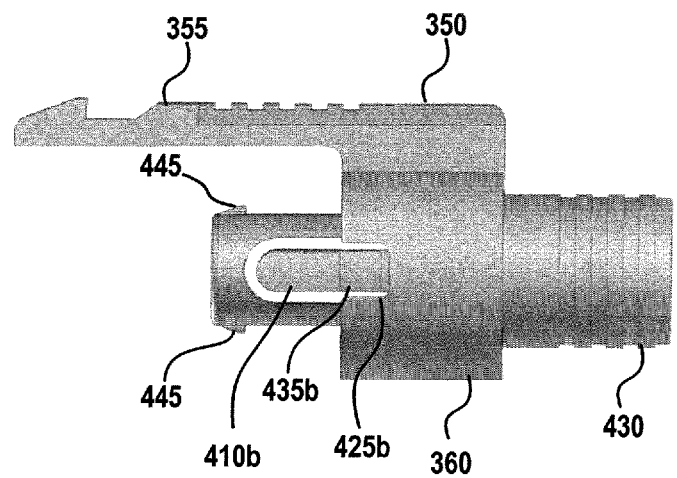
FIG. 4E depicts a side view of a latch component of a connector assembly according to an embodiment.
Figure 4F:
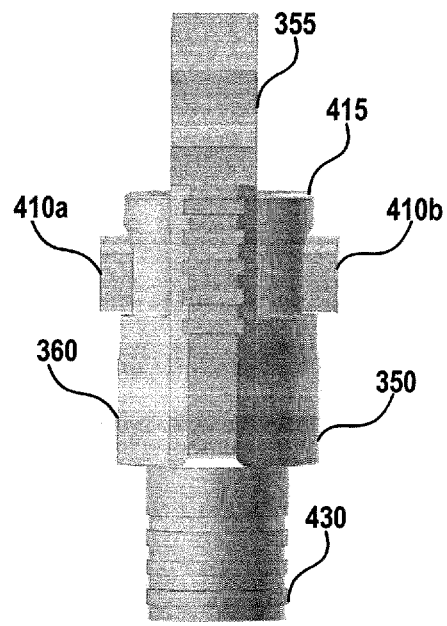
FIG. 4F depicts a top view of a latch component of a connector assembly according to an embodiment.

FIGS. 4C and 4D depict the housing (i.e., front portion) 405, rear portion 415, locking component 430, and latch component 350 in a side view and a perspective view, respectively. As shown in FIGS. 4C and 4D, housing 405 may include channels configured to receive compression elements 410a, 410b. In some embodiments, housing 405 may include one or more openings 440 configured to receive a complementary projection 445 on locking component 430 to secure the locking component in place within connector assembly 400. FIGS. 4E and 4F depict latch component 350 and locking component 430 as arranged within connector assembly 400 from a side view and a top-down view, respectively.

Figure 4G:
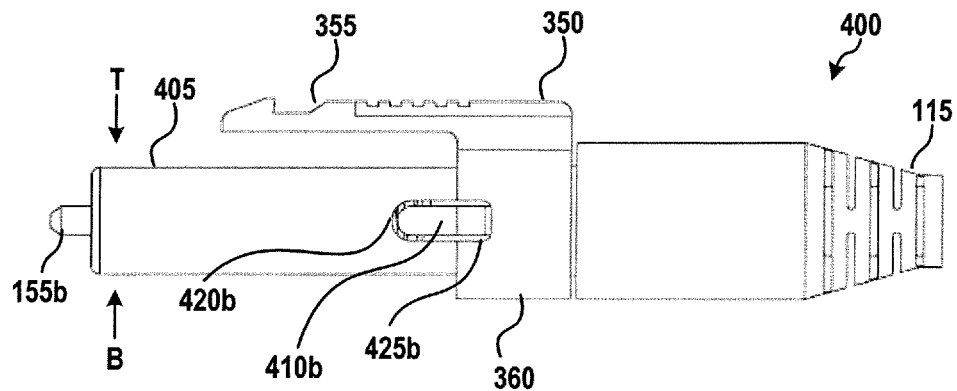
FIGS. 4G-4I depict a change in polarity of an illustrative connector assembly according to an embodiment.
Figure 4H:
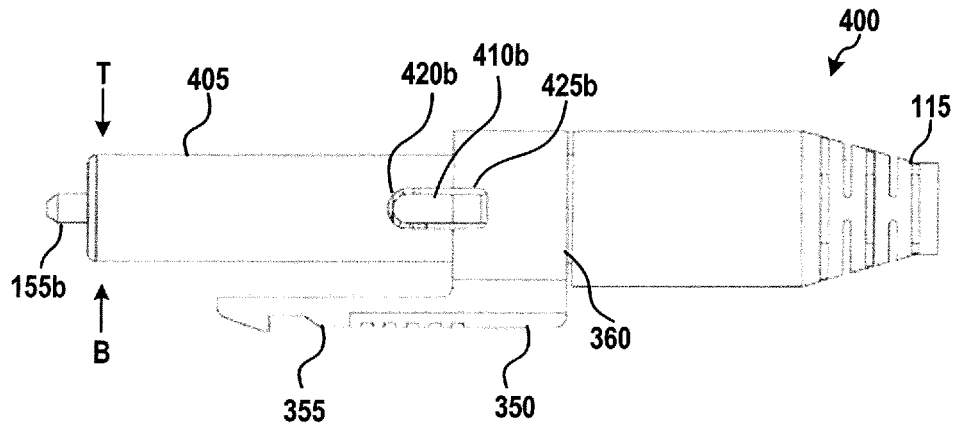
Figure 4I:
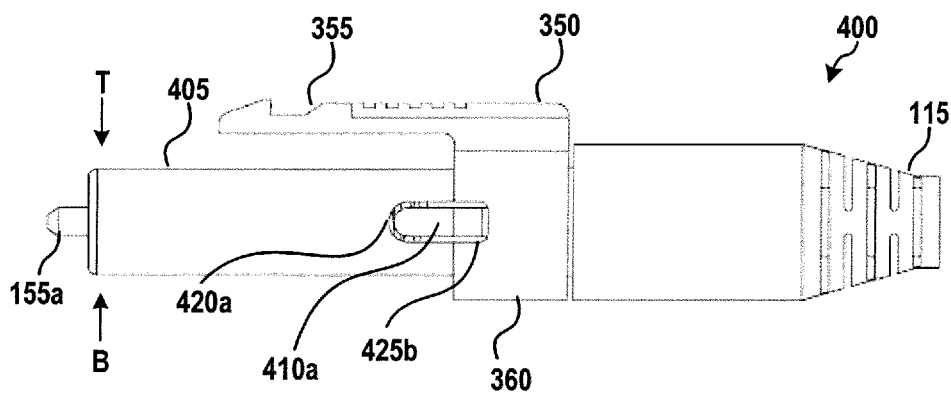

FIGS. 4G-4I depicts an illustrative polarity adjustment for the connector assembly 400. In FIG. 4G, the connector assembly 400 is arranged in a first polarity in which the connector assembly is configured to connect with an adapter with the second ferrule 155b on the right side and the first ferrule 155a on the left side of the connector assembly from a top-down perspective. The latch component 350 is arranged in a first polarity position on the locking component 430, with locking recess 425b visible in FIG. 4G and the thumb latch 355 being arranged over a top (T) surface of the housing 405. In FIG. 4H, the latch component 350 has been rotated to a second polarity position, in which locking recess 425b is visible in FIG. 4H and the thumb latch 355 is arranged under a bottom (B) surface of the housing 405. In FIG. 4I, the entire connection assembly 400 has been rotated such that the connection assembly may connect with an adapter in a second polarity with the second ferrule 155b on the left side and the first ferrule 155a on the right side of the connector assembly from a top-down perspective. Accordingly, the polarity of the connector assembly 400 may be adjusted by rotating the latch component 350 from a first polarity position to a second polarity position and rotating the connector assembly such that the thumb latch 355 is orientated to engage a corresponding adapter.

Figure 5:
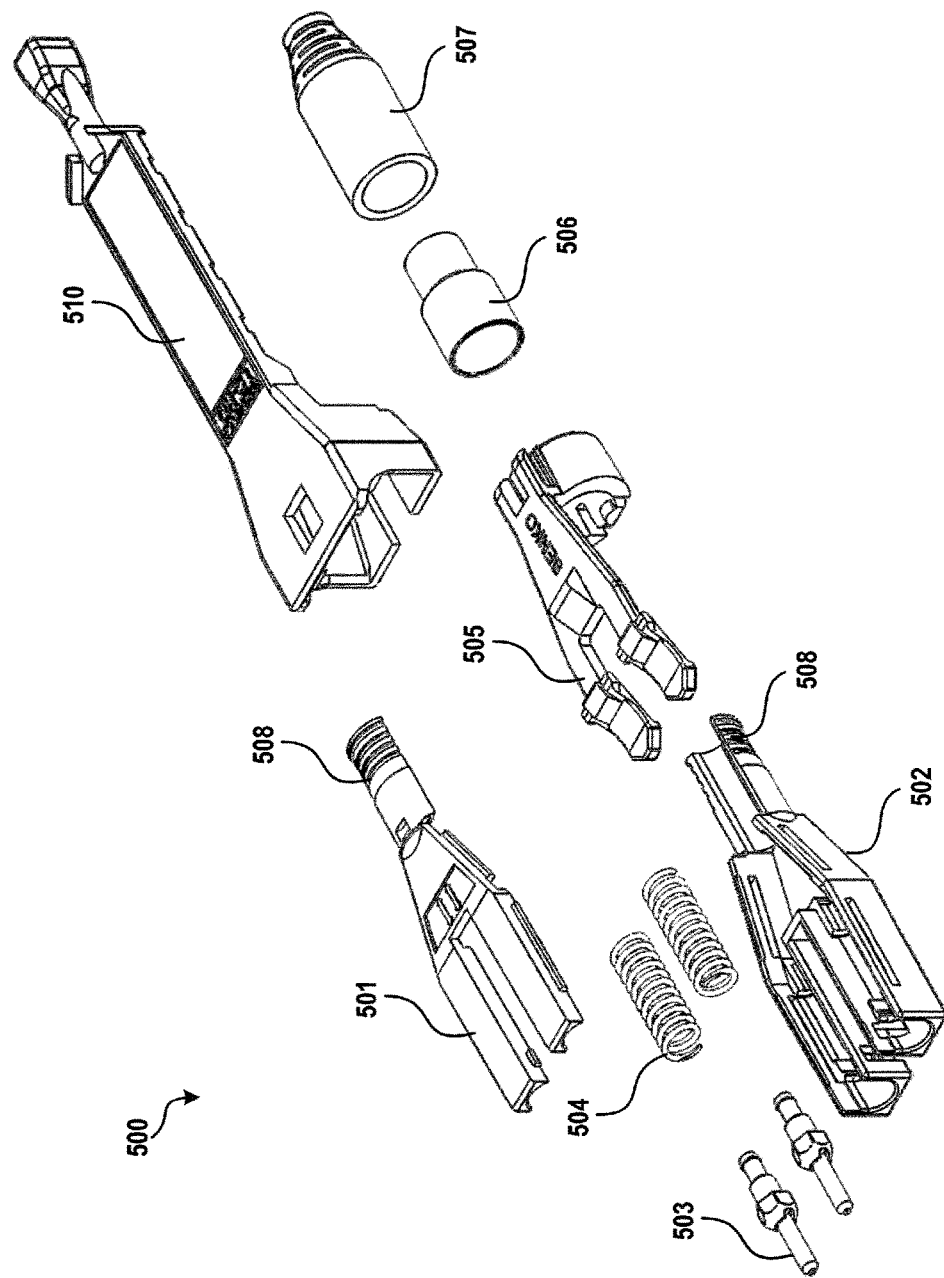
FIG. 5 depicts an exploded view of a connector assembly according to an embodiment.

FIG. 5 depicts an exploded view of an illustrative connector assembly according to various embodiments. As shown in FIG. 5, a connector assembly 500 may include a top housing component 501 and a bottom housing component 502. In some embodiments, top housing 501 and bottom housing 502 may be joined together in a "closed" configuration when top housing 501 being coupled to bottom housing 502. Alternatively, some embodiments may have an "open" configuration when top housing component 501 is not coupled to bottom housing component 502. When in the closed configuration, top housing 501 and bottom housing 502 may be securely coupled to each other using various means, such as a snap-fit, a friction-fit, or the like.

A cable (not shown) may extend through a boot 507, pass through a crimp ring 506 and then into the housing formed by top housing 501 and bottom housing 502. The cable may include two optical fibers (for instance, a transmitting optical fiber and a receiving optical fiber) terminating at one or more ferrule(s) 503. In some embodiments, two ferrules may be utilized, wherein a first ferrule may be coupled to a terminal end of a transmitting optical fiber and the second ferrule may be coupled to a terminal end of a receiving optical fiber, or vice versa. The crimp ring and/or crimp tube 506, which may include a material, such as a heat-shrink material, may encase a portion of the cable and may be secured to the cable. A back post 508, which may be made up of the combination of top housing 501 and bottom housing 502 may engage crimp ring 506 at a distal end thereof.

In some embodiments, crimp ring 506 may be secured to the cable, thus the crimp ring may prevent movement of back post 508 and, therefore, main housing (501 and 502), toward the distal end of connector assembly 500. In some further embodiments, back post 508 may be molded or otherwise affixed to a portion of top housing component 501 or the bottom housing component 502.

The ferrule(s) 503 may be arranged within (501 and 502) in two separate channels (as shown), or in a single combined channel, a first plug frame 150a and a second plug frame 150b, respectively. In this manner, the ferrule(s) (and plug frame(s)) 503 may be secured within the connector assembly 500 when the top housing 501 bottom housing 502 are in the closed configuration. In further embodiments, the ferrules(s) 503 may have a biasing force applied via one or more springs 504.

As also shown in FIG. 5, an embodiment may have a connection device 505 that allows the connector assembly to securely fasten into a receiver (e.g., adapter and/or transceiver). The connection device 505, in some embodiments, may be placed over a portion of the connector assembly (e.g., the back post 508). In a further embodiment, the connection device 505, may be rotatable around the back post 508 in order to allow for easy polarity change of the connector assembly 500. The connector assembly 500 may also comprise a push-pull tab 510, which will be discussed at further length herein.

Figure 6A:
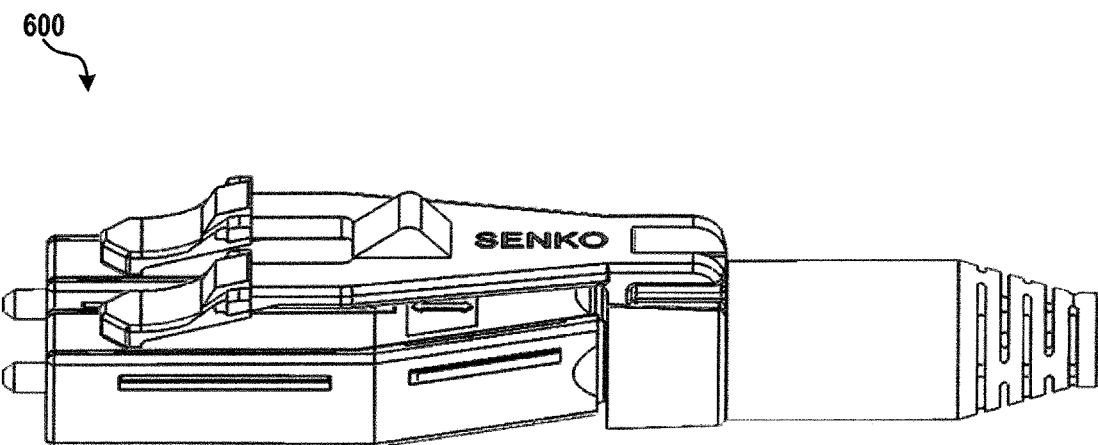
FIG. 6A depicts an illustrative example of connector assembly according to an embodiment.
Figure 6B:
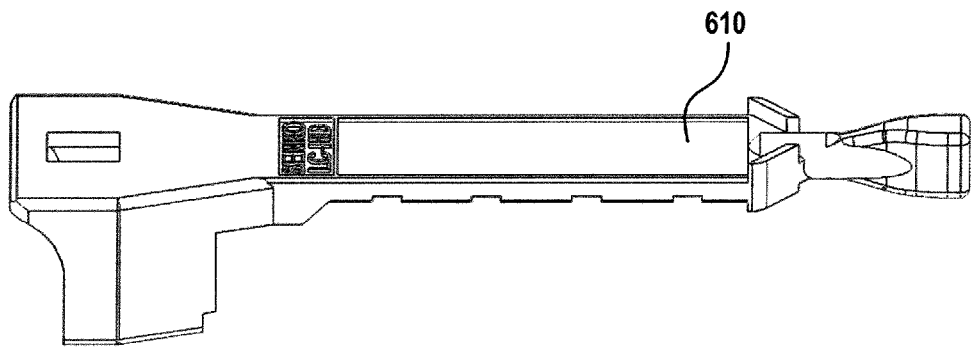
FIG. 6B depicts an illustrative example of push-pull tab according to an embodiment.
Figure 6C:
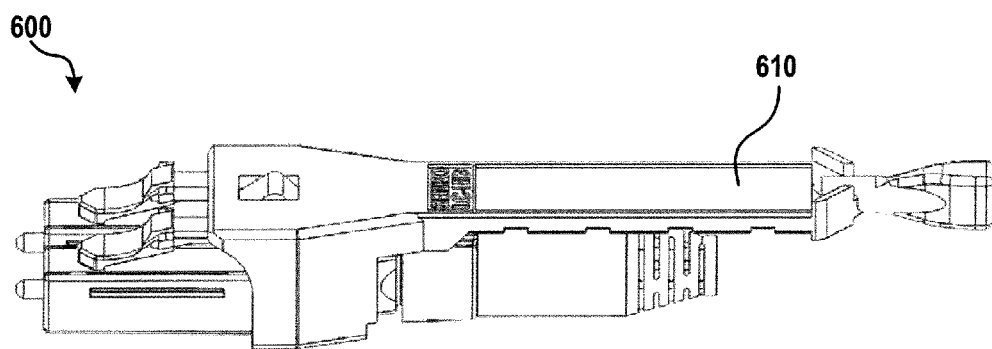
FIG. 6C depicts an illustrative example of the push-pull tab connected to the connector assembly according to an embodiment.
Figure 7A:
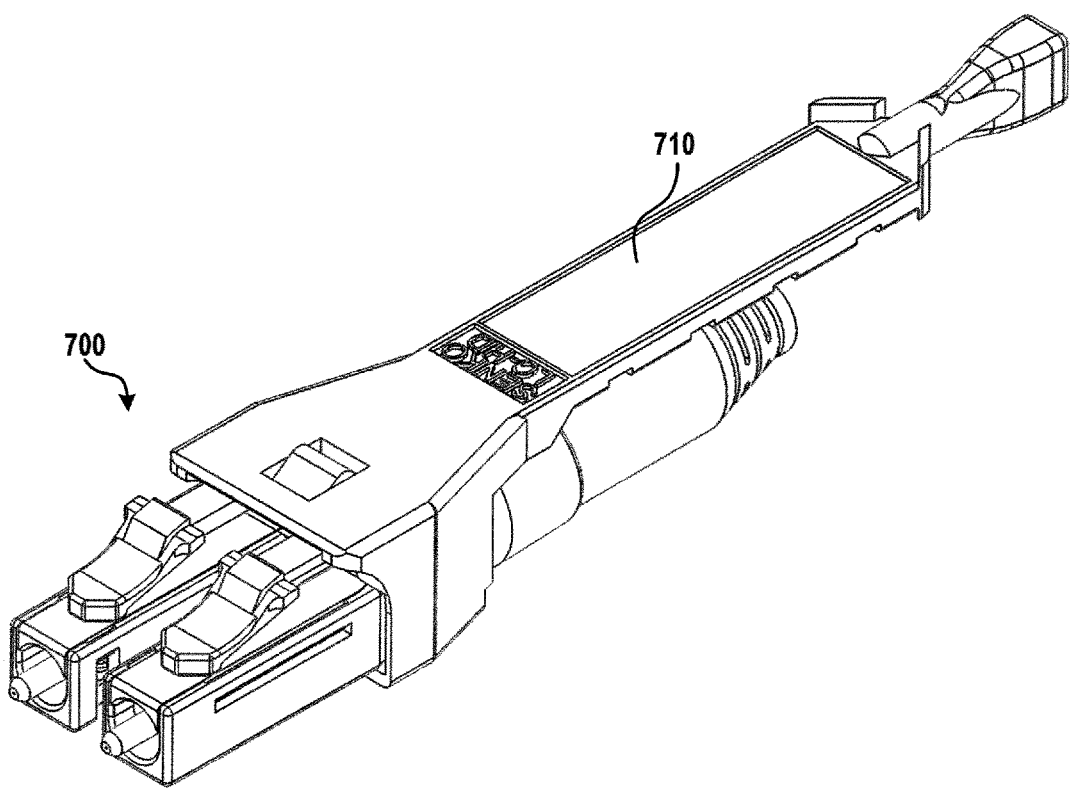
FIG. 7A depicts a perspective view of the push-pull tab connected to the connector assembly according to an embodiment.
Figure 7B:
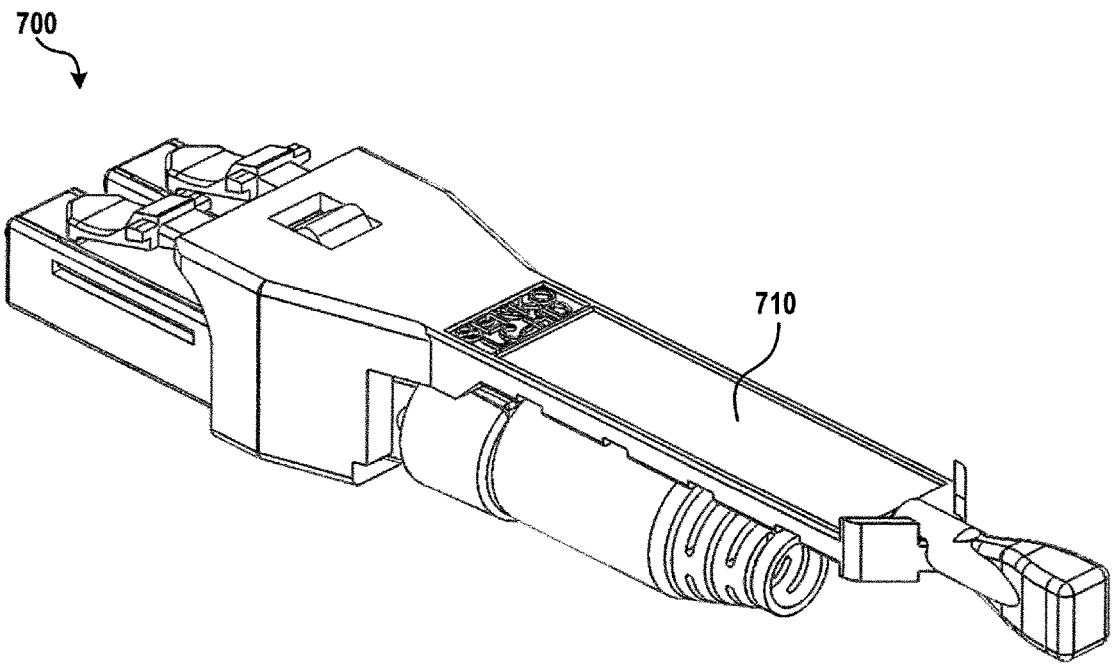
FIG. 7B depicts another perspective view of the push-pull tab connected to the connector assembly according to an embodiment.

A fully assembled connector assembly 600, is shown in FIG. 6A. FIG. 6B further shows a push-pull tab 610 according to a non-limiting example embodiment. In some embodiments, and as shown, the push-pull tab 610, may be removably and/or releasably attached to the connector assembly. Accordingly, and as shown in FIG. 6C, a connector assembly 600 and push-pull tab 610 may be combined into a single unit to allow for easy insertion and removal from a receiving device. Close up perspective views of a connector assembly 700 and push-pull tab 710 are shown in FIGS. 7A and 7B.

Figure 8A:
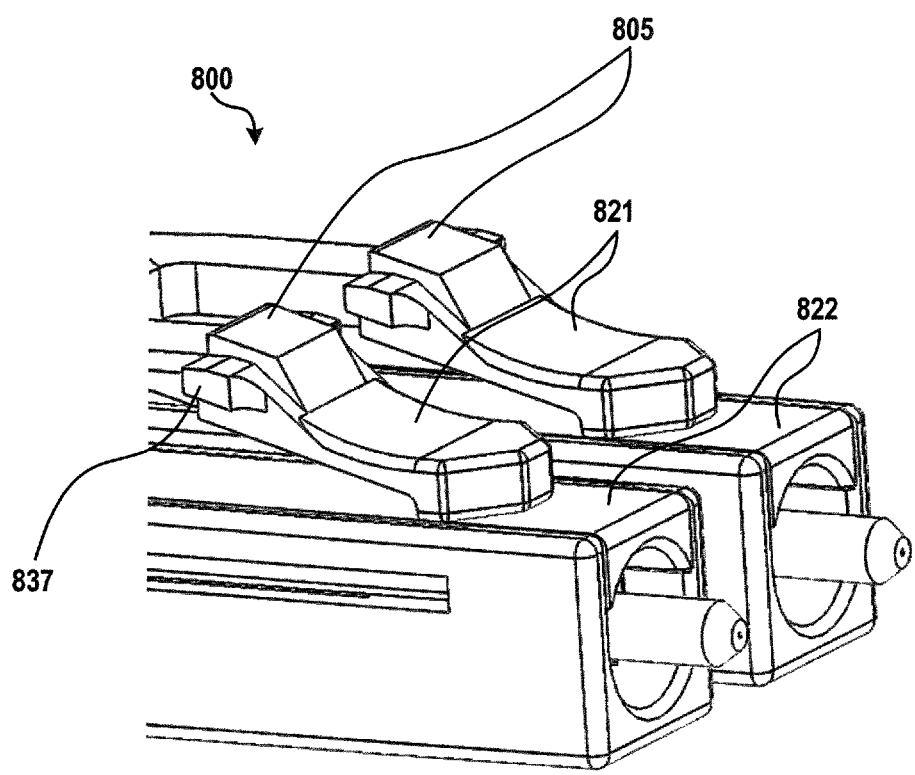
FIG. 8A depicts a detailed view of a portion of the connector assembly according to an embodiment.
Figure 8B:
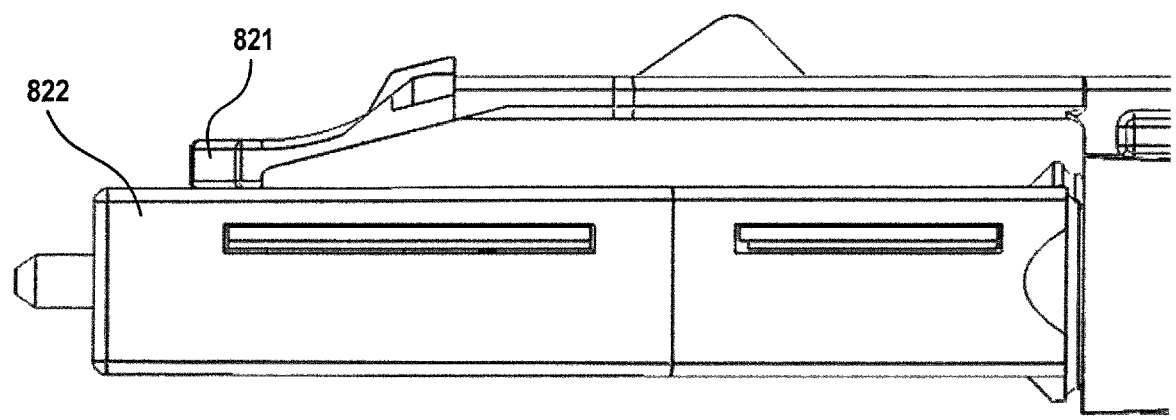
FIG. 8B depicts a side view of a portion of the connector assembly according to an embodiment.

Referring to FIGS. 8A and 8B, an embodiment is shown wherein the connector assembly 800 comprises one or more flexible latching arms 821. The flexible latching arm 821 may have a connection device 805. The connection device 805 is further detailed herein as it relates to an adapter and/or transceiver. Specifically, the connection device 805 interlocks with a recess in an adapter/transceiver. The connection device 805 may also comprise one or more connector hooks 837. In some embodiments, the connector hooks 837 may be used via a user's fingers and/or tool to compress the connection device 805 in order allow for removal of a connector assembly 800 from an adapter/transceiver.

As shown, the one or more flexible latching arms 821 may contact the surface of one or more of the channels 822. The contact of the latching arm 821 with the channel 822 provides additional support to the latching arm. In some embodiments, the latching arm 821 is used to secure the connection of the connector assembly 800 with a receiving device (e.g., and adapter and/or transceiver). Thus, the contact between the latching arms 821 and the channels 822 enables the one or more latching arms to more firmly connect and thereby better secure the connector assembly 800 within the receiving device.

As discussed herein, the connector assembly 900 may be configured such that a change in polarity of the connector is possible. As shown in FIG. 9A, the connection device may be rotated about a horizontal axis (i.e., rotated around the back post 908 (FIG. 5 at 508). In some embodiments, and as shown in FIG. 9B, a recess 931 may be located on the back post 908. It should be understood, the recess 931 may be located on various outer surfaces (e.g., the crimp ring (FIG. 5 at 506), the cable boot (FIG. 5 at 507), etc.). Furthermore, in some embodiments, there may be multiple recesses 931 located on the connector assembly 900, such as, for example, one on the top and one on the bottom of the back post 908. The connector device 905, may comprise a protrusion 932 that is complementary (i.e., matching) to the recess 931. Thus, in some embodiments, the protrusion 932 may securely fasten the connector device 905 to housing using the recess 931.

Figure 10A:
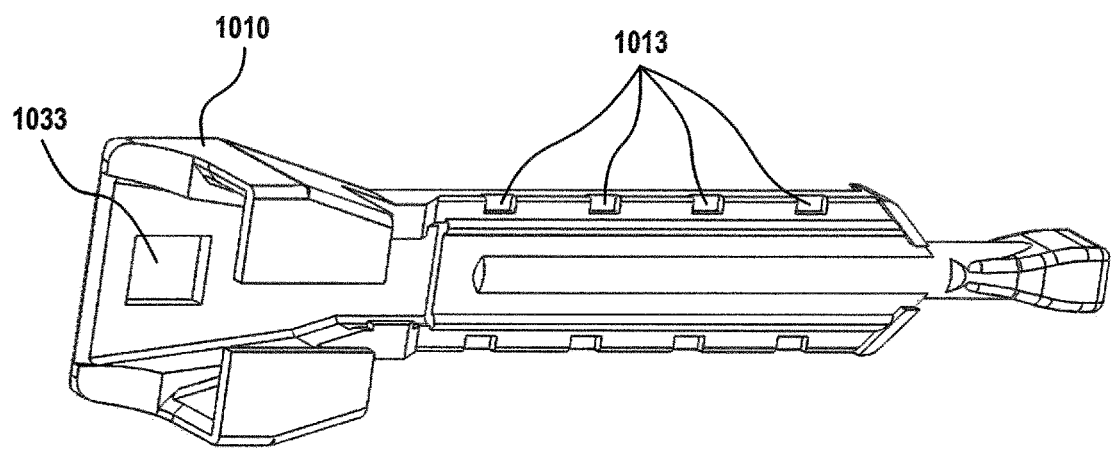
FIG. 10A depicts an underside view of a push-pull tab according to an embodiment.
Figure 10B:
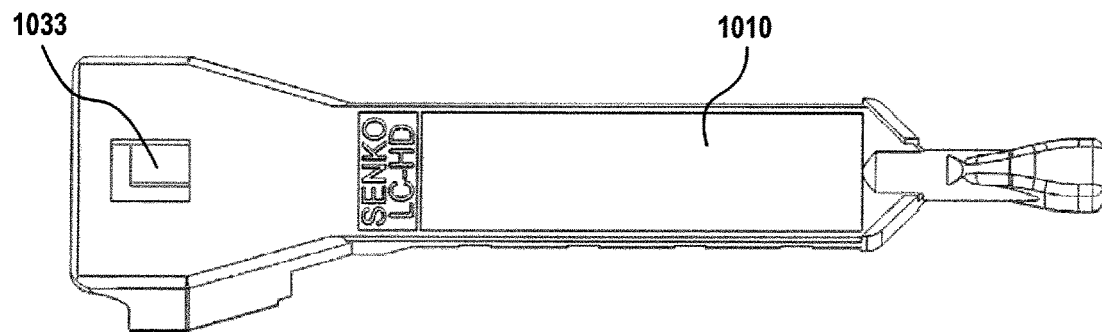
FIG. 10B depicts a topside view of a push-pull tab according to an embodiment.

Referring now to FIGS. 10A-10B, a top and bottom view of a push-pull tab 1010 is shown according to some embodiments. As shown in FIG. 10A, the push-pull tab 1010 may comprise a window or cutout 1033 at or near the proximal end of the push-pull tab and a push-pull knob 1011 near the distal end. It should be understood that the location and dimensions of the window 1033 may vary with different embodiments, and that the dimensions and location as shown is for illustrative purposes only. In further embodiments, the push-pull tab 1010 may comprise one or more recesses 1013.

Figure 10C:
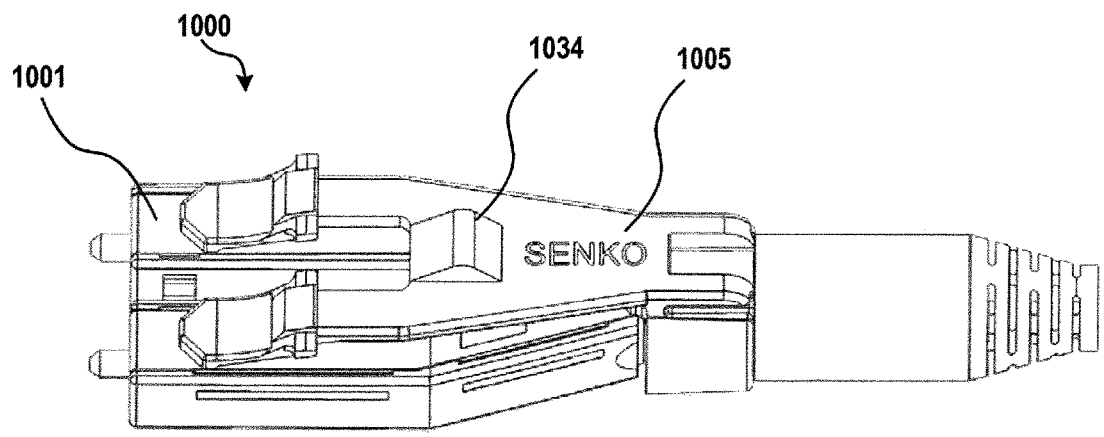
FIG. 10C depicts a perspective view of a connector assembly according to an embodiment.

As shown in FIG. 10C, in some embodiments, the connector device 1005 may have one or more protrusions 1034. A protrusion 1034 may be configured to fit through or inside of the cutout 1033 of push-pull tab 1010. Referring back to FIGS. 7A and 7B, an illustrative embodiment is shown where the push-pull tab is releasably connected to the connector assembly.

Accordingly, when push-pull tab 1010 moved longitudinally along connector assembly 1000, the protrusion 1034 impacts the side of the window 1033. In some embodiments, when the protrusion 1034 impacts an inside edge of window 1033, the ramp portion of the protrusion slides along the edge or face 1133a of the window and forces connection device 1005 closer to the top housing component 1001. When the connection device 1005 is compressed (i.e., forced closer to the top housing component 1001) the connector assembly 1000, can be easily removed from a receiver (e.g., adapter and/or transceiver).

Figure 11:
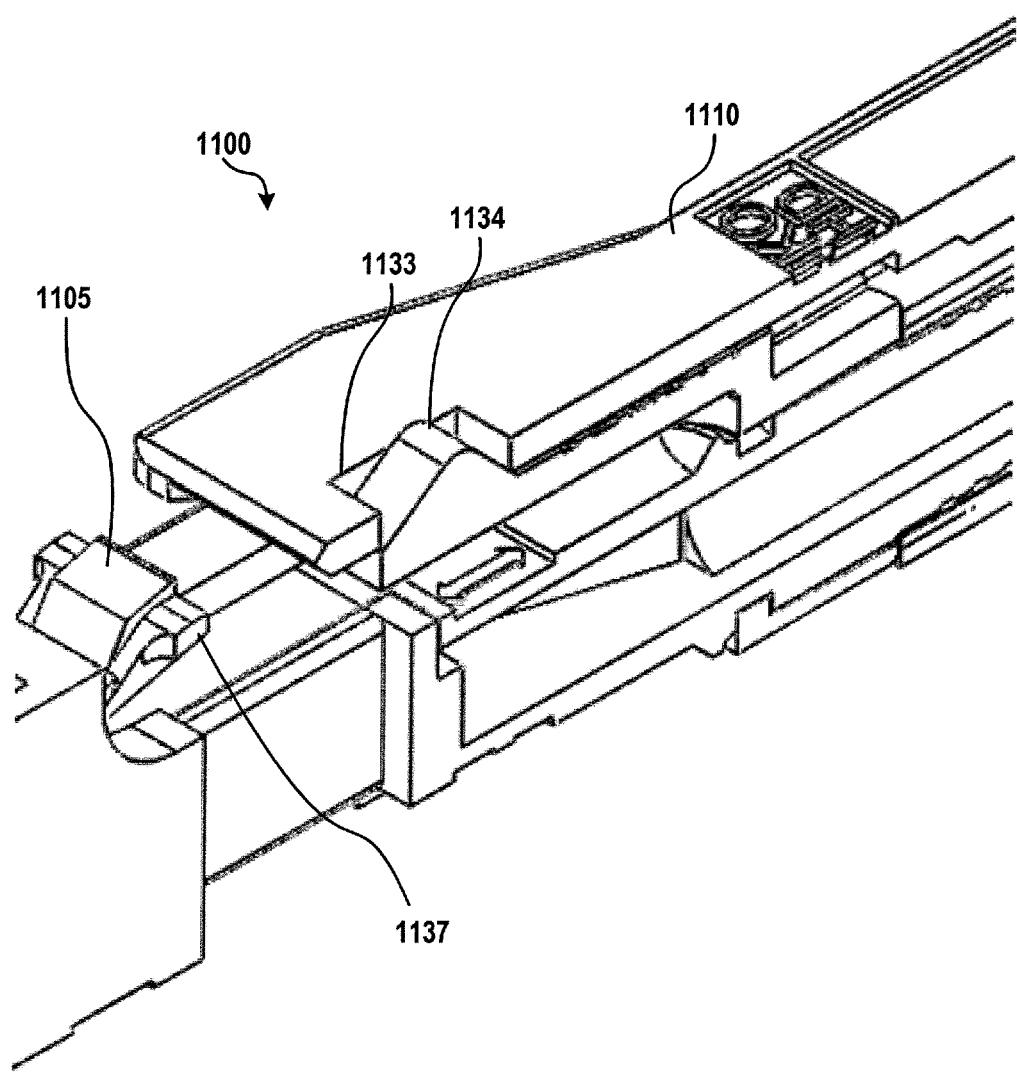
FIG. 11 depicts a detailed view of a protrusion and window interacting according to an embodiment.

A further example embodiment is shown in FIG. 11, which specifically shows a cross section of the connector assembly and the push-pull tab 1110. As shown, the protrusion 1134 is placed through the window 1133. Additionally, the small protrusion (not shown) resides in the recess (not shown) of the connector body. FIG. 11 also illustrates an example embodiment that has a connection device 1105 with connector hooks 1137. As depicted, the connector assembly may be inserted into an adapter and/or transceiver. It should be understood, that various alternative embodiments may exist, and that those discussed herein and illustrated in the figures are simply for explanatory purposes.

Figure 12A:
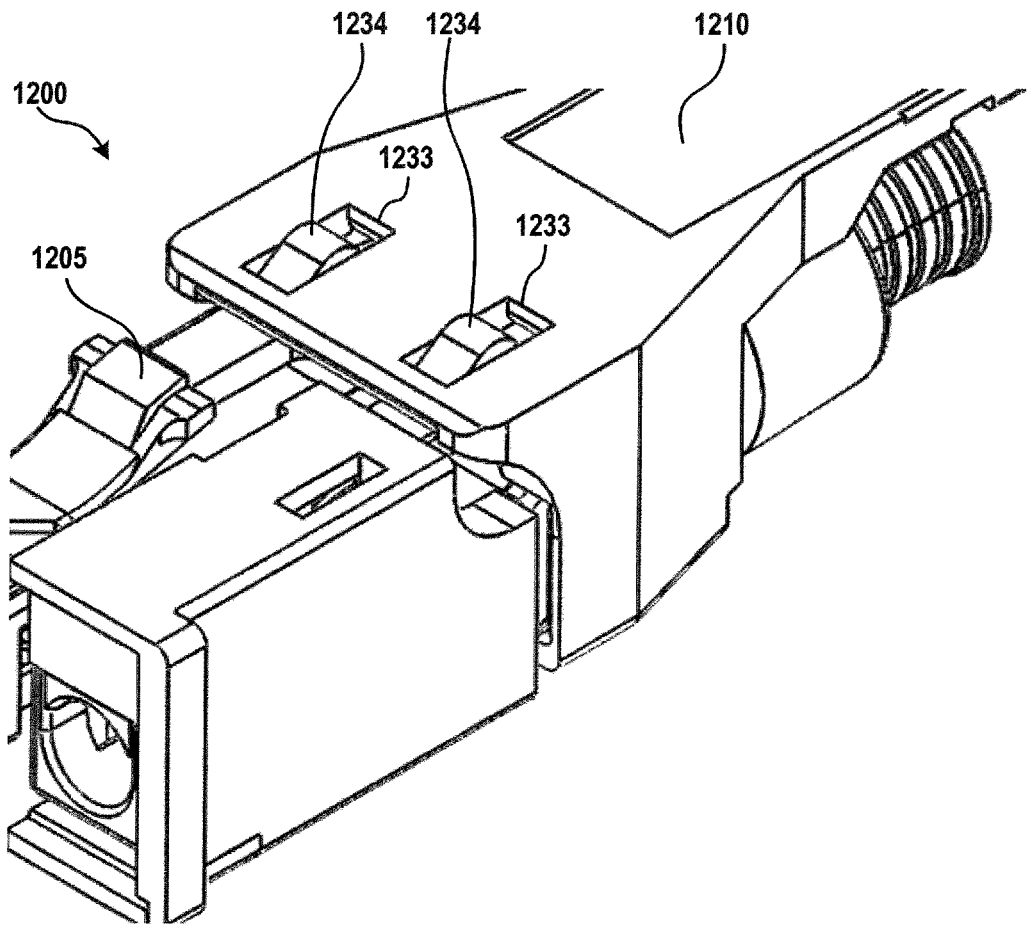
FIG. 12A depicts an illustrative view of a push-pull tab connected to a connector assembly according to an embodiment.
Figure 12B:
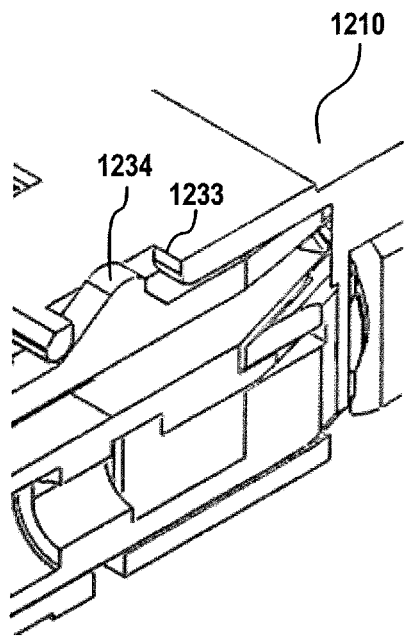
FIG. 12B depicts a detailed view of a portion of the illustrative view of a push-pull tab connected to a connector assembly according to an embodiment and shown in FIG. 12A.
Figure 12C:
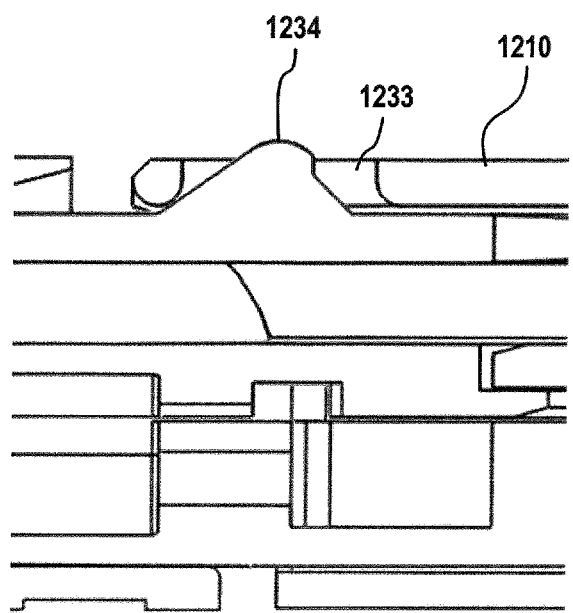
FIG. 12C depicts a detailed view of a portion of the illustrative view of a push-pull tab connected to a connector assembly according to an embodiment and shown in FIG. 12A.

For example, an as shown in FIG. 12A-12C, some embodiments may have more than one protrusion 1234 and more than one window 1233. Thus, when the push-pull tab 1210 is moved horizontally along the connector assembly 1200, the protrusion(s) 1234 impact the side or face 1133a of the window(s) 1233. In some embodiments, when the protrusions 1234 impact the edge of the windows 1233, the ramp portion of the protrusions slides along the edge of the windows and forces the connection device 1205 closer to the top housing component (not shown). When the connection device 1205 is compressed (i.e., forced closer to the top housing component) the connector assembly 1200, can be easily removed from a receiver (e.g., adapter and/or transceiver).

Figure 12D:
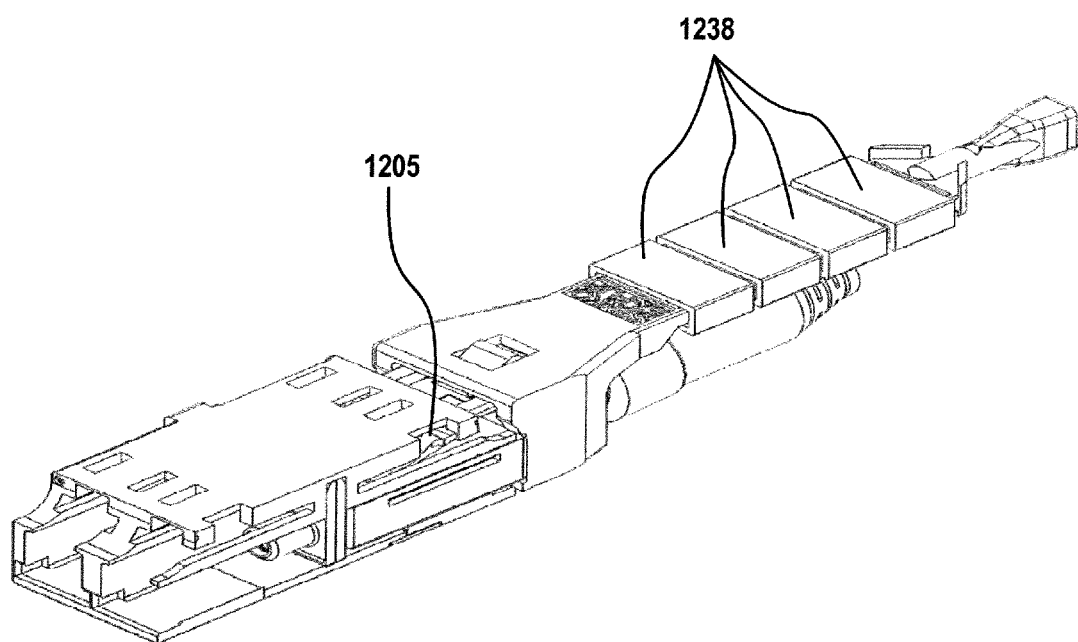

As shown in FIG. 12D, some embodiment may utilize identification tabs 1237 to identify a connector as inserted into an adapter/transceiver, via a connection device 1205 as shown. The identification tabs 1237 may be made of various materials and have various properties (i.e., color, etc.)

Figure 13:
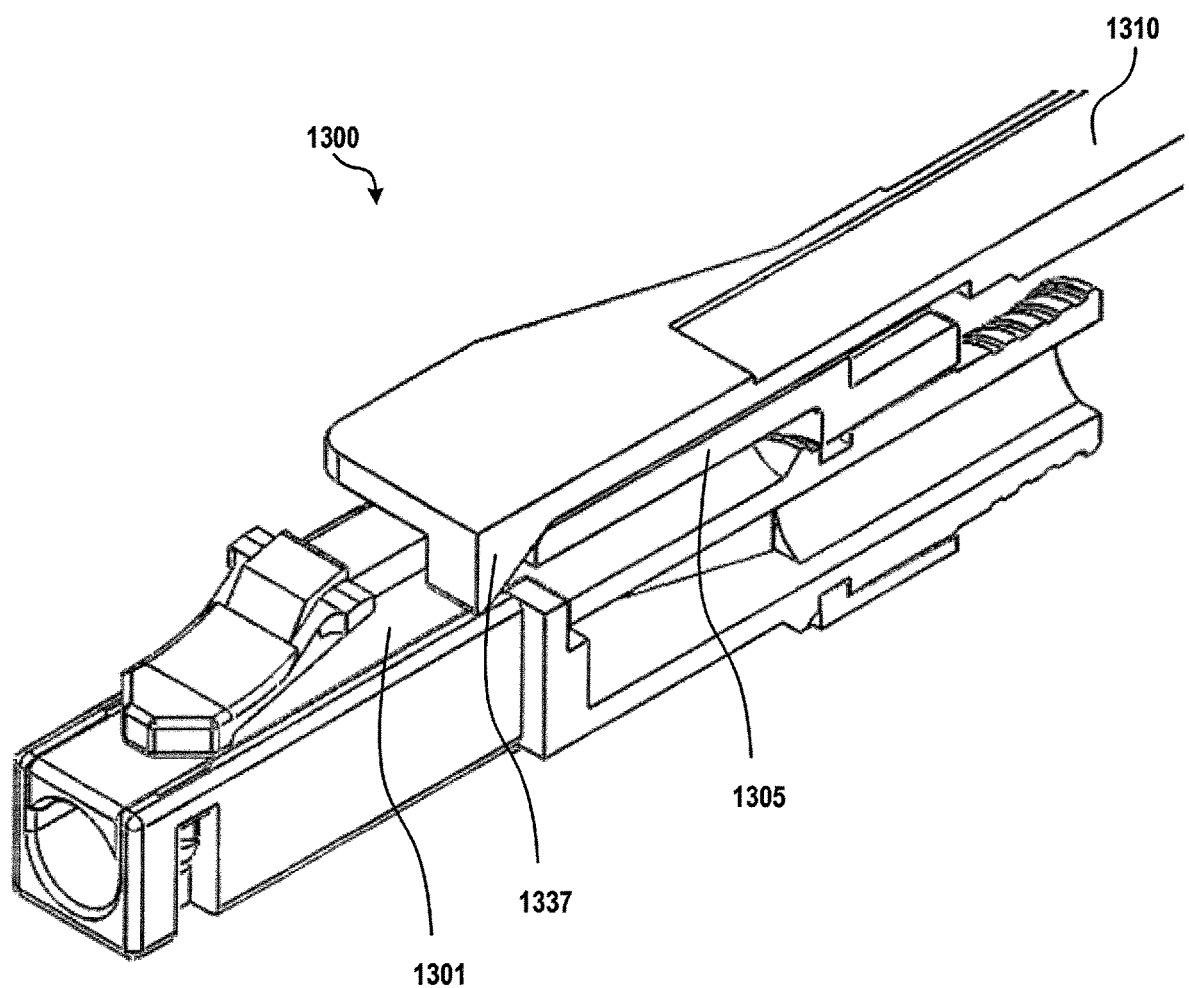
FIG. 13 depicts a cross-sectional view of a push-pull tab connected to a connector assembly according to an embodiment.

An alternative embodiment of a connector assembly 1300 is shown in FIG. 13 in a cross-sectional view. Accordingly, some embodiments, such as that shown in FIG. 13, may not utilize a protrusion/window arrangement as discussed herein. Instead, a push-pull tab 1310 may have an inverted ramp 1337 at the proximal end of the push-pull tab. Thus, when the push-pull tab 1310 is moved (e.g., horizontally to the connector assembly 1300) the inverted ramp 1337 impacts the connection device 1305 forcing the connection device down towards the top housing component 1301. When the connection device 1305 is compressed (i.e., forced closer to the top housing component 1301) the connector assembly 1300, can be easily removed from a receiver (e.g., adapter and/or transceiver).

Figure 14:
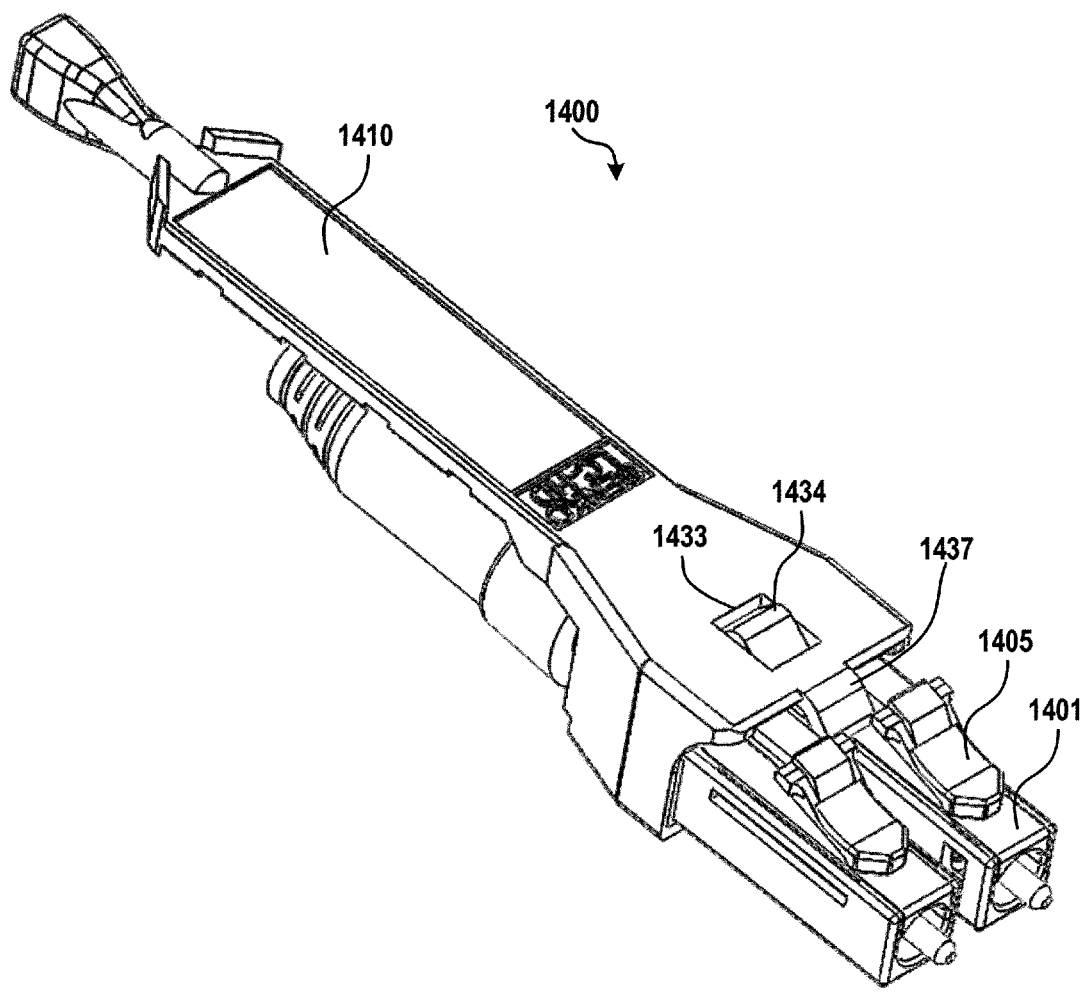
FIG. 14 depicts a perspective view of a push-pull tab connected to a connector assembly according to an embodiment.
Figure 15A:
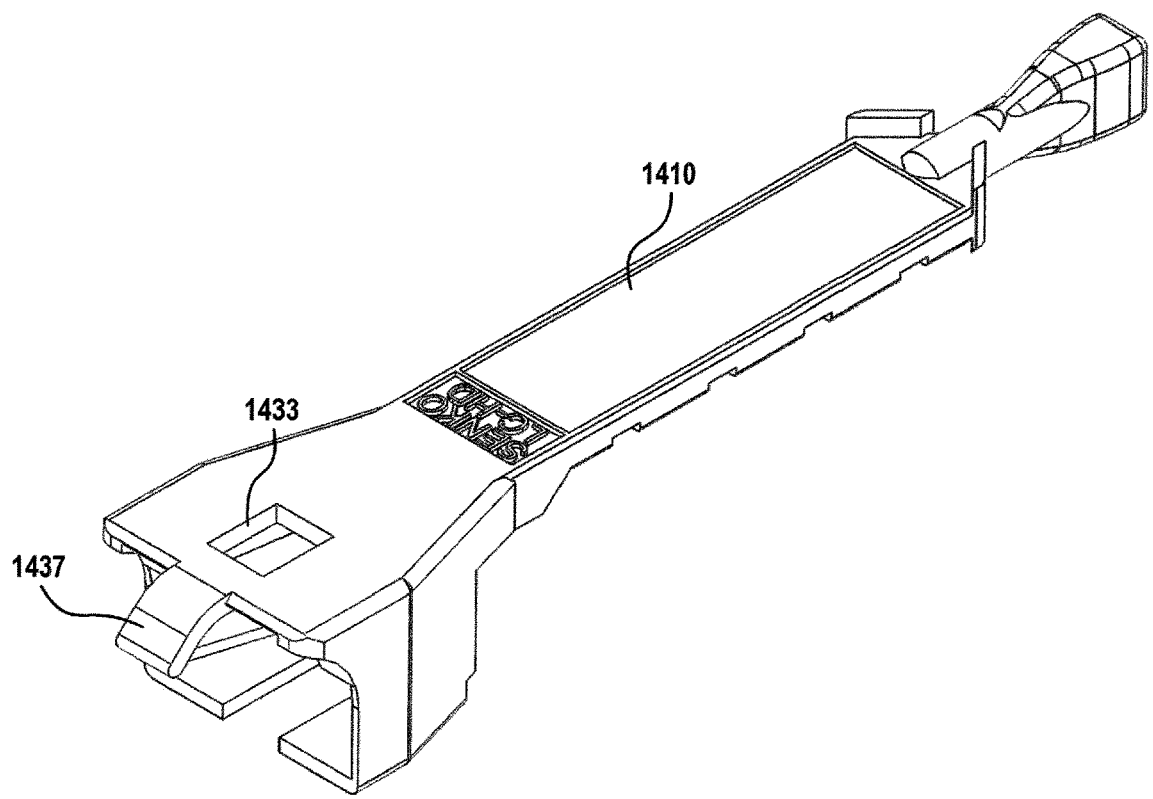
FIG. 15A depicts a perspective view of a push-pull tab according to an embodiment.
Figure 15B:
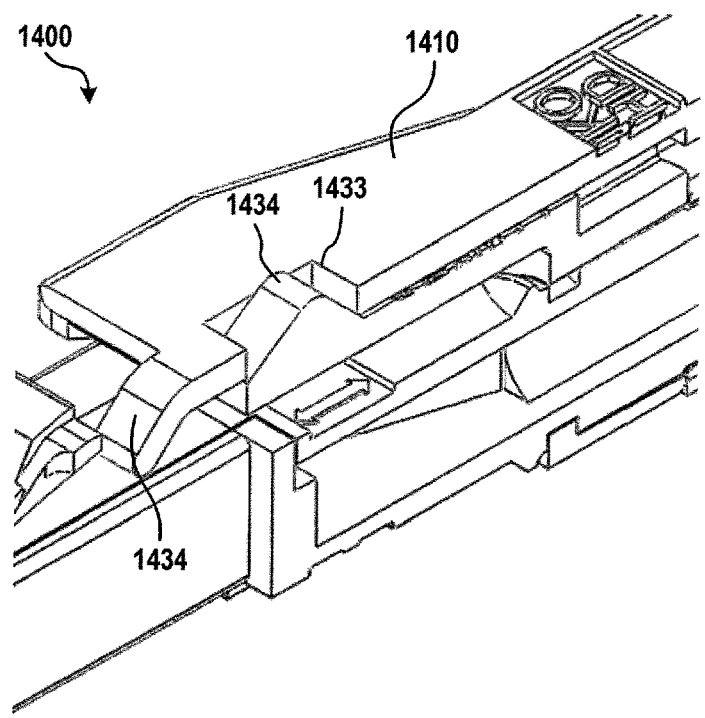
FIG. 15B depicts a detailed view of a push-pull tab connected to a connector assembly according to an embodiment.

A further alternative embodiment of a connector assembly 1400 is shown in FIG. 14. Accordingly, some embodiments, such as that shown in FIG. 15, may utilize both a protrusion 1434 and window 1433 arrangement as well as an inverted ramp 1437 at the proximal end of the push-pull tab. Thus, when the push-pull tab 1410 is moved (e.g., horizontally to the connector assembly 1400) the inverted ramp 1437 impacts the front connection device 1405 and the protrusion 1434 impact the edge of the window 1433 thus, similar to embodiments discussed previously, forcing the connection device down towards the top housing component 1401. When the connection device 1405 is compressed (i.e., forced closer to the top housing component 1401) the connector assembly 1400, can be easily removed from a receiver (e.g., adapter and/or transceiver). Detailed views of the push-pull tab 1410 and a cross-sectional view of the connector assembly 1400 are presented in FIGS. 15A and 15B.

Figure 16A:
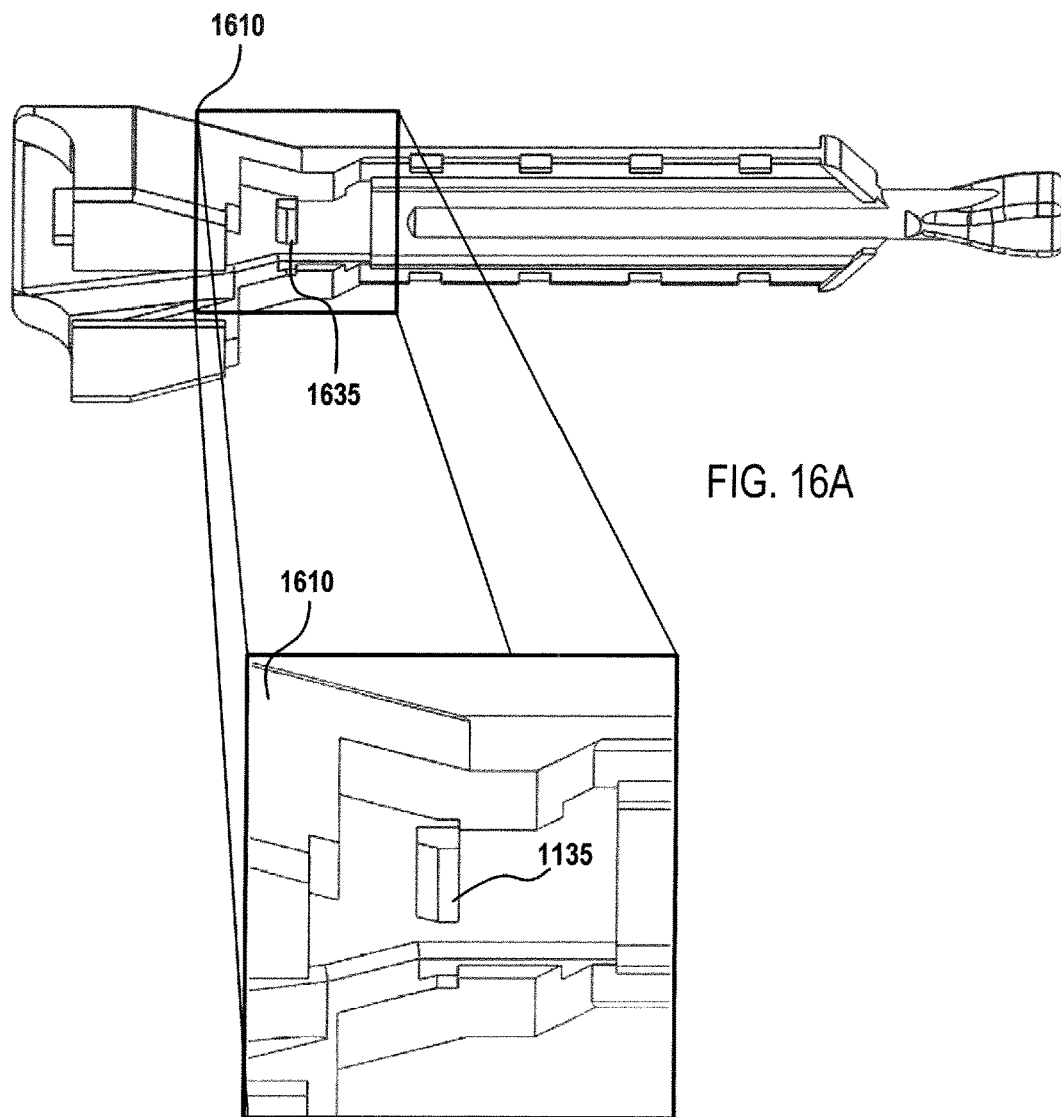
FIG. 16A depicts a detailed view of a small recess on the push-pull tab according to an embodiment.
Figure 16B:
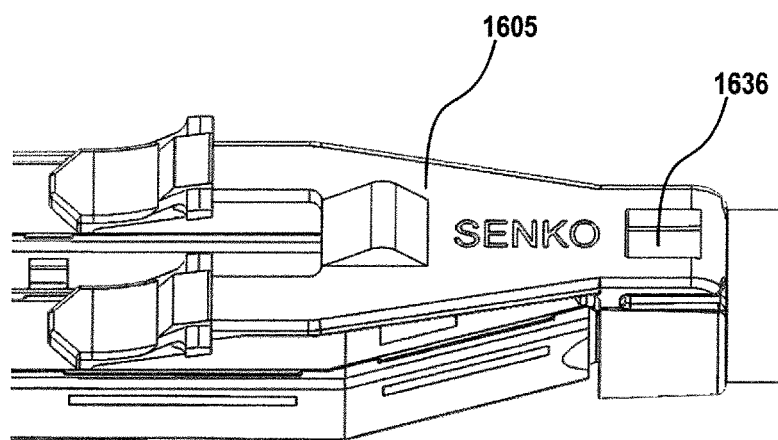
FIG. 16B depicts a perspective view of the top of the latching component according to an embodiment.
Figure 17:
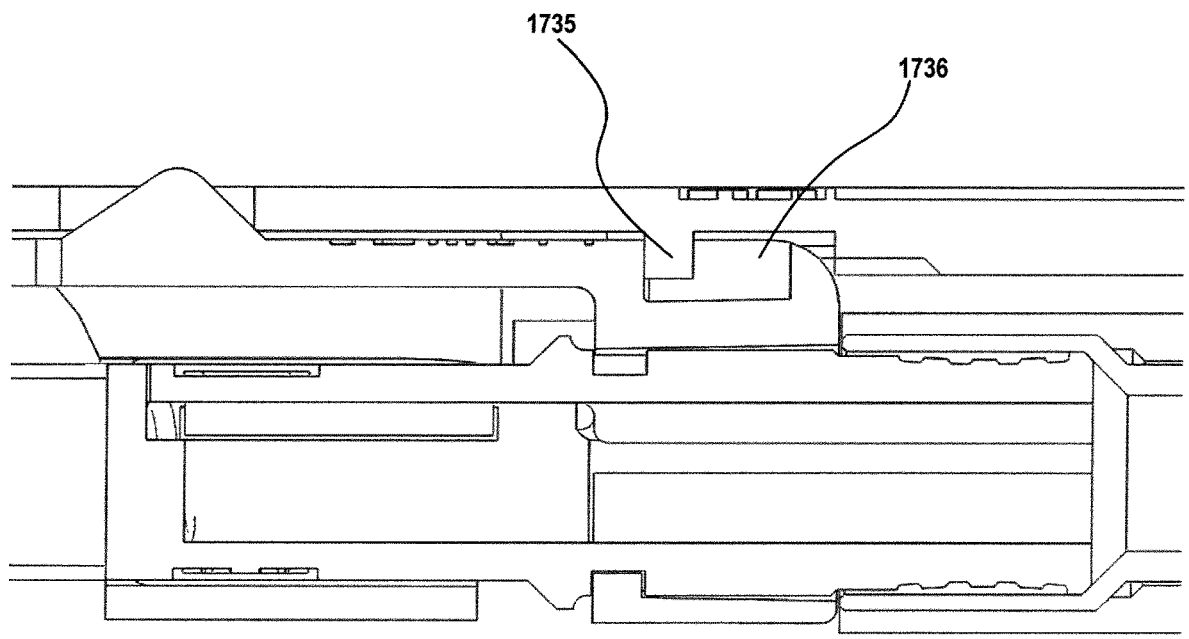
FIG. 17 depicts a detailed cross-sectional view of a small protrusion interacting with a small recess according to an embodiment.

In a further embodiment, such as that shown in FIGS. 16A-16C, a push-pull tab 1610, may have a small protrusion 1635 on the underside of the push-pull tab. FIG. 16B shows a detailed view of the small protrusion 1635 on the push-pull tab 1610. In some embodiments, FIG. 16 C, small protrusion 1635 is inserted into a recess 1636 on connection device 1605. In some embodiments, this restricts the horizontal movement of the push-pull tab along the connector assembly (not shown). As shown in FIG. 17, the small protrusion 1735 easily fits into the recess 1736.

As shown in FIG. 17, the small protrusion 1735 is impacting the front wall of the recess 1736. This impact limits the forward movement of the push-pull tab 1710. This serves multiple functions in various embodiments. For example, the impact of the small protrusion 1735 with the recess 1736 allows a user to apply substantial forward force to the connector assembly (not shown) via push-pull tab 1710 without damaging connector.

Figure 18A:
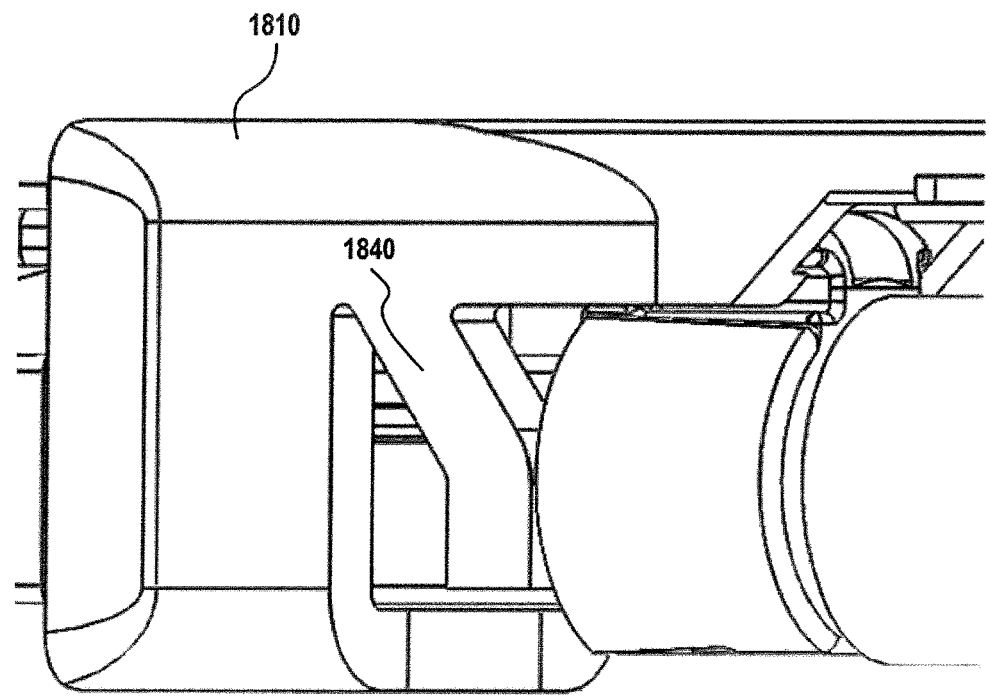
FIG. 18A depicts a perspective view of a tension bar on the push-pull tab.
Figure 18B:
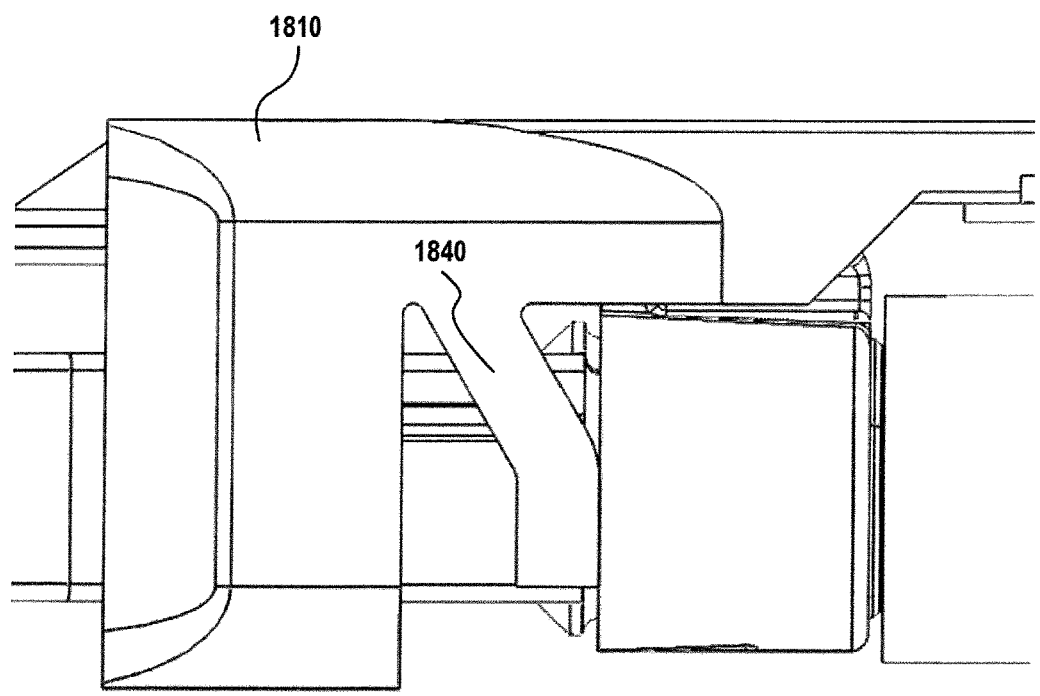
FIG. 18B depicts a side view of a tension bar on the push-pull tab.

Referring now to FIGS. 18A and 18B, as discussed herein, the push-pull tab 1810 may move in relation to the connector assembly (e.g., move horizontally with respect to the connector assembly). In some embodiments, the push-pull tab 1810 may have a tension member 1840 which applies a biasing force against a portion of the connector assembly thus forcing the push-pull tab in one direction. The non-limiting example illustrated in FIGS. 18A and 18B show the tension member 1840, instead of spring 504 which applies a biasing force to move push-pull tab 1810 toward the front of the connector assembly (i.e., the location of the ferrules). It should be understood that this is a non-limiting example, and that one or more tension members may be used, and that the biasing may be in different directions. Moreover, there may be tension members applying a biasing force in more than one direction or opposing directions. Additionally, as discussed herein, a spring system or any method of applying a biasing force may be utilized for the embodiments discussed herein.

Figure 19A:
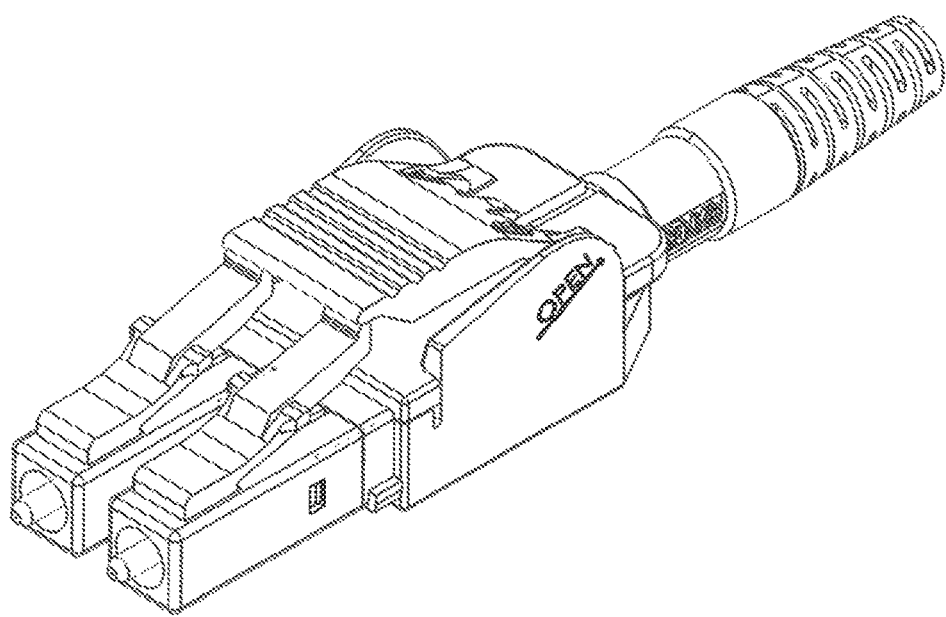
FIG. 19A depicts a perspective view of a connector assembly with a 6.25 mm pitch.
Figure 19B:
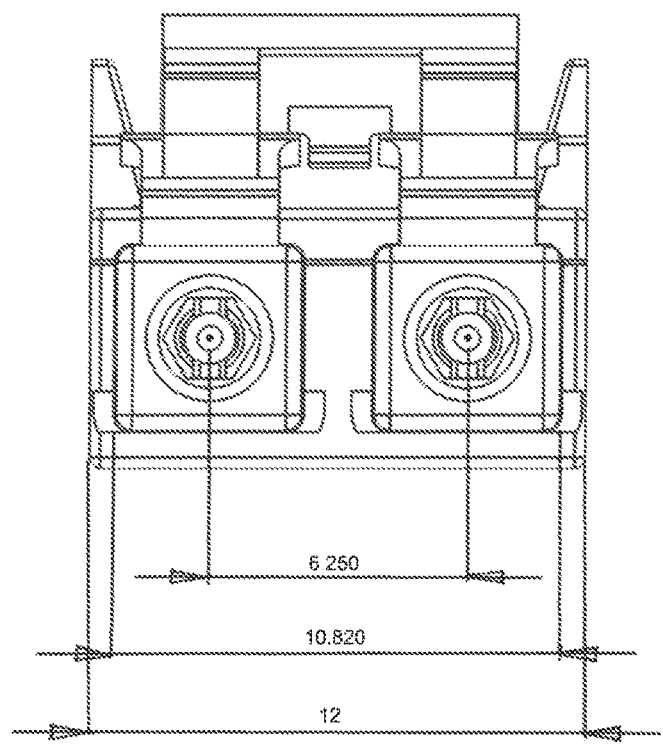
FIG. 19B depicts a front view of a connector assembly with a 6.25 mm pitch.

Referring now to FIGS. 19A and 19B, a connector is shown according to an embodiment. In some embodiments, such as that shown in FIGS. 19A and 19B, a connector may have a ferrule to ferrule pitch of 6.25 mm. In a further embodiment, the outer dimensions of the ferrule housing may be 10.82 mm, and the overall width dimension of the connector may be 12 mm.

Figure 20A:
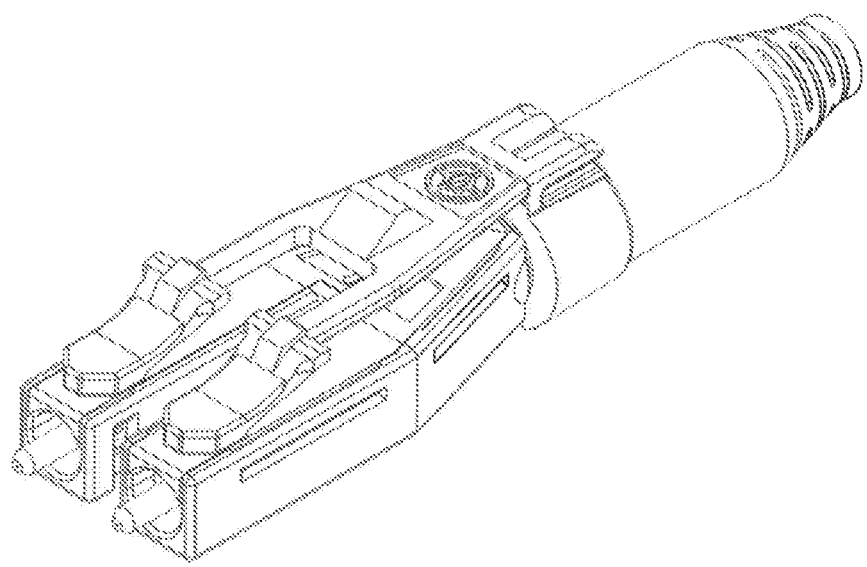
FIG. 20A depicts a perspective view of a connector assembly with a 6.25 mm pitch.
Figure 20B:
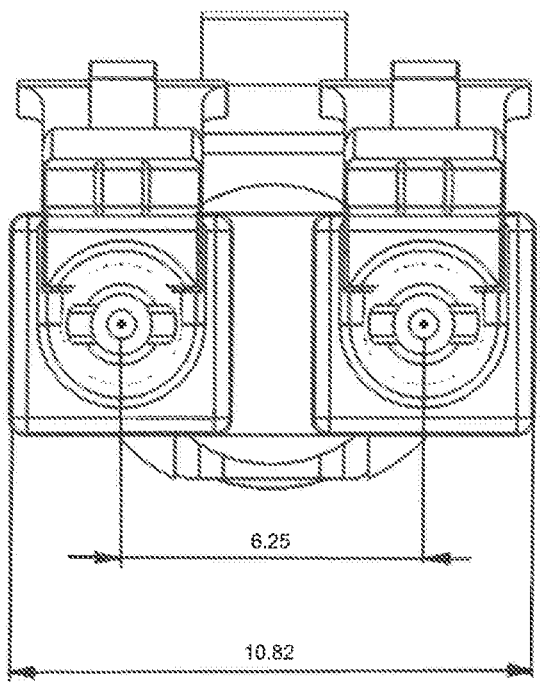
FIG. 20B depicts a front view of a connector assembly with a 6.25 mm pitch.

In an alternative embodiment, such as that shown in FIGS. 20A and 20B, some embodiments may keep the 6.25 mm pitch between the ferrules, and even the 10.82 dimensions of the ferrule housing components, in order to remain within existing standards. However, the overall width dimension of the connector may be reduced to the existing dimension of the ferrule housing (e.g., 10.82 mm) instead of the 12 mm of FIGS. 19A and 19B.

Figure 21A:
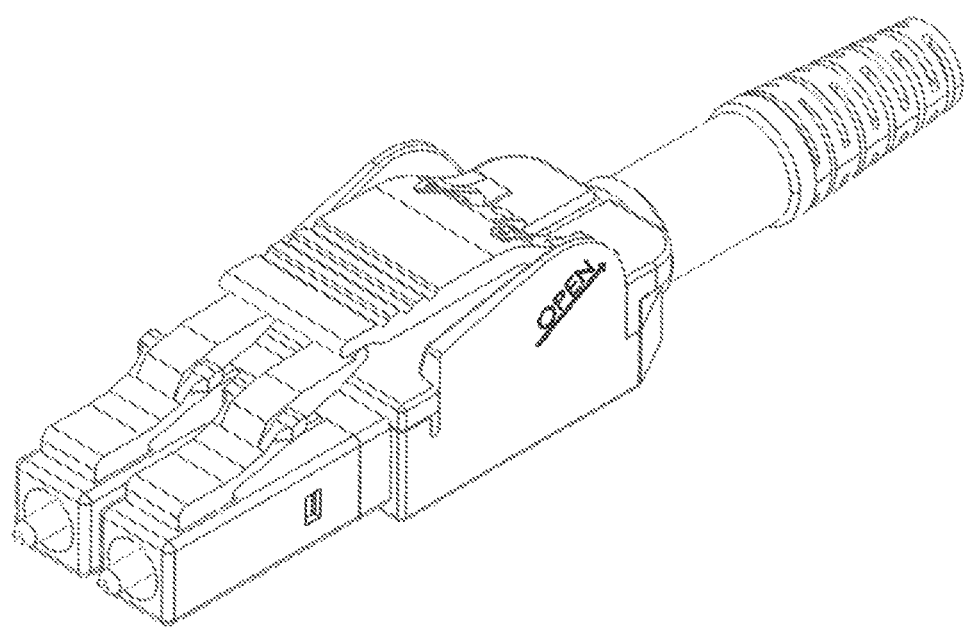
FIG. 21A depicts a perspective view of a connector assembly with a 5.25 mm pitch.
Figure 21B:
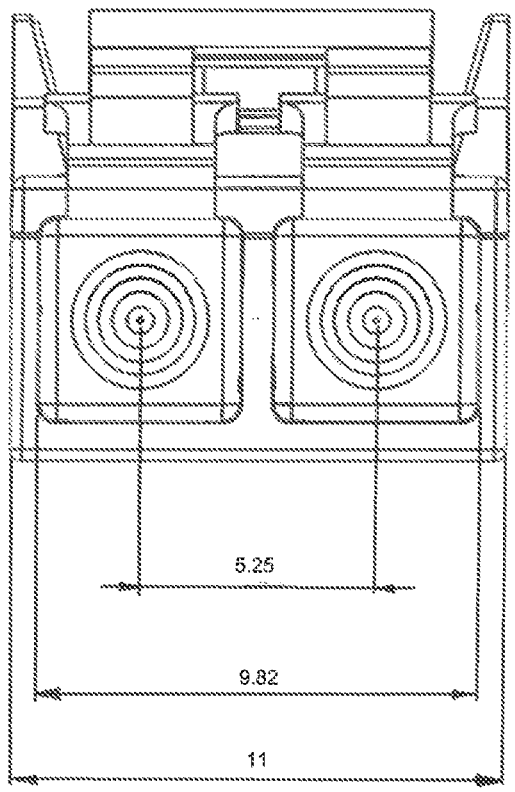
FIG. 21B depicts a front view of a connector assembly with a 5.25 mm pitch.

Referring now to FIGS. 21A and 21B, a connector is shown according to an embodiment. In some embodiments, such as that shown in FIGS. 21A and 21B, a connector may have a ferrule to ferrule pitch of 5.25 mm (i.e., 1 mm smaller than that of FIGS. 19A, 19B, 20A, and 20B). In a further embodiment, the outer dimensions of the ferrule housing may be 9.82 mm, and the overall width dimension of the connector may be 11 mm.

Figure 22A:
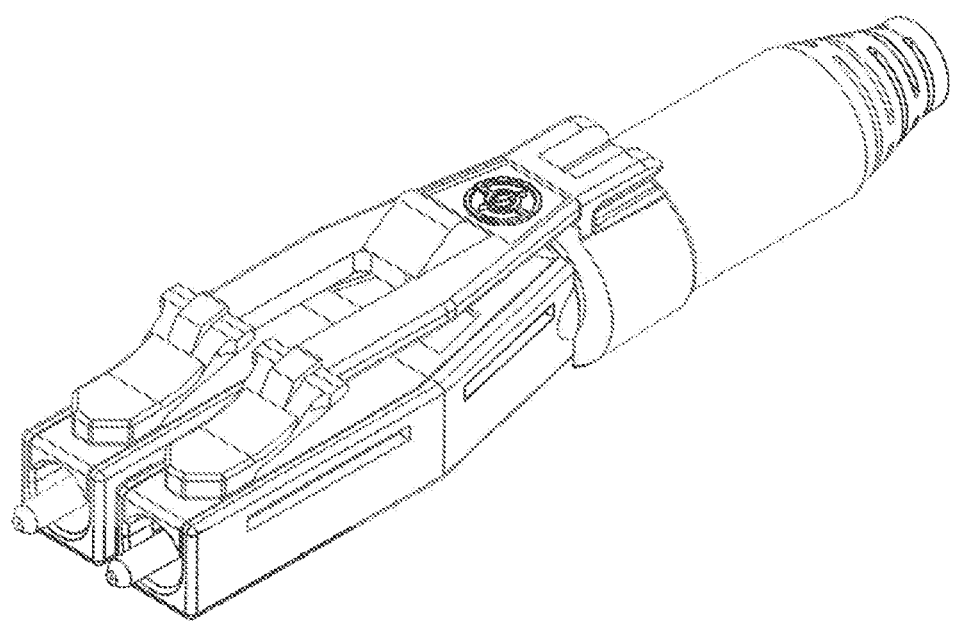
FIG. 22A depicts a perspective view of a connector assembly with a 5.25 mm pitch.
Figure 22B:
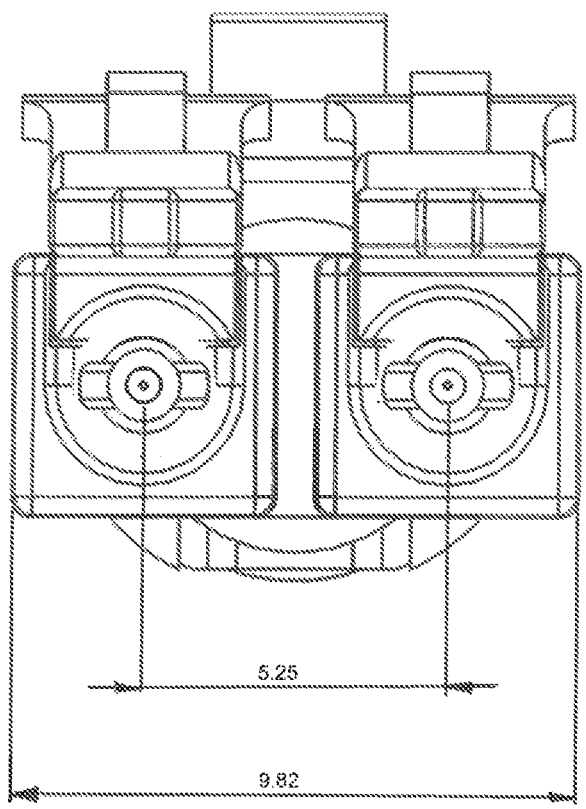
FIG. 22B depicts a front view of a connector assembly with a 5.25 mm pitch.

In an alternative embodiment, such as that shown in FIGS. 22A and 22B, some embodiments may keep the 5.25 mm pitch between the ferrules, and even the 9.82 dimensions of the ferrule housing components, in order to remain within existing standards. However, the overall width dimension of the connector may be reduced to the existing dimension of the ferrule housing (e.g., 9.82 mm) instead of the 11 mm of FIGS. 21A and 21B.

Figure 23A:
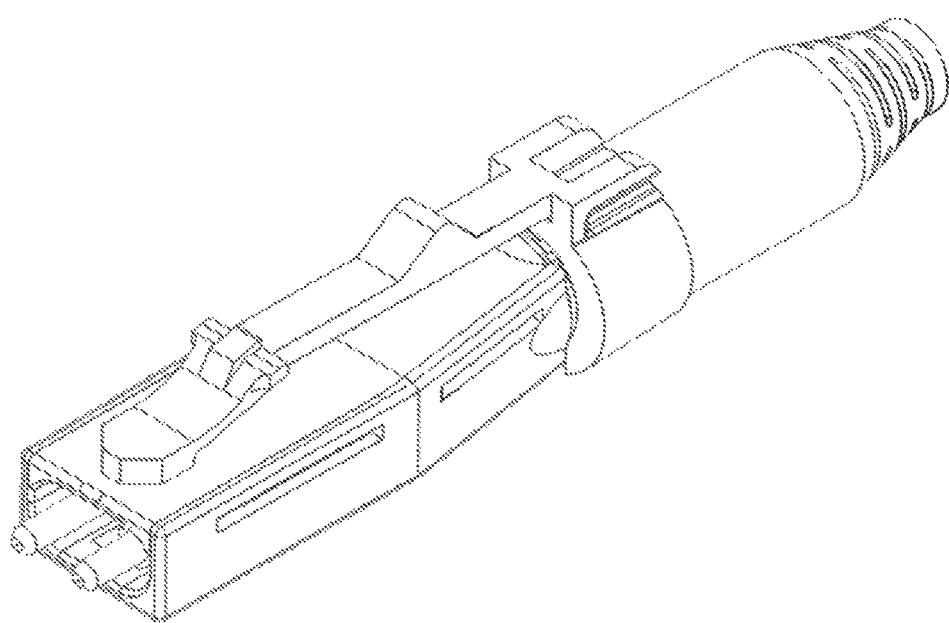
FIG. 23A depicts a perspective view of a connector assembly with a 3.4 mm pitch.
Figure 23B:
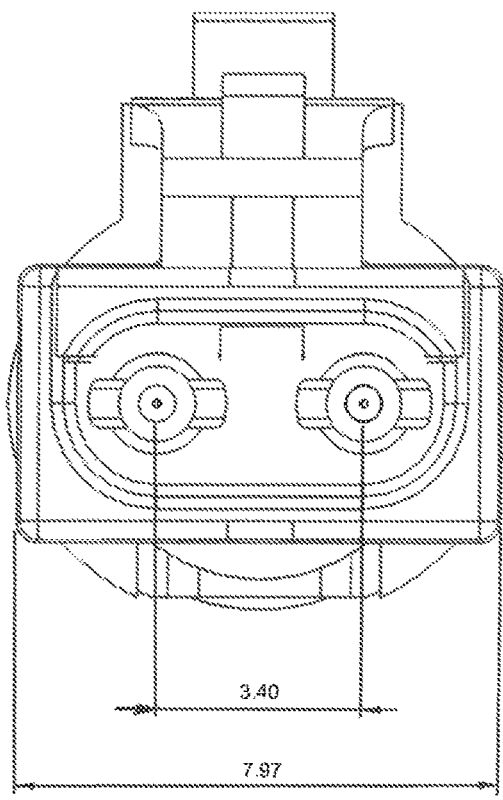
FIG. 23B depicts a front view of a connector assembly with a 3.4 mm pitch.

Referring now to FIGS. 23A and 23B, a connector is shown according to an embodiment. In some embodiments, such as that shown in FIGS. 23A and 23B, a miniature footprint connector may have a ferrule to ferrule pitch of 3.4 mm. In a further embodiment, the outer dimensions of the ferrule housing may be 7.97 mm.

Figure 24A:
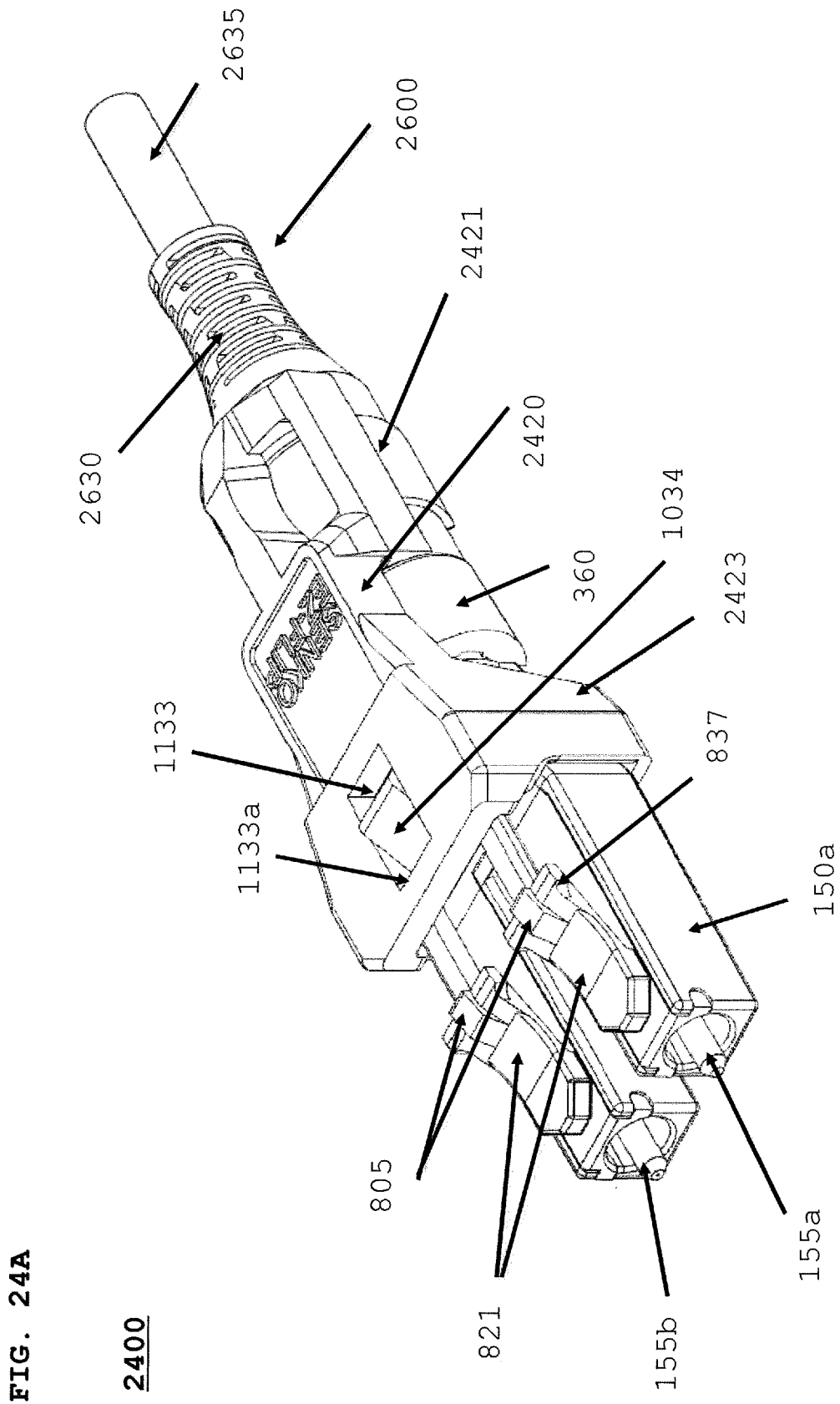
FIG. 24A depicts a perspective view of a connector assembly with a push/pull clip having a cable release assembly according to a first embodiment of the present invention.
Figure 35C:
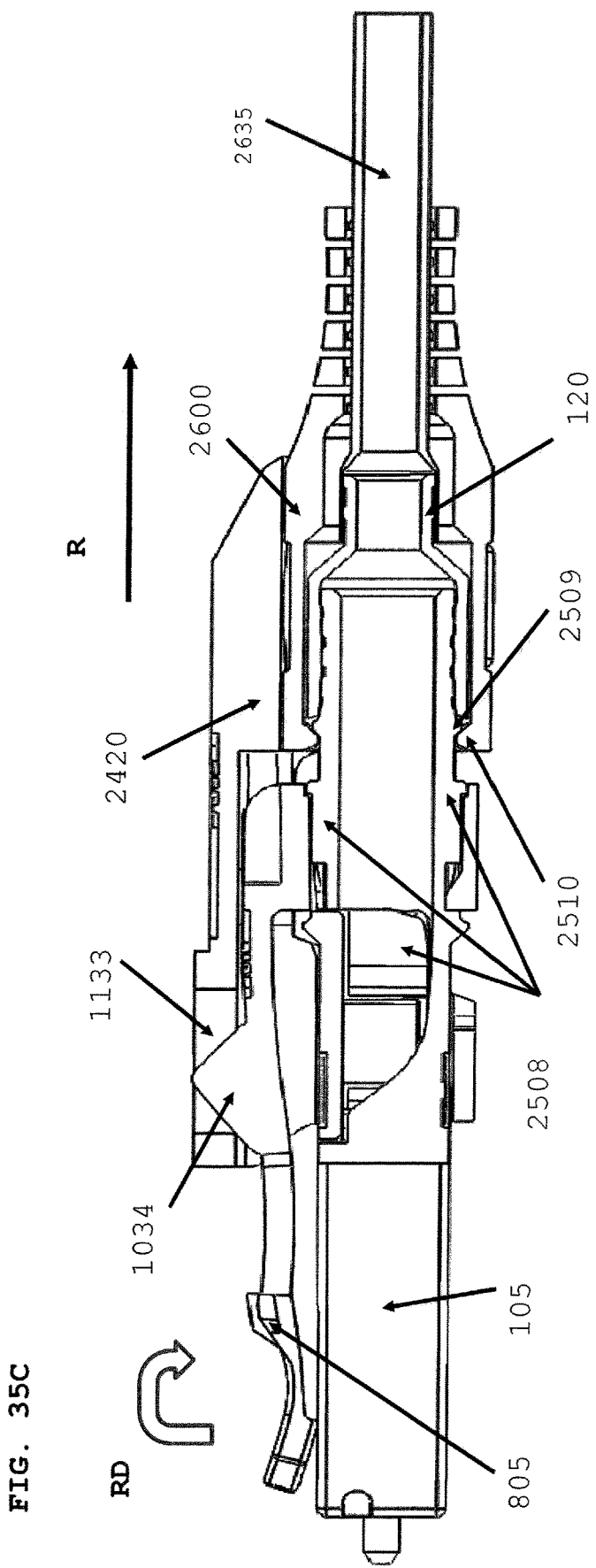
FIG. 35C is a cross-section view of FIG. 35 as connector is released from adapter housing (not shown).

FIG. 24A depicts the connector of FIGS. 8 and 10C assembled, with a push/pull clip 2420 (refer to FIG. 27) attached thereto. In a first embodiment, push/pull clip 2420 is secured to a cable boot 2600 using a pair of tabs (2424*a*, 2424*b*). The clip 2420 is further secured to the connector 2400 by a pair of wings (2424*a*, 2424*b*). Ring portion 360 is used to change polarity as discussed above. Cable boot 2600 may be formed as part of the push/pull clip 2420, or a separated as shown in FIG. 24B. Clip 2420 further comprises an extended leg 2423. A second leg is position around the connector body and opposite the first leg 2423. The pair of legs 2423 further secure clip 2420 to the connector 2400, and the legs stabilize the clip during use when the user pulls or pushes on the cable boot 2600. Releasing connector 2400 from adapter 2403 is depicted in FIGS. 35A-35C and discussed below.

Continuing to refer to FIG. 24A, ferrule 155*a* is located within plug frame 150*a*. The referring to FIG. 24F, plug frames (150*a*, 150*b*) are formed from an upper housing 501 and a bottom housing 502. Flexible latch arm 821 forms part of connection device 805 that secures connector into adapter 2403 opening (refer to FIGS. 34A and 36A). As described below in FIG. 32B, upon pulling cable boot 2600, a protrusion 1034 engages a face 1133*a* of opening 1133, which releases or actuates connection device 805 from adapter opening. As cable boot is pulled in rearward, boot 2600 to move over back body 2508 as shown in FIG. 25A and FIG. 25B, with exploded in FIG. 25C.

In this patent the term actuate means to release or secure a connector (2400, 3800, 4400, 5300, or 6000) within an adapter housing. A connection device 805 is actuated by an outer housing to which a clip device is secured, or a cable boot assembly is secured within the outer housing. Upon pushing the connector, the connection device is moved or rotated to secure within corresponding structure of the adapter, such as a latch. Upon pulling distally, the connection device secured to a push/pull clip or cable boot assembly to outer housing, which is secured to connection device, rotates down or moves down the connection device thus releasing it from the corresponding structure within the adapter housing. Further in this patent, moving about is in a longitudinal direction that is X-Y along a connector axis with an incoming fiber cable.

FIGS. 24B through 24D depict connector 2400. FIG. 24B is a side-view of FIG. 24A connector 2400. Connection device 805 is on a side of plug frame 150*a*, and when connector 2400 is in a first or normal position, protrusion 1034 is visible through opening 1133. The normal or first position may be while connector 2400 is in an adapter opening or user is not applying a pull force "R" on the cable boot or a distal end connector 2400. The push/pull clip-on 2420 is attached to the connector 2400 body by a pair of tabs (2421*a*, 242*b*) (refer to FIG. 24D) formed as part of extended legs 2423, as shown in FIG. 24A. The tabs 2421 are flexible with a memory that allows it to bend outward when being place over an outer diameter of the cable boot, and then the wing returns to its original position, securing the push/pull clip 2420 onto cable boot assembly 2600. FIG. 24B depicts wings 2421 extending around cable boot assembly 2600. FIG. 24D depicts a bottom view of connector 2400. A pair of tabs (2424*a*, 2424*b*) extend outward from legs 2423 and toward the center of the connector body to further secure push/pull clip 2420 onto a proximal end of connector 2400. The proximal end is defined as closer to a ferrule 150.

Figure 24E:
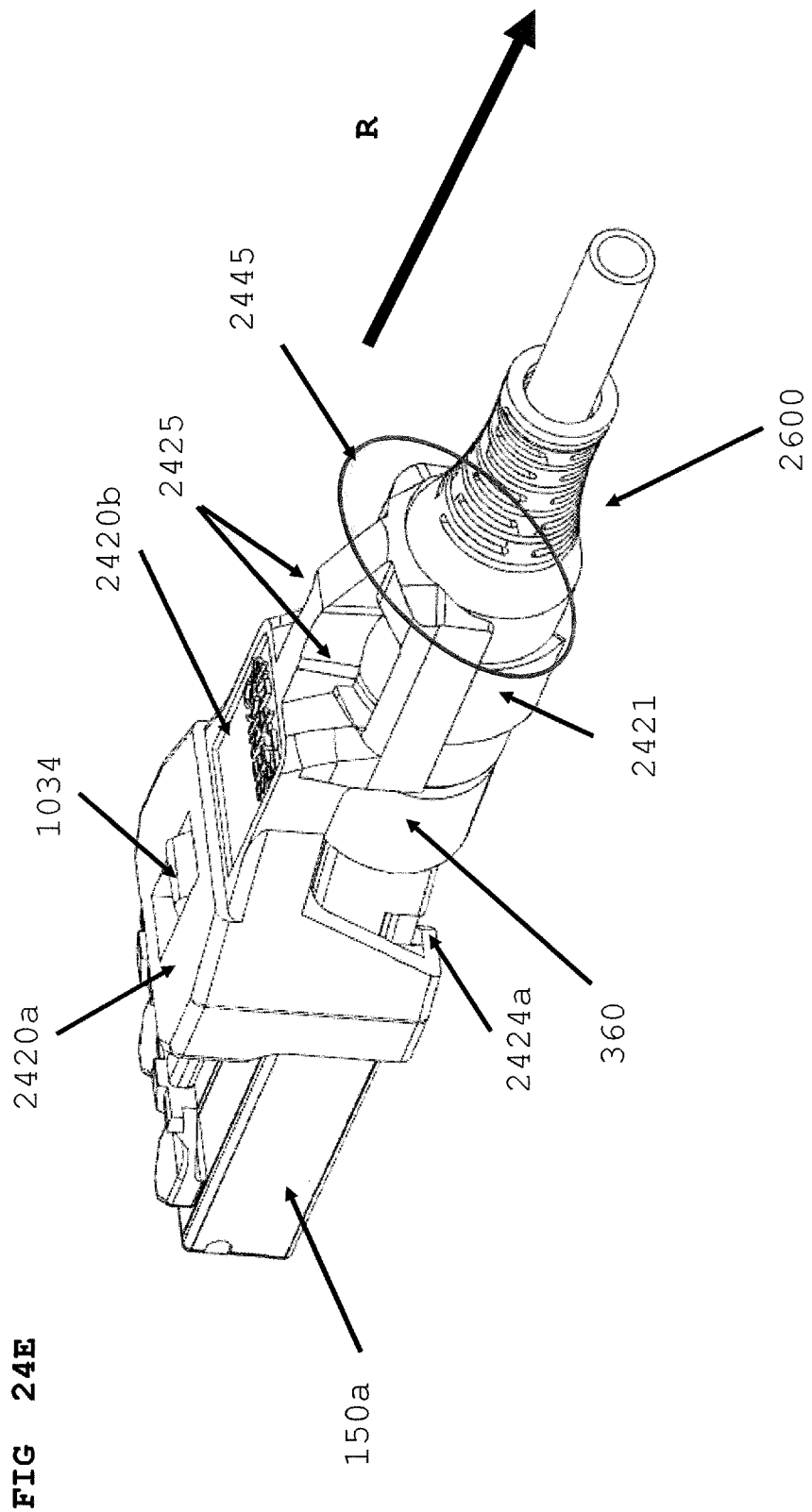
FIG. 24E is a rear perspective view of the connector of FIG. 24A during "R" release operation at a distal end of the connector.

FIG. 24E depicts a user applying a release force "R" on cable boot 2600. Push/pull clip 2420 has an upper body portion 2420*a* with a window 1130 that contains a protrusion 1034. As described below, upon pulling boot cable 2600, the protrusion 1034 is pushed downward, and the protrusion being attached to the connection device 805, causes the connector to de-latch or release from an adapter opening. A second body portion 2420*b* integrates ring portion 360 into push/pull clip 2420. As described above ring portion 360 is used to change connector polarity. An indented surface 2425 allows a user to grasp push/pull clip 2420 and apply force "R" to release connector 2400 from an adapter.

Figure 24F:
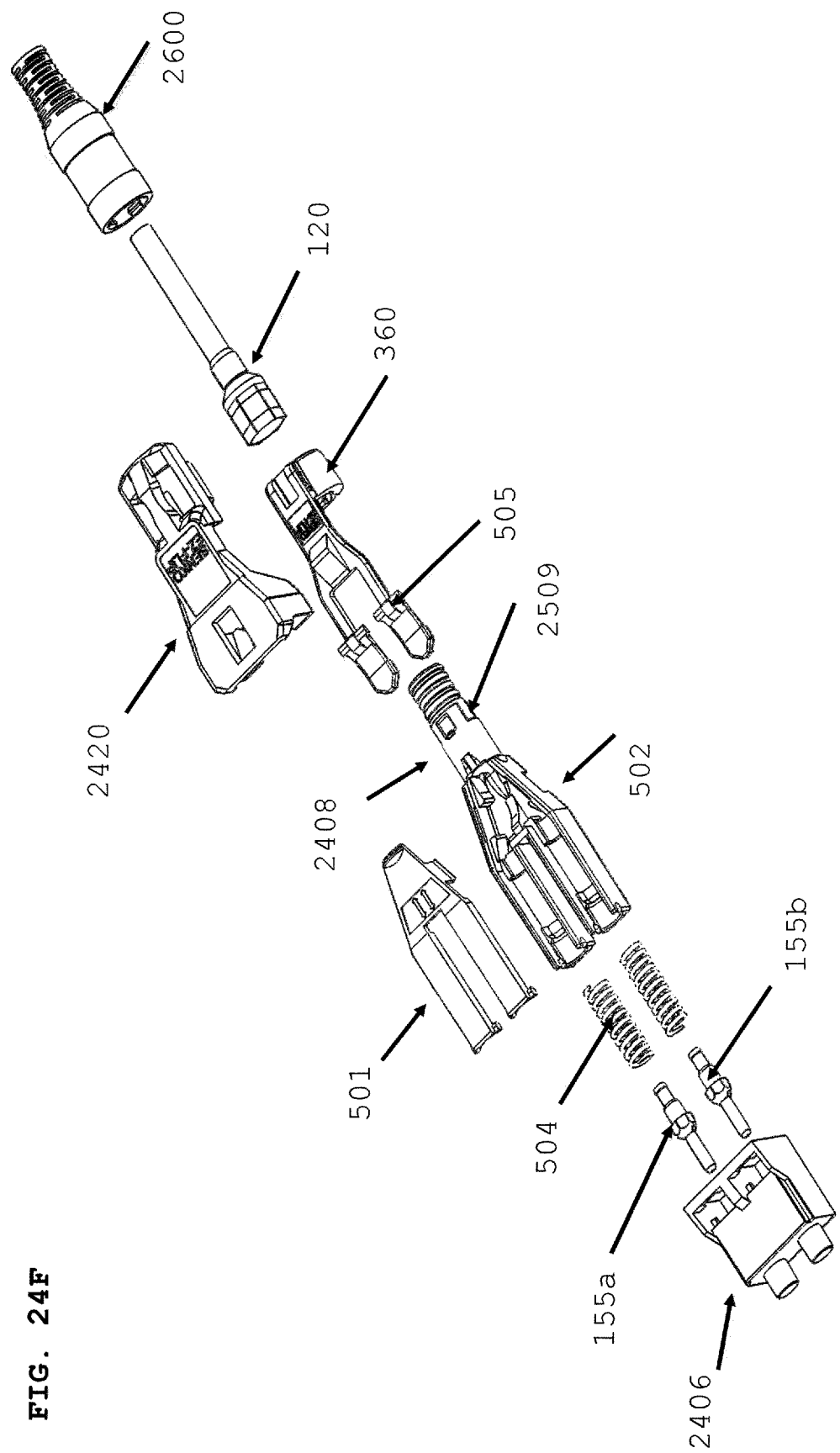
FIG. 24F is an exploded view of the connector of FIG. 24A.
Figure 25C:
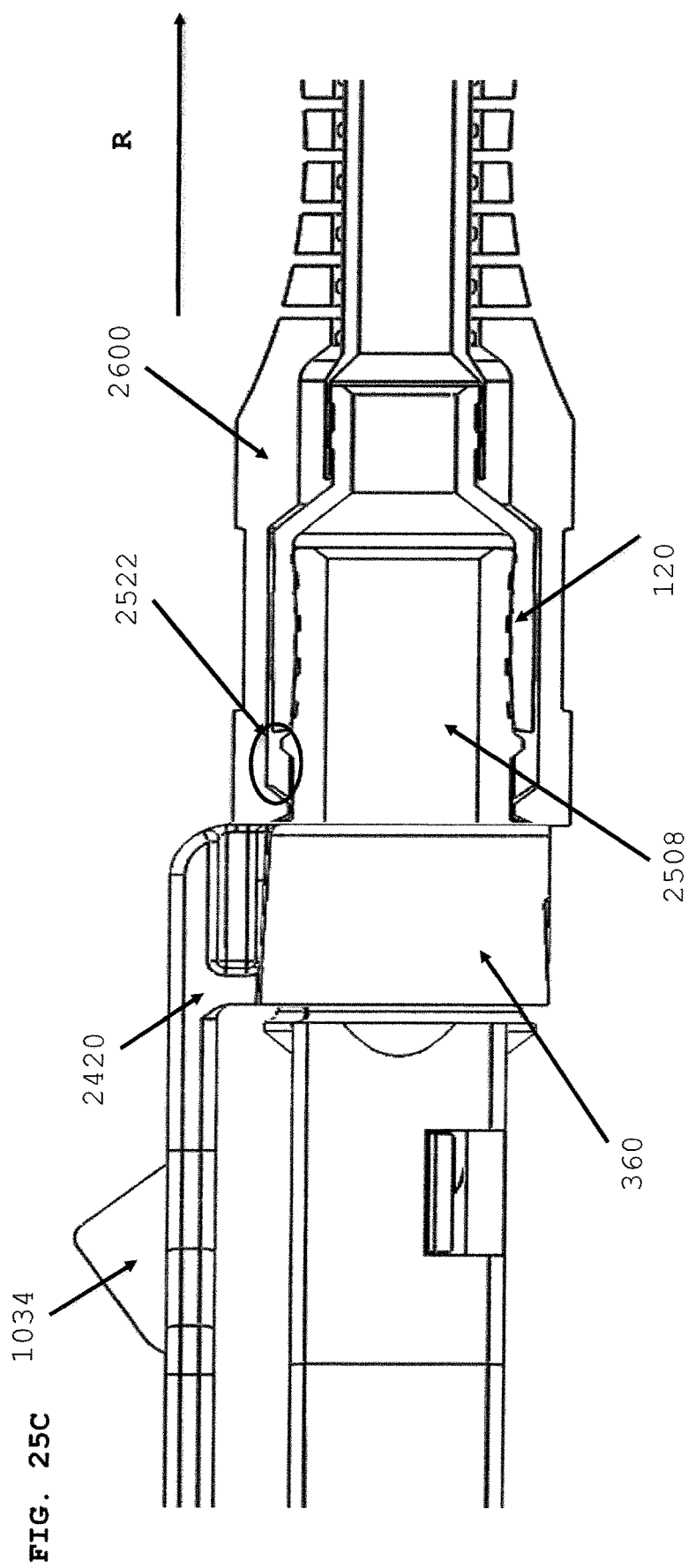
FIG. 25C is a zoomed view of FIG. 25A back body area at onset of release "R".

FIG. 24F depicts an exploded view of FIG. 24A connector 2400. With like numerals represented by other figures, FIG. 24F shows a dust cover 2406 to protect against moisture and debris ingress damaging the fiber cable embedded in ferrule 150. A crimp ring assembly 120 with a crimp ring and tube attached thereto. A polarity change ring portion 360 with a pair of connection devices 505, and a push/pull clip 2420. In a second embodiment, referring to FIG. 37, the push/pull clip 2420 is integrated with cable boot 2600. In another embodiment push/pull clip 2420, ring portion 360 and back post 2408 (FIG. 24F) are integrated as one molded piece.

Figure 24G:
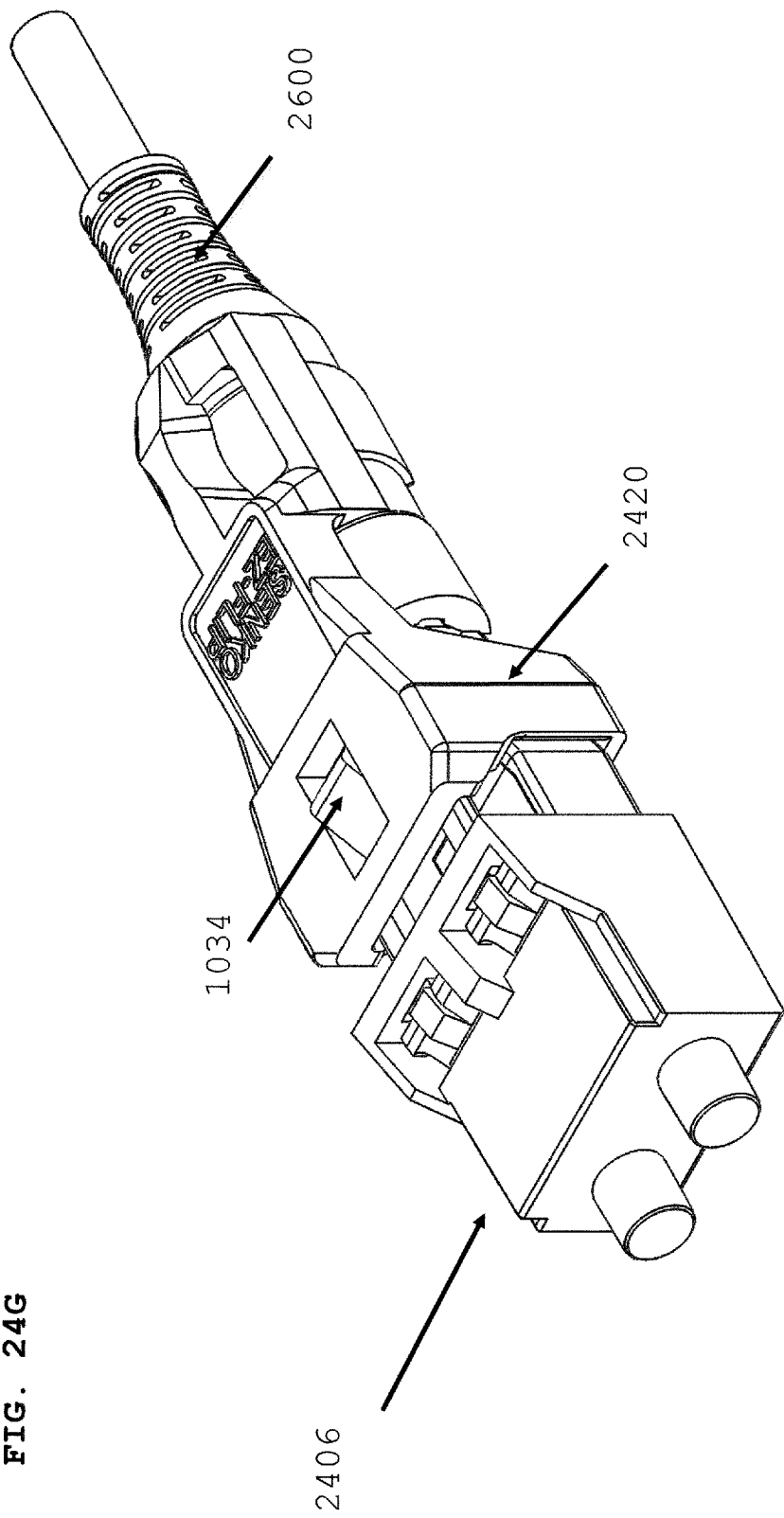
FIG. 24G is a perspective view of the connector of FIG. 24A with a dust cap installed.

FIG. 24G depicts connector 2400 with a dust cap 2406 installed at a proximal end of connector protecting ferrules 150. Connector device 805 release protrusion 1034 is shown in a first position, when cable boot assembly 2600 is under no release force R. Without departing from the scope of the invention, protrusion 1034 only needs to be within window 1133 to allow protrusion 1034 to engage window face, which pushed down protrusion 1034, upon user pulling cable boot 2600 rearward to release connector from adapter port.

FIGS. 25A-25C depict connector 2400 with push/pull clip 2420. As discussed above ring portion 360 is connected to connection device 505, and this assembly is rotatable about back post 2508 to change polarity. FIG. 25A depicts side view of connector 2400 prior to applying a release force "R" as shown in FIG. 25B. In FIG. 25A, a stop face 2509 on an outer surface of back body 2508 will engage a corresponding raised surface 2610, (refer to FIG. 26B), and also raised surface 2510, formed within an inner surface of cable boot assembly 2600. A distal portion of back body 2508 is secured to crimp ring assembly 120. Cable boot 2600 is secured about crimp ring assembly 120. Tapered portion 2637 of boot is typically a molded plastic but may be of other material or methods commonly known in the art such a U.S. Pat. No. 9,360,649 Cable Guide of Fiber Optic Cables, Inventor Chang, assigned to the owner of the present invention. Referring to FIG. 25B, a pull force "B" is applied, raised surface 2510 travel ends at stop face 2509. The travel distance is determined to allow access to release the connector but not too long to extend the cable boot beyond connector main body so as to meet data center space needs. Once the surface 2510 and face 2509 engage, protrusion 1934 is depressed rotating down connection device 505, and the connector 2400 can be release from adapter housing, as depicted in FIG. 32B below. Connector 2400 can be removed from adapter housing. This occurs because connection device 805 is fully rotated down, RD, near top housing 105 of connector. As shown in FIG. 25B the cable boot 2600 is moving about back body 2508 as the connector is being pulled in direction "R". FIG. 25C depicts a zoomed view of FIG. 25B further depicting back body 2508, which is within cable boot 2600. Upon pulling cable boot in direction of "R", cable boot 2600 moves about back body 2508, in a longitudinal direction, in this non-limiting example, a distance 2522.

FIG. 26A depicts the cable boot assembly 2600. A recess 2407 substantially circumferential around an outer surface of cable boot 2600 accepts tabs (2421*a*, 242*b*) of FIG. 24D to secure push/pull clip 2420 onto connector 2400 body. At a proximal end of cable boot 2600 one or more raised surfaces (2610*a*-2610*d*), are spaced about an inner surface of the boot. The spacing corresponds to a stop face 2509 formed as part of back body 2508. FIG. 26B depicts an offset-rear view that illustrates the raised surfaces 2610 spaced equally around an inner surface of boot 2600. The raised surfaces 2610 engage and hold in front of its corresponding back post stop face 2509, when a pull force R is applied to the boot. As the boot is pulled further, the entire push/pull clip 2420 is pulled distally or rearward, which in turn releases connector latch 805 from adapter 2403, as protrusion 1034 is depressed. FIG. 26C depicts an end on view of boot 2600 with a plural of raised surfaces 2610*a*, 2610*b*.

Figure 27:
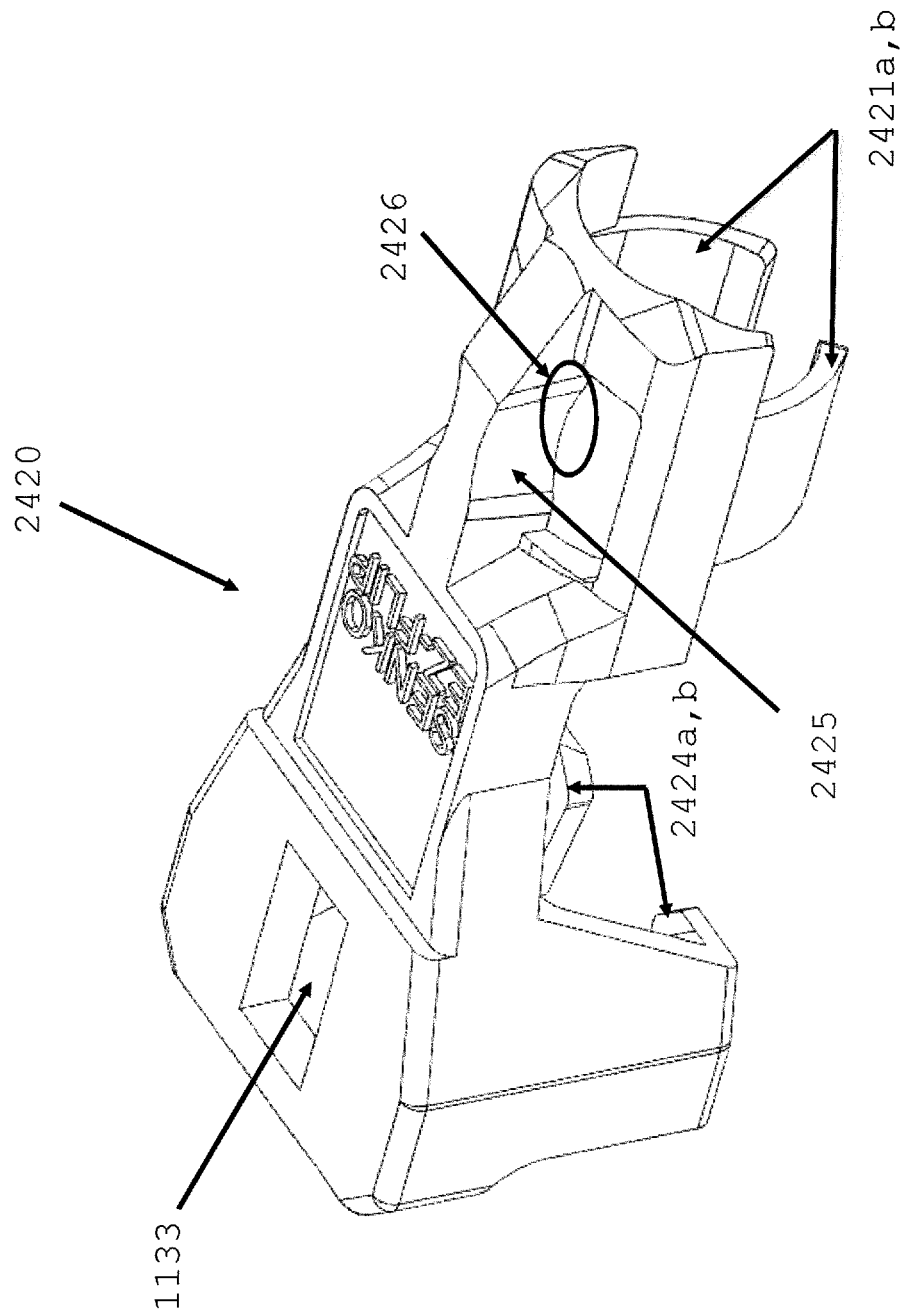
FIG. 27 is a perspective view of a push/pull clip-on used in the connector of FIG. 24A.

FIG. 27 depicts push/pull clip on 2420. Window 1133 retains connector release protrusion 1034. Indent surface 2425 allows a user to apply pull force to clip 2420 directly. Tabs (2421*a*, 2600*b*) flex around cable boot 2600 recess 2407 when attaching clip 2420 to connector 2400.

Figure 28B:
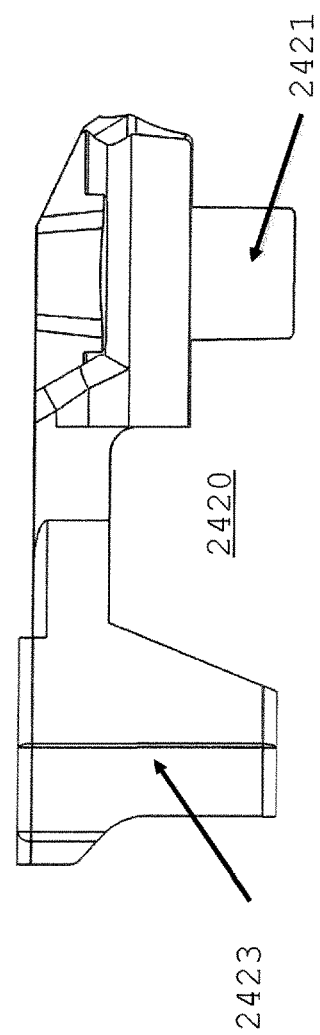
FIG. 28B is a side view of FIG. 27.
Figure 28A:
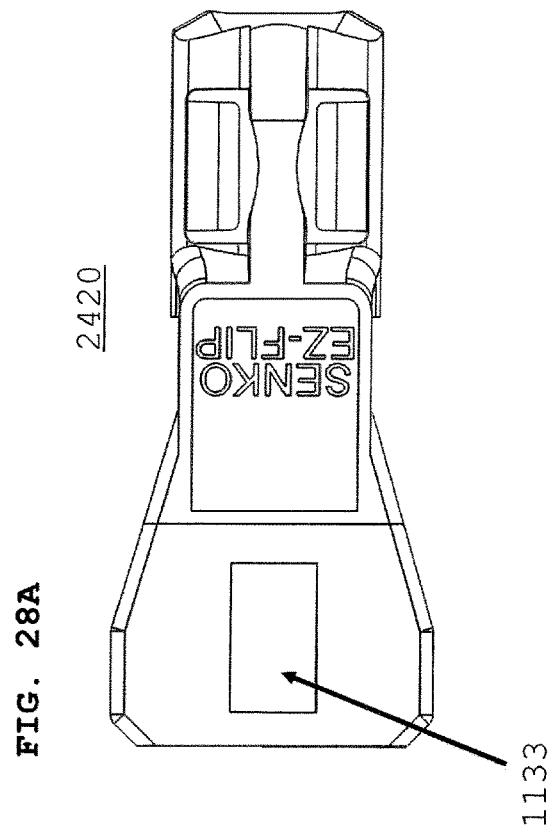
FIG. 28A is a top view of FIG. 27.

FIG. 28A depicts a top view of clip 2420 showing the outer dimensions of window 1133. The window is sized and shaped to accept protrusion 1034 that releases connector from adapter by rotating down connection device 805, as described above. FIG. 28B depicts a side view of push/pull clip 2420 illustrating extended legs 2423 and tabs 2421. Opposing leg and tab not shown.

FIGS. 29A-29D is a pictorial of assembling push/pull clip 2420 onto cable boot assembly 2600. FIG. 29A depicts clip 2420 showing tabs 2421 being inserted onto boot 2600 recess 2407 of FIG. 24C. Tabs 2421 are secured in recess 2407 as tabs are flexible and undersized respective to recess outer diameter to cause a friction fit between wing and recess. The final assembly is shown in FIG. 29D. In call-out 2930, the fit between window and recess is shown. Also upon pulling boot rearward, pull or release force "R" (refer to FIG. 30B for "R") is transmitted generally along dotted line "C", as the clip is an integrated one-piece design. FIG. 29B is a side view of securing clip 2420 onto boot 2600 (in direction of arrow A), and the final assembly is shown in FIG. 29B.2 as assembly 2900.

Figures 31A, 31B:
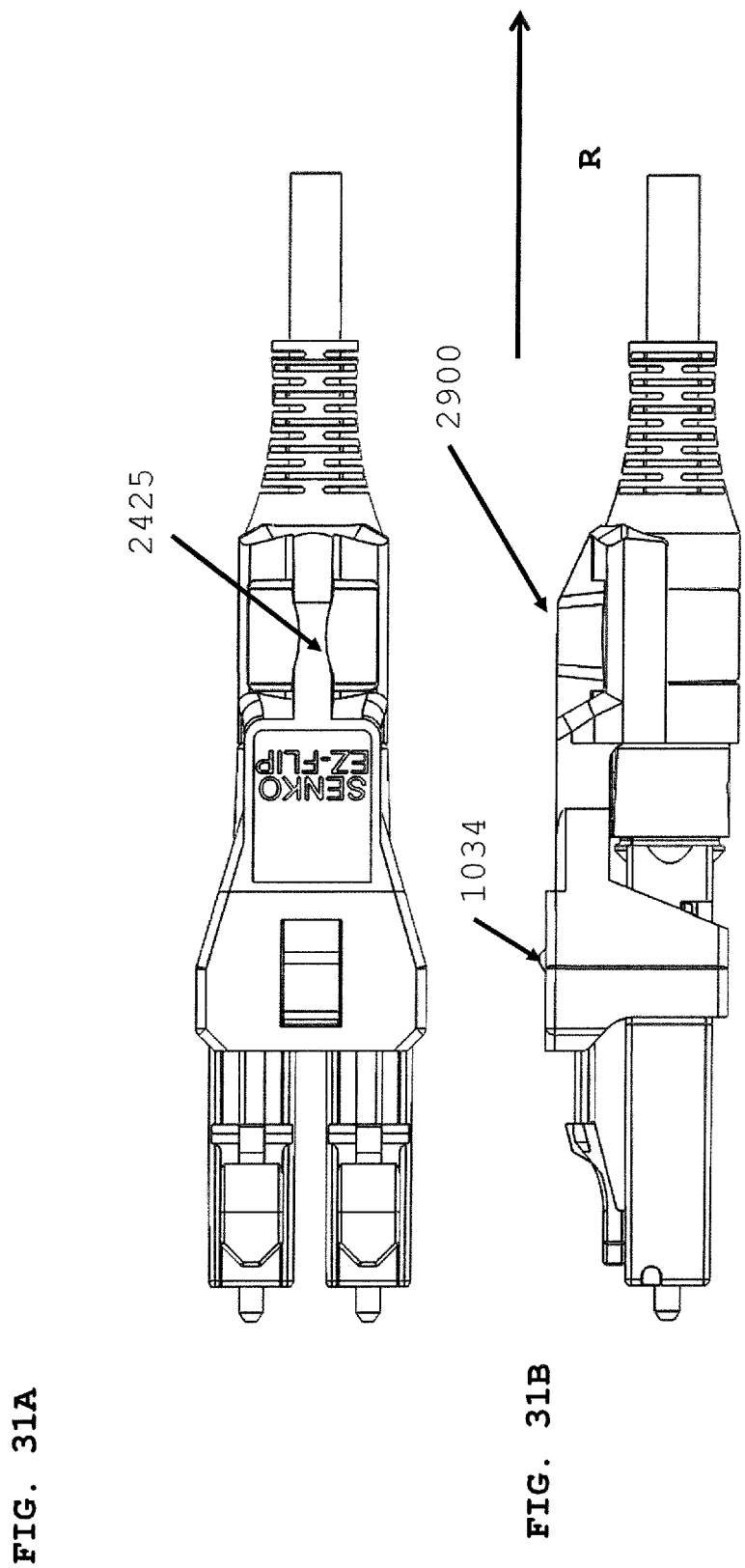
FIG. 31A depicts a top view of FIG. 30A.
FIG. 31B depicts a side view of FIG. 30B.

FIG. 30A depicts connector 2400 with push/pull clip 2420 prior to applying force "R", FIG. 30B, where raised surface 2510 engages stop face 2509, once connector pull distally. The distance of travel d distally from DL datum line is determined by data center space needs along A-A'. FIG. 31A a top view of connector 2400 where user may apply pull force at indent surface 2425. FIG. 31B depicts a side view of clip/boot assembly 2900 secured onto connector 2400, and direction "R" of release force applied.

FIG. 32A depicts connector 2400 with clip/boot assembly 2900 inserted thereon. When connector 2400 is in a first position out of the adapter housing or secured within an adapter housing, connection device 805 rotates up RU to its original configuration, where protrusion 1034 is through window 1133. The stored force, SF (FIG. 32B) returns device 805 to its original position. The stored force came from user pulling in direction of "R" on boot/clip assembly 2900. Referring to FIG. 32B, user applies pull/release force "R" in a distal direction. Protrusion 1034 engages with at least one wall of face 1133a of window 1133, and protrusion rotates down, RD, as wall face 1133a engages with protrusion ramp surface. The pull force energy R, is stored at SF. Once connector 2400 is clear of adapter opening or housing, the SF is released and RU rotates up connection device 805 to a first position, and protrusion 1034 rotates up into window 1133. The pull distance resulting from "R" pull forces is depicted and described in FIGS. 30A, 30B and 36C.

FIG. 33A depicts another embodiment of push/pull clip 3300A further comprising an undercut protrusion 2427 on an inner surface of wing 2421. So when assembling push/pull clip onto boot assembly 2600 using recess 2407, the recess has a cutout 2428 (refer to FIG. 33B) that accepts undercut protrusion 2427. This aids in securing the clip 3300A, and prevents rotation about recess 2407, improving clip 3300A stability by reducing or eliminating any inadvertent rotation of clip about cable boot 3300B. FIG. 33B depicts cable boot 3300B accepting undercut protrusion 2427 into recess 2428 near a mid-point of body portion 2429.

Referring to FIG. 33C, a front view of push/pull clip 3300A with undercut protrusions 2427 and FIG. 33D shows recess 2428 within body portion 2429 of cable boot 3300B from at proximal end "P". Dotted line L shows the assembly path to secure clip 3300A to boot 3300B using undercut protrusion 2427 and recess 2428. FIG. 33E shows an end proximal view of clip 3300A assembled with boot 3300B.

Figure 34C:
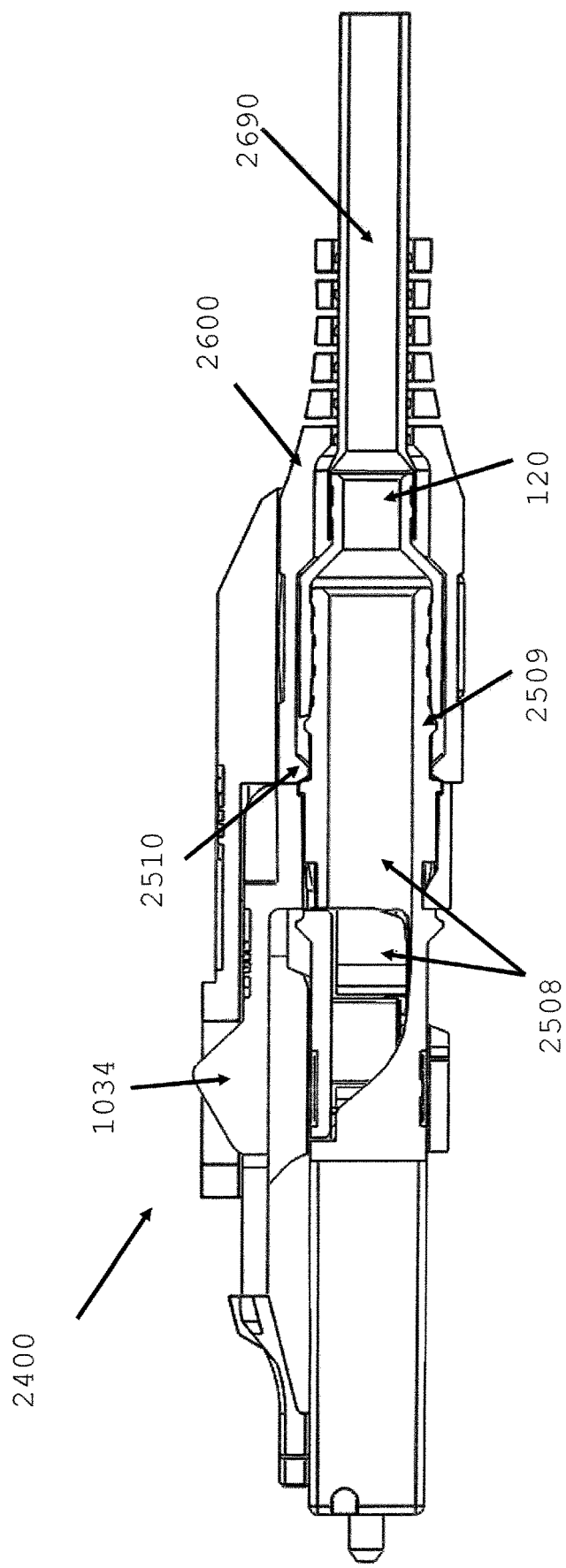
FIG. 34C is a cross-section view of FIG. 34B (adapter not shown).

FIG. 34A depicts connector 2400 with clip/boot assembly 2900 or clip/boot assembly 3300E installed as part of fiber optic connector 2400. Connector 2400 is inserted into an adapter 2403. In this first position, protrusion 1034 is not depressed under the force of window 1133. FIG. 34B is a side view of FIG. 34A with connector 2400 secured within adapter 2403. FIG. 34C is a cross-section of FIG. 34B, installed in adapter (not shown). The distance between 2510 and 2509 is a representative, non-limiting distance when the connector 2400 is in a first position. Cable 2690 is secured using crimp ring 120 to cable boot 2600 and back post 2509, which allows cable boot to move above back body 2508.

FIG. 35A depicts connector 2400, with either embodiment of clip/boot assembly (2420, 2900) with cable boot (2600, 3300B) while connector 2400 is being removed from adapter 2403 under force R. As connector 2400 is pulled distally using cable boot 2421, cable 2690 or push/pull clip 2420, protrusion 1034 is depress by window face 1133a and this releases connection device 805 from adapter inner securing structure. FIG. 35B depicts a distance "D" when protrusion 1034 is fully depress and connector is released from adapter. FIG. 35C is a cross-section of FIG. 35B without adapter structure. As raised surface 2510 continues to engage stop face 2509, connection device 805 is rotated down "RD" toward housing 105, as window 1133 surface engages and depresses protrusion 1034. FIG. 25 further depicts back body 2508 capture within cable boot 2600 or 3300B opening at its proximal end "P".

FIG. 36A depicts connector 2400 removed from adapter opening, and connector protrusion 1034 is in a normal or first position. FIG. 36B is a side view of connector 2400 removed from an adapter 2403. FIG. 36C is a cut-view of connector 2400 after removal from adapter housing 2403. FIG. 36C illustrates connection device 805 has returned to its normal position, (and this is the same position if latched within adapter housing). Further there is a gap 3622 where raised surface 2510 is forward of stop face 2509. The length of gap 3622 is a non-limiting pull distance or release distance "R" to release connector 2400 from adapter housing 2403 latching (not shown). As cable boot 2512 is pulled rearward, the boot travels over back body 2508 until raised surface 2510 reaches stop face 2509. This results in releasing connector 2400 from adapter housing, as shown and described in FIGS. 32A, 32B.

FIG. 37 depicts push/pull clip 2420 integrated with cable boot 2600 with a permanent ring 2424c, which is molded as one-piece with cable boot 2600.

FIGS. 38A-42G depicts an embodiment using a SC or standard connector. FIG. 38A is a perspective view of present invention connector 3800 deploying a cable push/pull boot assembly 4000 (refer to FIG. 40). FIG. 38B depicts call-out of FIG. 38A. Connector 3800 outer housing 3831 further comprises an opening 3933 (at FIG. 39A) that is configured to secure protrusion 3813. When protrusion 3813 is secured within opening 3933, and a user pulls in direction "R", connector 3800 can be released from an adapter housing 3900 (refer to FIGS. 39, 42). As user pulls, outer housing 3831 travels in a distal direction "D", beyond and over back body face 3808a in direction of arrow in circle 3809a. Moving distally over face 3808a requires moving over back body 3808 (refer to FIG. 38D.2). A user can pull on cable boot 2612 or its tapered portion 2630 or outer housing 3831, to release connector 3800 from an adapter housing.

FIGS. 38C.1 and 38D.1 depict a prior art SC connector 3800PA and connector 3800 of the present invention. FIG. 38C.1 depicts a call-out circle shown in exploded view of FIG. 38C.2. FIG. 38C.2 illustrates outer housing 3831 with an inner protrusion (i.e. circled) that engages back body 3808 at stop face 3809b, to prevent a user employing a normal pull force (e.g. not to damage connector from pulling outer housing rearward, as achieved in the present invention as shown in FIG. 38D.2. FIG. 38D.2 depicts the present invention with cable boot assembly 4000 (refer to FIG. 40), that a user can pull rearward in direction of arrow, and outer housing 3821 moves about back body 3808 and over as shown 3809c, in a longitudinal direction.

FIG. 39A depicts outer housing 3900 for the present invention. The cable boot assembly 4000 is inserted at a distal end "D". Opening 3933 accepts protrusion 3813 (refer to FIG. 38D.2). Outer housing 3831 further comprises an alignment key 3931a. FIG. 39B depicts a pair of openings 3933a and 3933b that can accept first and second protrusion. A pair of protrusions further secures cable boot assembly 4000 within outer housing 3831. The present invention can be practiced using one protrusion.

Figure 40:
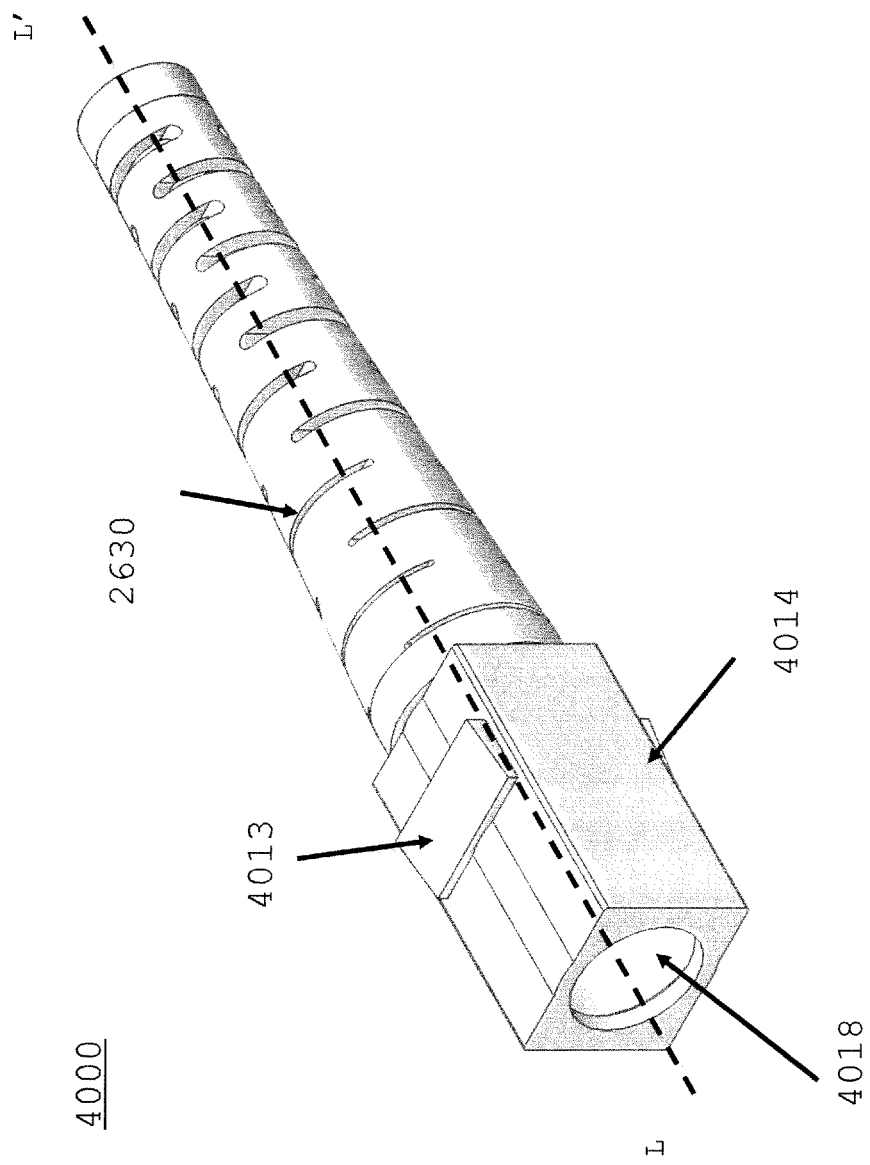
FIG. 40 is a perspective view of a cable boot release assembly.
Figure 41A:
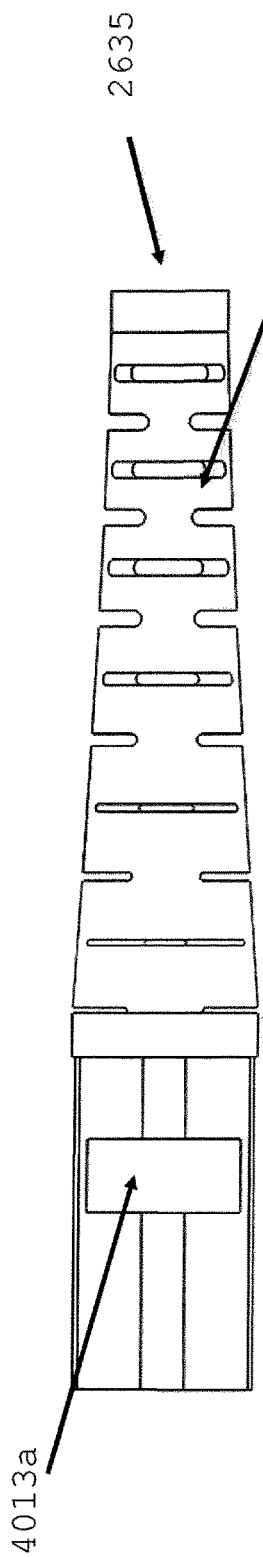
FIG. 41A is a perspective top view of FIG. 40.
Figure 41B:
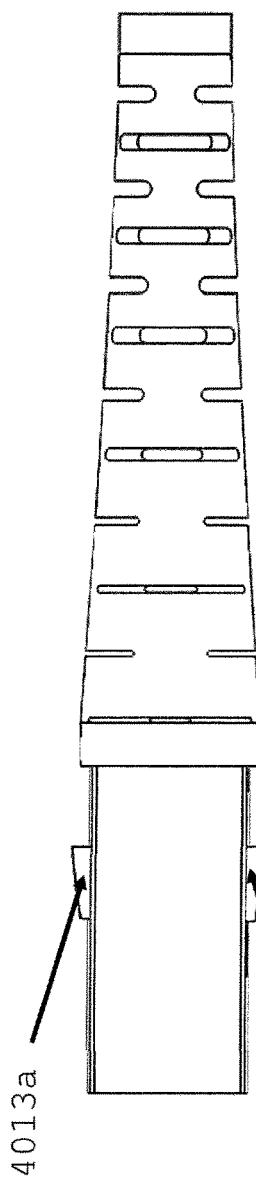
FIG. 41B is a perspective side view of FIG. 40.
Figure 41C:
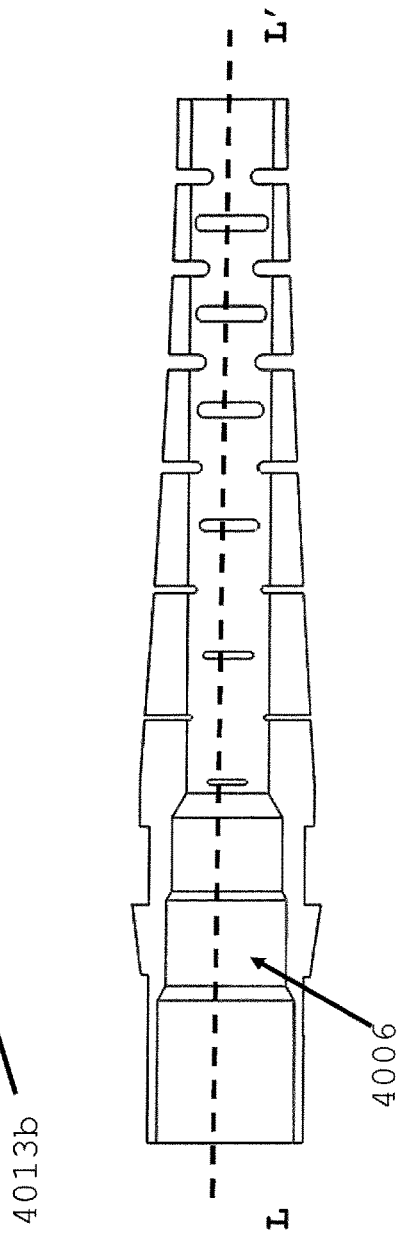
FIG. 41C is a perspective section view of FIG. 40.

FIG. 40 depicts a second embodiment of a cable boot assembly 4000. Assembly 4000 further comprises a body 4014 with at least one protrusion 4013 on one side of the body. Body 4014 has a bore 4018 that extends longitudinally L-L' through assembly 4000. The cable boot 2630 is molded with body 4014. FIG. 41A is a top view of FIG. 40 showing a first protrusion 4013a, cable boot 2630 and distal entry point of a fiber optic cable 2635. FIG. 41B is a side view of a cable boot assembly having two protrusions (4013a, 4013b). FIG. 41C is a side view with a cut-away showing internal structure configured to accept a crimp ring assembly 4006 within a portion of longitudinal bore L-L'.

Figure 42C:
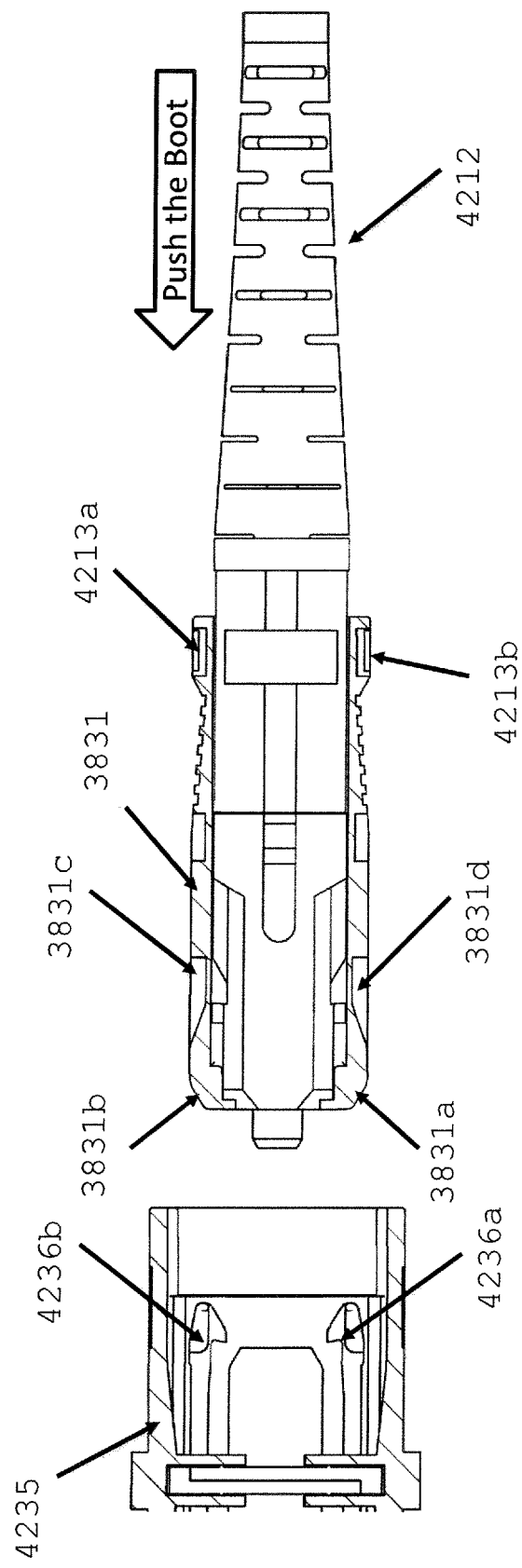
FIG. 42C is a cross-section view of connector of FIG. 38A prior to insertion into an adapter shown as a cross-section.

FIG. 42A is a side view cross-section of connector 3800 with cable boot 4212 (i.e. cable boot assembly 4000), and crimp ring assembly 4206 (refer to FIG. 42B) within cable boot bore 4018. To insert connector into an adapter housing (not shown), user would apply a force in the direction "Push". FIG. 42B is a side view cross section of connector 3800 being removed from an adapter housing (not shown) in direction of "PULL". FIG. 42B further depicts solid slanted lines overlapping crimp ring assembly 4206. And dotted lines overlapping cable boot 4212. Cable boot 4212 bore accepts crimp ring assembly 4206 and secures crimp ring assembly within cable boot bore by press fit, as a non-limiting method. As shown in FIG. 42C, a pair of protrusions (4213*a*, 4213*b*) secure cable boot assembly with crimp ring within outer housing 4231.

Figure 42D:
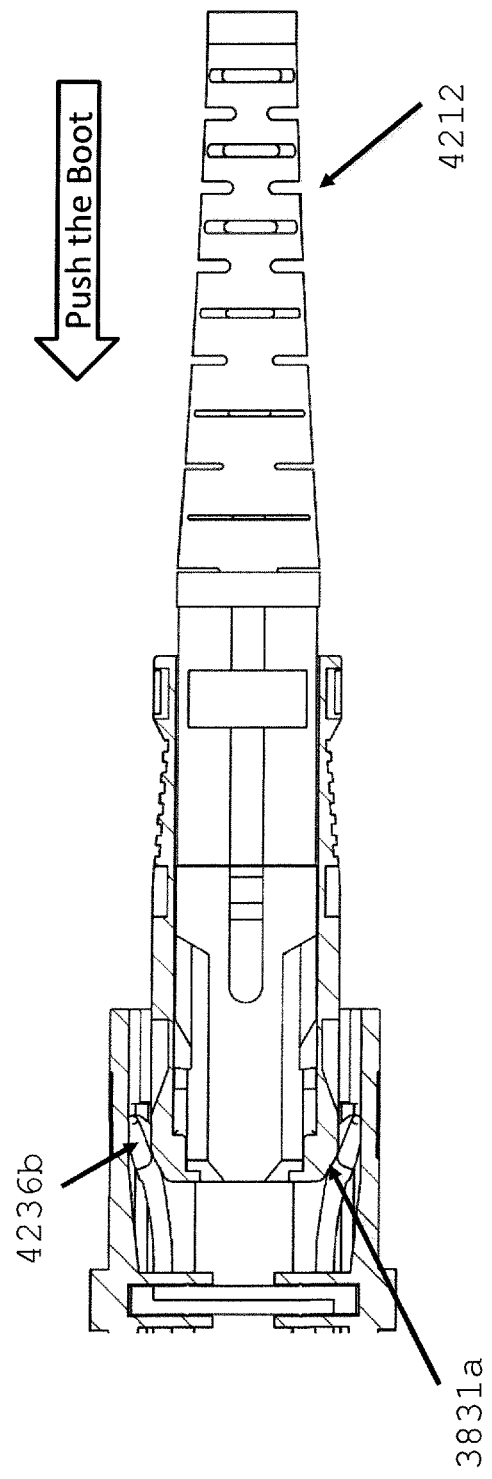
FIG. 42D is a partial insertion of connector into adapter of FIG. 42C.
Figure 42E:
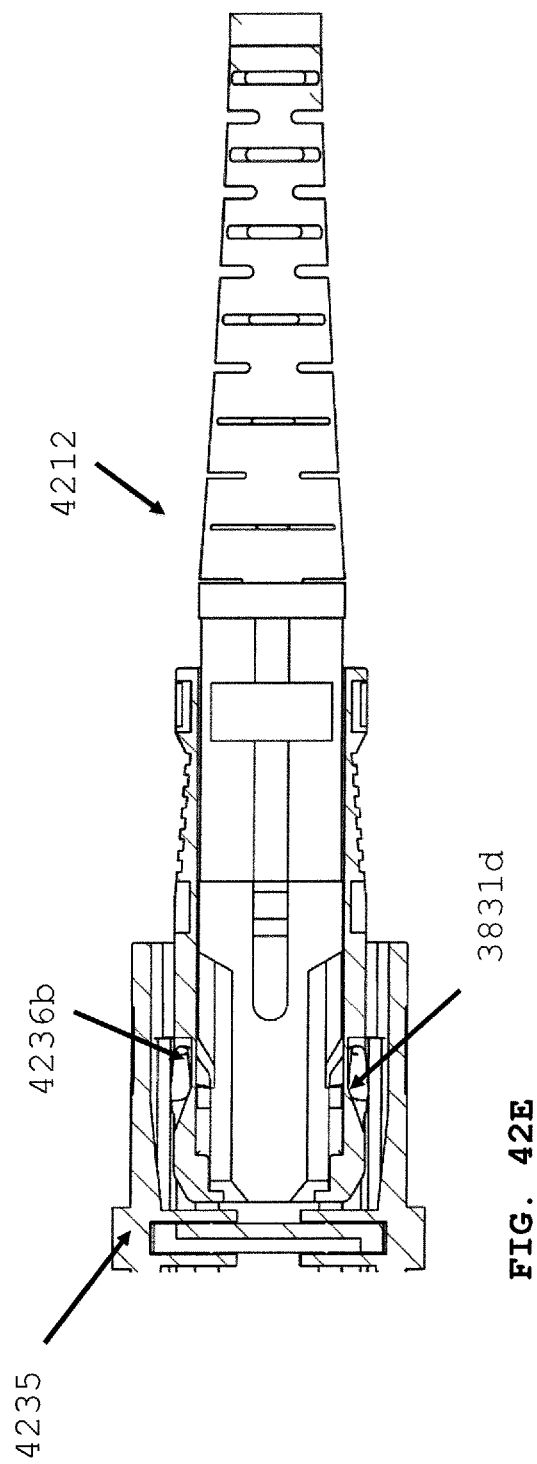
FIG. 42E is a connector fully inserted into adapter of FIG. 42C.
Figure 42F:
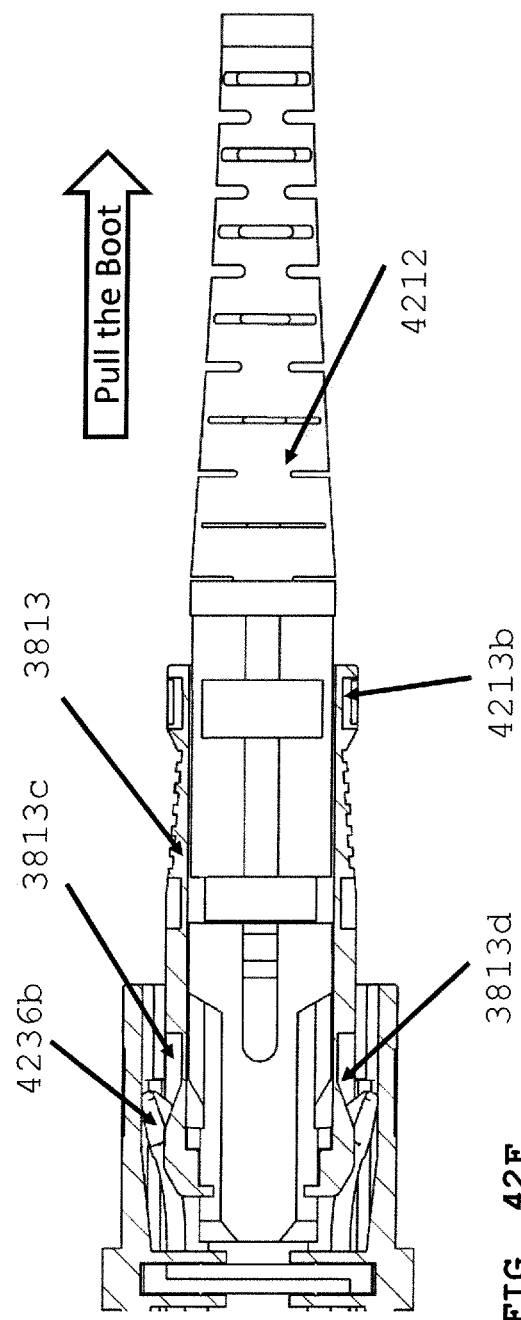
FIG. 42F is a partial removal of connector of FIG. 38A from an adapter housing.
Figure 42G:
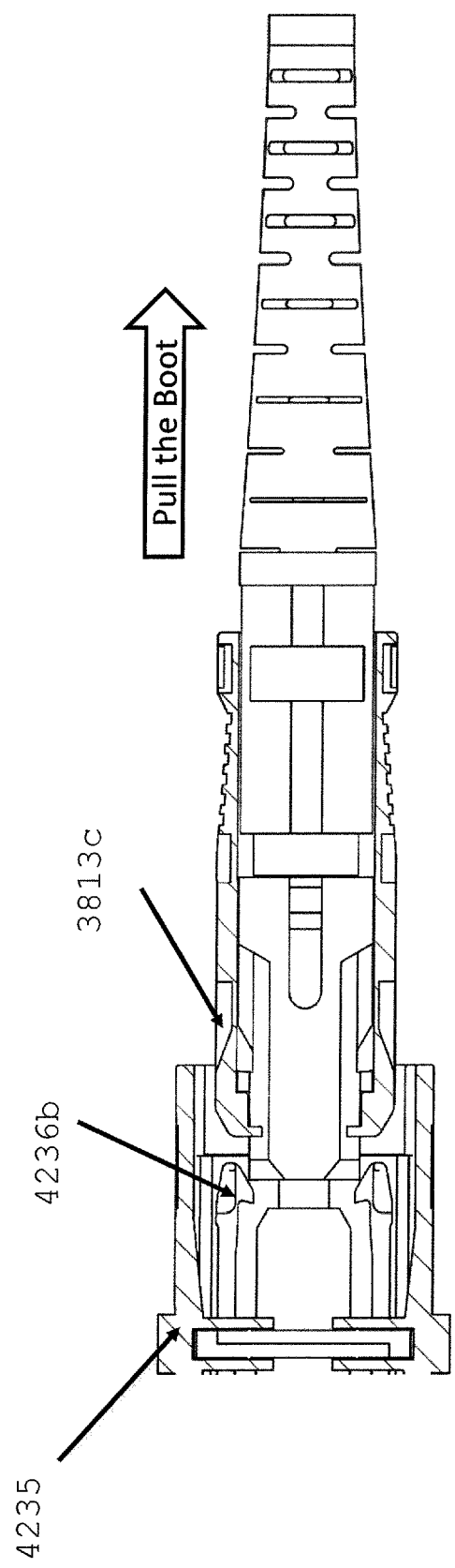
FIG. 42G is connector of FIG. 38A removed from the adapter.

Continuing with SC connector embodiment, FIGS. 42C through 42E shows method of securing connector 3800 into an adapter housing 4235 opening. FIGS. 42F and 42G show removing connector 3800 from adapter housing 4235. FIG. 42C depicts adapter housing 4235 with a pair of latches (4236*a*, 4236*b*) that secure to connector recess (3831*c*, 3813*d*). Recesses (3831*c*, 3831*d*) are formed as part of inner housing 3831. A pair of protrusions (4213*a*, 423*b*) secures cable boot 4212 to outer housing 3831. As depicted in FIG. 42D, user pushes on cable boot, in direction of arrow "Push the Boot", latches (4236*a*, 4236*b*) are lifted as latch face engages connector front faces (3831*a*, 383*b*). As depicted in FIG. 42E, once user completes connector to adapter mating, latches (4236*a*, 4236*b*) come to rest in recesses (3831*c*, 3831*d*).

FIG. 42F depicts pulling on cable boot 4212 or at outer housing 3813 in direction of arrow "Pull the Boot". Protrusions (4213*a*, 4213*b*) secured to outer housing 3831, pull outer housing rearward. Latches (4236*b*, 4236*a*) are lifted out of respective recesses (3831*c*, 3831*d*), as shown. FIG. 42G depicts cable boot pulled rearward, in direction of "Pull the Boot" a sufficient distance to release connector 3800 from adapter housing 4235. Latch (4236*b*, 4236*a*) is removed from recess (3831*c*, 3831*d*) that unlocks or releases connector from housing.

Figure 43:
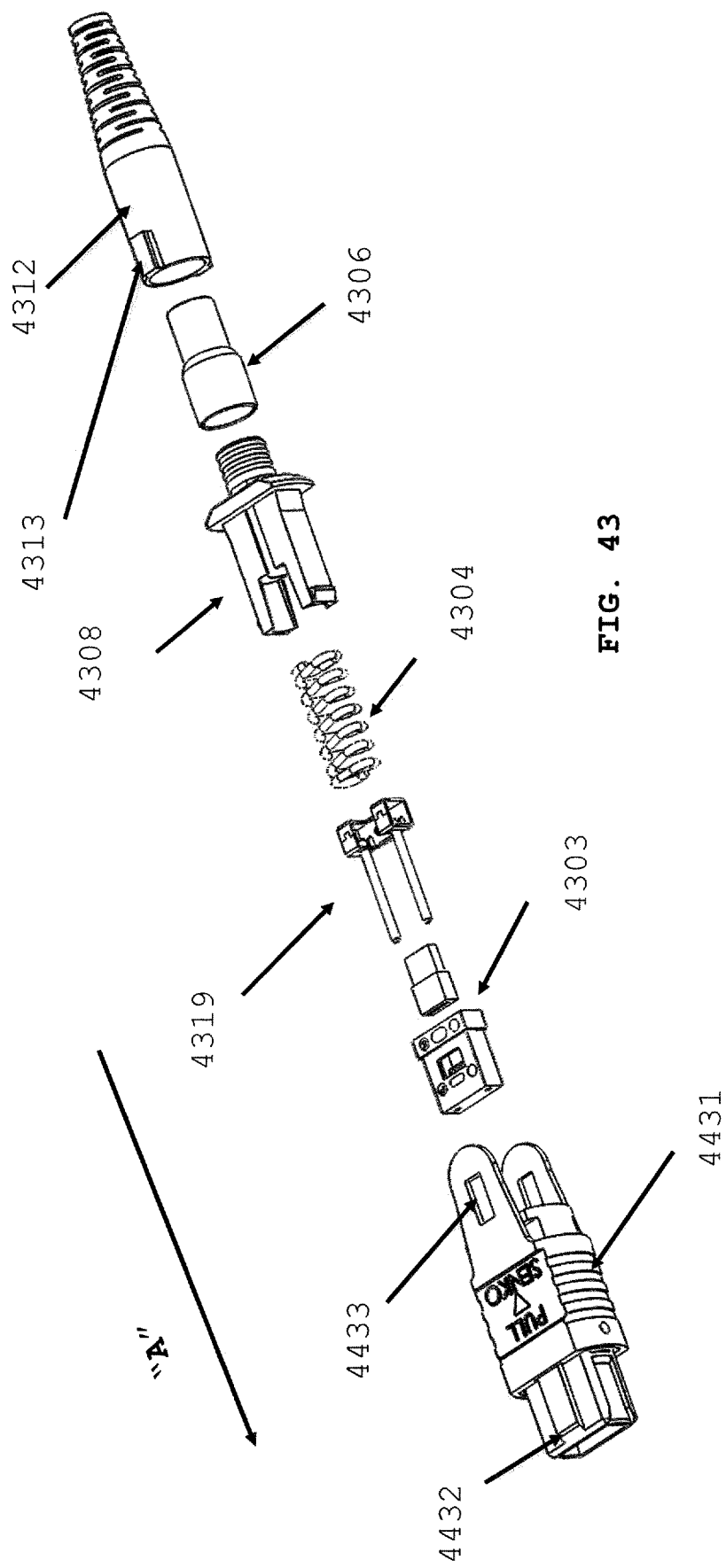
FIG. 43 is an exploded view of MPO connector deploying a cable boot release.

FIG. 43 depicts an exploded view of a MPO connector embodiment of a cable boot release invention, assembled in the direction of arrow "A". Cable boot 4312 has at least one protrusion 4313 that is accepted within an opening 4433 on an outer housing 4431. Outer housing 4431 is configure to slide over an inner housing 4432, as is discussed in U.S. Pat. No. 9,658,409B2 Optical Fiber Connector with Changeable Polarity, Jeffrey Gniadek, currently assigned to the assignee of the present invention. The MPO connector further comprises a back body 4308, bias spring 4304, pin keeper 4319, and mechanical transfer or MT ferrule 4303.

Figure 44:
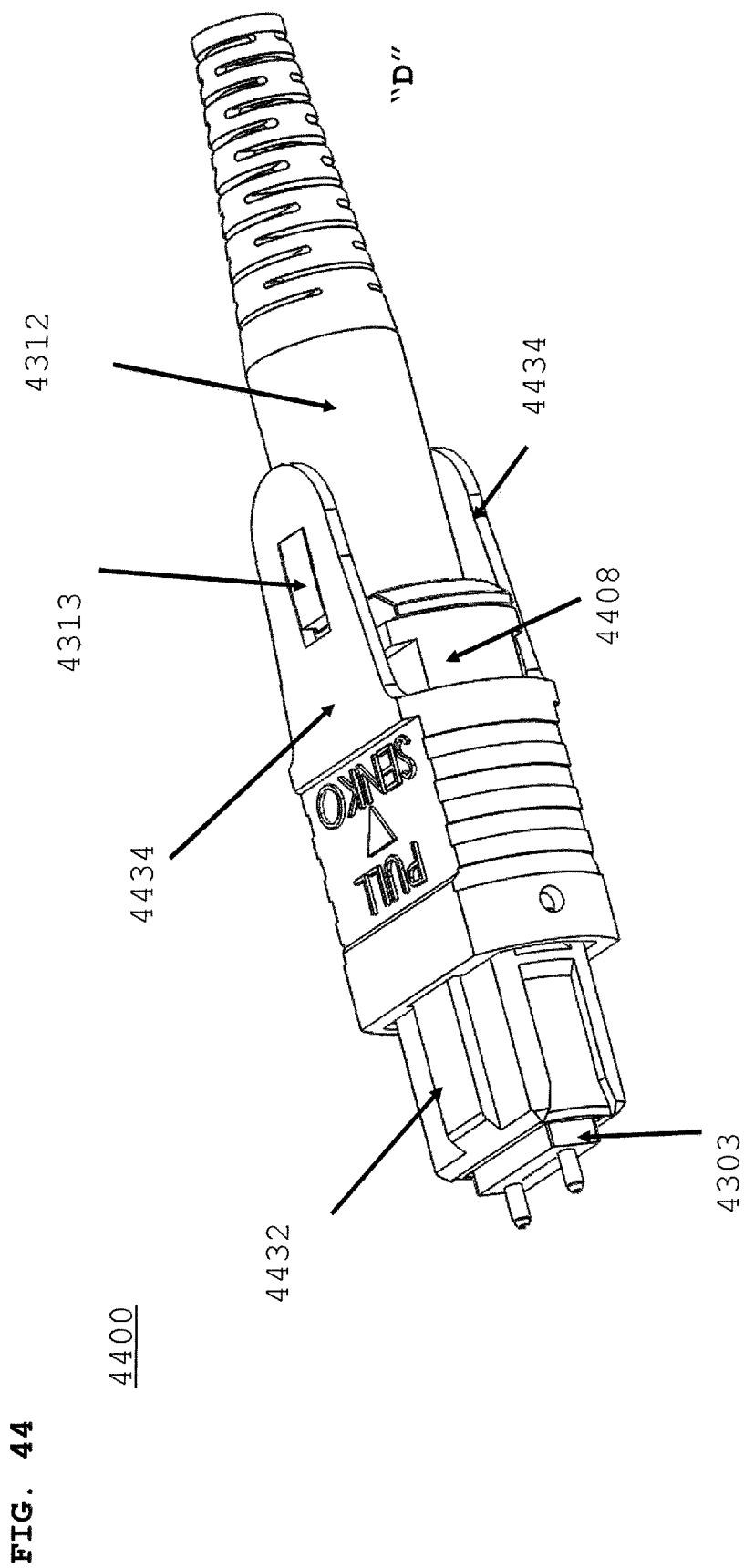
FIG. 44 is an assembled view of MPO connector of FIG. 43.

FIG. 44 depicts an assembled MPO connector 4400. Cable boot 4312 protrusion 4313 is within opening 4433 formed as part of an ear or flap 4434 extending from outer housing 4431 toward a distal end "D" of connector 4400. Outer housing 4431 moves over back body 4408, when cable boot 4412 or outer housing 4431 is pull in a distal direction or direction of "Pull" as depicted in FIG. 50B.

Figure 45:
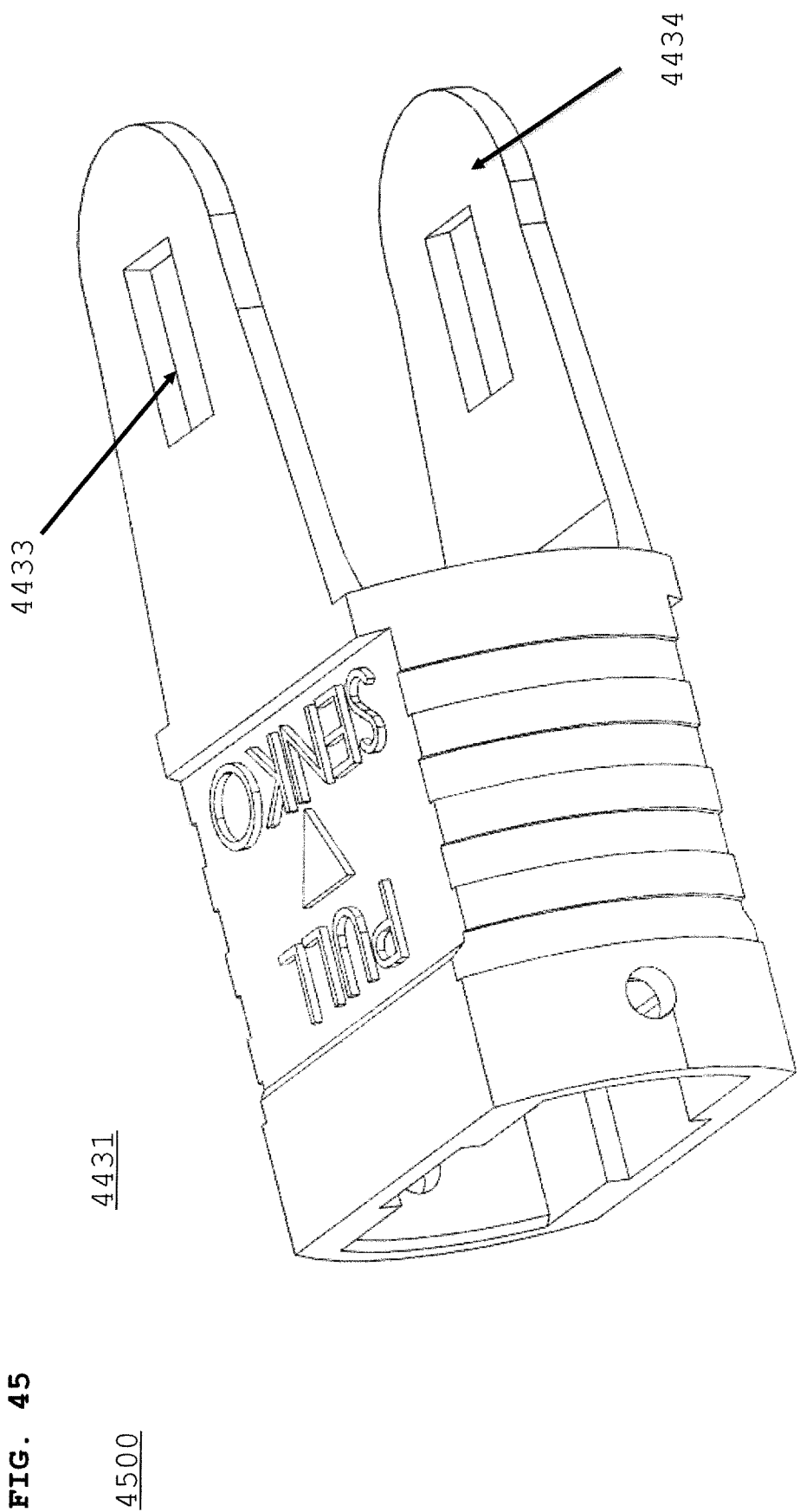
FIG. 45 is a perspective view of outer housing of FIG. 43.
Figure 46:
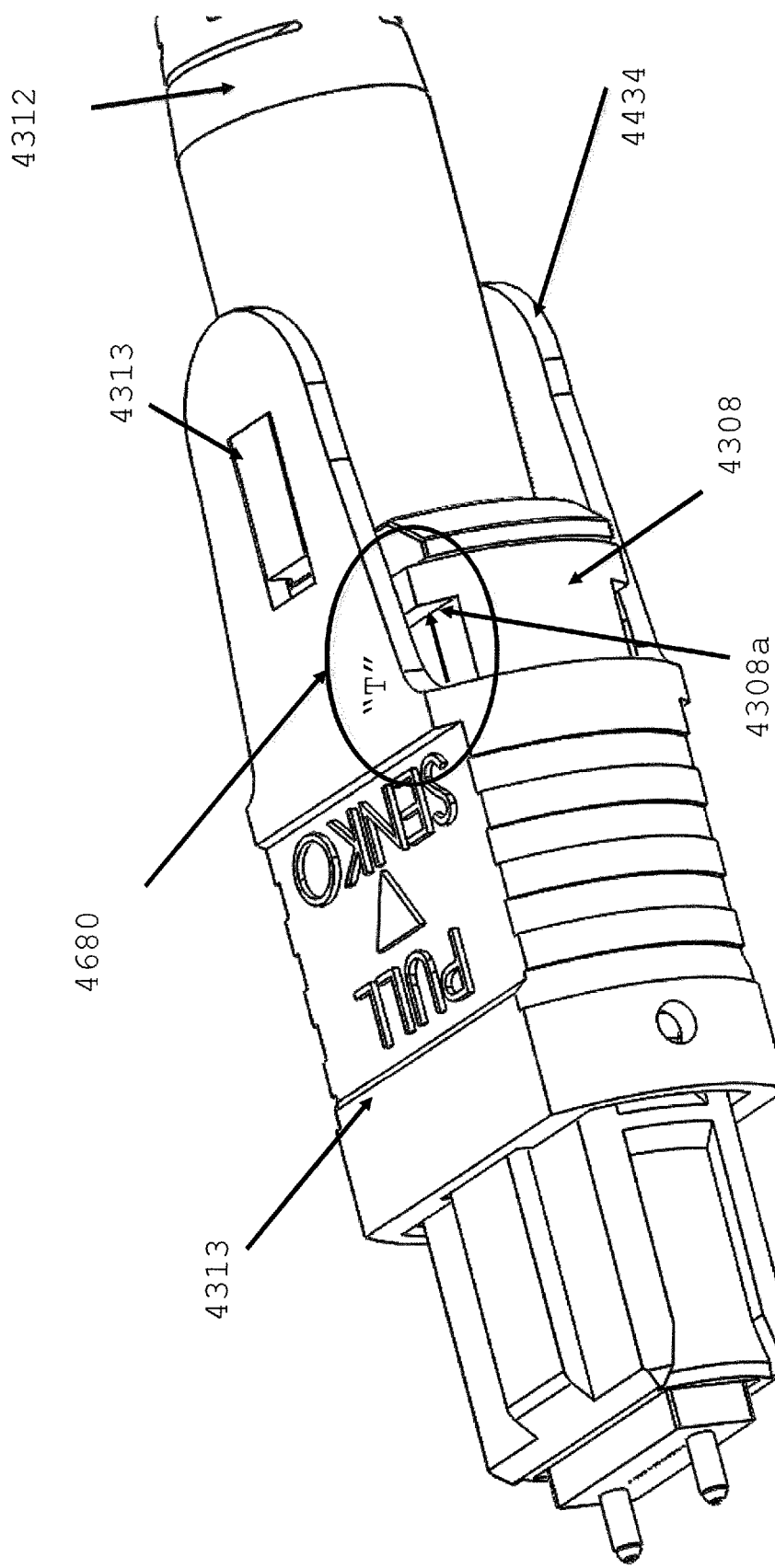
FIG. 46 is a call-out of release distance pulling on cable boot.
Figure 47:
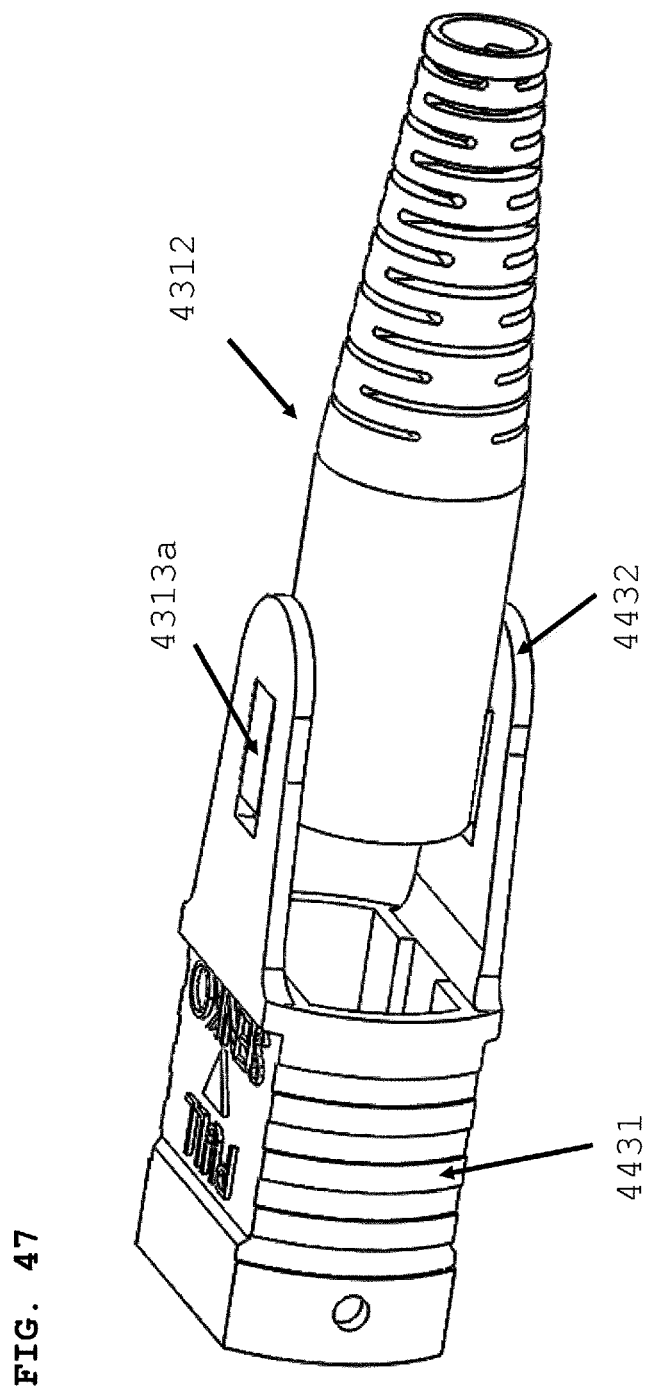
FIG. 47 is a rear perspective view of cable boot attached to outer housing of FIG. 44.

FIG. 45 depicts outer housing 4431 with ears or flaps 4434 and opening 4433 molded in each flap. Opening 4433 accepts a corresponding protrusion 4313 molded as part of a cable boot 4312. As shown in FIG. 43, cable boot 4312 is inserted over a distal end of crimp ring 4306. The crimp ring is secured to a distal end of back body 4308 via internal threads on crimp ring attached to threaded portion of back body, as shown in FIG. 43. FIG. 46 depicts stop face 4308*a* of back body 4308. The travel distance "T" 4680 ensures outer housing 4431 is pulled rearward to release connector from adapter housing. The processing of pulling rearward housing 4313 overcomes spring 4304 (refer to FIG. 51B) and outer housing springs (4914*a*, 4914*b*) (refer to FIG. 49A). FIG. 47 is a side perspective view of outer housing 4431 attached to cable boot 4312 via protrusions (4313*a*, 4313*b*). Opposite side protrusion 4313*b* is not shown.

FIG. 48A depicts assembled MPO connector 4400. FIG. 48B is a cross section along section A-A' of FIG. 48A, cable boot 4312 is secured about crimp ring 4306. FIG. 48B depicts, cable boot 4312 moving about back body when it is pulled rearward or in a distal direction. Cable boot protrusion 4313*a* is secured through outer housing opening 4433*a*, which upon pulling rearward cable boot 4312 or outer housing 4431, the cable boot moves about back body and rearward (in a longitudinal direction), which pulls back outer housing releasing it from an adapter not shown. The cable boot or outer housing may be pushed or pulled in either direction A-A°. Pushing along "A" would secure connector within an adapter.

Figure 49A:
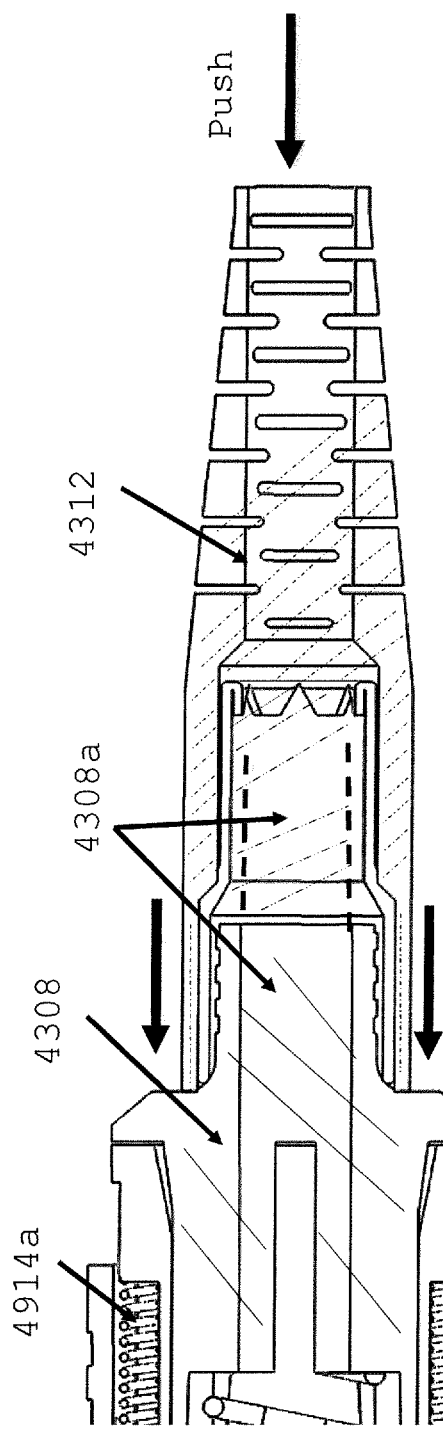
Figure 49B:
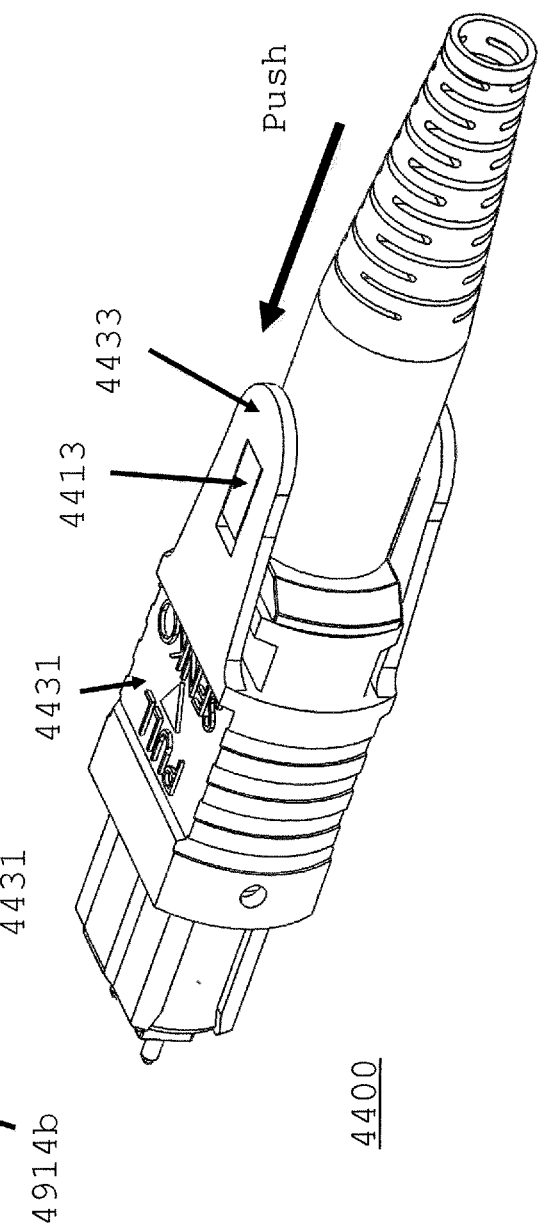

FIG. 49A depicts a cross-section of connector 4400. In this operation, a user is pushing on cable boot 4312 in direction of "Push" arrow, to secure connector 4400 in an adapter (not shown). Cable boot 4312 shown by dahs-dot-dash lines surrounds and is secured to crimp ring 4306 shown by dash double dot lines. Back body 4308 is secured within crimp ring at a proximal side thereof, as shown by horizontal dashed lines. Back body 4308 is shown by slanted, solid lines. In a push operation, cable boot moves over back body as shown in direction of arrows. This depresses outer housing springs (4914*a*, 4914*b*) proximally, and when inserted into an adapter the inner housing is secured to latch within said adapter as shown in the prior art. Connector and adapter latching and de-latching operation is improved over the prior art by the pushing and pulling on the cable boot. FIG. 49B depicts an assembled connector 4400 at the onset of pushing on the cable boot.

FIG. 50A depicts a side view prior to pulling on cable boot 4312 to release connector from an adapter housing. A substantial amount of back body 4308 is shown prior to pulling on cable boot. FIG. 50B depicts pulling on cable boot 4312 or housing 4431 pull distally away from "DL" or datum line about back body 4308. FIG. 50B shows inner housing recess 4432*a* which secure adapter inner latches when connector 4400 is secured within an adapter housing. The outer housing 4431 is pulled distally to expose recess, and under a "Pull" inner housing 4432 is released from adapter. The user may pull by holding on to the outer housing 4431 or by the cable boot 4312, or cable (shown in FIG. 51A). It is known to one in the art, a cable with fiber strands is enters an opening at a distal end of the cable boot.

FIG. 51A depicts a cross section of side view of connector 4400. Inner gap 5100*a* is proportional to "Travel" (refer to FIG. 51B) that is required to release connector from adapter. Referring to FIG. 51B, as cable boot 5112 is "Pull" distally, gap 5100*b* is formed which is smaller than gap 5100*a*.

Figure 52:
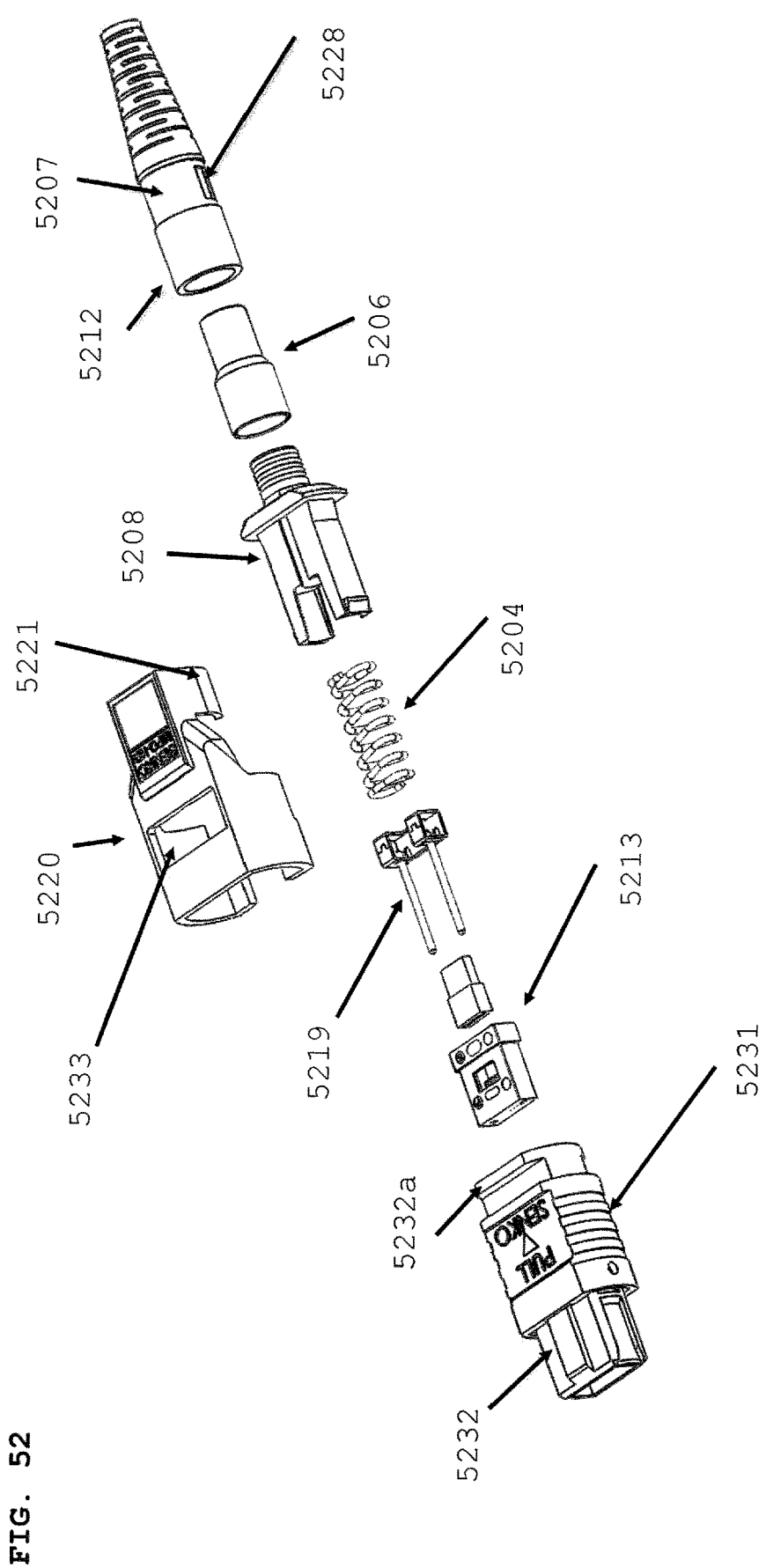

FIG. 52 depicts an exploded view of a second embodiment of a MPO cable release connector 5300. An inner housing 5231 is surrounded by an outer housing 5231. A stop face 5223*a* on inner housing 5223 restricts rearward pull as described above in connector 4400. A pin keeper 5129 accepts a ferrule assembly 5513. A bias spring 5204 urges pin keeper and ferrule assembly forward. Spring 5204 is secured within a proximal end of back body 5209. Back body 5208 is secured to a crimp ring 5206, and a cable boot assembly 5212 is secured to crimp ring 5206. As explained below, push/pull clip 5220 is secured about cable boot assembly 5212 and outer housing 5231.

Figure 53:
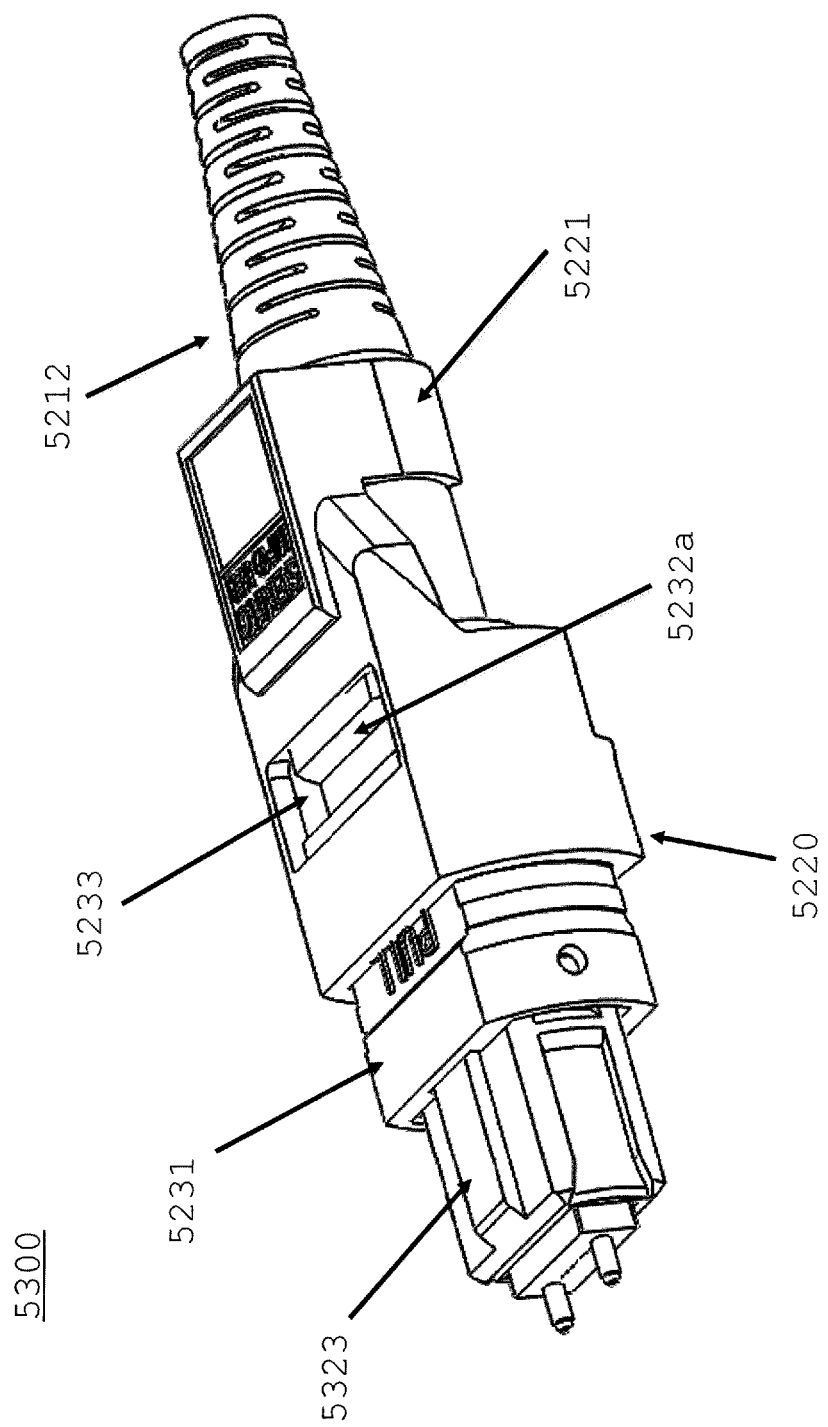

FIG. 53 is a fully assembled MPO connector 5300 of FIG. 52. Push/pull clip 5220 further comprises a window 5533. In operation, as push/pull clip 5220 is pulled distally, outer housing 5231 is stopped a stop face 5208a, at which point connector 5300 is removable from an adapter housing (not shown). Push/pull clip 5220 is secured about cable boot using a pair of flexible, slightly undersized leg 5221.

FIGS. 54A and 54B depict push/pull clip 5220. FIG. 54A depicts proximal end a pair of lead-ins off legs 5521. The lead-ins (5424a, 5424b) stabilize and secure clip 5220 to outer housing 5231. FIG. 54B depicts clip 5220 with opening and a pair of flexible arms (5221a, 5521b) secure about a recess of cable boot assembly 5521. One or each arm further contains a cut-away protrusion 5227 that is secured within a recess within recess of cable boot assembly. The cut-away adds stability during a push/pull operation using the clip 5220 or the cable boot assembly 5212.

Figure 55:
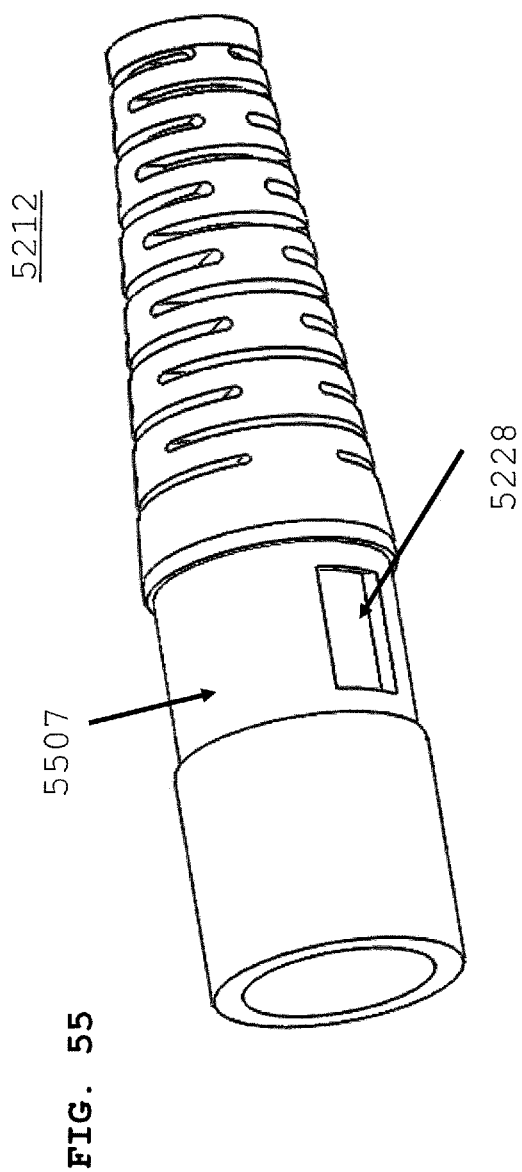

FIG. 55 depicts cable boot assembly 5212 with a recess 5507 configured to accept arm 5221, and a second recess 5228 to accept cut-away protrusion 5227 located on inside of an arm 5221.

FIG. 56A depicts push/push clip 5520 secured about cable boot assembly 5212. FIG. 56B depicts a proximal end view of FIG. 56A, along section B-B'. Cut-away protrusion 5227 is accepted into recess 5228 to add stability to inserting and releasing connector 5300 from an adapter using the clip 5220, or cable boot 5212, or cable 5236. FIG. 56C depicts a two-piece push/pull clip 5620 as opposed to one-piece push-pull clip 5220. A top portion 5670 and a bottom portion are secured using a latch 5227c and a corresponding recess 5228c. Cut-away protrusion 5227 may be formed on an inside surface of top portion 5260 or bottom portion 5672, without departing from the scope of the invention. A second set of latches 5227b and openings 5228b secured top and bottom portions, at a proximal end of two-piece push/pull clip 5620. The openings and latches may be reversed without departing from the scope of this invention. FIG. 56D depicts the two-piece push/pull clip 5620 secured together. Opening 5633 is described above in FIG. 53.

FIG. 56E depicts a side view of two-piece push/pull clip 5620 prior to assembly. Bottom portion 5672 and top portion 5670 are secured together as depicted in FIG. 56F, with latches 5227b and 5227c securing top and bottom portion into a releasably attached two-piece clip 5620.

FIGS. 57A and 57B depict an assembly MPO connector with two-piece clip 5620. To insert connector into an adapter housing (not shown), a user would "Push" the connector in the proximal direction. FIG. 57A depicts back body 5208 over which cable boot moves when connector 5300 is inserted or released from an adapter housing. FIG. 57B depicts stop face on outer housing 5231.

FIGS. 58A and 58B are a side view of connector 5300. FIG. 58A depicts connector 5300 when inserted in an adapter housing. A user pulls distally, (refer to FIG. 58B), in direction of Pull on cable boot, push/pull clip 5620 or outer housing, and outer housing is moved distally by Travel Distance, which corresponds to opening distance (refer to FIG. 57B). The opening strikes back body 5708a stop face, at which point connector is releasable from an adapter housing.

FIGS. 59A and 59B are cross-section views of FIGS. 58A and 58B respectively. Opening distance 5980 is less in FIG. 59B after Pull distally on cable boot 5912. Outer housing 5931 is moved distally as cable boot 5912 is attached to push/pull clip 5620 (as discussed above). As shown in FIG. 59B, clip 5620 is moved distally, and it moves about back body 5980 until outer housing strikes inner housing 5932 flange 5932a. The movement of clip and cable boot assembly is in a longitudinal direction.

FIGS. 60-64 depicts another embodiment of a SC connector push/pull cable boot release. FIG. 60 is an exploded view of a SC connector with a housing 6031, ferrule 6003 within an inner housing 6032, an integrated back body 6008 and a releasably attached cable boot assembly 6012. The SC connector is assembled in direction of arrow "A".

FIG. 61A depicts outer housing 6012 with an inner protrusion 6113b and 6113a (as depicted in FIG. 61B). FIG. 61B depicts a proximal end view of connector outer housing 6012 along C-C', showing inner protrusions (6113a, 6113b). FIG. 61C is a cross-section view of FIG. 61B showing inner protrusions (6113a, 6113b). FIG. 62A depicts cable boot assembly 6212 accepting a cable 6235 at a distal end of assembly 6212. FIG. 62B depicts a top view cable boot assembly 6212 with an opening 6233 that accepts a corresponding inner protrusion 6113. Cable boot assembly has a bore 6218 that accepts cable 6235 at a distal end, and back body 6308 at a proximal end. Body portion is 6214 is sized and shaped to fit with a distal end of outer housing 6031. FIG. 62C is a cross-section view of FIG. 62D along section A-A' at a proximal end of cable boot assembly 6212. FIG. 62C depicts inner bore configured to accept back body 6208.

FIG. 63A depicts a securing plate 6333a with a raised protrusion 6333. FIG. 63A.1 depicts a top view of FIG. 63A showing raised protrusion 6333. FIG. 63A.2 is a side view of FIG. 63A showing protrusion 6333 and channel 6633c. FIG. 63B depicts cable boot assembly 6312 moving about back body 6308 when a user pulls distally in direction of arrow "Pull". A pair of protrusions (6300a, 6300b) are attached to outer housing along "L" shaped channels (6333b, 6633c), of the securing plate (refer to FIG. 63A). The plates are secured to outer housing 6331. Inner housing 6332 is secured into outer housing 6331 as is known in the prior art for a SC connector.

FIG. 63C depicts inserting securing plate (6300a, 6300b) to cable boot assembly, as shown by dotted arrow. FIG. 63D depicts inserting back body 6308 into proximal bore 6318 of cable boot assembly 6312, and cable boot moves over dotted line of back boot as cable boot assembly is pulled and pushed. Once cable boot is secured onto back body 6308, which is secured to inner housing 6332, outer housing 6331 is secured over inner housing via protrusions (6300a, 6300b).

FIGS. 64A and 64B depicts removal operation of SC connector 6000 from an adapter housing (not shown). FIG. 64A depicts cable boot 6412 not actuated or Pulled distally to move outer housing rearward, a distance "DL" as shown in FIG. 643. In FIG. 64B, User Pulls in a distal direction that moves outer housing 6431 a distance from DL, which represents a release of connector from adapter housing. As user pulls, by cable boot 6412 or outer housing, cable boot moves over back body 6308, and since outer housing 6313 is secured to cable boot 6412, connector 6000 is release from adapter. Comparing FIG. 64A with FIG. 64B, cable boot 6412 moves over back body 6408 a distance CM.

FIG. 65 depicts a two-piece push/pull tab clip-on 6500 using a slider structure form as a lengthwise tab and a recess pairing configured to form a snap-fit for releasably removing push-pull clip 6500 from distal end of fiber optic connector (refer to FIG. 66). Top housing 6501 has a plural of lengthwise tabs (6503a, 6503b) position about top housing 6501 to accept and secure bottom housing 6502 via a tab corresponding to recess (6504*a*, 6504*b*, 6504*c*, 6540*d*). Recess 6504*a* corresponds to lengthwise tab 6503*a* when bottom housing 6504 is mated with top housing 6501, tab 6502*a* is received in recess 6504*a*. Recess 6504*a* is on the inside of first sidewall 6505 and recess 6504*c* is on inside of second sidewall 6506. Recess 6504*a* and 6504*b* are shown by dotted line on outside of first sidewall 6505 and wing 6507 respectively. The remaining tab and recess pairings operate the same.

FIG. 66 depicts assembling bottom housing 6502 with top housing 6501 by sliding together recesses 6504 in bottom housing 6502 with corresponding protrusions 6503 in top housing 6501. FIG. 67 depicts assembled top housing 6501 and bottom housing 6502 or clip-on push/pull release assembly 6509 deploying a tab/recess snap-fit system. Fiber optic connector 6700 is depicted assembled with opposing plug frame (6508*a*, 6508*b*) having a latch on the top of the plug frame, the latch secures connector 6700 within an adapter port, as described in FIG. 24 above. Each plug frame (6508*a*, 6508*b*) has a corresponding ferrule protruding at a proximal end or first end of connector 6700. Refer to FIG. 24A that describes the elements of plug frame housing (6508*a*, 6508*b*). FIG. 24A differs from FIGS. 65-67 where a set of opposing tab 2421 and first leg 2143 and an opposing second leg attaches push/pull clip 2420 assembly to connector 2400 outer housing.

FIG. 68 depicts a two-piece "C" mount push/pull clip 6800 where the "C" mount body portion 6801 and two-piece snap-fit boot portion 6802 forms push/pull clip 6800. Once secured about a connector body (refer to FIG. 69 and FIG. 70), it forms a push/pull clip similar to clip 2420. User operation of clip 2420 and clip 6800 are the same for operatively releasing and inserting the connector out-of and into an adapter port respectively, as described above in FIG. 24. Referring to FIG. 68, body portion 6801 has two legs (6803*a*, 6803*b*) that extend perpendicular to axis A-A' of clip 6800. This allows clip legs (6803*a*, 6803*b*) to be secured about a corresponding portion of plug frame (6805*a*, 6805*b*). Two-piece snap-fit boot portion 6802 has a pair of opposing openings (6805, 6807) that are received in corresponding tabs (6806, 6808) which allows clip 6800 to be secured about cable boot 6810. Boot portion 6802 is secured when tabs (6806, 6808) are received in openings (6805, 6807).

FIG. 69 depicts the assembly "A" of boot portion 6802 after the body portion is clip about plug frame (6805*a*, 6805*b*). Boot portion 6802 is snap-fit about cable boot 6810. Referring to FIG. 70, a fiber optic connector is fitted with clip 6800. In operation, a user pulls on cable boot 6810 in a distal direction or in direction of arrow "R", and protrusion 6811 is push down by body portion 6801 housing as protrusion 6811 extends beyond body portion opening 6813, which in turn rotates down latches (6182*a*, 6812*b*) and connector 6800 is released from an adapter port.

FIG. 71 depicts FIG. 68 body portion 7101 and boot portion 7102 except boot portion 7102 is secured to body portion 7101 using tab 7103*b* and recess 7104*a* pairings, as similarly described in FIG. 65. Unlike FIG. 65, boot portion 7102 and body portion 7101 form two-piece push/pull clip 7100. FIG. 72 depicts assembling FIG. 73 which is connector 7100 ready for use. Boot portion 7102 is mated with body portion 7101 when recess 7104*c* (not shown) formed on inside of boot portion accepts recess 7103*b* formed as part of body portion 7101. Likewise opposing tab 7103*c* (not shown) but opposite of tab 7103*b* and having the same form of 7103*b* is accepted into recess 7104*d*. FIG. 73 depicts operation of connector 7100 assembled when releasing connector 7100 from an adapter port. As described in FIG. 70, user pulls on cable boot 7110 in a distal direction or in direction of arrow "R", which moves body portion 7101 distally. Protrusion 7111 is pushed down which rotates down the latches and releases the connector from the adapter port.

FIG. 74 depicts push/pull clip 7400 with a two-piece snap-fit at body portion 7401 and "C" clip or boot portion is 7402 integrally formed with body portion 7401. Lower housing 7404 is mated to body portion 7401 using an opposing pair of tab (7405*a*, 7405*b*) and recess (7406*a*, 7406*b*) forming the clip from two pieces. Recess 7406*a* is shown at dotted line on inside of lower housing 7404. FIG. 75 depicts body portion 7401 and boot portion 7402 formed as one piece and secured about the plug frame at a proximal end, and the boot portion 7402 secured about cable boot 7410 at a distal end of the connector. Lower housing 7404 is assembled in direction of arrow A, forms clip 7400 about the fiber optic connector as shown in FIG. 76. FIG. 76 operates similar to FIG. 73 where a user pulls on the cable in direction of arrow "R", and connector 7600 is released from an adapter port (not shown). Body portion 7401 has an opening which depresses a protrusion that rotates down a latch on the top of each plug frame, and releases connector 7600 from the adapter port.

FIG. 77 depicts an integrated body portion 7701 and boot portion 7702 formed as one-piece push/pull clip 7700. Body portion 7701 has a pair of opposing legs (7703*a*, 7703*b*) that are secured about corresponding plug frame (7705*a*, 7705*b*) (refer to FIG. 78). Boot portion 7702 has opening 7715 that is accepted by backpost 7814 when mated with the fiber optic connector main body. This secures clip 7700 to the main body portion of the fiber optic connector as described in FIG. 78. Opening 7713 accepts protrusion 7711 and operates as described in FIG. 79 below.

FIG. 78 depicts main body of the fiber optic connector having opposing plug frames (7805*a*, 7805*b*) and backpost 7814. Clip 7700 is mated with and installed onto the connector in direction of arrow A. Cable boot 7710 opening 7715 is press-fitted onto backpost 7814, and legs (7703*a*, 7703*b*) are secured about plug frames (7805*a*, 7805*b*), which secures clip 7700 with the fiber optic connector. FIG. 79 depicts the operation of clip 7700 when the user pulls on cable boot 7710 in the direction of arrow "R", protrusion 7711 is pushed down by opening 7713 and this rotates down adapter latches (7712*a*, 7712*b*) to release the connector from an adapter port.

FIG. 80 depicts one-piece clip 8000 with active release tab 8016. Assembly to the fiber optic connector main body is described in FIG. 78 above. FIG. 81 depicts clip 8000 installed with the fiber optic connector main body. Referring to FIG. 84, release tab 8016 is flexible and when depressed in direction, "P", latch arms (8017*a*, 8017*b*) are pushed down toward the top portion of each corresponding plug frame (8008*a*, 8008*b*), which rotates down latches (8012*a*, and 8012*b*) allowing the release of the connector from an adapter port in the direction of arrow "R" in FIG. 84. FIG. 82 depicts the underside of clip 8000 and release tab 8016. FIG. 83 depicts clip 8900 installed on the fiber optic connector, and prior to depressing release table 8016, as depicted in FIG. 84. Comparing FIG. 83 with FIG. 84, protrusion 8011 is moved downward as latch arms (8017*a*, 8017*b*) are depressed when pushing, "P", on release tab 8016, so protrusion does not jam within opening thereby preventing the connector from being removed from an adapter port.

Although a fiber optic connector has been used as an illustrative embodiment, this detailed description is not so limited, as any type of electrical and/or communication connector may be used according to some embodiments. The connectors, adapters, and connection assemblies formed therefrom may be used in combination with other connection elements and/or materials, such as crimpers, bands, straps, ferrules, locking materials, fluids, gels, or the like.

In the above detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be used, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds, compositions or biological systems, which can, of course, vary. It is also to be understood that the terminology used herein is for the purpose of describing particular embodiments only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (for example, bodies of the appended claims) are generally intended as "open" terms (for example, the term "including" should be interpreted as "including but not limited to," the term "having" should be interpreted as "having at least," the term "includes" should be interpreted as "includes but is not limited to"). While various compositions, methods, and devices are described in terms of "comprising" various components or steps (interpreted as meaning "including, but not limited to"), the compositions, methods, and devices can also "consist essentially of" or "consist of" the various components and steps, and such terminology should be interpreted as defining essentially closed-member groups. It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (for example, "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (for example), the bare recitation of "two recitations," without other modifiers, means at least two recitations, or two or more recitations). Furthermore, in those instances where a convention analogous to "at least one of A, B, and C, et cetera" is used, in general such a construction is intended in the sense one having skill in the art would understand the convention (for example, "a system having at least one of A, B, and C" would include but not be limited to systems that have A alone, B alone, C alone, A and B together, A and C together, B and C together, and/or A, B, and C together, et cetera). In those instances where a convention analogous to "at least one of A, B, or C, et cetera" is used, in general such a construction is intended in the sense one having skill in the art would understand the convention (for example, "a system having at least one of A, B, or C" would include but not be limited to systems that have A alone, B alone, C alone, A and B together, A and C together, B and C together, and/or A, B, and C together, et cetera). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, or the like. As a non-limiting example, each range discussed herein can be readily broken down into a lower third, a middle third, and an upper third. As will also be understood by one skilled in the art all language such as "up to," "at least," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

Various of the above-disclosed and other features and functions, or alternatives thereof, may be combined into many other different systems or applications. Various presently unforeseen or unanticipated alternatives, modifications, variations or improvements therein may be subsequently made by those skilled in the art, each of which is also intended to be encompassed by the disclosed embodiments.

What is claimed is:

1. A fiber optic connector comprising:
a top housing and a bottom housing;
a push-pull clip,
the push-pull clip configured to actuate a connection device;
the push-pull clip is formed from the top housing and the bottom housing,
the top housing has a plurality of lengthwise tabs and the bottom housing has a plurality of recesses;
the lengthwise tabs and recesses are pairs that mate when the top housing and bottom housing are secured about the fiber optic connector; and
wherein the fiber optic connector comprises a cable boot configured to be pulled in a rearward direction and thereby be displaced in the rearward direction with respect to another portion of the fiber optic connector; and
wherein the push-pull clip is configured to unlatch and release the fiber optic connector from an adapter when the cable boot is pulled in the rearward direction.

2. A fiber optic connector comprising:
a push-pull clip,
the push-pull clip configured to actuate a connection device;
the push-pull clip further comprises a body portion and a boot portion;
the body portion has a pair of opposing tabs at a distal end of the body portion; and wherein
the boot portion has a pair of opposing recesses configured to accept the opposing tabs to form the push/pull clip as part of the fiber optic connector;
wherein the fiber optic connector comprises a cable boot configured to be pulled in a rearward direction and thereby be displaced in the rearward direction with respect to another portion of the fiber optic connector;
wherein the boot portion one of (i) forms the cable boot and (ii) couples to the cable boot; and
wherein the push-pull clip is configured to unlatch and release the fiber optic connector from an adapter when the cable boot is pulled in the rearward direction.

3. The fiber optic connector of claim 2, wherein the body portion has a pair of opposing lengthwise tabs that are accepted by a corresponding pair of opposing recesses in the boot portion.

4. The fiber optic connector of claim 3, wherein the push-pull clip is used by pulling on a cable boot to release the fiber optic connector from an adapter.

5. A fiber optic connector comprising:
a lower housing;
a push-pull clip,
the push-pull clip configured to actuate a connection device;
the push-pull clip further comprises an integrated body portion and a boot portion;
the body portion has a pair of opposing lengthwise tabs that accept a corresponding recess formed as part of the lower housing; and wherein
by securing the lower housing to the proximal end of the body portion, the push-pull clip is secured about the fiber optic connector,
wherein the fiber optic connector comprises a cable boot configured to be pulled in a rearward direction and thereby be displaced in the rearward direction with respect to another portion of the fiber optic connector;
wherein the boot portion one of (i) forms and (ii) couples to the cable boot; and
wherein the push-pull clip is configured to unlatch and release the fiber optic connector from an adapter when the cable boot is pulled in the rearward direction.

6. A fiber optic connector comprising:
a back post;
a push-pull clip,
the push-pull clip configured to actuate a connection device;
the push-pull clip further comprises an integrated body portion and a boot portion;
the boot portion has an opening configured to secure the boot portion to the backpost of the fiber optic connector; and
wherein the fiber optic connector comprises a cable boot configured to be pulled in a rearward direction and thereby be displaced in the rearward direction with respect to another portion of the fiber optic connector;
wherein the boot portion one of (i) forms the cable boot and (ii) couples to the cable boot; and
wherein the push-pull clip is configured to unlatch and release the fiber optic connector from an adapter when the cable boot is pulled in the rearward direction.

7. The fiber optic connector of claim 6, wherein the push/pull clip has a flexible release tab formed as part of the body portion.

8. The fiber optic connector of claim 7, wherein in depressing the flexible release tab rotates down a pair latches to release the fiber optic connector from an adapter housing.

* * * * *